United States Patent
Stewart et al.

(10) Patent No.: US 11,293,770 B2
(45) Date of Patent: Apr. 5, 2022

(54) GEOGRAPHIC ROUTING ENGINE

(71) Applicant: Salesforce.com, Inc., San Francisco, CA (US)

(72) Inventors: John Brian Stewart, Charlotte, NC (US); Dinesh Premalal Weerapurage, Morrison, CO (US); Timothy Alan Carnes, Seattle, WA (US); Christopher Sebastian Groer, Knoxville, TN (US); Lahiru Sandakith Pileththuwasan Gallege, Knoxville, TN (US); Chenlu Lou, Knoxville, TN (US)

(73) Assignee: salesforces.com, Inc., San Francisco, CA (US)

( * ) Notice: Subject to any disclaimer, the term of this patent is extended or adjusted under 35 U.S.C. 154(b) by 187 days.

(21) Appl. No.: 16/727,658

(22) Filed: Dec. 26, 2019

(65) Prior Publication Data

US 2020/0263999 A1  Aug. 20, 2020

Related U.S. Application Data

(63) Continuation-in-part of application No. 16/236,644, filed on Dec. 31, 2018, now Pat. No. 10,354,529, and a continuation-in-part of application No. 16/236,490, filed on Dec. 29, 2018, now Pat. No. 10,955,249, which is a continuation of application No. 16/053,792, filed on Aug. 2, 2018, now Pat. No. 10,274,326, said application No. 16/236,644 is a continuation of application No. 16/053,793, filed on Aug. 2, 2018, now Pat. No. 10,242,571.

(51) Int. Cl.
| | |
|---|---|
| *G01C 21/34* | (2006.01) |
| *G06F 16/29* | (2019.01) |
| *G01C 21/36* | (2006.01) |

(52) U.S. Cl.
CPC ..... *G01C 21/3461* (2013.01); *G01C 21/3438* (2013.01); *G01C 21/3605* (2013.01); *G06F 16/29* (2019.01)

(58) Field of Classification Search
CPC ........... G01C 21/3461; G01C 21/3438; G01C 21/3605; G01C 21/32; G01C 21/3407; G01C 21/3446; G01C 21/34; G06F 16/29; G06F 16/9566; H04W 4/024; H04L 67/18; G06N 20/00
See application file for complete search history.

(56) References Cited

U.S. PATENT DOCUMENTS

| | | |
|---|---|---|
| 6,879,912 B2 | 4/2005 | Chen et al. |
| 7,092,964 B1 | 8/2006 | Dougherty et al. |
| (Continued) | | |

OTHER PUBLICATIONS

U.S. Appl. No. 16/053,792, Non Final Office Action dated Oct. 17, 2018.

(Continued)

*Primary Examiner* — Nicholas Kiswanto
(74) *Attorney, Agent, or Firm* — Kwan & Olynick LLP

(57) ABSTRACT

A server within an on-demand computing services environment may receive a request to determine a route that involves a set of geographic locations. The server may identify pre-computed path information suitable for responding to the request. A route may be determined based on the identified information, and route information may be transmitted in response to the request.

20 Claims, 172 Drawing Sheets

(56) References Cited

U.S. PATENT DOCUMENTS

| | | | |
|---|---|---|---|
| 7,181,344 B2 | 2/2007 | Lehmann et al. | |
| 7,848,880 B2 | 12/2010 | Cheung | |
| 7,949,642 B2 | 5/2011 | Yang et al. | |
| 8,005,609 B2 | 8/2011 | Uyeki et al. | |
| 8,260,743 B2 | 9/2012 | Suojasto | |
| 8,660,789 B2* | 2/2014 | Demiryurek | G01C 21/3446 701/423 |
| 9,280,567 B2 | 3/2016 | Fischer et al. | |
| 9,546,872 B1 | 1/2017 | Duan et al. | |
| 9,778,057 B2 | 10/2017 | O'Mahony et al. | |
| 9,945,678 B2 | 4/2018 | Carter et al. | |
| 10,088,324 B2 | 10/2018 | Chen et al. | |
| 10,142,255 B1 | 11/2018 | Pachon et al. | |
| 10,242,571 B1 | 3/2019 | Stewart et al. | |
| 10,274,326 B1 | 4/2019 | Stewart et al. | |
| 10,323,949 B1 | 6/2019 | Stewart et al. | |
| 10,323,950 B1 | 6/2019 | Stewart et al. | |
| 10,325,492 B1 | 6/2019 | Stewart et al. | |
| 10,325,493 B1 | 6/2019 | Stewart et al. | |
| 10,337,871 B1 | 7/2019 | Stewart et al. | |
| 10,354,529 B1 | 7/2019 | Stewart et al. | |
| RE47,985 E * | 5/2020 | Heed | G06Q 10/047 |
| 11,099,024 B2* | 8/2021 | Spears | G01C 21/3484 |
| 2002/0169778 A1* | 11/2002 | Natesan | G01C 21/34 |
| 2006/0014547 A1 | 1/2006 | Walter | |
| 2006/0155464 A1 | 7/2006 | Smartt et al. | |
| 2009/0138188 A1 | 5/2009 | Kores et al. | |
| 2009/0144030 A1 | 6/2009 | Witmer | |
| 2009/0282072 A1 | 11/2009 | Nagase et al. | |
| 2010/0286907 A1 | 11/2010 | Hilbrandie et al. | |
| 2011/0219027 A1 | 9/2011 | Uyama | |
| 2013/0179067 A1* | 7/2013 | Trowbridge | G01C 21/34 701/410 |
| 2013/0204528 A1 | 8/2013 | Okude et al. | |
| 2015/0073692 A1* | 3/2015 | Malikopoulos | B60W 50/14 701/123 |
| 2015/0106014 A1 | 4/2015 | Choi et al. | |
| 2015/0302743 A1 | 10/2015 | Hao et al. | |
| 2017/0219365 A1 | 8/2017 | Zhou et al. | |
| 2017/0219373 A1 | 8/2017 | Dimeo et al. | |
| 2017/0276502 A1 | 9/2017 | Fischer et al. | |
| 2018/0144369 A1 | 5/2018 | Pouliot | |
| 2018/0180423 A1 | 6/2018 | Baverstock et al. | |
| 2018/0259352 A1 | 9/2018 | Han | |
| 2018/0364061 A1* | 12/2018 | Chen | G01C 21/3469 |
| 2019/0266557 A1* | 8/2019 | Berk | G06N 20/00 |
| 2020/0041277 A1 | 2/2020 | Stewart et al. | |
| 2020/0041278 A1 | 2/2020 | Stewart et al. | |
| 2020/0041279 A1 | 2/2020 | Stewart et al. | |
| 2020/0041280 A1 | 2/2020 | Stewart et al. | |
| 2020/0041281 A1 | 2/2020 | Stewart et al. | |
| 2020/0041282 A1 | 2/2020 | Stewart et al. | |
| 2020/0041283 A1 | 2/2020 | Stewart et al. | |
| 2020/0043331 A1 | 2/2020 | Stewart et al. | |
| 2020/0043332 A1 | 2/2020 | Stewart et al. | |
| 2020/0043333 A1 | 2/2020 | Stewart et al. | |
| 2020/0043334 A1 | 2/2020 | Stewart et al. | |
| 2020/0043335 A1 | 2/2020 | Stewart et al. | |
| 2020/0043336 A1 | 2/2020 | Stewart et al. | |
| 2020/0043337 A1 | 2/2020 | Stewart et al. | |

OTHER PUBLICATIONS

U.S. Appl. No. 16/053,792, Notice of Allowance dated Jan. 23, 2019.
U.S. Appl. No. 16/053,793, Notice of Allowance dated Nov. 5, 2018.
U.S. Appl. No. 16/236,486, Notice of Allowance dated Apr. 8, 2019.
U.S. Appl. No. 16/236,489, Notice of Allowance dated Apr. 15, 2019.
U.S. Appl. No. 16/236,575, Notice of Allowance dated Apr. 8, 2019.
U.S. Appl. No. 16/236,577, Notice of Allowance dated Apr. 15, 2019.
U.S. Appl. No. 16/236,643, Notice of Allowance dated May 10, 2019.
U.S. Appl. No. 16/236,644, Notice of Allowance dated May 30, 2019.

* cited by examiner

| Road Segment | Distance |
|---|---|
| $\overline{AB}$ | 363 feet |
| $\overline{AC}$ | 724 feet |
| $\overline{AD}$ | 238 feet |
| $\overline{BE}$ | 264 feet |
| $\overline{BF}$ | 165 feet |
| $\overline{CD}$ | 561 feet |
| $\overline{DE}$ | 304 feet |

FIG. 7

Potential Path 1: $\overline{BF} + \overline{AB} + \overline{AC}$
165 + 363 + 724 = 1252

Potential Path 2: $\overline{BF} + \overline{AB} + \overline{AD} + \overline{CD}$
165 + 363 + 238 + 561 = 1327

Potential Path 3: $\overline{BF} + \overline{BE} + \overline{DE} + \overline{CD}$
165 + 264 + 304 + 561 = 1294

Potential Path 4: $\overline{BF} + \overline{BE} + \overline{DE} + \overline{AD} + \overline{AC}$
165 + 264 + 304 + 238 + 724 = 1695

| Road Segment | Distance |
|---|---|
| $\overline{AB}$ | 363 feet |
| $\overline{AC}$ | 724 feet |
| $\overline{AD}$ | 238 feet |
| $\overline{BE}$ | 264 feet |
| $\overline{BF}$ | 165 feet |
| $\overline{CD}$ | 561 feet |
| $\overline{DE}$ | 304 feet |

FIG. 12

| Path No. | Path | Total Distance |
|---|---|---|
| 1 | $\overline{BF} + \overline{AB} + \overline{AC}$ | (1252) |
| 2 | $\overline{BF} + \overline{AB} + \overline{AD} + \overline{CD}$ | 1327 |
| 3 | $\overline{BF} + \overline{BE} + \overline{DE} + \overline{CD}$ | 1294 |
| 4 | $\overline{BF} + \overline{BE} + \overline{DE} + \overline{AD} + \overline{AC}$ | 1695 |

FIG. 13

| Road Segment | Distance | Speed Limit | Est. Travel Time |
| --- | --- | --- | --- |
| $\overline{AB}$ | 363 feet | 35 mph | 7 seconds |
| $\overline{AC}$ | 724 feet | 35 mph | 14 seconds |
| $\overline{AD}$ | 238 feet | 35 mph | 5 seconds |
| $\overline{BE}$ | 264 feet | 25 mph | 7 seconds |
| $\overline{BF}$ | 165 feet | 25 mph | 5 seconds |
| $\overline{CD}$ | 561 feet | 45 mph | 9 seconds |
| $\overline{DE}$ | 304 feet | 45 mph | 5 seconds |

*FIG. 15*

Potential Path 1: $\overline{BF} + \overline{AB} + \overline{AC}$
5 + 7 + 14 = 26 seconds Potential Path 2: $\overline{BF} + \overline{AB} + \overline{AD} + \overline{CD}$
5 + 7 + 5 + 9 = 26 seconds Potential Path 3: $\overline{BF} + \overline{BE} + \overline{DE} + \overline{CD}$
5 + 7 + 5 + 9 = 26 seconds Potential Path 4: $\overline{BF} + \overline{BE} + \overline{DE} + \overline{AD} + \overline{AC}$
5 + 7 + 5 + 5 + 14 = 36 seconds

| Road Segment | Est. Travel Time |
|---|---|
| $\overline{AB}$ | 7 seconds |
| $\overline{AC}$ | 14 seconds |
| $\overline{AD}$ | 5 seconds |
| $\overline{BE}$ | 7 seconds |
| $\overline{BF}$ | 5 seconds |
| $\overline{CD}$ | 9 seconds |
| $\overline{DE}$ | 5 seconds |

*FIG. 16*

| Path No. | Path | Total Est. Trav. Time | Total Distance |
|---|---|---|---|
| 1 | $\overline{BF} + \overline{AB} + \overline{AC}$ | 26 seconds | 1252 |
| 2 | $\overline{BF} + \overline{AB} + \overline{AD} + \overline{CD}$ | 26 seconds | 1327 |
| 3 | $\overline{BF} + \overline{BE} + \overline{DE} + \overline{CD}$ | 26 seconds | 1294 |
| 4 | $\overline{BF} + \overline{BE} + \overline{DE} + \overline{AD} + \overline{AC}$ | 36 seconds | 1695 |

FIG. 17

| Path No. | Path | Total Est. Trav. Time | Total Distance |
|---|---|---|---|
| 1 | $\overline{BF} + \overline{AB} + \overline{AC}$ | 26 seconds | 1252 |
| 2 | $\overline{BF} + \overline{AB} + \overline{AD} + \overline{CD}$ | 26 seconds | 1327 |
| 3 | $\overline{BF} + \overline{BE} + \overline{DE} + \overline{CD}$ | 26 seconds | 1294 |
| 4 | $\overline{BF} + \overline{BE} + \overline{DE} + \overline{AD} + \overline{AC}$ | 36 seconds | 1695 |

FIG. 18

| Path No. | Path | Total Est. Trav. Time | No. of Turns |
|---|---|---|---|
| 1 | $\overline{BF} + \overline{AB} + \overline{AC}$ | 26 seconds | 0 |
| 2 | $\overline{BF} + \overline{AB} + \overline{AD} + \overline{CD}$ | 26 seconds | 2 |
| 3 | $\overline{BF} + \overline{BE} + \overline{DE} + \overline{CD}$ | 26 seconds | 2 |
| 4 | $\overline{BF} + \overline{BE} + \overline{DE} + \overline{AD} + \overline{AC}$ | 36 seconds | 4 |

FIG. 19

| Potential Path 1 | |
|---|---|
| Path Portion | Est. Travel Time |
| $\overline{BF}$ | 5 seconds |
| $\overline{AB}$ | 7 seconds |
| $\overline{AC}$ | 14 seconds |
| Total | 26 seconds |

FIG. 20

| Potential Path 2 | |
|---|---|
| Path Portion | Est. Travel Time |
| $\overline{BF}$ | 5 seconds |
| $\overline{AB}$ | 7 seconds |
| Left turn from $\overline{AB}$ on to $\overline{AD}$ | 30 seconds |
| $\overline{AD}$ | 5 seconds |
| Right turn from $\overline{AD}$ on to $\overline{CD}$ | 10 seconds |
| $\overline{CD}$ | 9 seconds |
| Total | 1 min 6 seconds |

FIG. 21

| Potential Path 3 | |
|---|---|
| Path Portion | Est. Travel Time |
| $\overline{BF}$ | 5 seconds |
| Left turn from $\overline{BF}$ on to $\overline{BE}$ | 30 seconds |
| $\overline{BE}$ | 7 seconds |
| Right turn from $\overline{BE}$ on to $\overline{DE}$ | 10 seconds |
| $\overline{DE}$ | 5 seconds |
| $\overline{CD}$ | 9 seconds |
| Total | 1 min 6 seconds |

FIG. 22

| Potential Path 4 | |
|---|---|
| Path Portion | Est. Travel Time |
| $\overline{BF}$ | 5 seconds |
| Left turn from $\overline{BF}$ on to $\overline{BE}$ | 30 seconds |
| $\overline{BE}$ | 7 seconds |
| Right turn from $\overline{BE}$ on to $\overline{DE}$ | 10 seconds |
| $\overline{DE}$ | 5 seconds |
| Right turn from $\overline{DE}$ on to $\overline{AD}$ | 10 seconds |
| $\overline{AD}$ | 5 seconds |
| Left turn from $\overline{AD}$ on to $\overline{AC}$ | 30 seconds |
| $\overline{AC}$ | 14 seconds |
| Total | 1 min 56 seconds |

FIG. 23

| Path No. | Path | Total Est. Trav. Time |
|---|---|---|
| 1 | $\overline{BF} + \overline{AB} + \overline{AC}$ | 26 seconds |
| 2 | $\overline{BF} + \overline{AB} + \overline{AD} + \overline{CD}$ | 1 min 6 seconds |
| 3 | $\overline{BF} + \overline{BE} + \overline{DE} + \overline{CD}$ | 1 min 6 seconds |
| 4 | $\overline{BF} + \overline{BE} + \overline{DE} + \overline{AD} + \overline{AC}$ | 1 min 56 seconds |

FIG. 24

| Potential Path 1 | |
|---|---|
| Path Portion | Est. Travel Time |
| $\overline{BF}$ | 5 seconds |
| Straight at Inter. (no light) | 15 seconds |
| $\overline{AB}$ | 7 seconds |
| Straight at Inter. (light) | 20 seconds |
| $\overline{AC}$ | 14 seconds |
| Total | 1 min 1 second |

FIG. 25

| Potential Path 2 | |
|---|---|
| Path Portion | Est. Travel Time |
| $\overline{BF}$ | 5 seconds |
| Straight at Intersection (no light) | 15 seconds |
| $\overline{AB}$ | 7 seconds |
| Left turn from $\overline{AB}$ on to $\overline{AD}$ (light) | 30 seconds |
| $\overline{AD}$ | 5 seconds |
| Right turn from $\overline{AD}$ on to $\overline{CD}$ (light) | 10 seconds |
| $\overline{CD}$ | 9 seconds |
| Total | 1 min 21 seconds |

FIG. 26

| Potential Path 3 | |
|---|---|
| Path Portion | Est. Travel Time |
| $\overline{BF}$ | 5 seconds |
| Left turn from $\overline{BF}$ on to $\overline{BE}$ (no light) | 20 seconds |
| $\overline{BE}$ | 7 seconds |
| Right turn from $\overline{BE}$ on to $\overline{DE}$ (light) | 10 seconds |
| $\overline{DE}$ | 5 seconds |
| Straight at Inter. (light) | 20 seconds |
| $\overline{CD}$ | 9 seconds |
| Total | 1 min 16 seconds |

FIG. 27

| Potential Path 4 | |
|---|---|
| Path Portion | Est. Travel Time |
| $\overline{BF}$ | 5 seconds |
| Left turn from $\overline{BF}$ on to $\overline{BE}$ (no light) | 20 seconds |
| $\overline{BE}$ | 7 seconds |
| Right turn from $\overline{BE}$ on to $\overline{DE}$ (light) | 10 seconds |
| $\overline{DE}$ | 5 seconds |
| Right turn from $\overline{DE}$ on to $\overline{AD}$ (light) | 10 seconds |
| $\overline{AD}$ | 5 seconds |
| Left turn from $\overline{AD}$ on to $\overline{AC}$ (light) | 30 seconds |
| $\overline{AC}$ | 14 seconds |
| Total | 1 min 46 seconds |

FIG. 28

| Path No. | Path | Total Est. Trav. Time |
|---|---|---|
| 1 | $\overline{BF} + \overline{AB} + \overline{AC}$ | 1 min 1 second |
| 2 | $\overline{BF} + \overline{AB} + \overline{AD} + \overline{CD}$ | 1 min 21 seconds |
| 3 | $\overline{BF} + \overline{BE} + \overline{DE} + \overline{CD}$ | 1 min 16 seconds |
| 4 | $\overline{BF} + \overline{BE} + \overline{DE} + \overline{AD} + \overline{AC}$ | 1 min 46 seconds |

FIG. 29

| Road Segment | Distance | Avg. Travel Time |
|---|---|---|
| $\overline{AB}$ | 363 | 9 seconds |
| $\overline{AC}$ | 724 | 14 seconds |
| $\overline{AD}$ | 238 | 8 seconds |
| $\overline{BE}$ | 264 | 7 seconds |
| $\overline{BF}$ | 165 | 5 seconds |
| $\overline{CD}$ | 561 | 10 seconds |
| $\overline{DE}$ | 304 | 8 seconds |

FIG. 31

| From | Type | On to | Avg. Time |
|---|---|---|---|
| $\overline{AB}$ | Straight | $\overline{AC}$ | 15 seconds |
| $\overline{AB}$ | Left | $\overline{AD}$ | 21 seconds |
| $\overline{AB}$ | Right Turn | $\overline{BE}$ | 4 seconds |
| $\overline{AB}$ | Straight | $\overline{BF}$ | 7 seconds |

FIG. 32

| Road Segment | Interval Start | Interval End | Avg. Travel Time |
|---|---|---|---|
| $\overline{AB}$ | 00:00:00 | 00:59:59 | 7 seconds |
| $\overline{AB}$ | 01:00:00 | 01:59:59 | 6 seconds |
| $\overline{AB}$ | 02:00:00 | 02:59:59 | 5 seconds |
| $\overline{AB}$ | 03:00:00 | 03:59:59 | 5 seconds |
| $\overline{AB}$ | 04:00:00 | 04:59:59 | 5 seconds |
| $\overline{AB}$ | 05:00:00 | 05:59:59 | 5 seconds |
| $\overline{AB}$ | 06:00:00 | 06:59:59 | 5 seconds |
| $\overline{AB}$ | 07:00:00 | 07:59:59 | 8 seconds |
| $\overline{AB}$ | 08:00:00 | 08:59:59 | 11 seconds |
| $\overline{AB}$ | 09:00:00 | 09:59:59 | 8 seconds |
| $\overline{AB}$ | 10:00:00 | 10:59:59 | 7 seconds |
| $\overline{AB}$ | 11:00:00 | 11:59:59 | 7 seconds |

*FIG. 33*

| Road Segment | Interval Start | Interval End | Avg. Travel Time |
|---|---|---|---|
| $\overline{AB}$ | 12:00:00 | 12:59:59 | 8 seconds |
| $\overline{AB}$ | 13:00:00 | 13:59:59 | 8 seconds |
| $\overline{AB}$ | 14:00:00 | 14:59:59 | 6 seconds |
| $\overline{AB}$ | 15:00:00 | 15:59:59 | 5 seconds |
| $\overline{AB}$ | 16:00:00 | 16:59:59 | 8 seconds |
| $\overline{AB}$ | 17:00:00 | 17:59:59 | 12 seconds |
| $\overline{AB}$ | 18:00:00 | 18:59:59 | 9 seconds |
| $\overline{AB}$ | 19:00:00 | 19:59:59 | 8 seconds |
| $\overline{AB}$ | 20:00:00 | 20:59:59 | 7 seconds |
| $\overline{AB}$ | 21:00:00 | 21:59:59 | 6 seconds |
| $\overline{AB}$ | 22:00:00 | 22:59:59 | 6 seconds |
| $\overline{AB}$ | 23:00:00 | 23:59:59 | 6 seconds |

FIG. 34

| Road Segment | Distance | Avg. Travel Time |
|---|---|---|
| $\overrightarrow{AB}$ | 363 | 10 seconds |
| $\overrightarrow{BA}$ | 363 | 9 seconds |

FIG. 38 prefValue p = (thispath.totalDistance * distWeight) + (thispath.estTime * timeWeight);

FIG. 40

| Path No. | Path | Total Est. Trav. Time | TimeVal | Total Dist. | DistVal | PrefVal |
|---|---|---|---|---|---|---|
| 1 | $\overline{BF} + \overline{AB} + \overline{AC}$ | 61 seconds | 1.694 | 1252 | 2.371 | (4.065) |
| 2 | $\overline{BF} + \overline{AB} + \overline{AD} + \overline{CD}$ | 81 seconds | 2.250 | 1327 | 2.513 | 4.763 |
| 3 | $\overline{BF} + \overline{BE} + \overline{DE} + \overline{CD}$ | 76 seconds | 2.111 | 1294 | 2.451 | 4.562 |
| 4 | $\overline{BF} + \overline{BE} + \overline{DE} + \overline{AD} + \overline{AC}$ | 106 seconds | 2.944 | 1695 | 3.210 | 6.154 |

TimeVal = Total Est. Trav. Time * timeWeight
timeWeight = (1 / 36)

DistVal = Total Dist * distWeight
distWeight = (1 / 528)

PrefVal = (TimeVal + DistVal)

FIG. 41

| No. | Path | estTime | TimeVal | totalDist | DistVal | PrefVal |
|---|---|---|---|---|---|---|
| 1 | $\overline{BF} + \overline{AB} + \overline{AC}$ | 61 seconds | 1.00000 | 1252 | 1.00000 | 1.00000 |
| 2 | $\overline{BF} + \overline{AB} + \overline{AD} + \overline{CD}$ | 81 seconds | 1.32787 | 1327 | 1.05990 | 1.19388 |
| 3 | $\overline{BF} + \overline{BE} + \overline{DE} + \overline{CD}$ | 76 seconds | 1.24590 | 1294 | 1.03354 | 1.13972 |
| 4 | $\overline{BF} + \overline{BE} + \overline{DE} + \overline{AD} + \overline{AC}$ | 106 seconds | 1.73770 | 1695 | 1.35383 | 1.54577 | leastTime = 61 seconds
leastDist = 1252 feet

TimeVal = estTime / leastTime
DistVal = totalDist / leastDist

PrefVal = ( (TimeVal * timeWeight) + (DistVal * distWeight) ) / (timeWeight + distWeight)

FIG. 42

```
path findPreferredPath(List<path> pathList, timeofday t, int distWeight, int timeWeight)
{
    dist leastDist = new dist();
    time leastTime = new time();

foreach (path x in pathList)
    {
        dist totalDist = findDist(x);
        x.totalDist = totalDist;
        if (totalDist < leastDist)
        {
            leastDist = totalDist;
        } time estTime = findAvgTime(x, t);
        x.estTime = estTime;
        if (estTime < leastTime)
        {
            leastTime = estTime;
        }
    } prefvalue p = new prefvalue();
    path prefPath = new path();

foreach (path x in pathList)
    {
        dist curDistVal = x.totalDist / leastDist;
        time curTimeVal = x.estTime / leastTime;
        prefvalue curPrefVal = ( (curDistVal * distWeight) + (curTimeVal * timeWeight) ) / (distWeight + timeWeight);

if (curPrefVal > p)
        {
            p = curPrefVal;
            prefPath = x;
        }
    } return prefPath;
}
```

FIG. 43

|  | From | | | |
|---|---|---|---|---|
| | 1 | 2 | 3 | 4 |
| Distance To 1 | | | | |
| 2 | | | | |
| 3 | | | | |
| 4 | | | | |

FIG. 51

|   | 1 | 2 | 3 | 4 |
|---|---|---|---|---|
| 1 | 0 feet | | | |
| 2 | | | | |
| 3 | | | | |
| 4 | | | | |

From / Distance To

Potential Path 1: $\overline{BF} + \overline{BE}$
165 + 264 = 429

Potential Path 2: $\overline{BF} + \overline{AB} + \overline{AD} + \overline{DE}$
165 + 363 + 238 + 304 = 1070

| Road Segment | Distance |
|---|---|
| $\overline{AB}$ | 363 feet |
| $\overline{AC}$ | 724 feet |
| $\overline{AD}$ | 238 feet |
| $\overline{BE}$ | 264 feet |
| $\overline{BF}$ | 165 feet |
| $\overline{CD}$ | 561 feet |
| $\overline{DE}$ | 304 feet |

FIG. 55

| Path No. | Path | Total Distance |
|---|---|---|
| 1 | $\overline{BF} + \overline{BE}$ | (429) |
| 2 | $\overline{BF} + \overline{AB} + \overline{AD} + \overline{DE}$ | 1070 |

FIG. 56

|  | \multicolumn{4}{c|}{From} |   |   |   |
|---|---|---|---|---|
|  | 1 | 2 | 3 | 4 |
| Distance To | 1 | 0 feet |  |  |  |
|  | 2 | 429 feet |  |  |  |
|  | 3 |  |  |  |  |
|  | 4 |  |  |  |  |

FIG. 57

|  | From | | | |
|---|---|---|---|---|
| | 1 | 2 | 3 | 4 |
| 1 | 0 feet | 429 feet | | |
| 2 | 429 feet | | | |
| 3 | | | | |
| 4 | | | | |

Distance To

FIG. 58

|  | From | | | |
|---|---|---|---|---|
|  | 1 | 2 | 3 | 4 |
| 1 | 0 feet | 429 feet | 528 feet | 1252 feet |
| 2 | 429 feet | 0 feet | 542 feet | 865 feet |
| 3 | 528 feet | 542 feet | 0 feet | 724 feet |
| 4 | 1252 feet | 865 feet | 724 feet | 0 feet |

Distance To

FIG. 59

|  | \multicolumn{4}{c}{From} |  |  |  |
|---|---|---|---|---|
| Time To | 1 | 2 | 3 | 4 |
| 1 |  |  |  |  |
| 2 |  |  |  |  |
| 3 |  |  |  |  |
| 4 |  |  |  |  |

| Path No. | Path | Total Time |
|---|---|---|
| 1 | $\vec{FB} + \vec{BE}$ | 30 secs |
| 2 | $\vec{FB} + \vec{BA} + \vec{AD} + \vec{DE}$ | 99 seconds |

FIG. 63

|  | \multicolumn{4}{c}{From} | | | |
|---------|---|---|---|---|
|  | 1 | 2 | 3 | 4 |
| Time To 1 | n/a | | | |
| Time To 2 | 30 secs | | | |
| Time To 3 | | | | |
| Time To 4 | | | | |

FIG. 64

|         | From |        |   |   |
|---------|------|--------|---|---|
|         | 1    | 2      | 3 | 4 |
| Time To 1 | n/a  | 21 secs |   |   |
| 2       | 30 secs |      |   |   |
| 3       |      |        |   |   |
| 4       |      |        |   |   |

FIG. 66

|  | From | | | |
|---|---|---|---|---|
| | 1 | 2 | 3 | 4 |
| 1 | n/a | 21 secs | 28 secs | 52 secs |
| 2 | 30 secs | n/a | 45 secs | 28 secs |
| 3 | 24 secs | 23 secs | n/a | 24 secs |
| 4 | 48 secs | 28 secs | 24 secs | n/a |

Time To

FIG. 67

|  |  | From | | | |
|---|---|---|---|---|---|
|  |  | 1 | 2 | 3 | 4 |
| Distance To | 1 | n/a | 429 feet | 528 feet | 1252 feet |
|  | 2 | 429 feet | n/a | 542 feet | 865 feet |
|  | 3 | 528 feet | 542 feet | n/a | 724 feet |
|  | 4 | 1252 feet | 865 feet | 724 feet | n/a |
| Time To | 1 | n/a | 21 secs | 28 secs | 52 secs |
|  | 2 | 30 secs | n/a | 45 secs | 28 secs |
|  | 3 | 24 secs | 23 secs | n/a | 24 secs |
|  | 4 | 48 secs | 28 secs | 24 secs | n/a |

FIG. 68

|  | From | | | |
|---|---|---|---|---|
| | 1 | 2 | 3 | 4 |
| Time To 1 | n/a | 21 secs | 28 secs | 52 secs |
| 2 | 30 secs | n/a | 45 secs | 28 secs |
| 3 | 24 secs | 23 secs | n/a | 24 secs |
| 4 | 48 secs | 28 secs | 24 secs | n/a |

| Potential Route 1 | |
|---|---|
| Route Portion | Est. Travel Time |
| 1 -> 2 | 30 secs |
| 2 -> 3 | 23 secs |
| 3 -> 4 | 24 secs |
| Total | 77 secs |

Potential Route 1: 1 -> 2 -> 3 -> 4

|   | From | | | |
|---|---|---|---|---|
| Time To | 1 | 2 | 3 | 4 |
| 1 | n/a | 21 secs | 28 secs | 52 secs |
| 2 | 30 secs | n/a | 45 secs | 28 secs |
| 3 | 24 secs | 23 secs | n/a | 24 secs |
| 4 | 48 secs | 28 secs | 24 secs | n/a |

| Potential Route 2 | |
|---|---|
| Route Portion | Est. Travel Time |
| 1 -> 3 | 24 secs |
| 3 -> 4 | 24 secs |
| 4 -> 2 | 28 secs |
| Total | 76 secs |

Potential Route 2: 1 -> 3 -> 4 -> 2

|   | From | | | |
|---|---|---|---|---|
| Time To | 1 | 2 | 3 | 4 |
| 1 | n/a | 21 secs | 28 secs | 52 secs |
| 2 | 30 secs | n/a | 45 secs | 28 secs |
| 3 | 24 secs | 23 secs | n/a | 24 secs |
| 4 | 48 secs | 28 secs | 24 secs | n/a |

| Potential Route 4 | |
|---|---|
| Route Portion | Est. Travel Time |
| 2 -> 4 | 28 secs |
| 4 -> 3 | 24 secs |
| 3 -> 1 | 28 secs |
| Total | 80 secs |

Potential Route 4: 2 -> 4 -> 3 -> 1

| Route No. | Route | Total Est. Time |
|---|---|---|
| 1 | 1 -> 2 -> 3 -> 4 | 77 secs |
| 2 | 1 -> 3 -> 4 -> 2 | (76 secs) |
| 3 | 4 -> 3 -> 2 -> 1 | 90 secs |
| 4 | 2 -> 4 -> 3 -> 1 | 80 secs |

*FIG. 74*

Problem: Two Trucks for Visiting Four Locations (1,2,3,4)
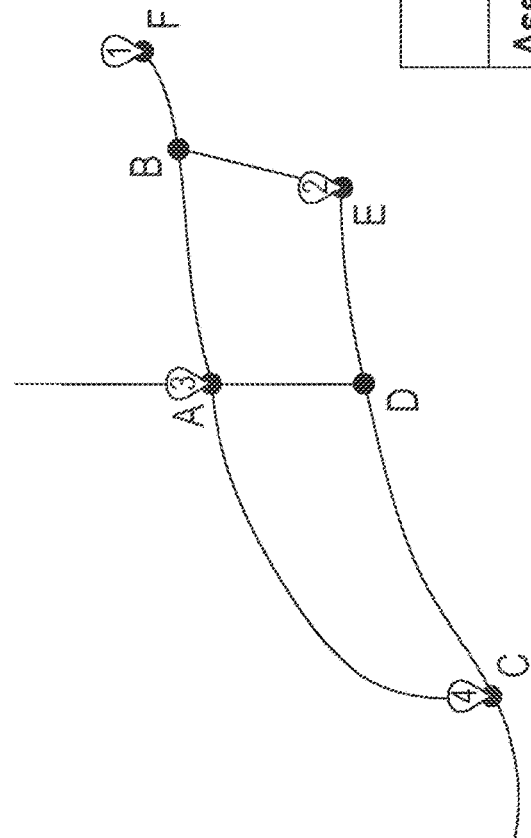
| Potential Assignments | |
|---|---|
| Assignment No. | Assignments |
| 1 | 1,2 AND 3,4 |
| 2 | 1,3 AND 2,4 |
| 3 | 1,4 AND 2,3 |
FIG. 75

|  | From | | | |
|---|---|---|---|---|
| Time To | 1 | 2 | 3 | 4 |
| 1 | n/a | 21 secs | 28 secs | 52 secs |
| 2 | 30 secs | n/a | 45 secs | 28 secs |
| 3 | 24 secs | 23 secs | n/a | 24 secs |
| 4 | 48 secs | 28 secs | 24 secs | n/a |

| Potential Assignment 1 | |
|---|---|
| Routes | Est. Travel Time |
| 1 -> 2 | 30 secs |
| 2 -> 1 | 21 secs |
| 3 -> 4 | 24 secs |
| 4 -> 3 | 24 secs |

Potential Assignment 1: 1,2 AND 3,4

| | | From | | | |
|---|---|---|---|---|---|
| | | 1 | 2 | 3 | 4 |
| Time To | 1 | n/a | 21 secs | 28 secs | 52 secs |
| | 2 | 30 secs | n/a | 45 secs | 28 secs |
| | 3 | 24 secs | 23 secs | n/a | 24 secs |
| | 4 | 48 secs | 28 secs | 24 secs | n/a |

| Potential Assignment 1 | |
|---|---|
| Routes | Est. Travel Time |
| 2 → 1 | 21 secs |
| 3 → 4 | 24 secs |
| Total | 45 secs |

Potential Assignment 1: 1,2 AND 3,4

Problem: Two Trucks for Visiting Four Locations (1,2,3,4)
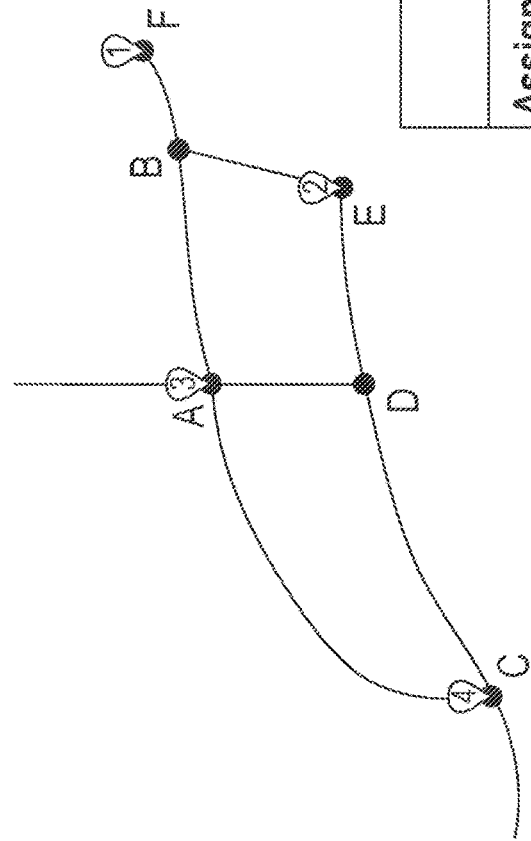
FIG. 80

Problem: Two Trucks at Location 1 for Visiting Three Locations (2,3,4)

| | | From | | | |
|---|---|---|---|---|---|
| | | 1 | 2 | 3 | 4 |
| Time To | 1 | n/a | 21 secs | 28 secs | 52 secs |
| | 2 | 30 secs | n/a | 45 secs | 28 secs |
| | 3 | 24 secs | 23 secs | n/a | 24 secs |
| | 4 | 48 secs | 28 secs | 24 secs | n/a |

| Potential Assignment 1 | | |
|---|---|---|
| Truck | Routes | Est. Travel Time |
| 1 | 1 -> 2 -> 3 | 53 secs |
| 1 | 1 -> 3 -> 2 | 69 secs |
| 2 | 1 -> 4 | 48 secs |
| Total | Preferred Routes | 101 secs |

Potential Assignment 1: 2,3 AND 4

|   | From | | | |
|---|---|---|---|---|
| Time To | 1 | 2 | 3 | 4 |
| 1 | n/a | 21 secs | 28 secs | 52 secs |
| 2 | 30 secs | n/a | 45 secs | 28 secs |
| 3 | 24 secs | 23 secs | n/a | 24 secs |
| 4 | 48 secs | 28 secs | 24 secs | n/a |

| Potential Assignment 2 | | |
|---|---|---|
| Truck | Routes | Est. Travel Time |
| 1 | 1 -> 2 -> 4 | 58 secs |
| 1 | 1 -> 4 -> 2 | 76 secs |
| 2 | 1 -> 3 | 24 secs |
| Total | Preferred Routes | 82 secs |

Potential Assignment 2: 2,4 AND 3

Problem: Two Trucks at Location 1 for Visiting Three Locations (2,3,4)
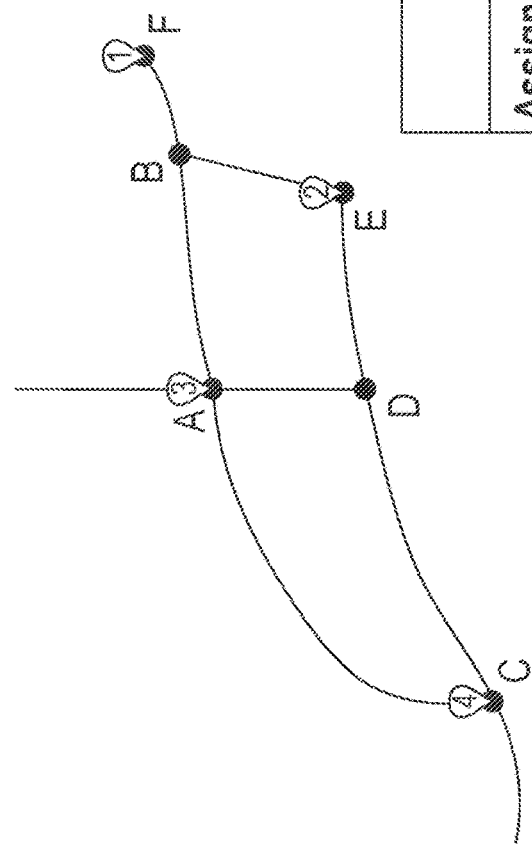
FIG. 85 weightedEstVal = weight * assignmentEstTime

FIG. 86

$$normalizedEstVal = \frac{assignmentEstTime}{minEstTime}$$

$$adjustedVal = weightedEstVal + \sum Penalty_n$$

FIG. 93B $$adjustedVal = normalizedEstVal + \sum Penalty_n$$

FIG. 93C

Potential Assignment 3: 3,4 AND 2

Potential Assignment 3

| Truck | Routes | Est. Travel Time | Penalty | Penalty Val. |
|---|---|---|---|---|
| 1 | 1 -> 3 -> 4 | 48 secs | 6 points | 0.06 |
| 1 | 1 -> 4 -> 3 | 72 secs | 6 points | 0.06 |
| 2 | 1 -> 2 | 30 secs | 0 points | 0.06 |

Problem: Two Trucks at Location 1 for Visiting Three Locations (2,3,4)

| | | Potential Solutions | | | | |
|---|---|---|---|---|---|---|
| Solution No. | Assign. No. | Routes | T. Est. Time | N. Est. Val. | Pen. Val. | Adj. Val. |
| 1 | 1 | 1 -> 2 -> 3 AND 1 -> 4 | 101 secs | 1.295 | 0.060 | 1.355 |
| 2 | 1 | 1 -> 3 -> 2 AND 1 -> 4 | 117 secs | 1.500 | 0.060 | 1.560 |
| 3 | 2 | 1 -> 2 -> 4 AND 1 -> 3 | 82 secs | 1.051 | 0.000 | 1.051 |
| 4 | 2 | 1 -> 4 -> 2 AND 1 -> 3 | 100 secs | 1.282 | 0.000 | 1.282 |
| 5 | 3 | 1 -> 3 -> 4 AND 1 -> 2 | 78 secs | 1.000 | 0.060 | 1.060 |
| 6 | 3 | 1 -> 3 -> 4 AND 1 -> 2 | 102 secs | 1.307 | 0.060 | 1.367 |

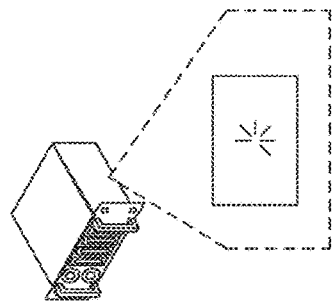
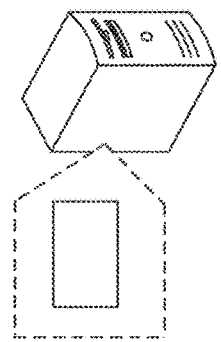
System generates possible solutions and evaluates against constraints.
FIG. 96C

1 → 4

| Path No. | Path | Total Est. Trav. Time | WEVal | PenVal | AdjVal |
|---|---|---|---|---|---|
| 1 | $\vec{FB} + \vec{BA} + \vec{AC}$ | 48 seconds | 0.800 | 0.060 | 0.860 |
| 2 | $\vec{FB} + \vec{BA} + \vec{AD} + \vec{DC}$ | 51 seconds | 0.850 | 0.000 | (0.850) |
| 3 | $\vec{FB} + \vec{BE} + \vec{ED} + \vec{DC}$ | 58 seconds | 0.966 | 0.000 | 0.966 |
| 4 | $\vec{FB} + \vec{BE} + \vec{ED} + \vec{DA} + \vec{AC}$ | 77 seconds | 1.283 | 0.060 | 1.343 |

Weighted Est. Val = Total Est. Trav. Time * timeWeight
timeWeight = (1 / 60)

AdjVal = (WEVal + PenVal)

|  | | From | | | |
|---|---|---|---|---|---|
|  |  | 1 | 2 | 3 | 4 |
| AdjValTo | 1 | n/a | 0.350 | 0.467 | 0.926 |
|  | 2 | 0.500 | n/a | 0.750 | 0.467 |
|  | 3 | 0.400 | 0.383 | n/a | 0.460 |
|  | 4 | 0.850 | 0.467 | 0.450 | n/a |

| Potential Assignment 1 | | |
|---|---|---|
| Truck | Routes | AdjVal |
| 1 | 1 -> 2 -> 3 | 0.883 |
| 1 | 1 -> 3 -> 2 | 1.150 |
| 2 | 1 -> 4 | 0.850 |
| Total | Preferred Routes | 1.733 |

Potential Assignment 1: 2,3 AND 4

| AdjVal To | From | | | |
|---|---|---|---|---|
| | 1 | 2 | 3 | 4 |
| 1 | n/a | 0.350 | 0.467 | 0.926 |
| 2 | 0.500 | n/a | 0.750 | 0.467 |
| 3 | 0.400 | 0.383 | n/a | 0.460 |
| 4 | 0.850 | 0.467 | 0.450 | n/a |

| Potential Assignment 2 | | |
|---|---|---|
| Truck | Routes | AdjVal |
| 1 | 1 -> 2 -> 4 | 0.967 |
| 1 | 1 -> 4 -> 2 | 1.317 |
| 2 | 1 -> 3 | 0.400 |
| Total Preferred Routes | | 1.367 |

Potential Assignment 2: 2,4 AND 3

Problem: Two Trucks at Location 1 for Visiting Three Locations (2,3,4)

Potential Solutions

| Solution No. | Assign. No. | Routes | Adj. Val. |
|---|---|---|---|
| 1 | 1 | 1 -> 2 -> 3 AND 1 -> 4 | 1.733 |
| 2 | 1 | 1 -> 3 -> 2 AND 1 -> 4 | 2.883 |
| 3 | 2 | 1 -> 2 -> 4 AND 1 -> 3 | 1.367 |
| 4 | 2 | 1 -> 4 -> 2 AND 1 -> 3 | 1.717 |
| 5 | 3 | 1 -> 3 -> 4 AND 1 -> 2 | 1.350 |
| 6 | 3 | 1 -> 3 -> 4 AND 1 -> 2 | 1.810 |

1 -> 4
Potential Path 1: $\vec{FB} + \vec{BA} + \vec{AC}$

| Potential Path 1 | | | | |
|---|---|---|---|---|
| Path Portion | Est. Travel Time | WEVal | PenVal | AdjVal |
| $\vec{FB}$ | 5 seconds | 0.083 | 0.000 | 0.083 |
| Straight from $\vec{FB}$ onto $\vec{BA}$ | 4 seconds | 0.066 | 0.000 | 0.066 |
| $\vec{BA}$ | 8 seconds | 0.133 | 0.000 | 0.133 |
| Straight from $\vec{BA}$ onto $\vec{AC}$ | 7 seconds | 0.116 | 0.000 | 0.166 |
| $\vec{AC}$ | 24 seconds | 0.400 | 0.060 | 0.460 |
| Total | 48 seconds | 0.800 | 0.060 | 0.860 |

|  | \multicolumn{4}{c}{From} | | | |
|---|---|---|---|---|
| | | 1 | 2 | 3 | 4 |
| Distance To | 1 | n/a | 374 feet (EDE) | | |
| | 2 | 374 feet (EDE) | n/a | | |
| | 3 | | | n/a | |
| | 4 | | | | n/a |

FIG. 105

| Distance To | | From | | | |
|---|---|---|---|---|---|
| | | 1 | 2 | 3 | 4 |
| | 1 | n/a | 374 feet (EDE) | 521 feet (EDE) | |
| | 2 | 374 feet (EDE) | n/a | | |
| | 3 | 521 feet (EDE) | | n/a | |
| | 4 | | | | n/a |

FIG. 107

|  | | From | | | |
|---|---|---|---|---|---|
|  |  | 1 | 2 | 3 | 4 |
| Distance To | 1 | n/a | 374 feet (EDE) | 521 feet (EDE) | 1139 feet (EDE) |
| | 2 | 374 feet (EDE) | n/a | 366 feet (EDE) | 812 feet (EDE) |
| | 3 | 521 feet (EDE) | 366 feet (EDE) | n/a | 655 feet (EDE) |
| | 4 | 1139 feet (EDE) | 812 feet (EDE) | 655 feet (EDE) | n/a |

*FIG. 108*

| | | From | | | |
|---|---|---|---|---|---|
| | | 1 | 2 | 3 | 4 |
| Distance To | 1 | n/a | 374 feet (EDE) | 521 feet (EDE) | 1139 feet (EDE) |
| | 2 | 374 feet (EDE) | n/a | 366 feet (EDE) | 812 feet (EDE) |
| | 3 | 521 feet (EDE) | 366 feet (EDE) | n/a | 655 feet (EDE) |
| | 4 | 1139 feet (EDE) | 812 feet (EDE) | 655 feet (EDE) | n/a |
| Time To | 1 | n/a | 14 secs (EDE) | 20 secs (EDE) | 44 secs (EDE) |
| | 2 | 14 secs (EDE) | n/a | 14 secs (EDE) | 32 secs (EDE) |
| | 3 | 20 secs (EDE) | 14 secs (EDE) | n/a | 26 secs (EDE) |
| | 4 | 44 secs (EDE) | 32 secs (EDE) | 26 secs (EDE) | n/a |

FIG. 109

| Time To | | From | | | |
|---|---|---|---|---|---|
| | | 1 | 2 | 3 | 4 |
| | 1 | n/a | 14 secs (EDE) | 20 secs (EDE) | 44 secs (EDE) |
| | 2 | 14 secs (EDE) | n/a | 14 secs (EDE) | 32 secs (EDE) |
| | 3 | 20 secs (EDE) | 14 secs (EDE) | n/a | 26 secs (EDE) |
| | 4 | 44 secs (EDE) | 32 secs (EDE) | 26 secs (EDE) | n/a |

| Potential Route 2 | |
|---|---|
| Route Portion | Est. Travel Time |
| 1 -> 3 | 20 secs |
| 3 -> 4 | 26 secs |
| 4 -> 2 | 32 secs |
| Total | 78 secs |

Potential Route 2: 1 -> 3 -> 4 -> 2

| Route No. | Route | Total Est. Time |
|---|---|---|
| 1 | 1 -> 2 -> 3 -> 4 | 54 secs |
| 2 | 1 -> 3 -> 4 -> 2 | 78 secs |
| 3 | 4 -> 3 -> 2 -> 1 | 54 secs |
| 4 | 2 -> 4 -> 3 -> 1 | 78 secs |

FIG. 112

|  | | From | | | |
|---|---|---|---|---|---|
|  |  | 1 | 2 | 3 | 4 |
| Distance To | 1 | n/a | 374 feet (EDE) | 521 feet (EDE) | 1139 feet (EDE) |
|  | 2 | 429 feet | n/a | 366 feet (EDE) | 812 feet (EDE) |
|  | 3 | 521 feet (EDE) | 366 feet (EDE) | n/a | 655 feet (EDE) |
|  | 4 | 1139 feet (EDE) | 812 feet (EDE) | 655 feet (EDE) | n/a |
| Time To | 1 | n/a | 14 secs (EDE) | 20 secs (EDE) | 44 secs (EDE) |
|  | 2 | 30 secs | n/a | 14 secs (EDE) | 32 secs (EDE) |
|  | 3 | 20 secs (EDE) | 14 secs (EDE) | n/a | 26 secs (EDE) |
|  | 4 | 44 secs (EDE) | 32 secs (EDE) | 26 secs (EDE) | n/a |

FIG. 113

| Time To | | From | | | |
|---|---|---|---|---|---|
| | | 1 | 2 | 3 | 4 |
| | 1 | n/a | 14 secs (EDE) | 20 secs (EDE) | 44 secs (EDE) |
| | 2 | 14 secs (EDE) | n/a | 14 secs (EDE) | 32 secs (EDE) |
| | 3 | 20 secs (EDE) | 14 secs (EDE) | n/a | 26 secs (EDE) |
| | 4 | 44 secs (EDE) | 32 secs (EDE) | 26 secs (EDE) | n/a |

| Potential Assignment 1 | |
|---|---|
| Routes | Est. Travel Time |
| 1,2 | 14 secs |
| 3,4 | 26 secs |
| Total | 40 secs |

Potential Assignment 1: 1,2 AND 3,4

| | | From | | | |
|---|---|---|---|---|---|
| | | 1 | 2 | 3 | 4 |
| Time To | 1 | n/a | 14 secs (EDE) | 20 secs (EDE) | 44 secs (EDE) |
| | 2 | 14 secs (EDE) | n/a | 14 secs (EDE) | 32 secs (EDE) |
| | 3 | 20 secs (EDE) | 14 secs (EDE) | n/a | 26 secs (EDE) |
| | 4 | 44 secs (EDE) | 32 secs (EDE) | 26 secs (EDE) | n/a |

| Potential Assignment 2 | |
|---|---|
| Routes | Est. Travel Time |
| 1,3 | 20 secs |
| 2,4 | 32 secs |
| Total | 52 secs |

Potential Assignment 2: 1,3 AND 2,4

| Time To | | From | | | |
|---|---|---|---|---|---|
| | | 1 | 2 | 3 | 4 |
| | 1 | n/a | 14 secs (EDE) | 20 secs (EDE) | 44 secs (EDE) |
| | 2 | 14 secs (EDE) | n/a | 14 secs (EDE) | 32 secs (EDE) |
| | 3 | 20 secs (EDE) | 14 secs (EDE) | n/a | 26 secs (EDE) |
| | 4 | 44 secs (EDE) | 32 secs (EDE) | 26 secs (EDE) | n/a |

| Potential Assignment 3 | |
|---|---|
| Routes | Est. Travel Time |
| 1,4 | 44 secs |
| 2,3 | 14 secs |
| Total | 58 secs |

Potential Assignment 3: 1,4 AND 2,3

| Assignment No. | Assignment | Total Est. Time |
|---|---|---|
| 1 | 1,2 AND 3,4 | 40 secs |
| 2 | 1,3 AND 2,4 | 52 secs |
| 3 | 1,4 AND 2,3 | 58 secs |

FIG. 117

| | From | | | | |
|---|---|---|---|---|---|
| Time To | | 1 | 2 | 3 | 4 |
| | 1 | n/a | (21 secs) | 28 secs | 52 secs |
| | 2 | (30 secs) | n/a | 45 secs | 28 secs |
| | 3 | 24 secs | 23 secs | n/a | 24 secs |
| | 4 | 48 secs | 28 secs | 24 secs | n/a |

Possible Orders: 1 -> 2 OR 2 -> 1

| Order | Est. Travel Time |
|---|---|
| 1 -> 2 | 30 secs |
| 2 -> 1 | (21 secs) |

| Time To | From | | | |
|---|---|---|---|---|
| | 1 | 2 | 3 | 4 |
| 1 | n/a | 21 secs | 20 secs (EDE) | 44 secs (EDE) |
| 2 | 30 secs | n/a | 14 secs (EDE) | 32 secs (EDE) |
| 3 | 20 secs (EDE) | 14 secs (EDE) | n/a | 24 secs |
| 4 | 44 secs (EDE) | 32 secs (EDE) | 24 secs | n/a |

| Assignment | |
|---|---|
| Routes | Est. Travel Time |
| 2 -> 1 | 21 secs |
| 3 -> 4 | 24 secs |
| Total | 45 secs |

Assignment: 2 -> 1 AND 3 -> 4

```
int[] bestFit = new int[intervals];

for (int i=0; i<=intervals; i++) {
    theSum = 0;
    foreach (roadSegment r in theSegments) {
        theSum = theSum + r[i].normalizedAvgTravelTime;
    }
    bestFit[i] = theSum / intervals;
}
```

FIG. 127 normalizedAverageTravelTime(A -> C, 0:00 - 0:59) = 0.9 normalizedAverageTravelTime(C -> A, 0:00 - 0:59) = 0.85 normalizedAverageTravelTime(A -> D, 0:00 - 0:59) = 0.7

$$\text{normalizedBestFit}(0{:}00 - 0{:}59) = \frac{0.9 + 0.85 + 0.7}{3} = \boxed{0.81\overline{6}}$$

FIG. 128 normalizedBestFit(0:00 - 0:59) = 0.81$\overline{6}$ normalizedBestFit(1:00 - 1:59) = 0.81$\overline{6}$ normalizedBestFitDelta(0:00 - 0:59 -> 1:00 - 1:59) = 0.0 normalizedBestFit(1:00 - 1:59) = 0.81$\overline{6}$ normalizedBestFit(2:00 - 2:59) = 0.9 normalizedBestFitDelta(1:00 - 1:59 -> 2:00 - 2:59) = 0.08$\overline{3}$ secondOrderDelta(0:00 - 0:59 -> 1:00 - 1:59, 1:00 - 1:59 -> 2:00 - 2:59) = 0.08$\overline{3}$ - 0.0 = (0.08$\overline{3}$)

FIG. 132

$\text{secondOrderDelta}(0{:}00 - 0{:}59 \rightarrow 1{:}00 - 1{:}59, 1{:}00 - 1{:}59 \rightarrow 2{:}00 - 2{:}59) = 0.08\overline{3}$ $\text{minThreshold} = 0.08$ $0.08\overline{3} > 0.08$ $\text{secondOrderDelta}(0{:}00 - 0{:}59 \rightarrow 1{:}00 - 1{:}59, 1{:}00 - 1{:}59 \rightarrow 2{:}00 - 2{:}59) > \text{minThreshold}$

FIG. 133

```
List<jTime> theList = new List<jTime>();

foreach (jTime thisTime in bestFit.getTimes()) {
    curValue = bestFit.getValueAt(thisTime);
    preDelta = curValue - bestFit.getValueAt(thisTime - theInterval);
    postDelta = bestFit.getValueAt(thisTime + theInterval) - curValue;
    curSecondDelta = postDelta - preDelta;
    if (Abs(curSecondDelta) > minThreshold) {
        theList.Add(thisTime);
    }
}
```

FIG. 137

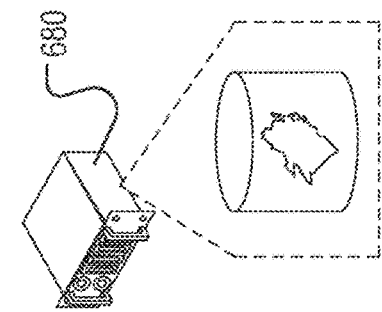
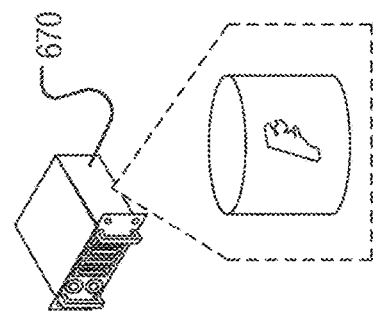
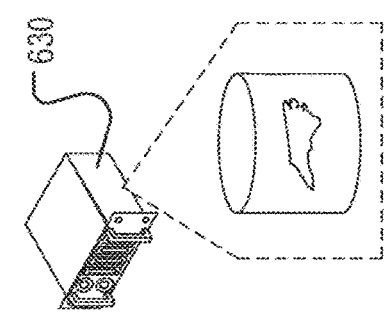
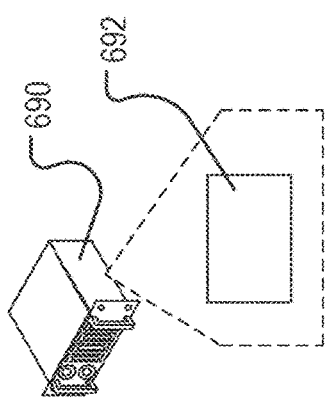
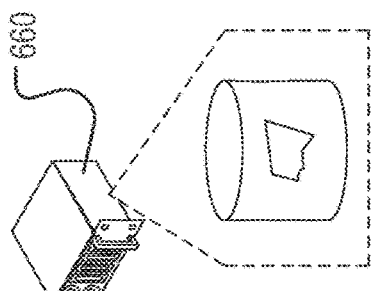
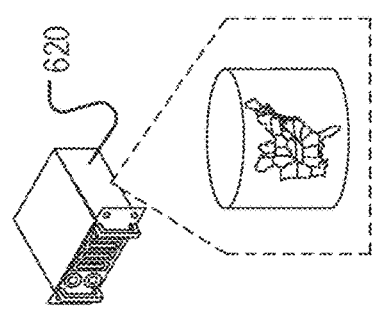
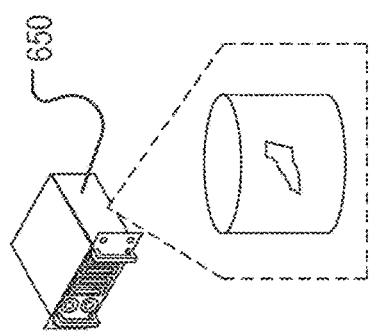
FIG. 153

GEOGRAPHIC ROUTING ENGINE

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

CROSS-REFERENCE TO RELATED APPLICATIONS

This application is a continuation-in-part of co-pending and commonly assigned U.S. patent application Ser. No. 16/236,490, filed Dec. 29, 2018, titled "USING A GEO-LOCATOR SERVICE AND ZONE SERVERS TO REDUCE COMPUTER RESOURCE REQUIREMENTS FOR DETERMINING HIGH-QUALITY SOLUTIONS TO ROUTING PROBLEMS", by Stewart et al., which is a continuation of U.S. Pat. No. 10,274,326, filed Aug. 2, 2018, titled "Using a geo-locator service and zone servers to reduce computer resource requirements for determining high-quality solutions to routing problems", by Stewart et al., both of which are hereby incorporated by reference in their entirety and for all purposes. This application is also a continuation-in-part of co-pending and commonly assigned U.S. patent application Ser. No. 16/236,644, filed Dec. 31, 2018, titled "USING DETERMINED OPTIMIZED TIME WINDOWS FOR PRECOMPUTING OPTIMAL PATH MATRICES TO REDUCE COMPUTER RESOURCE USAGE", by Stewart et al., which is a continuation of U.S. Pat. No. 10,242,571, filed Aug. 2, 2018, by Stewart et al., both of which are hereby incorporated by reference in their entirety and for all purposes.

FIELD OF TECHNOLOGY

The present invention generally relates to approaches for solving routing problems, such as vehicle routing problems.

BACKGROUND

Software which is configured to provide solutions to vehicle routing problems is increasingly ubiquitous. Most smart phones offer access to simplistic routing software which can be used to generate and display an optimized route for a user's vehicle.

However, conventional approaches used by typical routing software present a number of problems, particularly when considering determination of routing solutions for more complicated or complex routing problems, such as those involving a large number of locations or a large geographical area.

BRIEF DESCRIPTION OF THE DRAWINGS

The included drawings are for illustrative purposes and serve only to provide examples of possible structures and operations for the disclosed inventive systems, apparatus, methods and computer program products for solving routing problems. These drawings in no way limit any changes in form and detail that may be made by one skilled in the art without departing from the spirit and scope of the disclosed implementations.

FIG. 7 illustrates a table of road segments from FIG. 6 and their corresponding distances.

FIG. 12 illustrates total distance summations for potential paths.

FIG. 13 illustrates a shortest path identification from the distance summations.

FIG. 15 illustrates a table of estimated travel times based on speed limits of the road segments.

FIG. 16 illustrates calculation of estimated travel times for potential paths.

FIG. 17 illustrates estimated travel times and total distances for potential paths.

FIG. 18 illustrates determination of a preferred path.

FIG. 19 illustrates determination of a preferred path using estimated travel times and a number of turns.

FIGS. 20-24 illustrate calculation of total estimated travel time for the paths of FIGS. 8-11, updated to account for turning time.

FIGS. 25-29 illustrate calculation of total estimated travel time for the paths of FIGS. 8-11, updated to account for time at various types of intersections and turning time.

FIG. 31 illustrates an example of average travel time values calculated for road segments based on historical data.

FIG. 32 illustrates an example of average historical travel time values calculated for navigation from one road segment to another.

FIG. 33-34 illustrate an example of average travel times for windows of time throughout a day.

FIG. 38 illustrates an example of travel times for the road segments illustrated in FIG. 37.

FIG. 40 illustrates a calculation of a preference value for a path using a distance weight and a time weight.

FIG. 41 illustrates a calculation of such a preference value for each potential path of FIGS. 8-11.

FIG. 42 illustrates a calculation of normalized time and distance values, and a preference value.

FIG. 43 illustrates an example of C Sharp style pseudocode for calculation of a preference value based on normalized time and distance values.

FIG. 51 illustrates a simple two-dimensional grid for distance values for shortest paths between each location.

FIG. 52 illustrates a grid for an example of a scenario in which the distance between any location and itself would be zero.

FIG. 55 illustrates calculation of total distance values for each path in FIG. 53 and FIG. 54.

FIG. 56 illustrates the identification of a shortest distance path.

FIGS. 57-58 illustrate the population of a shortest distance path value in the grid of FIG. 51.

FIG. 59 illustrates the population of all shortest distance path values in the grid of FIG. 51.

FIG. 60 illustrates a simple two-dimensional grid for estimated time values for shortest paths between each location.

FIG. 63 illustrates the identification of the shortest travel time from FIGS. 61-62.

FIG. 64 illustrates the population of a shortest travel time in the grid of FIG. 60.

FIG. 66 illustrates the population of a shortest travel time in the grid of FIG. 60.

FIG. 67 illustrates the population of all shortest travel times in the grid of FIG. 60.

FIG. 68 illustrates the shortest distance and shortest travel times stored in a matrix together.

FIG. 74 illustrates identification of a preferred route.

FIG. 75 illustrates three potential assignments of trucks for a routing problem.

FIG. 80 illustrates comparison of estimated travel times for different potential assignments of two trucks.

FIG. 85 illustrates determination of an estimated travel time for a third potential assignment of two trucks.

FIG. 86 illustrates weighting of an estimated time value for an assignment.

FIG. 88 illustrates calculation of a normalized value for an estimated value for an assignment.

FIGS. 91-92 illustrate an example of a user interface for specifying constraints and penalties for a routing problem.

FIGS. 93A-C illustrate approaches for the calculation of penalty values and adjusted values taking such penalty values into account.

FIGS. 96A-D illustrate one or more an example of methodologies for generating high-quality solutions to a routing problem.

FIG. 105 illustrates the estimate from FIG. 104 stored in a shortest path matrix.

FIG. 107 illustrates the estimate from FIG. 106 stored in the same shortest path matrix from FIG. 105.

FIG. 108 illustrates population of the shortest path matrix of FIG. 105.

FIG. 109 illustrates population of estimated time values in a shortest path matrix.

FIG. 112 illustrates identification of a preferred or optimized route.

FIG. 113 illustrates updating the shortest path matrix of FIG. 109 with a computed value.

FIG. 117 illustrates comparison of potential assignments.

FIG. 127 illustrates an example of C Sharp style pseudo-code for calculation of a best fit line based on normalized average travel time values throughout the day.

FIG. 128 illustrates calculation of a best fit average travel time value for a simplified best fit line for a specific window of time.

FIG. 132 illustrates simplified calculation of a second order delta representing a change in the rate of change at a specific time interval.

FIG. 133 illustrates comparison of the calculated second order delta of FIG. 132 to a threshold value.

FIG. 137 illustrates an example of C Sharp style pseudo-code for simplified determination of times to be used for definition of traffic windows.

FIG. 141 illustrates characterization of the state of North Carolina as a zone.

FIG. 142 illustrates that a zone may have a designated server.

FIG. 143 illustrates characterization of the state of Florida as a zone.

FIG. 144 illustrates provision of a server including data for a zone corresponding to Florida.

FIG. 145 illustrates that a single server may include data for two or more zones.

FIGS. 146-152 illustrate that multiple zones may overlap or be nested inside of one another.

FIG. 153 illustrates a server comprising a geo-locator service which contains information regarding defined zones.

FIG. 154 illustrates three locations involved in a routing problem.

FIG. 155-158 illustrate a methodology in which a geo-locator service is used to allow a requestor to determine what server to contact to receive information for a routing problem.

FIGS. 159-160 illustrate another example of determination of a smallest defined zone containing all of the locations involved in a routing problem.

FIG. 161 shows a block diagram of an example of an environment that includes an on-demand database service configured in accordance with some implementations.

FIG. 162A shows a system diagram of an example of architectural components of an on-demand database service environment, configured in accordance with some implementations.

Figure 162A:
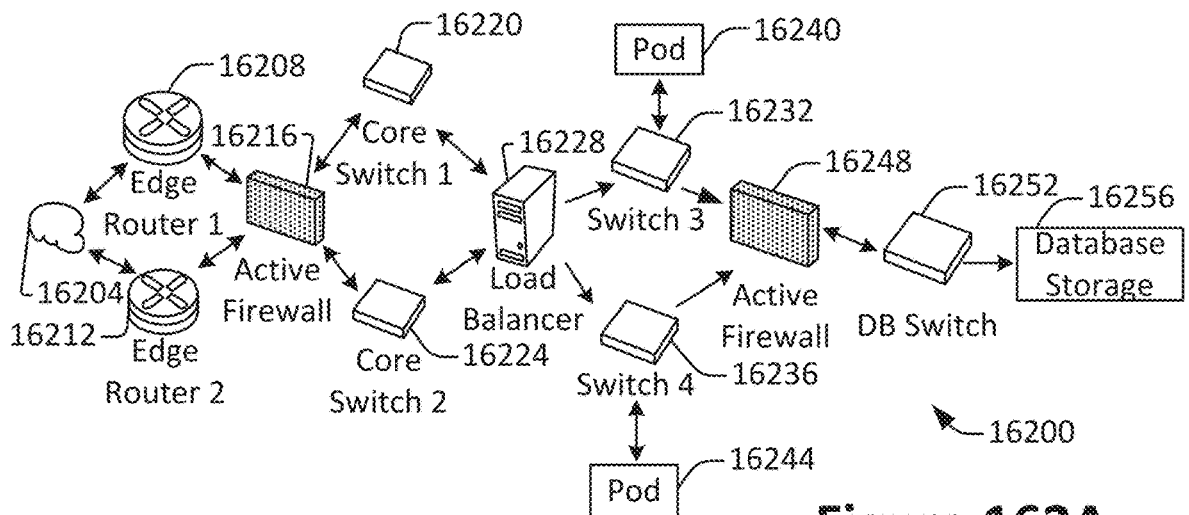
Figure 162B:
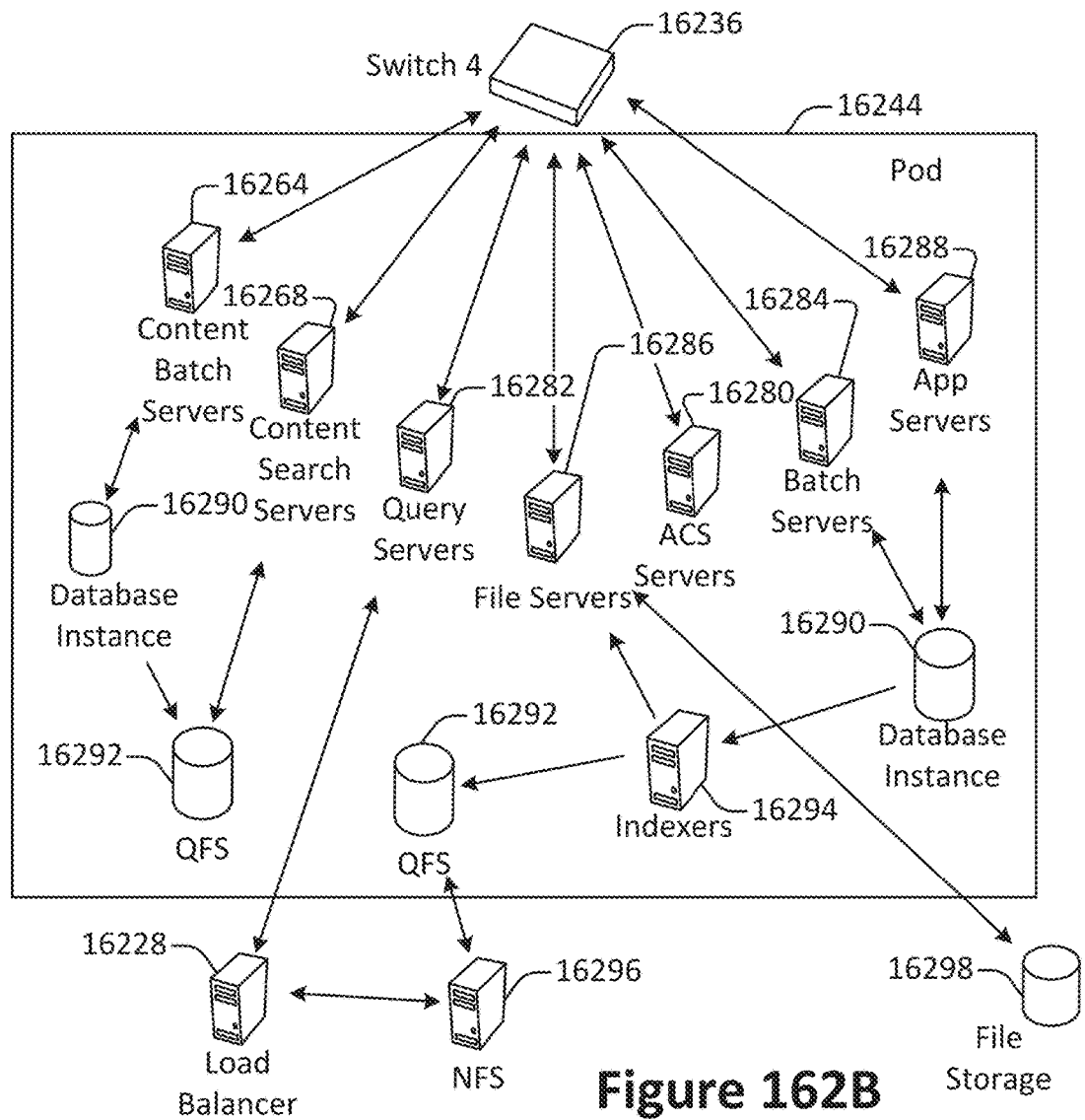

FIG. 162B shows a system diagram further illustrating an example of architectural components of an on-demand database service environment, in accordance with some implementations.

Figure 163:
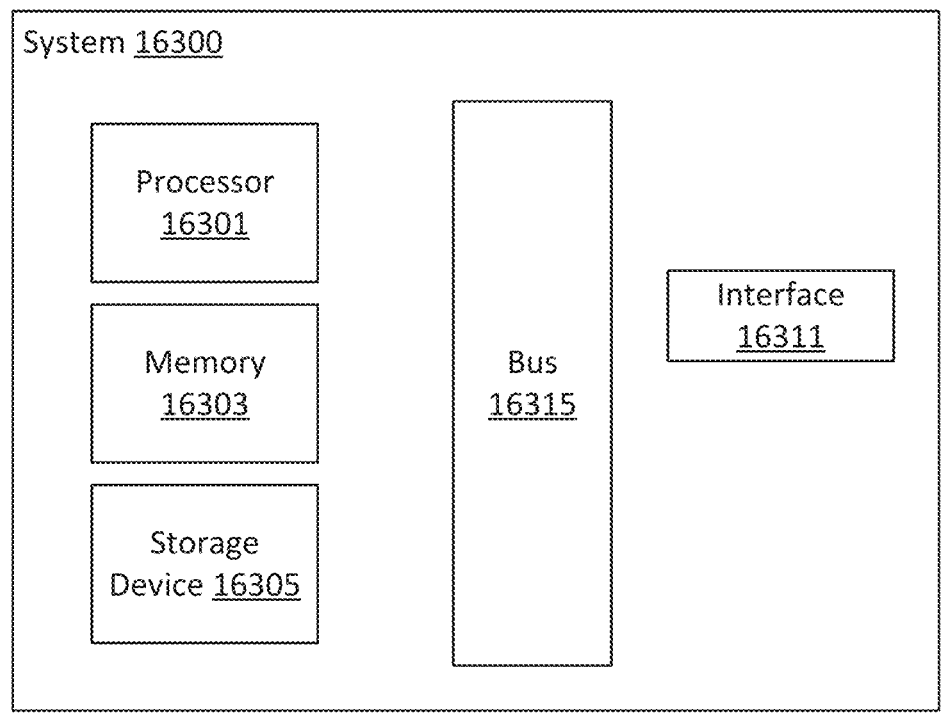

FIG. 163 illustrates one example of a computing device.

Figure 164:
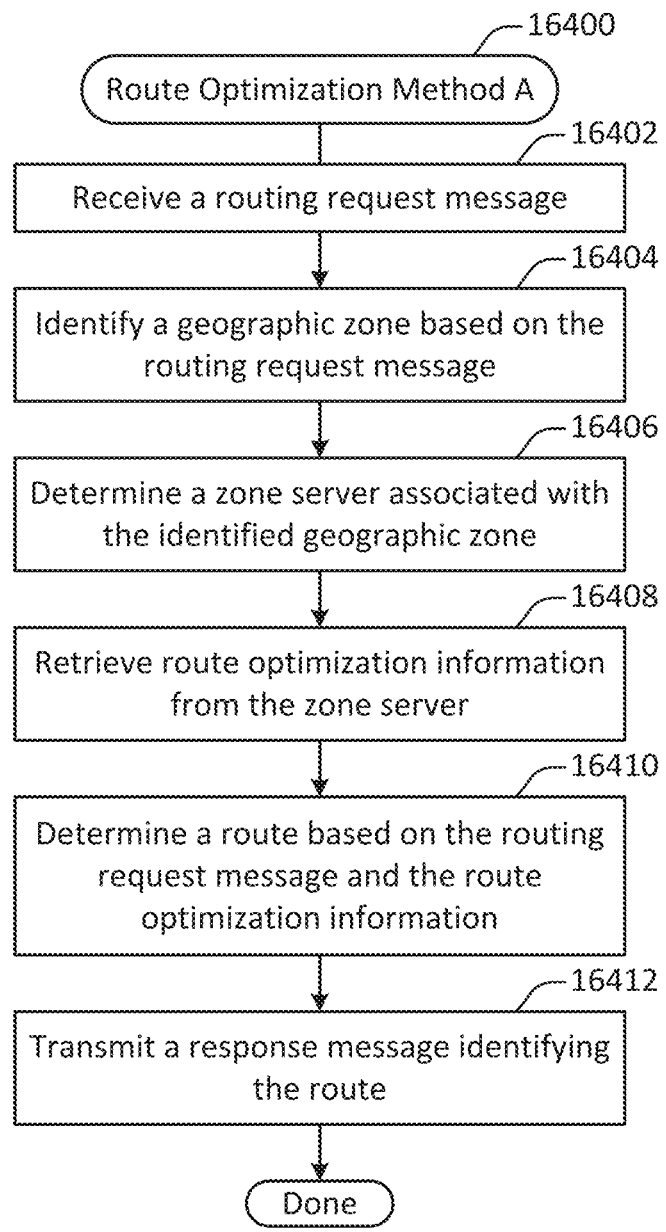

FIG. 164 illustrates a method for determining an optimized route, performed in accordance with one or more embodiments.

Figure 165:
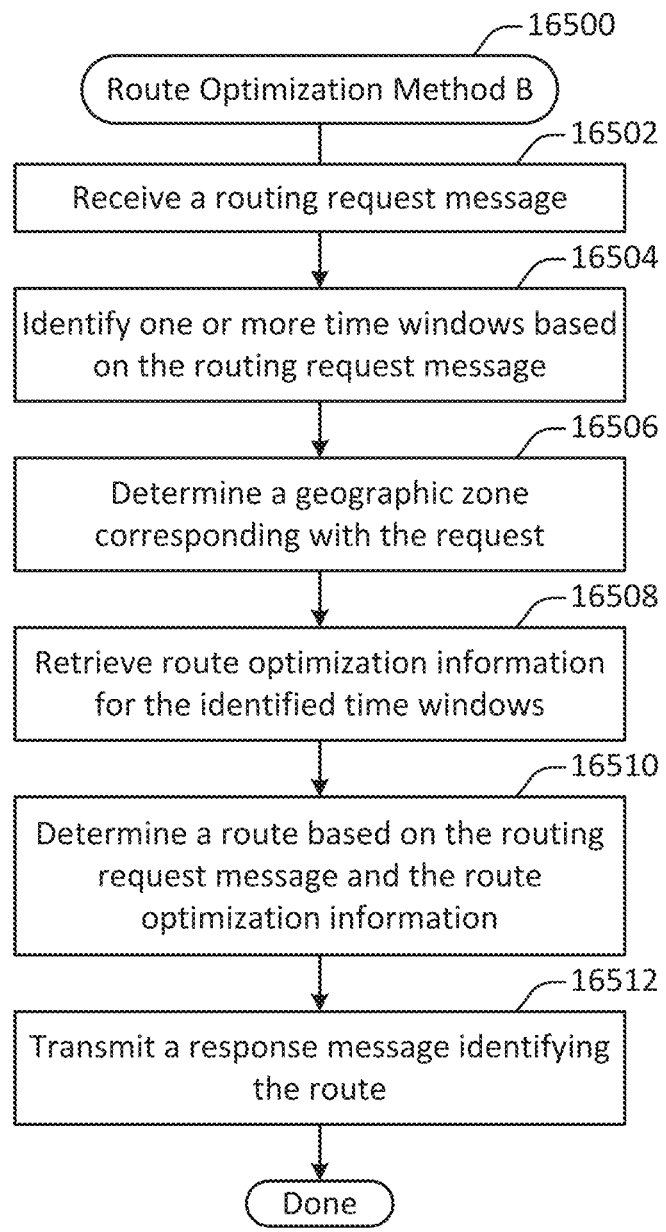

FIG. 165 illustrates a method for determining an optimized route, performed in accordance with one or more embodiments.

Figure 166:
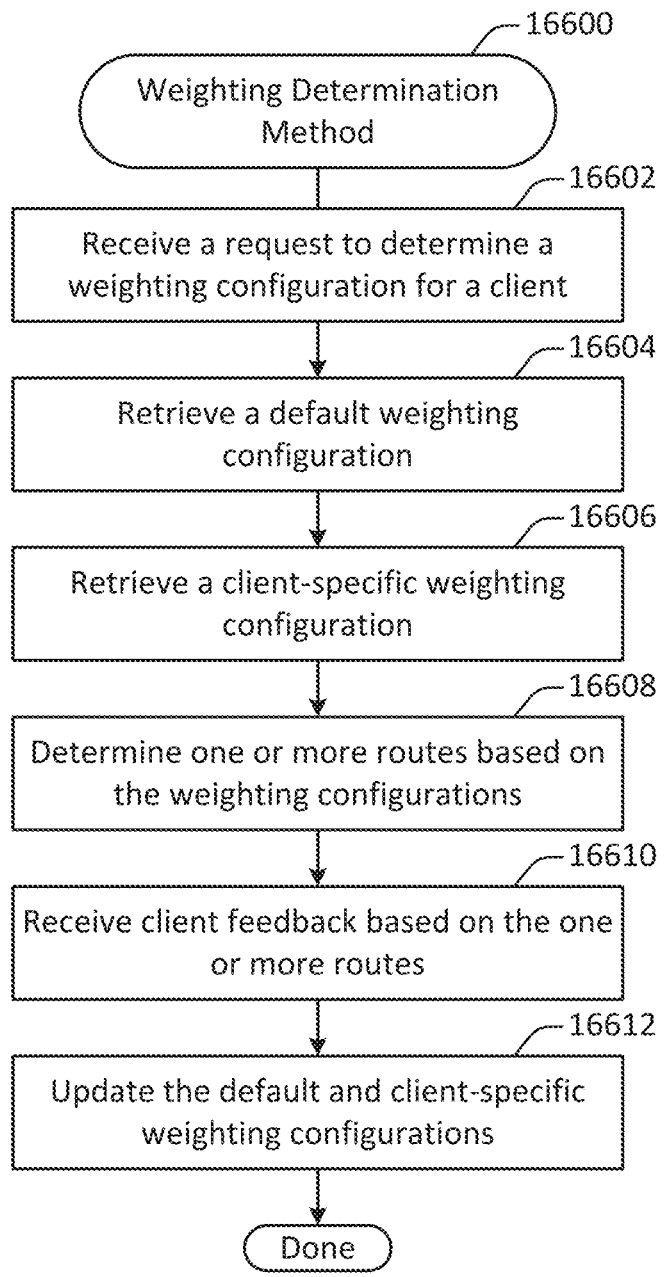

FIG. 166 illustrates a method for determining an optimized route, performed in accordance with one or more embodiments.

DETAILED DESCRIPTION

Introduction

Figure 1:
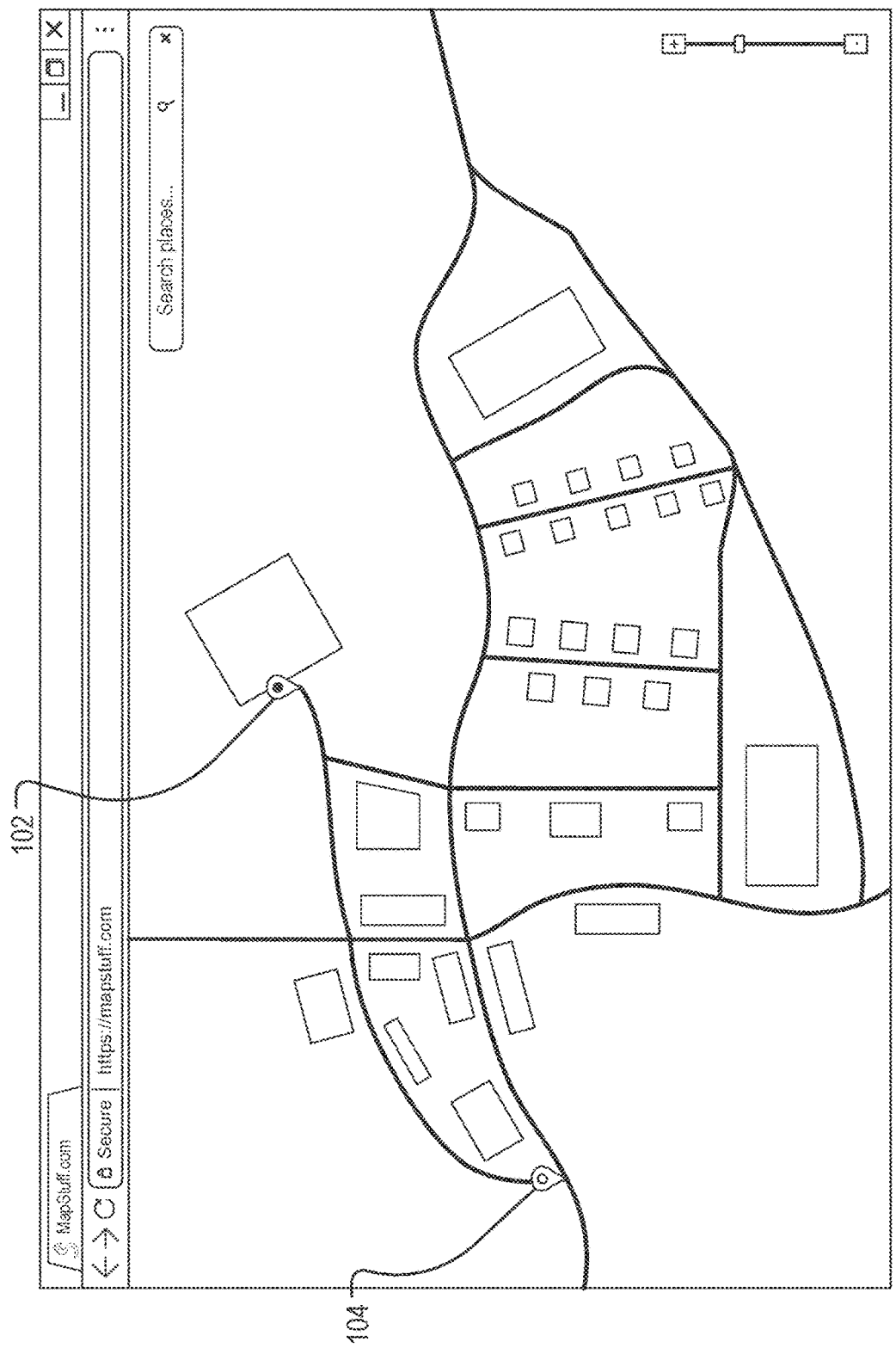
FIG. 1 illustrates an example of a graphical user interface for an example of software configured to provide solutions to routing problems.

FIG. 1 illustrates an example of a graphical user interface for an example of software which is configured to provide solutions to routing problems. The graphical user interface includes a map with a first placement marker 102 indicating a start location and second placement marker 104 indicating a desired destination location.

Figure 2:
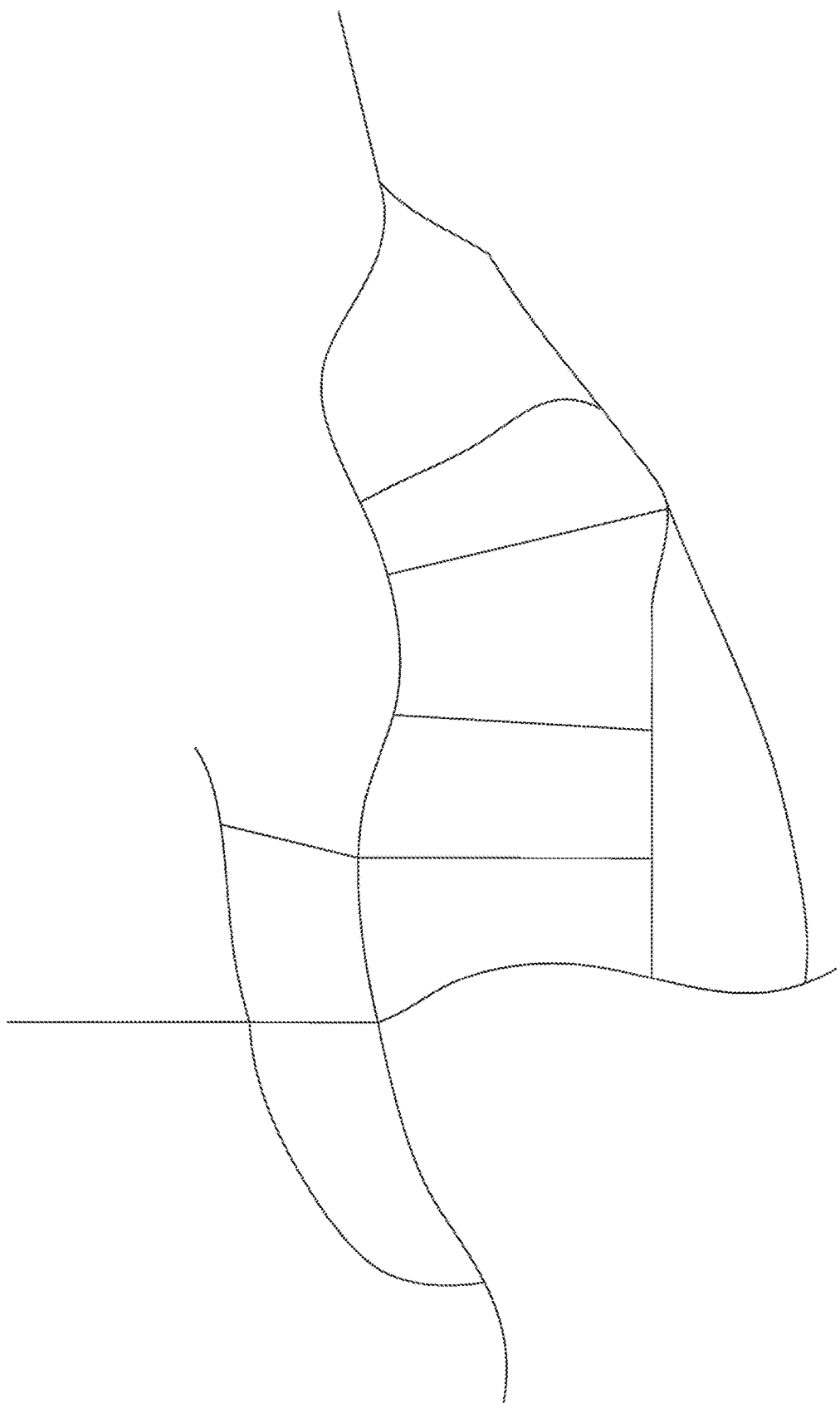
FIG. 2 illustrates a portion of a road network from the graphical user interface of FIG. 1.
Figure 3:
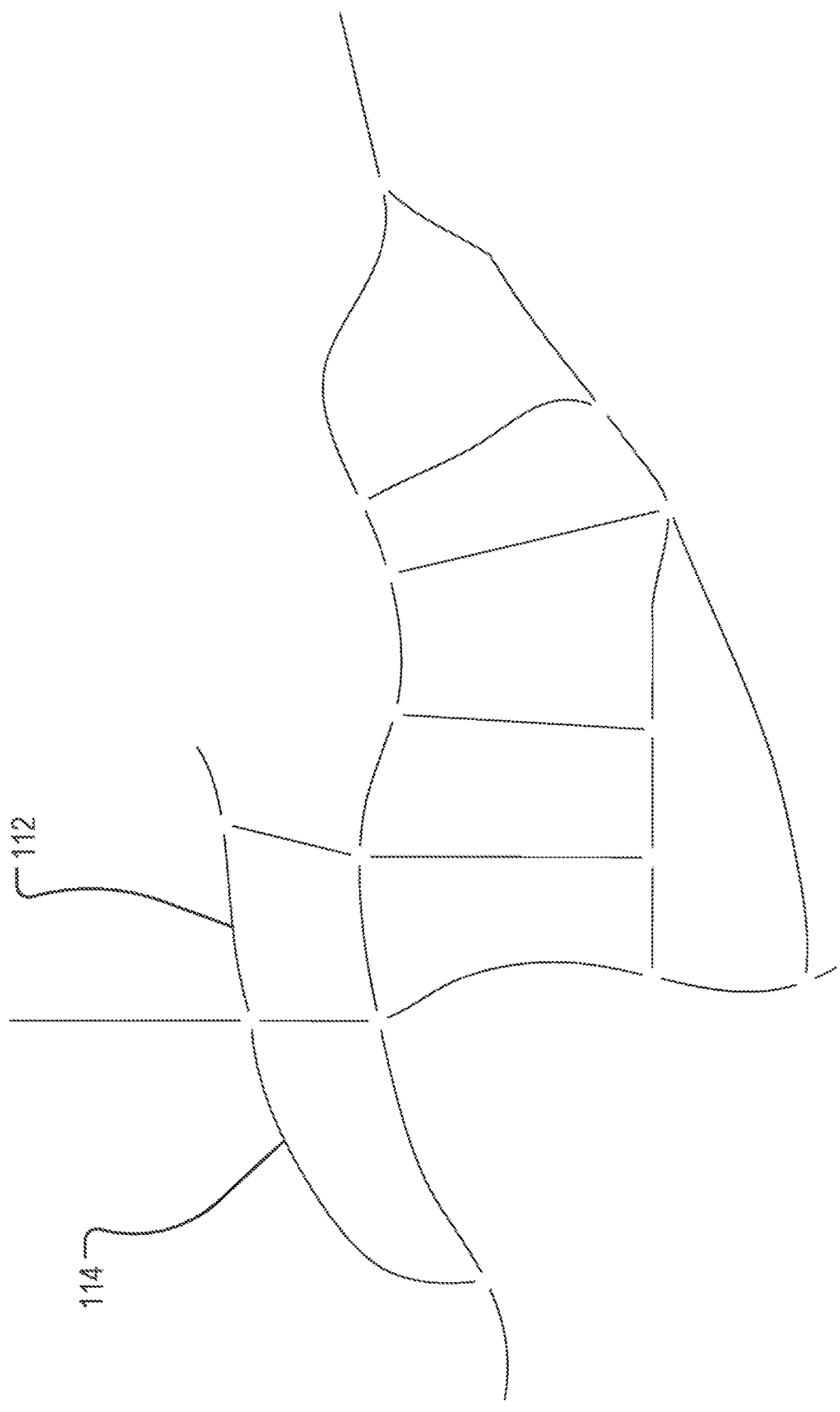
FIG. 3 illustrates road segments from the graphical user interface of FIG. 1.
Figure 4:
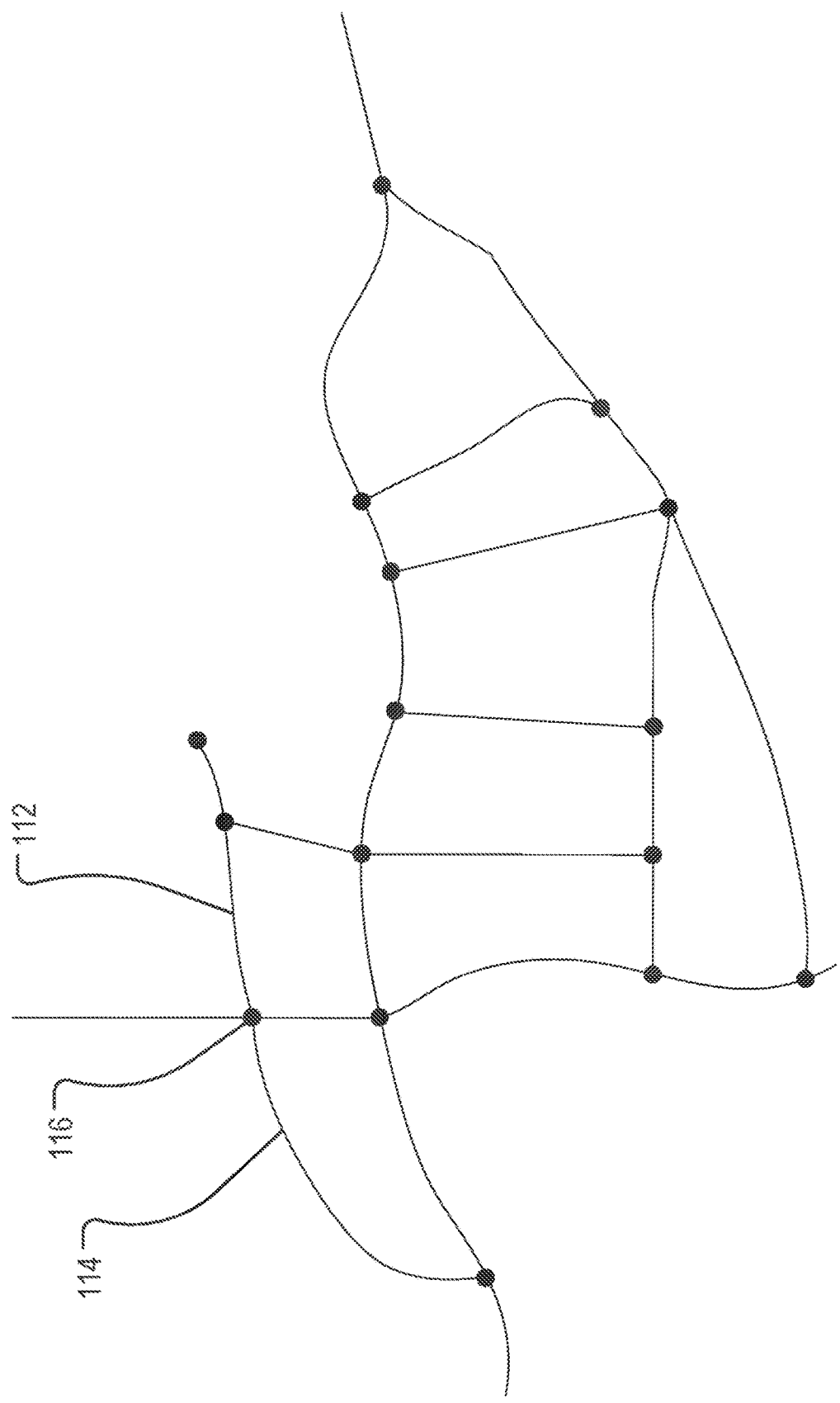
FIG. 4 illustrates road segments connected at connections points.
Figure 5:
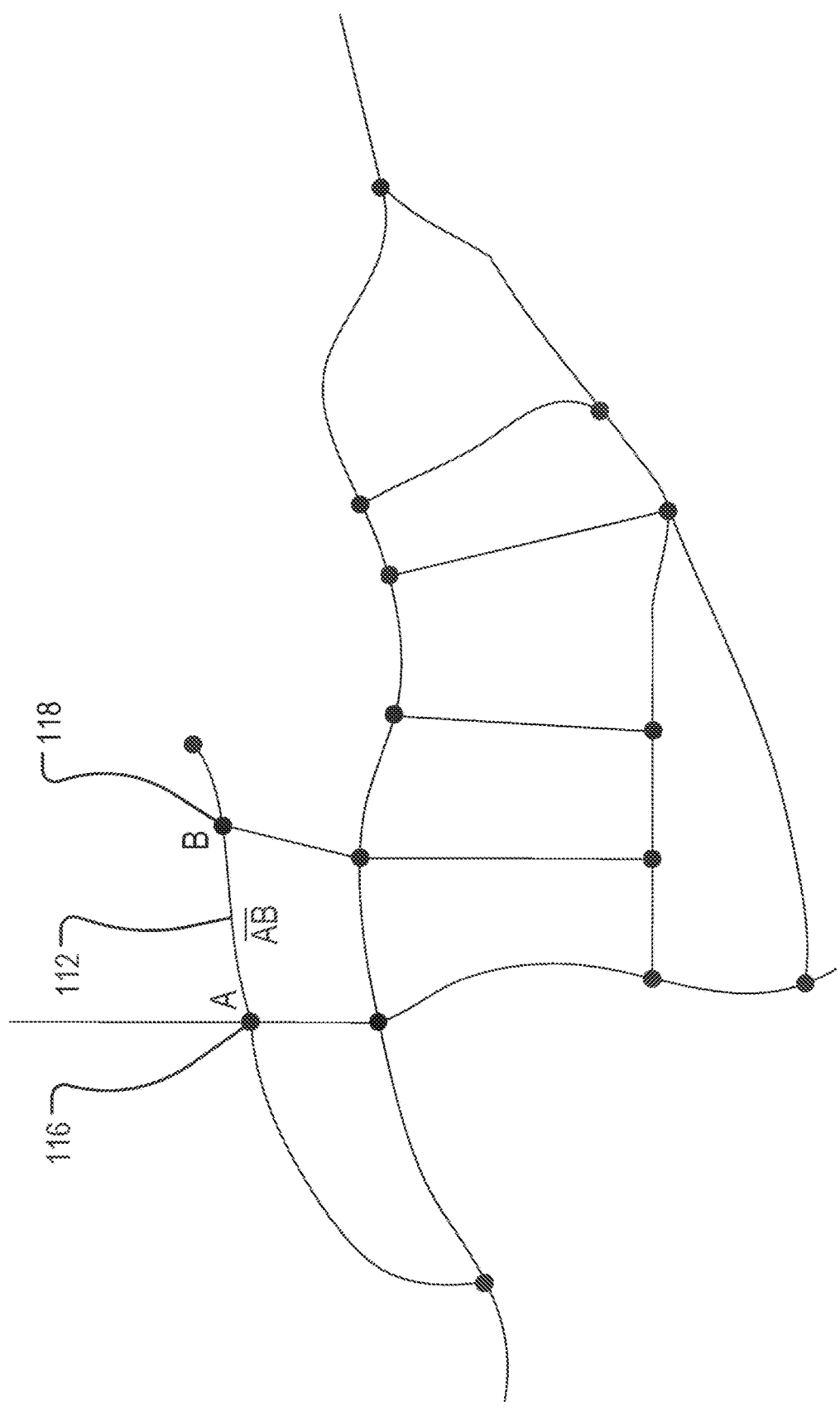
FIG. 5 illustrates a road segment characterized by two end points.
Figure 6:
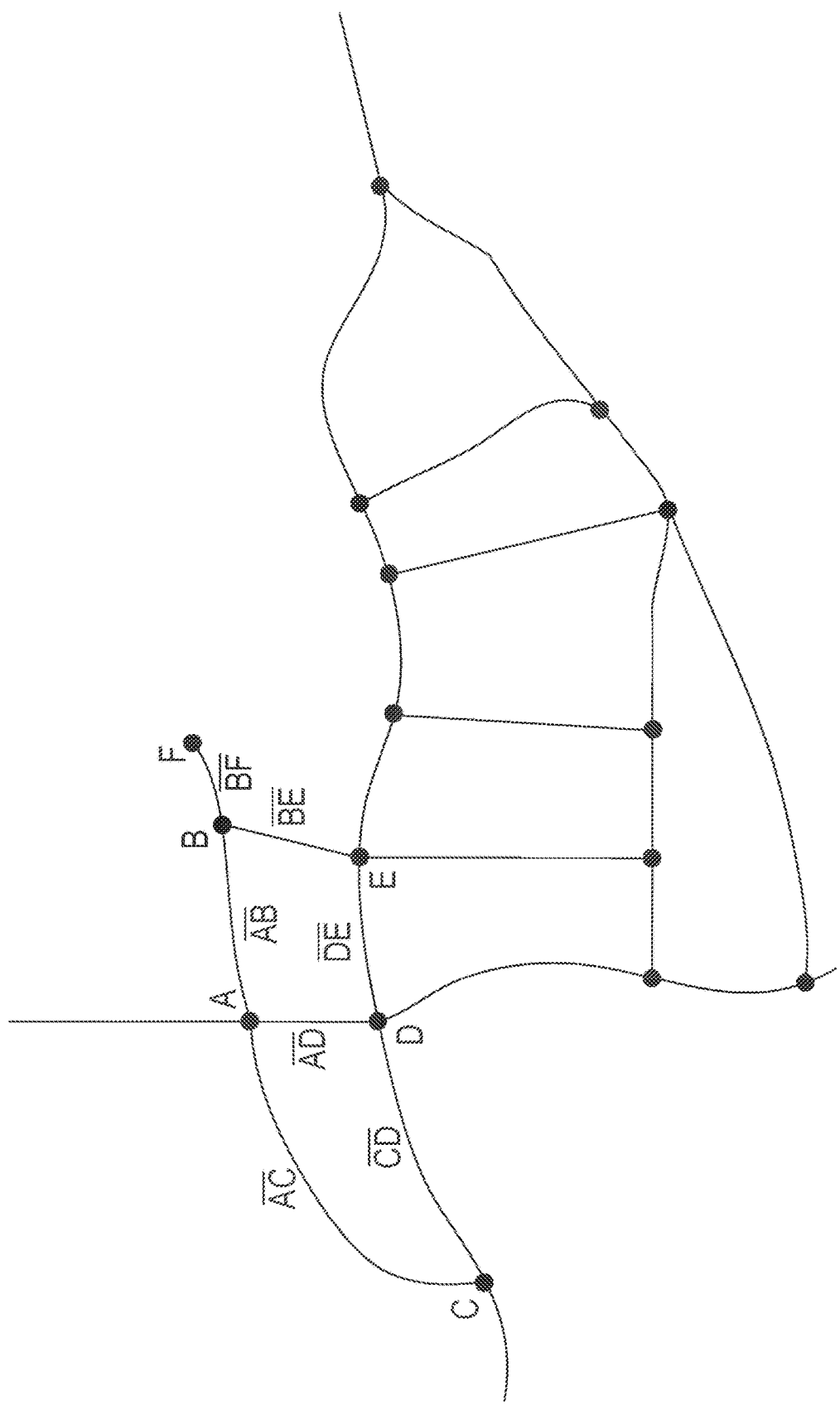
FIG. 6 illustrates multiple road segments, each characterized by two end points.

According to various embodiments, the graphical user interface is displaying a portion of a road network, which is also shown in FIG. 2. The road network can be characterized as being made up of road segments, as illustrated in FIG. 3, in which an example of road segments 112 and 114 are called out. The road segments can be characterized as being connected to one another at connections points, as illustrated in FIG. 4, where example road segments 112 and 114 are illustrated as connected at connection point 116. A road segment can be characterized by its end points, as illustrated in FIG. 5, where point 116 is characterized as point A, point 118 is characterized as point B, and road segment 112 is characterized as road segment AB. FIG. 6 illustrates similar characterization of other road segments of the illustrated road network.

In some embodiments, a distance of each of these road segments can be determined and stored, as illustrated in FIG. 7. Based on these distances, a total distance of a path from one point to another can be determined. Further, determined distances for various possible paths can be compared to determine an optimal path.

Figure 8:
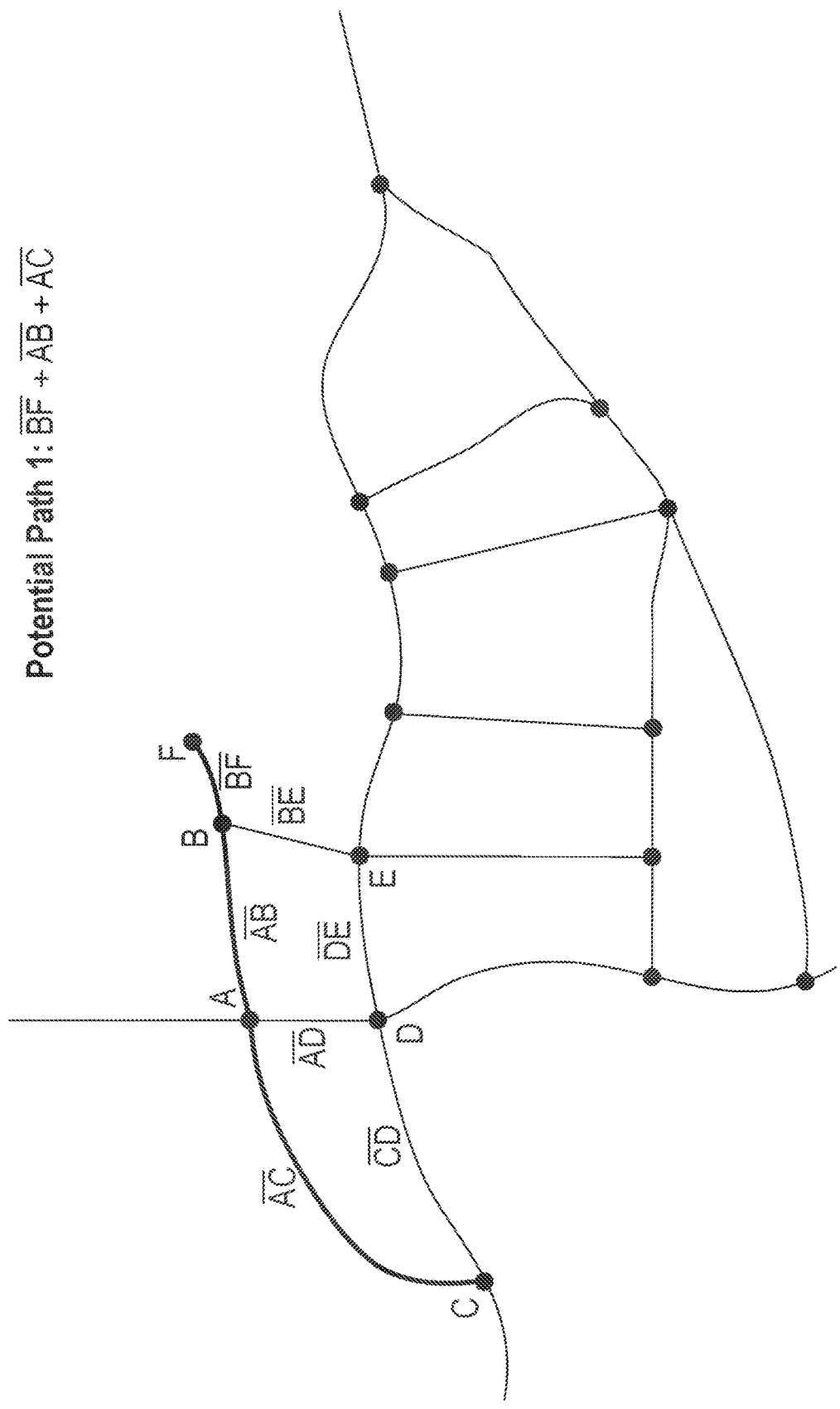
FIG. 8 illustrates a first potential path between points F and C.
Figure 9:
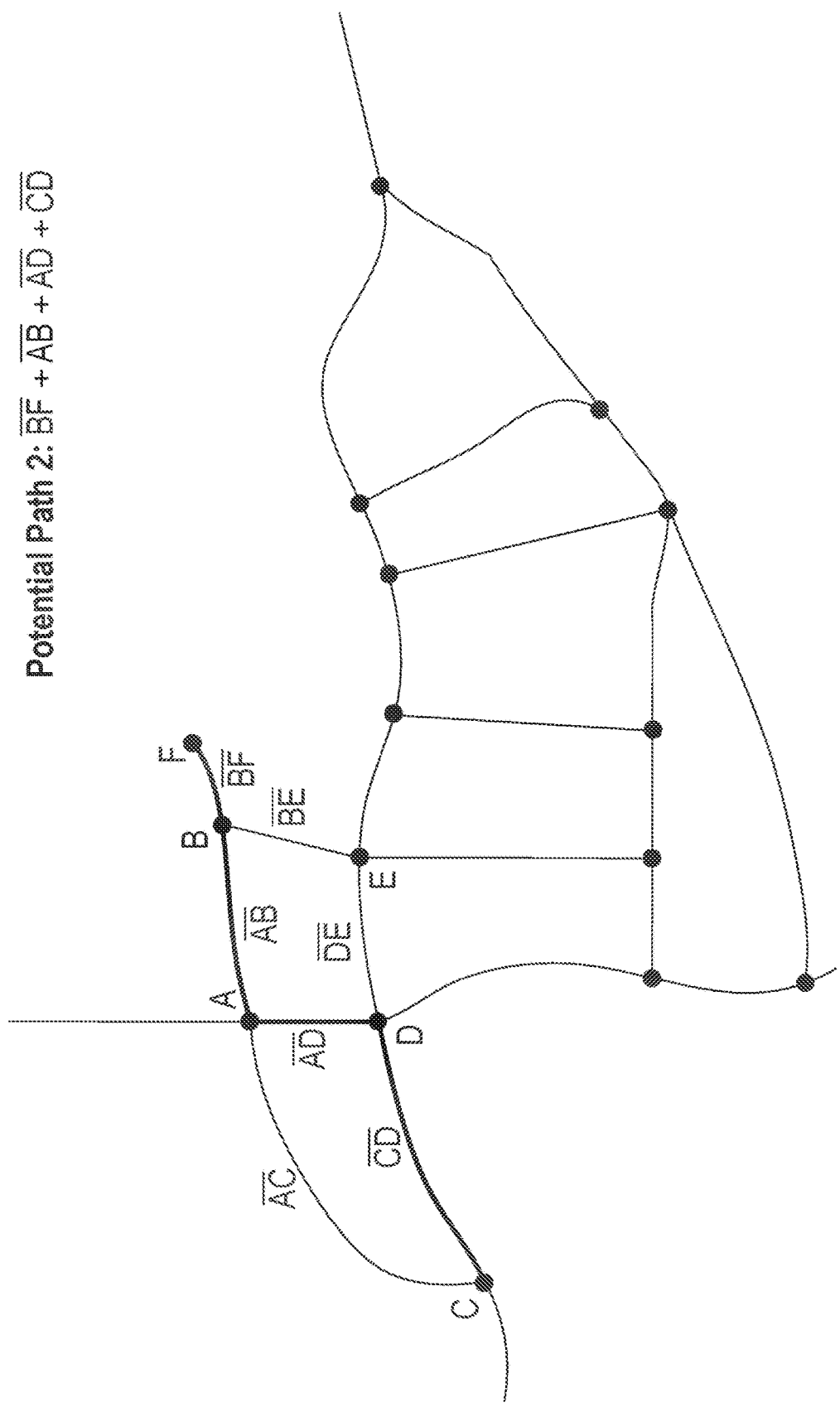
FIG. 9 illustrates a second potential path between points F and C.
Figure 10:
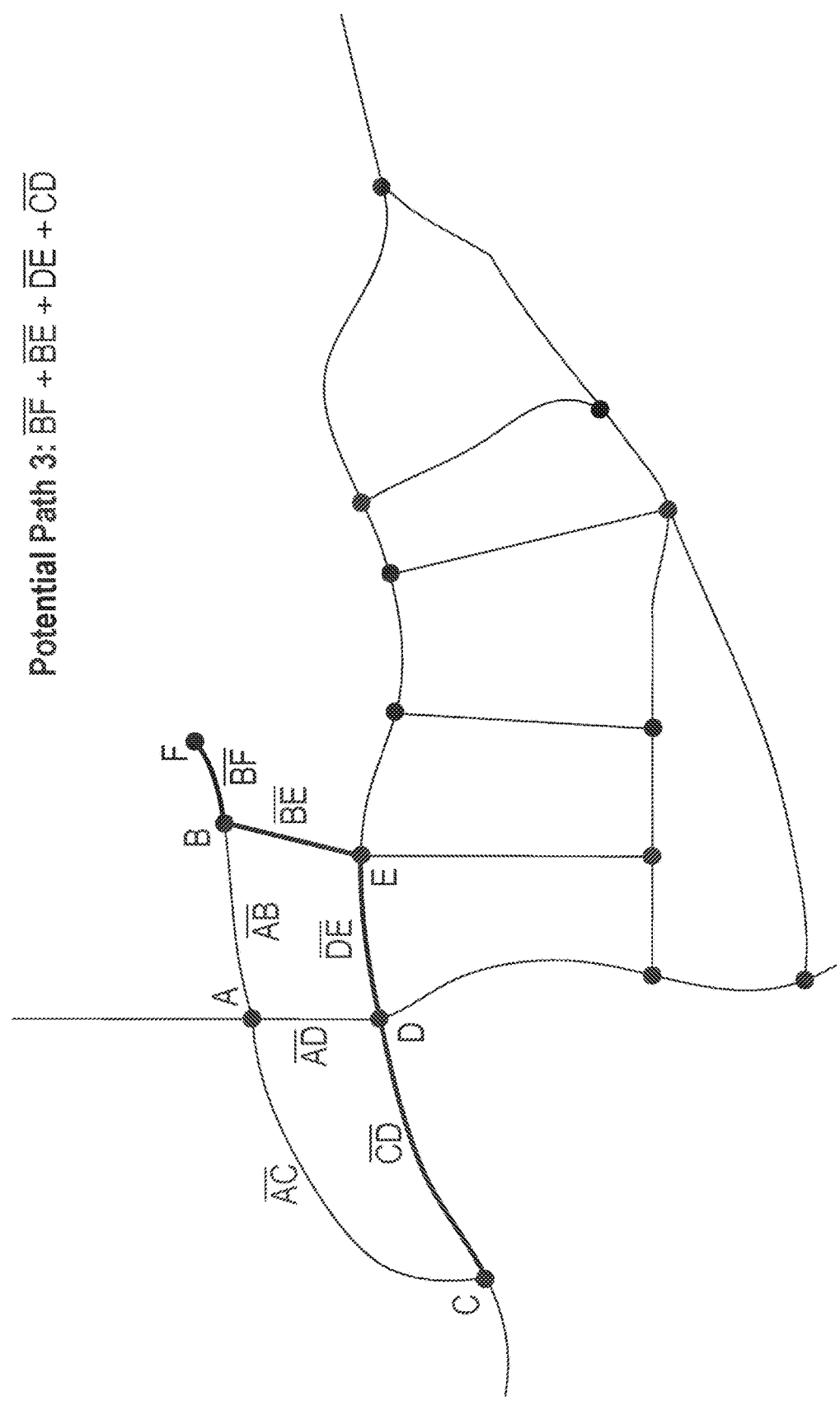
FIG. 10 illustrates a third potential path between points F and C.
Figure 11:
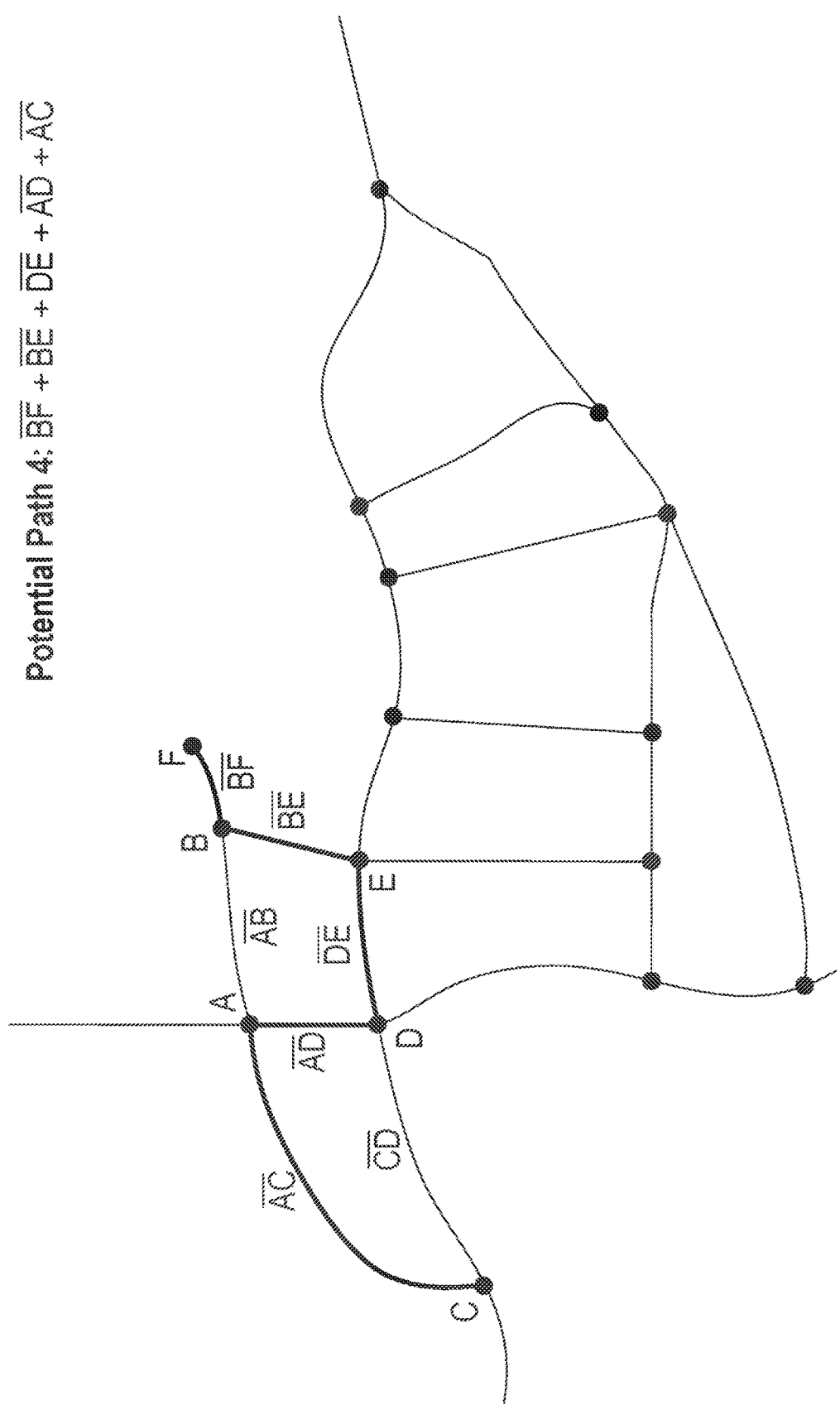
FIG. 11 illustrates a fourth potential path between points F and C.

For example, with reference to points F and C illustrated in FIG. 6, FIG. 8 illustrates a first potential path between points F and C which includes road segments BF, AB, and AC, FIG. 9 illustrates a second potential path between points F and C which includes road segments BF, AB, AD, and AC, FIG. 10 illustrates a third potential path between points F and C which includes road segments BF, BE, DE, and CD, and FIG. 11 illustrates a fourth potential path between points F and C which includes road segments BF, BE, DE, AD, and AC. It will be appreciated that more or less paths may be identified. For example, a search for paths between two points may involve a breadth first or depth first traversal of connecting road segments in an attempt to determine one or more paths from a first point to a second point.

According to various embodiments, a total distance for each path can be determined by summing up the distances of each road segment that the path traverses, as illustrated in FIG. 12. A shortest path can be identified based on these determined total distances, as illustrated in FIG. 13.

Figure 14:
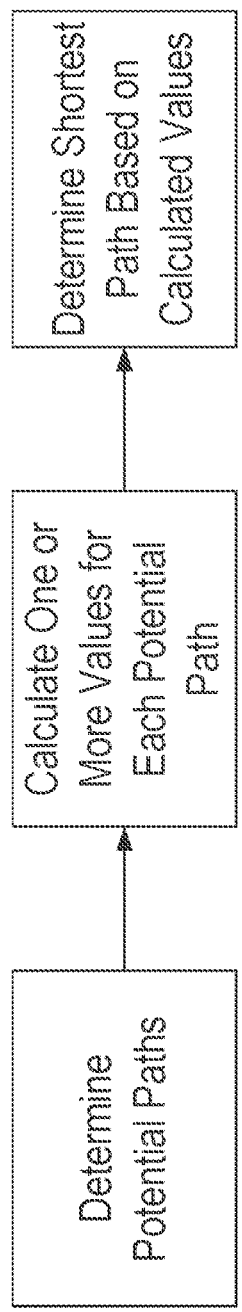
FIG. 14 illustrates a flow for determining a shortest path.

In some embodiments, a process for determining a shortest path can involve determining one or more potential paths, calculating one or more values (e.g. a total distance) for each potential path, and then determining a shortest path based on the calculated values. FIG. 14 illustrates a flow for such an example of a process.

Notably, however, other methodologies and approaches may additionally or alternatively be used for determining a shortest or preferred path between two points. For example, a search for a shortest or preferred path between two points may involve a breadth first traversal of connecting road segments in an attempt to determine a shortest or preferred path from a first point to a second point.

In some implementations, determination of a preferred path may involve not just determination of a path having a shortest total distance, but also may involve determination of a path having a shortest estimated travel time. For example, an estimated travel time for road segments could be calculated based on speed limits of the road segments, as illustrated in FIG. 15, and these estimated travel times could then be used to calculate estimated travel times for paths traversing such road segments. FIG. 16 illustrates calculation of estimated travel times for the paths of FIGS. 8-11.

In some embodiments, both a determined estimated travel time for a path and a determined total distance for a path may be used to select a preferred or shortest path. For example, as illustrated in FIG. 17, three of the four potential paths of FIGS. 8-11 have all been determined to have the same total estimated travel time. Determination of a preferred or shortest path might involve first determining one or more paths having a shortest total estimated travel time, and then using a determined total distance as a further metric to select a preferred or shortest path from among any that have the same (or very similar) total estimated travel time, as illustrated in FIG. 18.

According to various embodiments, other criteria could be used as well. For example, FIG. 19 illustrates use of a number of turns as a further metric to select a preferred or shortest path from among any that have the same (or very similar) total estimated travel time. Additionally, or alternatively, required turns along a traversed path may be taken into account in calculating an estimated travel time for a path. For example, FIGS. 20-24 illustrate calculation of total estimated travel times for the paths of FIGS. 8-11, updated to add 30 seconds for each required left turn and 10 seconds for each required right turn.

According to various embodiments, the values of 30 seconds and 10 seconds are just examples of values. Further, different values could be used for different navigation scenarios (e.g. turns) along a path. For example, FIGS. 25-29 illustrate calculation of total estimated travel times for the paths of FIGS. 8-11, updated to add 15 seconds for going straight at an intersection without a light, 20 seconds for going straight at an intersection with a light, 30 seconds for a left turn at an intersection with a light, 20 seconds for a left turn at an intersection without a light, and 10 seconds for a right turn at an intersection with a light.

Figure 30:
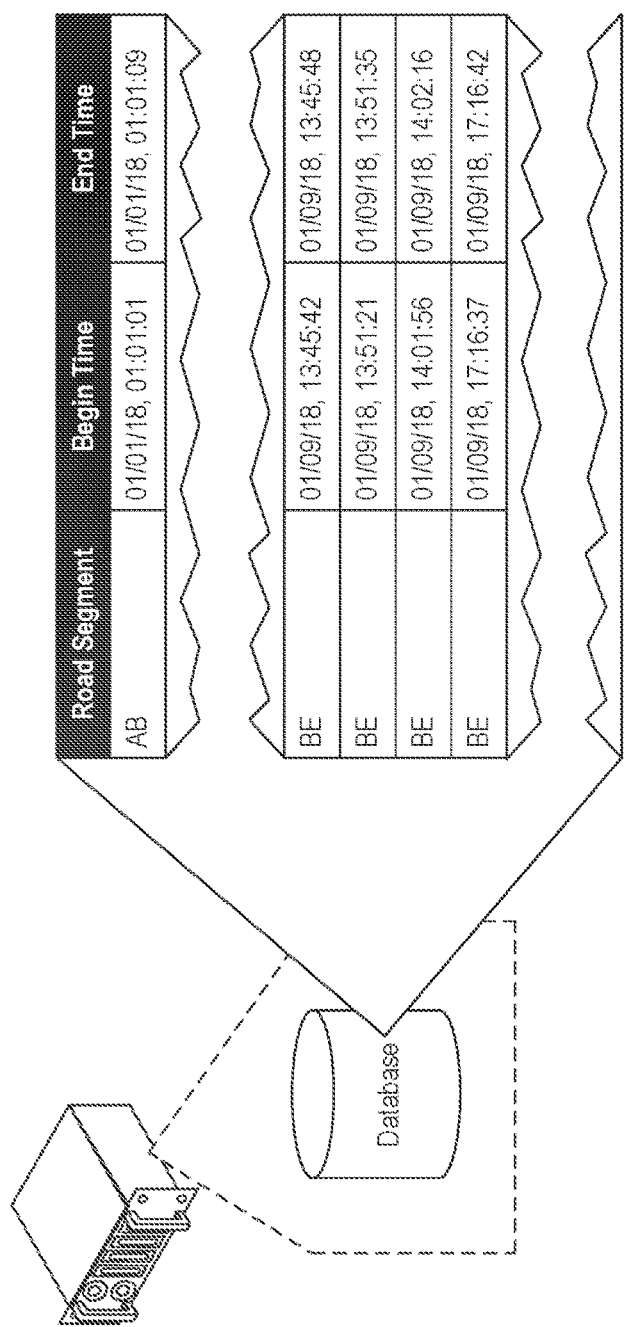
FIG. 30 illustrates an example of storage of historical data for traversal of road segments.

In some embodiments, rather than simply being calculated based on speed limits of a road segment, an estimated travel time for a road segment may be determined based on historical data for vehicles that traversed that road segment. For example, global positioning system (GPS) data may be gathered from vehicles with a GPS device traveling on a road segment. FIG. 30 illustrates an example of storage of historical data for traversal of road segments.

FIG. 31 illustrates an example of average travel time values calculated for road segments based on gathered historical data for traversal of such road segments. In some embodiments, historical data can be gathered on the time it takes vehicles to navigate from one road segment to another (e.g. turn at an intersection), and used to determine an estimated travel time for such navigations.

FIG. 32 illustrates an example of average travel time values calculated for navigation from one road segment to another based on gathered historical data for such navigations. Traffic patterns may frequently allow for quicker traversal of a road segment (or navigation from one road segment to another) at certain times of the day, and slower traversal at other times. To account for this, in some embodiments an example of average travel times may be determined for windows throughout the day, e.g. for 24 one-hour windows, as illustrated in FIGS. 33-34. Determination of a shortest path may involve using the time estimates for a window within which a current time falls, or within which an estimated time of travel falls.

Figure 35:
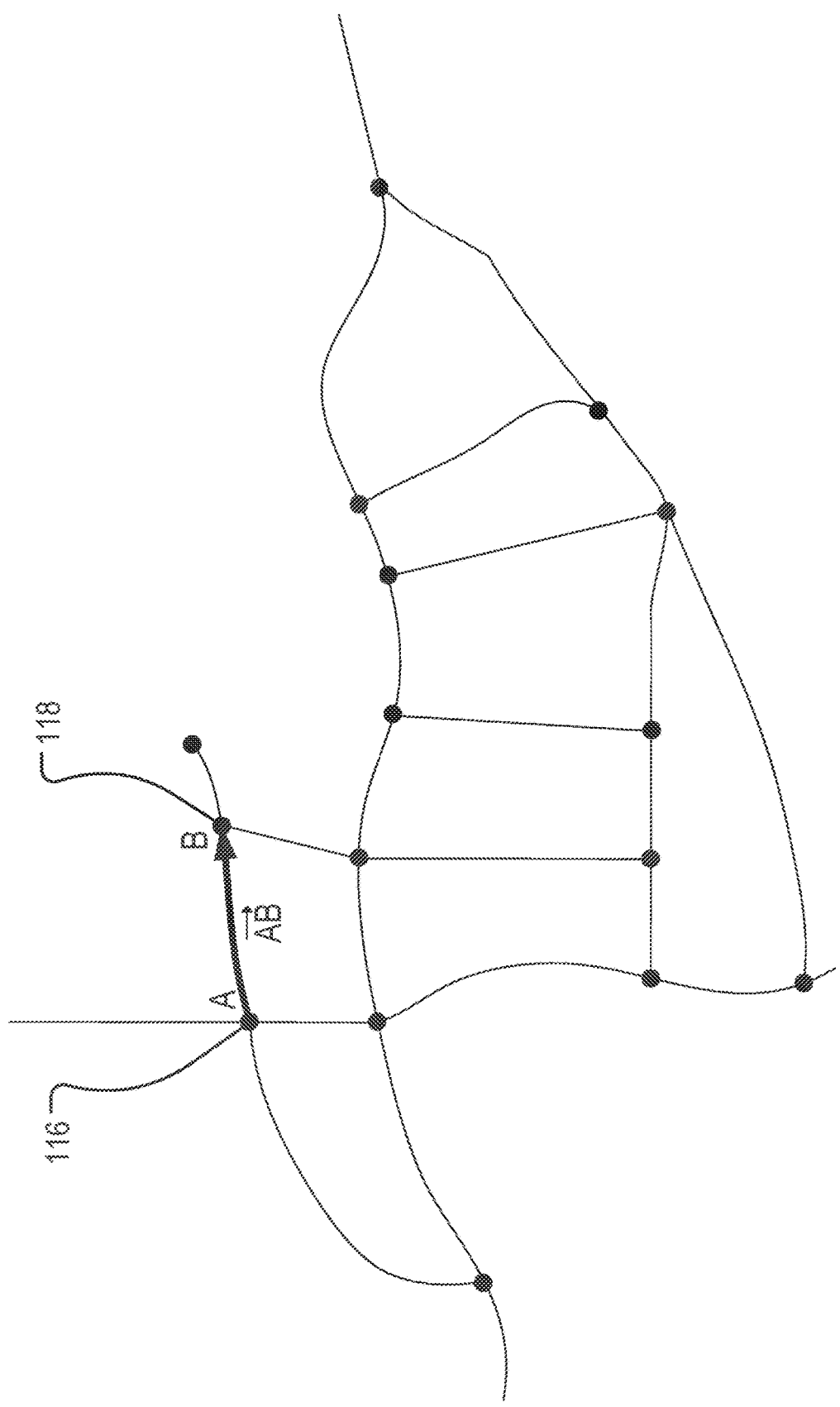
FIG. 35 illustrates a directional road segment.
Figure 36:
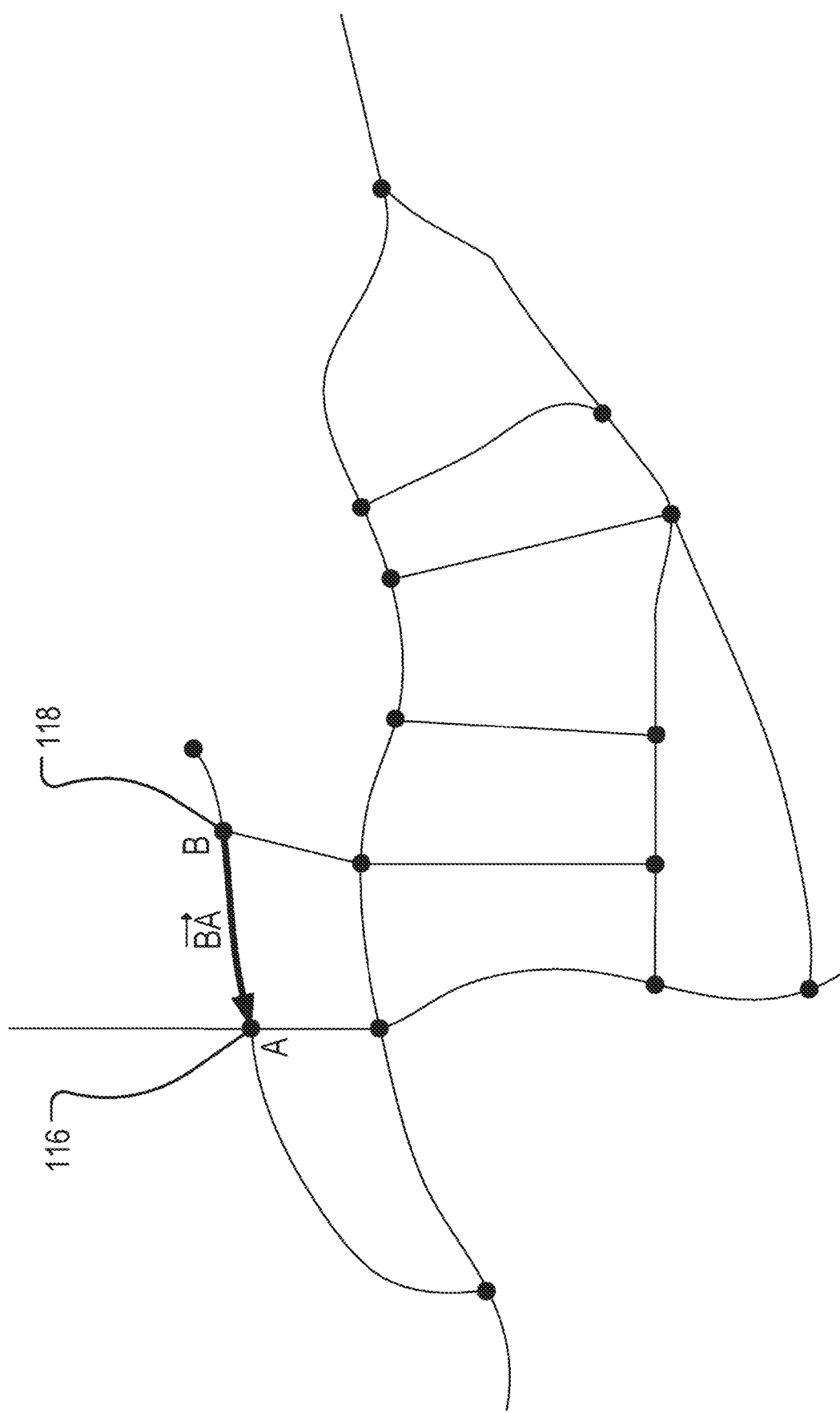
FIG. 36 illustrates another directional road segment.
Figure 37:
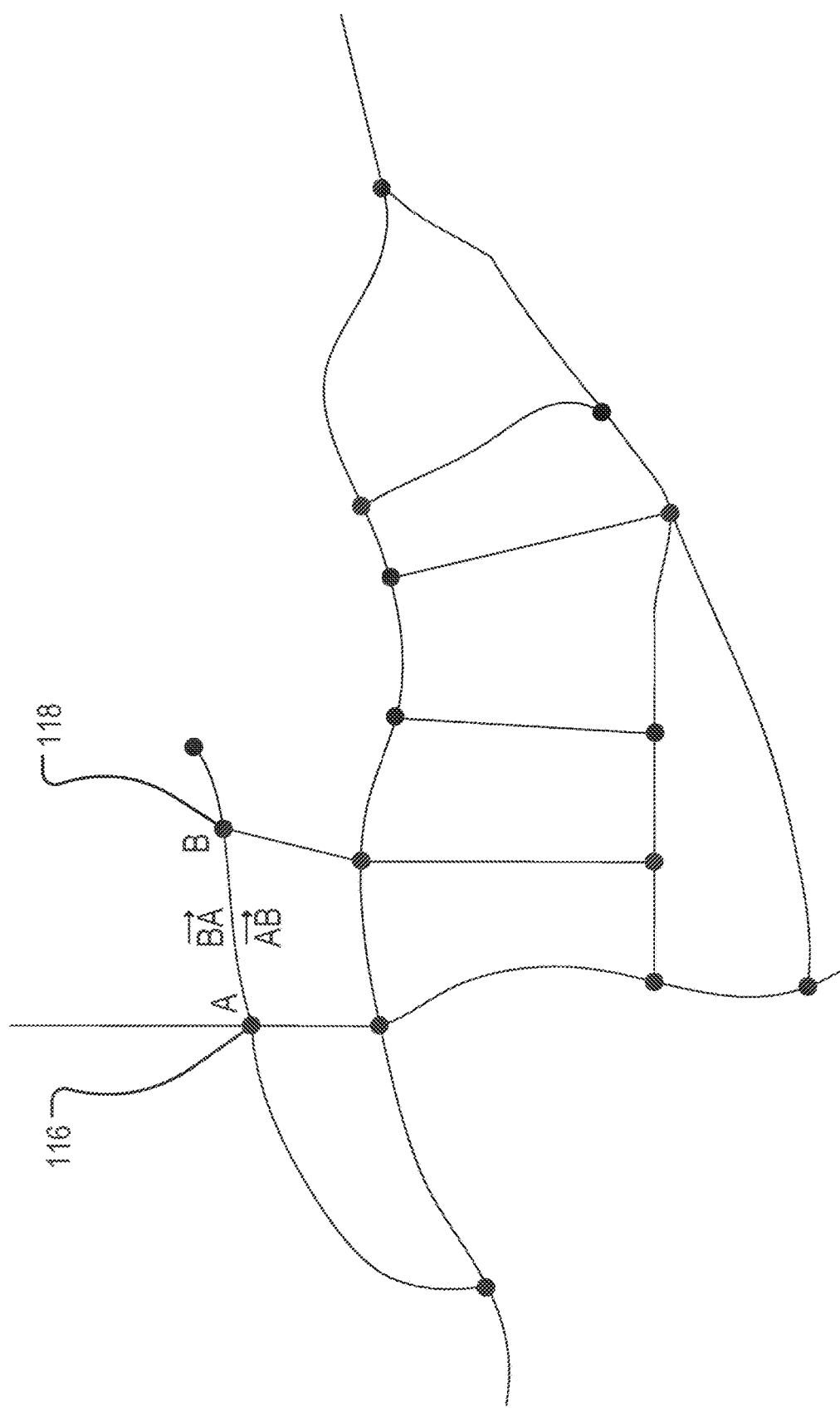
FIG. 37 illustrates two directional road segments going in opposite directions.

It may frequently take longer or shorter to traverse a road in a first direction, as compared to the opposite direction. According to various embodiments, a two-way road between two points can be characterized as representing not just one road segment, but two road segments (one in each direction). For example, FIG. 35 illustrates road segment AB from point 116 to point 118, and FIG. 36 illustrates road segment BA from point 118 to point 116. FIG. 37 illustrates both of these road segments together, and FIG. 38 illustrates different average travel times for each of these road segments.

Figure 39:
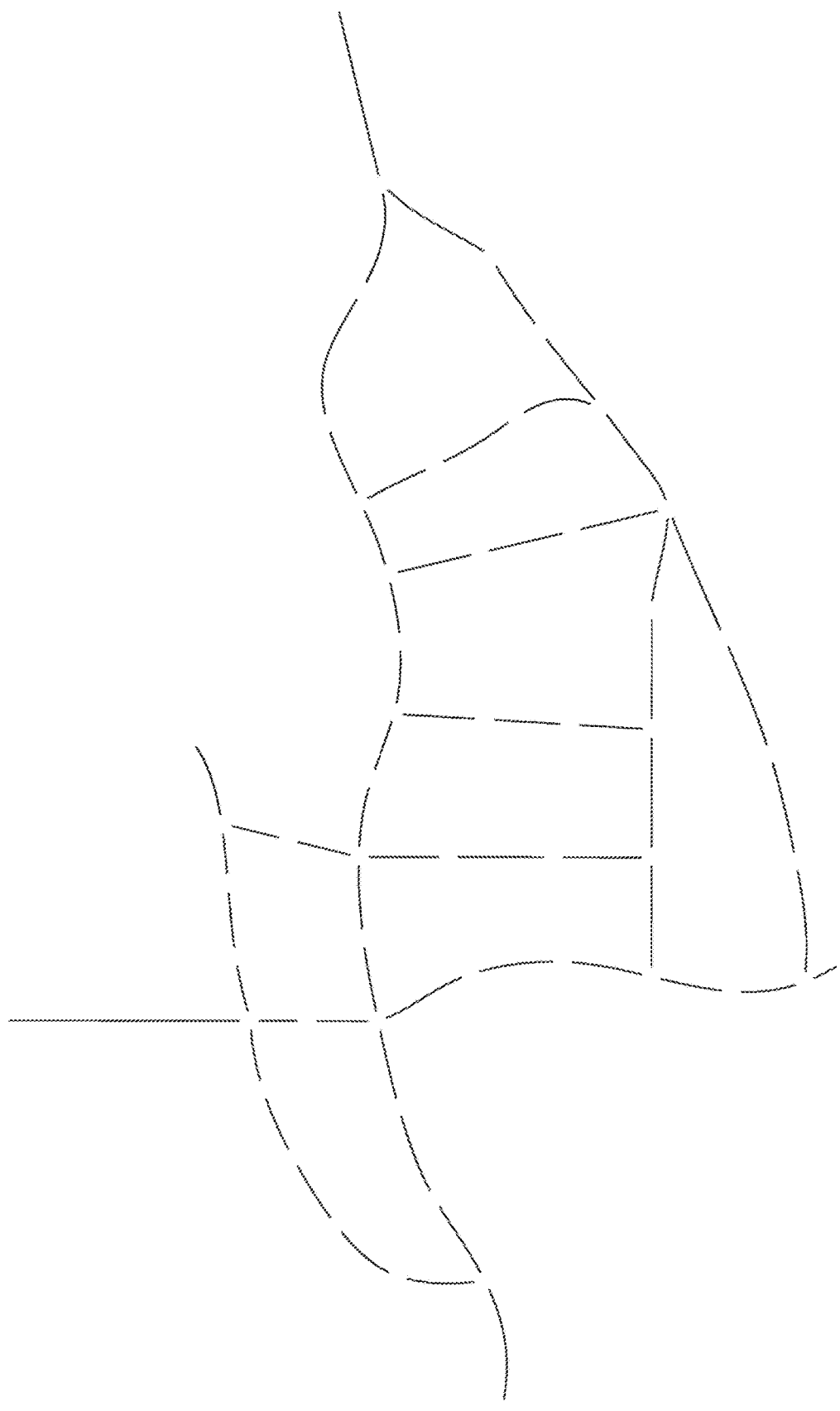
FIG. 39 illustrates a more granular road segmentation.

Although thus far road segments have largely been described as a segment connecting two intersections, in some embodiments more or less granular road segments may be defined and used. For example, FIG. 39 illustrates more granular road segmentation.

As noted above, in some embodiments determination of a preferred path may involve not just determination of a path having a shortest total distance, but also may involve determination of a path having a shortest estimated travel time. Determination of a preferred path may for example involve calculation of a preference value for a path using a distance weight for a total distance of the path and a time weight for an estimated travel time for the path, as illustrated in FIG.

40. FIG. 41 is an illustration of calculation of such a preference value for each potential path of FIGS. 8-11.

According to various embodiments, determination of a preferred path may also involve calculation of a preference value based on normalized time and distance values. For example, a normalized time value may be generated by dividing each total estimated time amount by a minimum total estimated time amount (or by dividing a minimum total estimated time amount by each total estimated time amount), and a normalized distance value may be generated by dividing each total distance amount by a minimum total distance amount (or by dividing a minimum total distance amount by each total distance amount). FIG. 42 is a fanciful illustration of calculation of normalized time and distance values, and a preference value based on such normalized time and distance values. FIG. 43 illustrates an example of C-Sharp style pseudocode for calculation of such a preference value based on normalized time and distance values.

Figure 44:
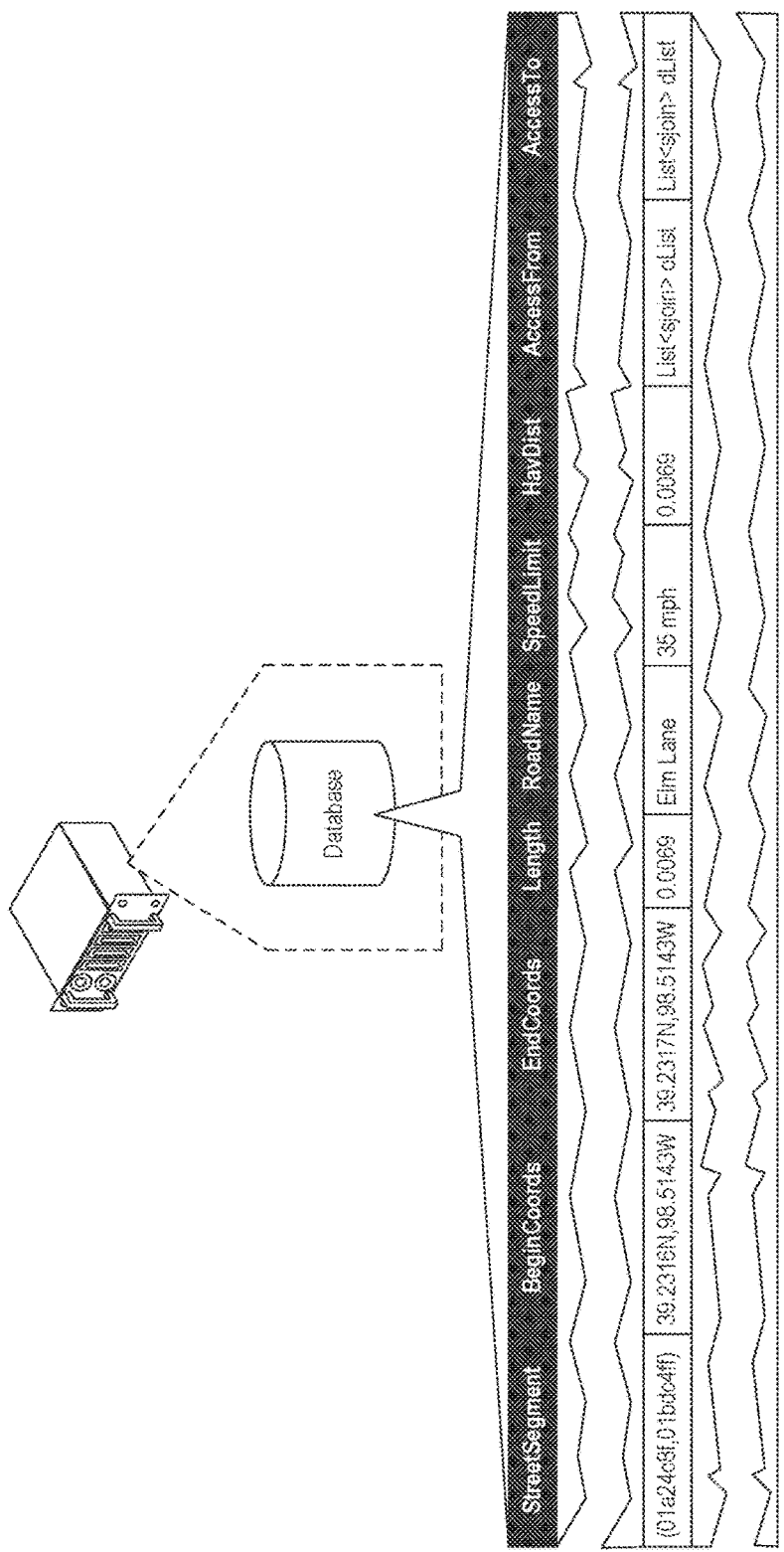
FIG. 44 illustrates an example of storage of data for a road segment which includes latitude and longitude coordinates.
Figure 45:
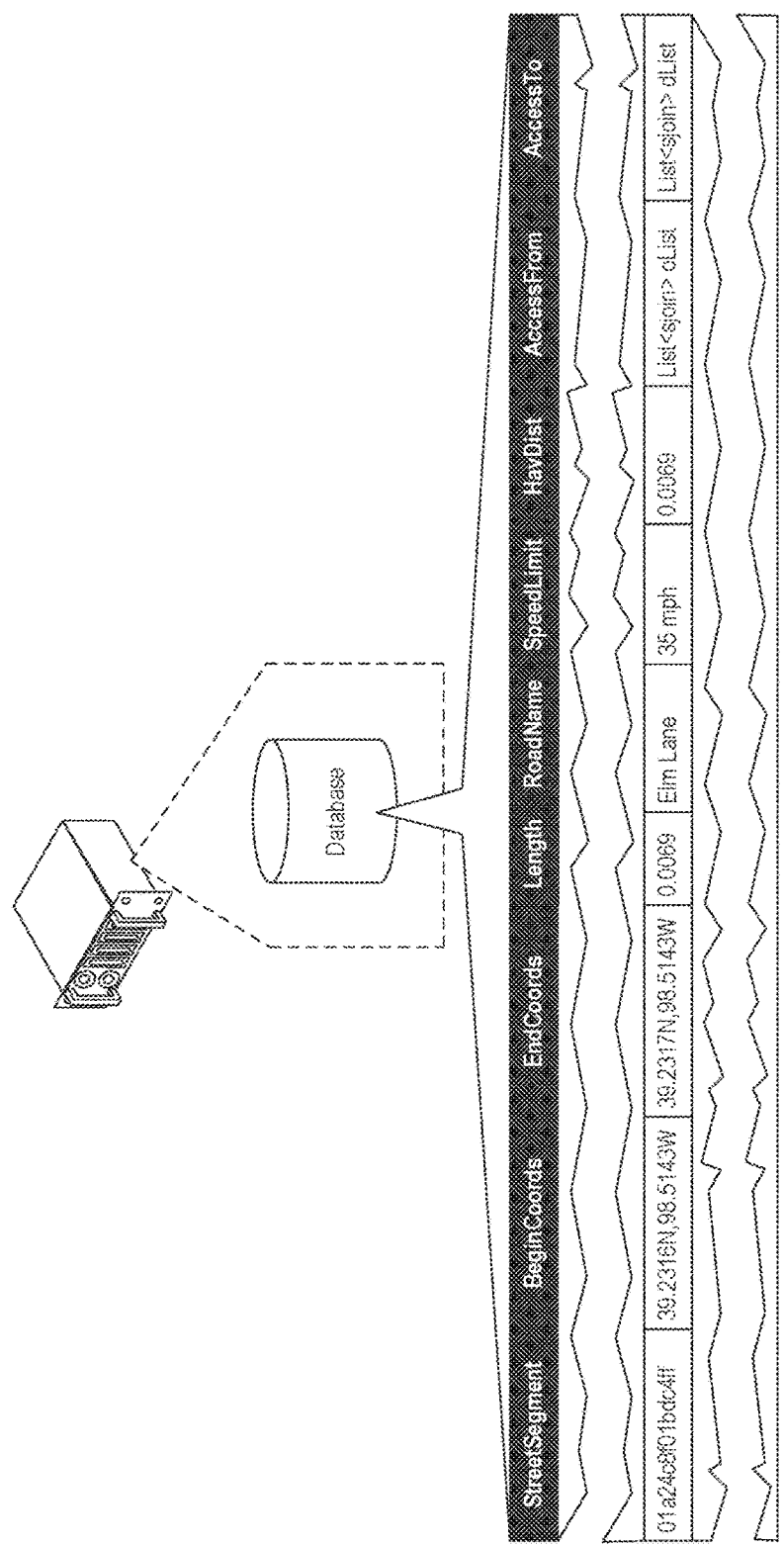
FIG. 45 illustrates the use of an assigned unique identifier for a road segment.

For example, FIG. 44 illustrates an example of storage of data for a road segment which includes latitude and longitude coordinates for a beginning of a road segment, and latitude and longitude coordinates for an end of the road segment. Although the example of FIG. 44 involves use of an identifier for a road segment which includes an identifier for each of two end points of the road segment, a road segment may instead include an assigned unique identifier, as illustrated in FIG. 45.

Figure 46:
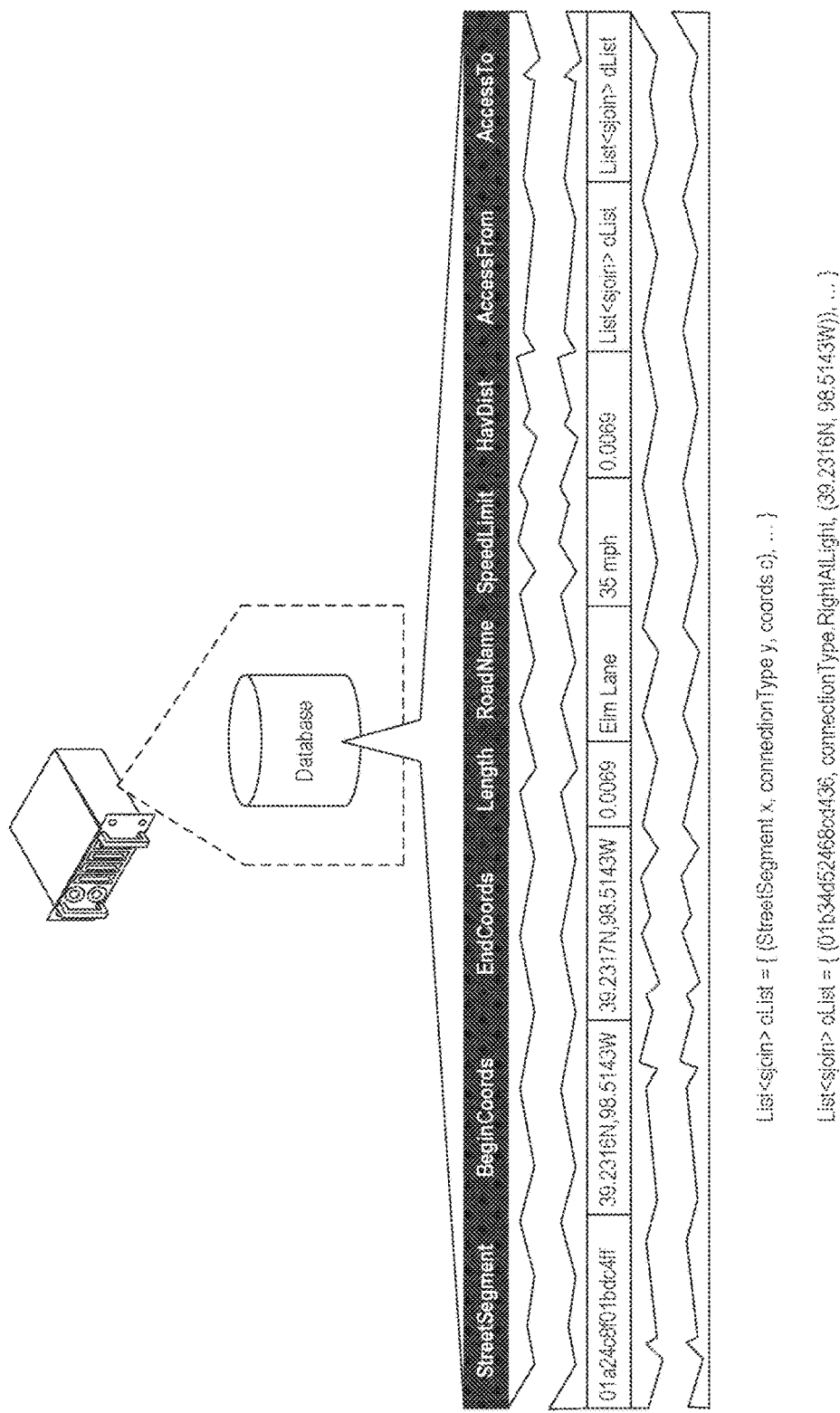
FIG. 46 illustrates data stored for a road segment including a list of connections from the road segment to and from other road segments.

According to various embodiments, data stored for a road segment may include a list of joins or connections from the road segment to other road segments, as well as a list of joins or connections to the road segment from other road segments, as illustrated in FIG. 46. Stored data for such a join or connection may include an indication of a joined or connected street segment, an indication of a type of join or connection, and an indication of coordinates at which the join or connection occurs, as illustrated in FIG. 46.

Figure 47:
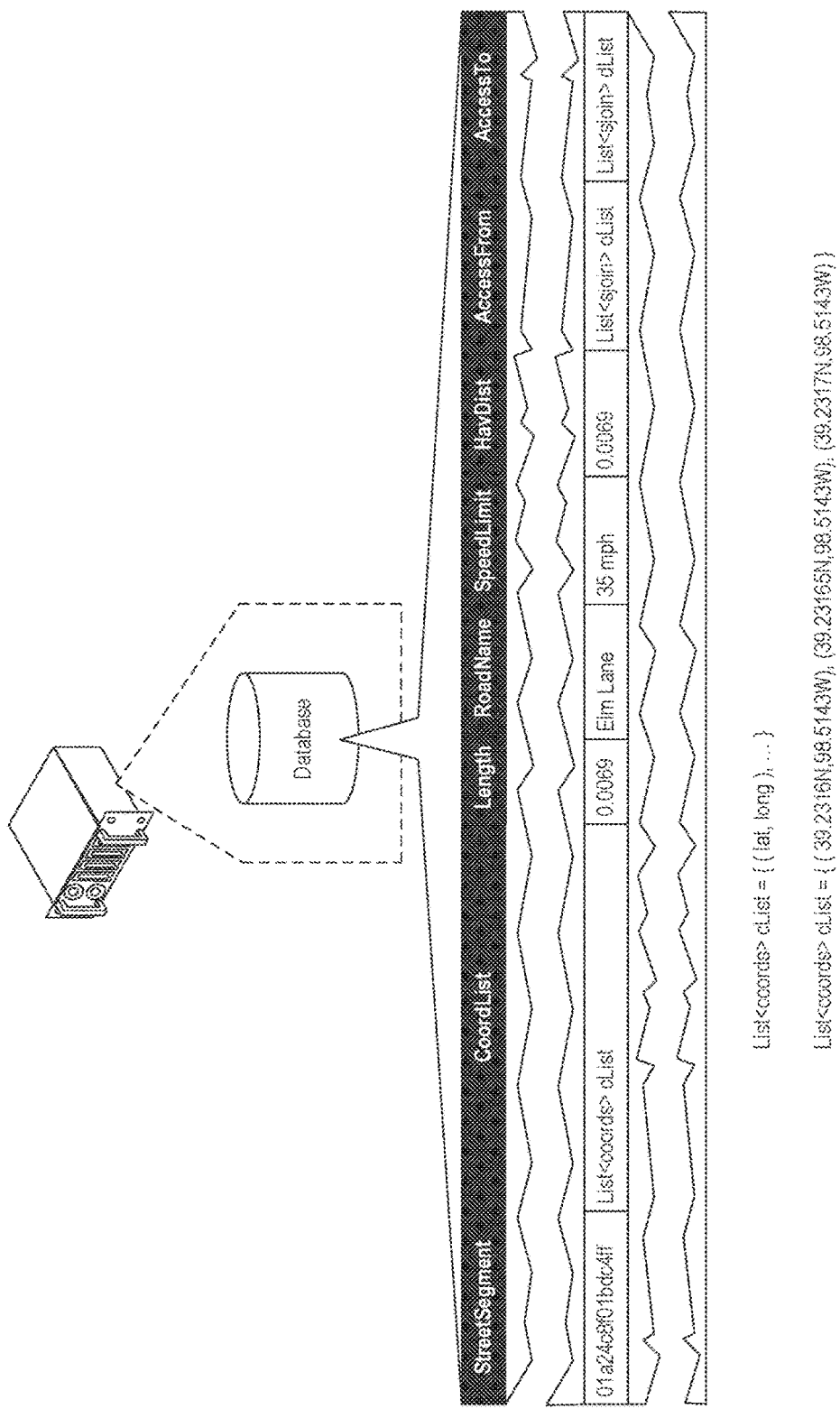
FIG. 47 illustrates stored data for a road segment which includes end points of the road segment as well as a list of points along the road segment.

Many roads are not straight. In some implementations, stored data for a road segment may include both a traversal length of the road segment, as well as a "crow flies" distance between ends of the road segment (e.g. a Euclidean distance or a distance calculated via the Haversine formula). Further, stored data for a road segment may include not just coordinates for end points of a road segment, but a list of points along a length of the road segment, as illustrated in FIG. 47.

Figure 48:
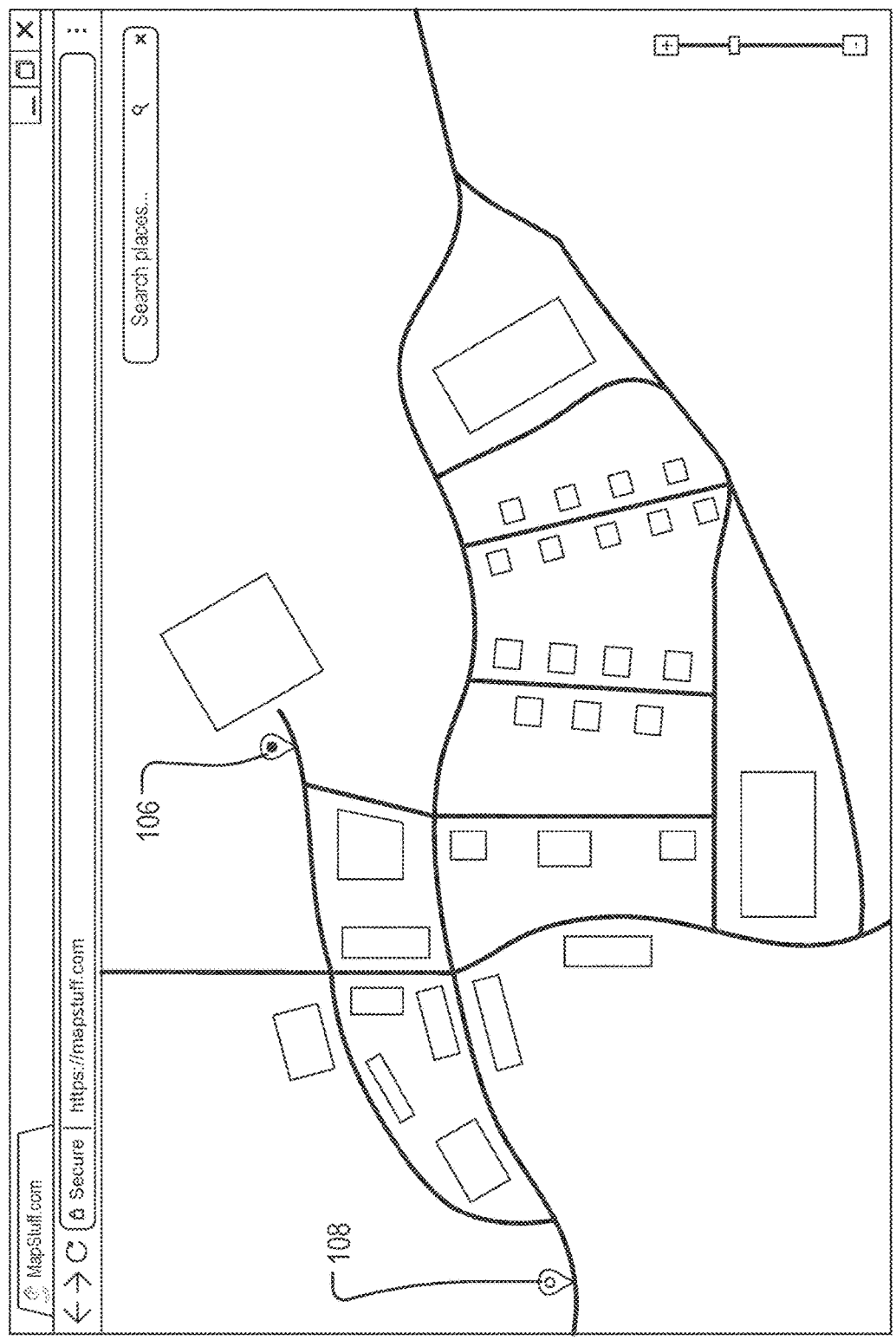
FIG. 48 illustrates an example of a graphical user interface with a start location and a destination location.
Figure 49:
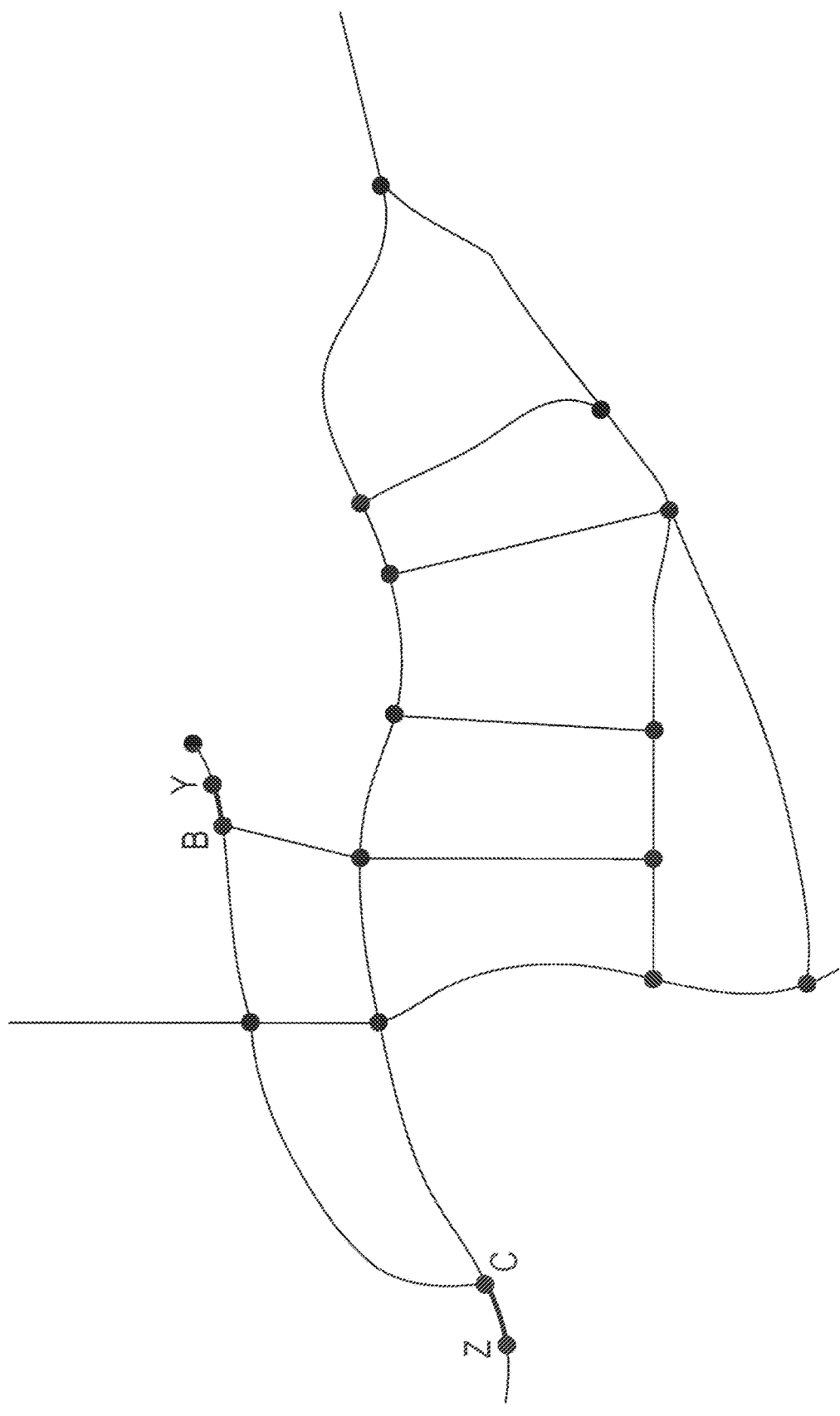
FIG. 49 illustrates points along road segments.

In determining a shortest or preferred path between two locations, those two locations will not always fall at an end of a road segment. For example, FIG. 48 illustrates an example of a graphical user interface comprising a map with a first placement marker 106 indicating a start location and second placement marker 108 indicating a desired destination location. In some implementations, stored data regarding points along road segments enables determination of what road segment the placement marker 106 lies on (or is closest to), as well as determination of a distance from that point to an end of that road segment. FIG. 49 illustrates such a situation.

Precomputing Shortest Path Matrices

Figure 50:
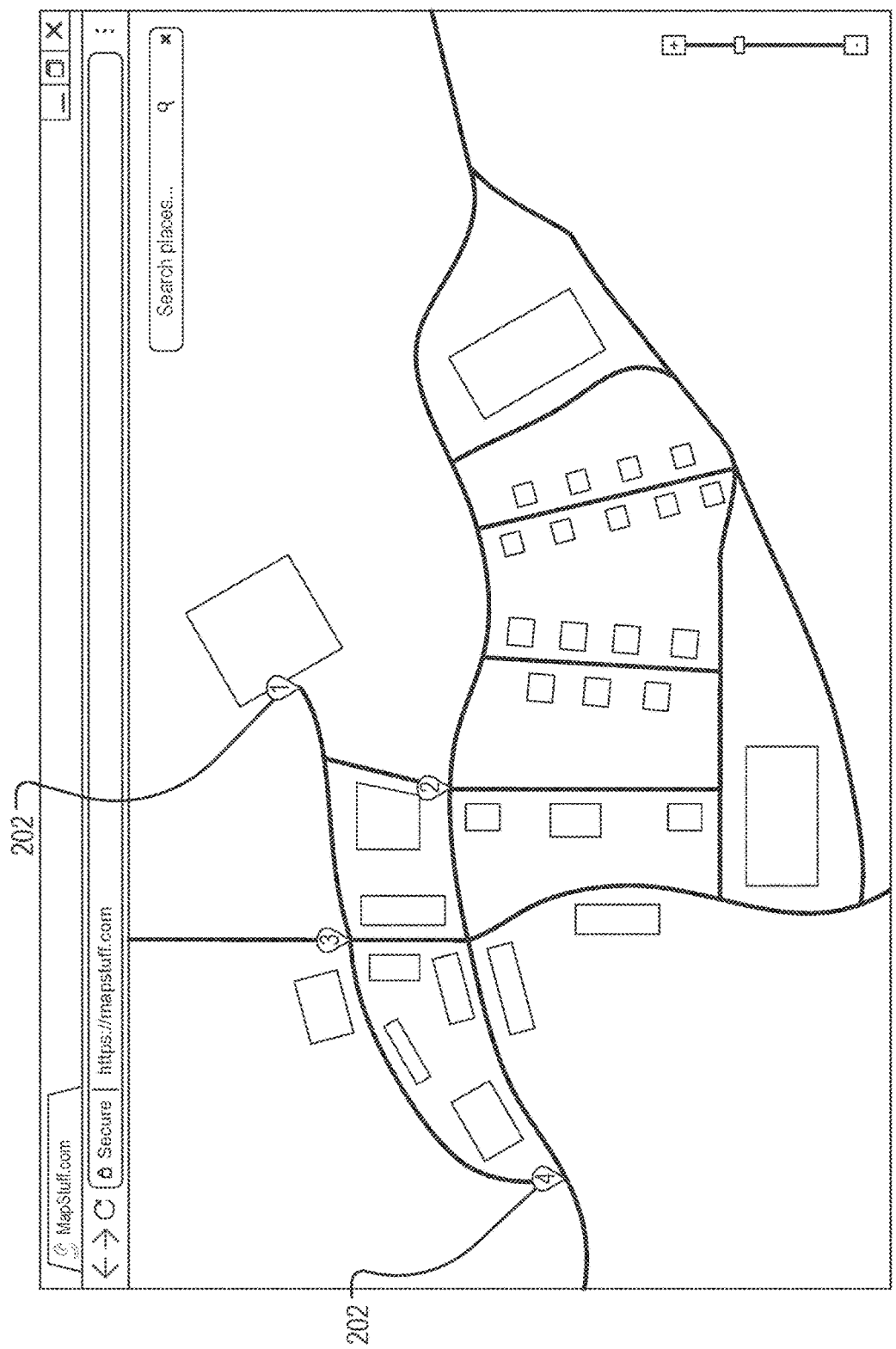
FIG. 50 illustrates an example of a graphical user interface with markers indicating locations to be visited.

In some implementations, not only the shortest path between two locations, but also a preferred or optimized route for visiting multiple locations may be determined. For example, FIG. 50 illustrates an example of a graphical user interface comprising a map with placement markers 202 indicating locations to be visited. These can represent locations for use in a routing problem, in which a high-quality routing solution is to be determined which involves visiting of all of the specified locations.

Figure 51:
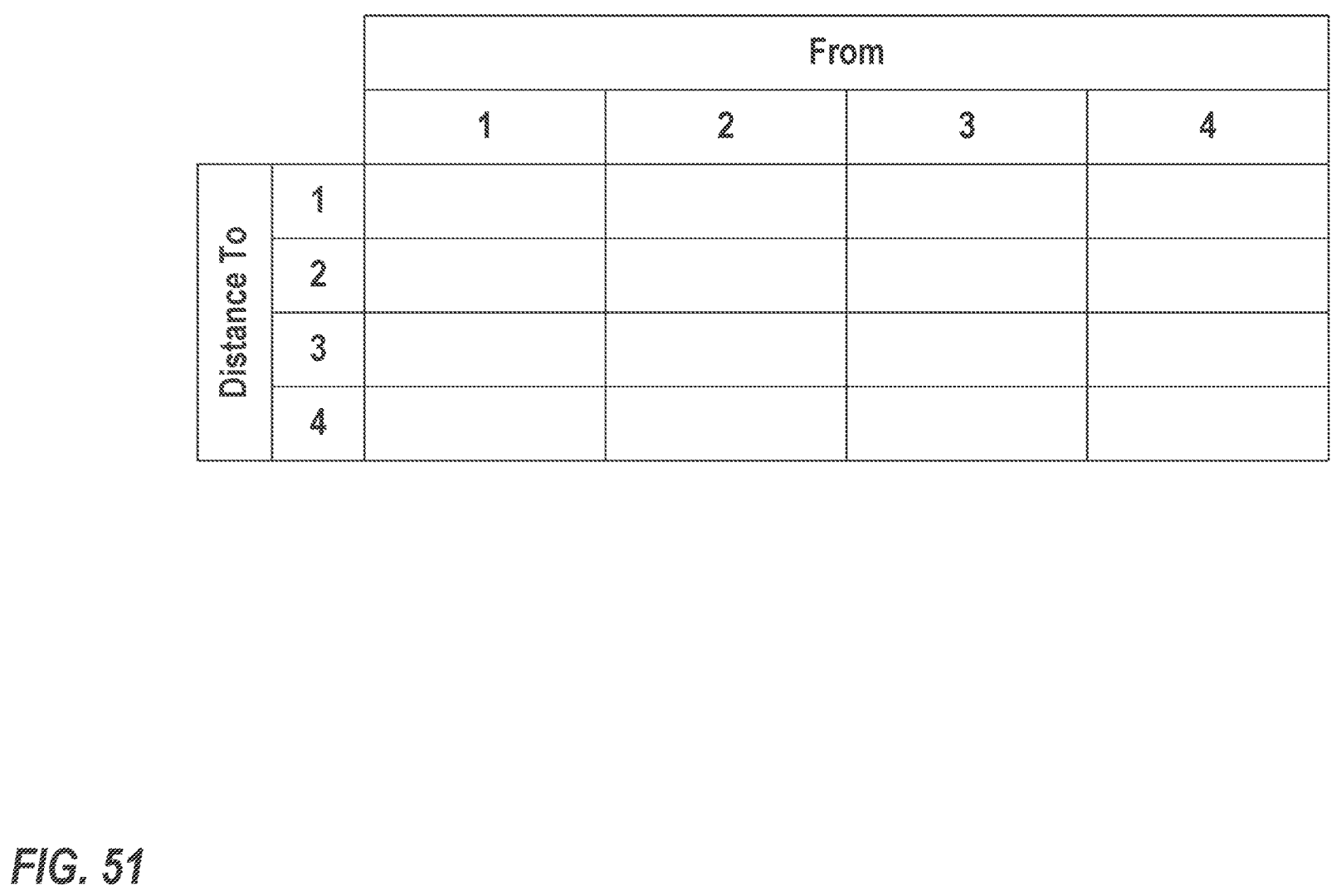

According to various embodiments, determination of a routing solution to a routing problem involves precomputation of information regarding shortest or optimal paths between locations to be visited for the routing problem. This information can be stored in one or more matrices, which can be characterized as shortest path matrices. For example, FIG. 51 illustrates a simple two-dimensional grid for distance values for shortest paths between each location.

Figure 52:
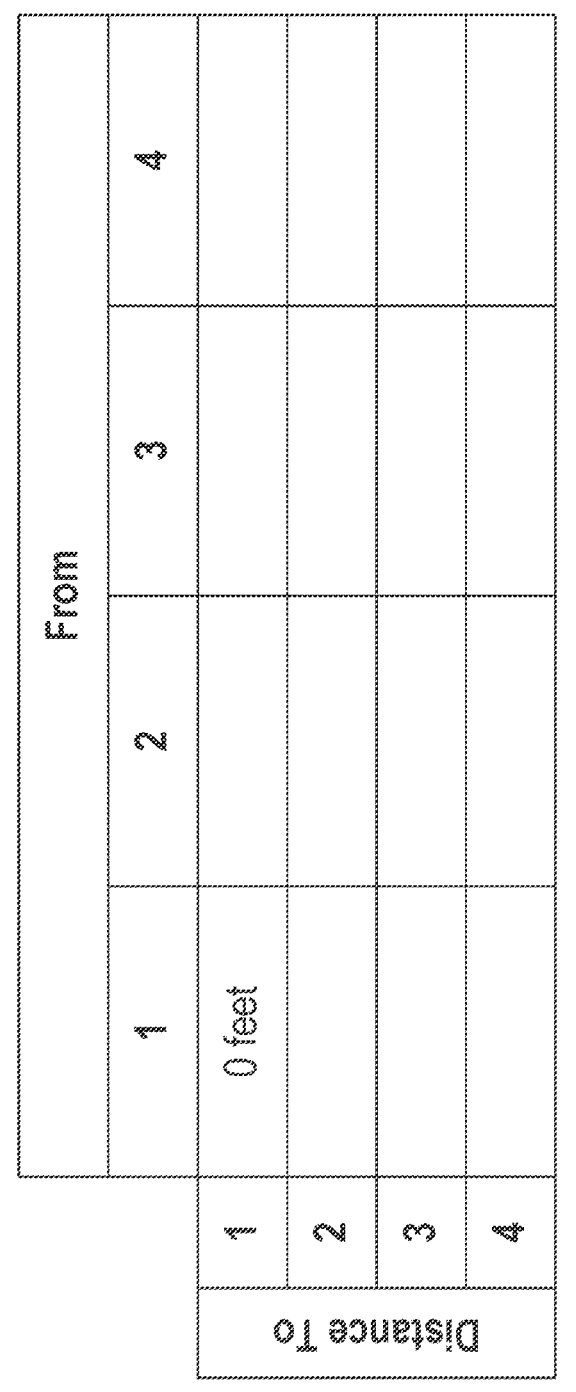
Figure 53:
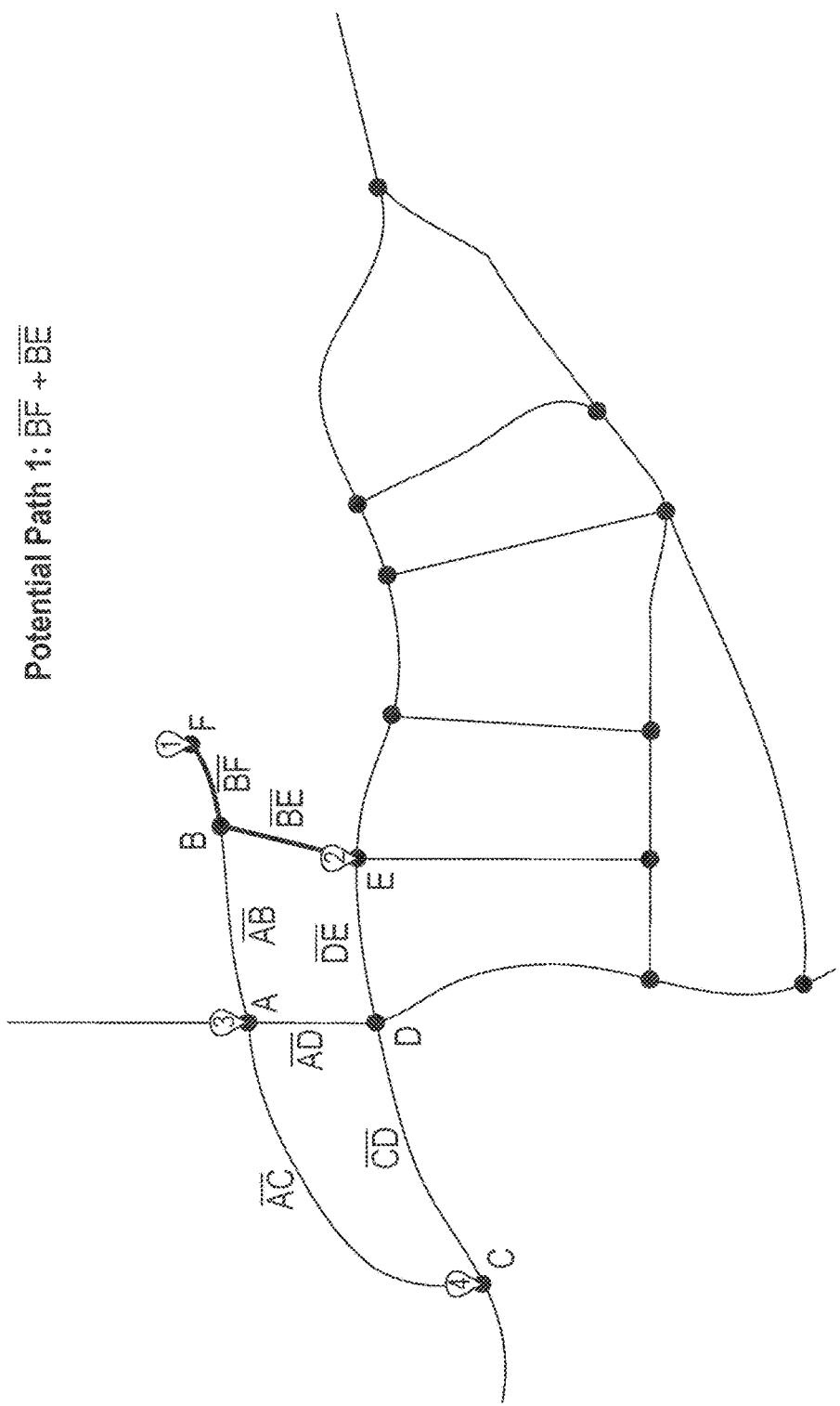
FIG. 53 illustrates a first potential path between two locations.
Figure 54:
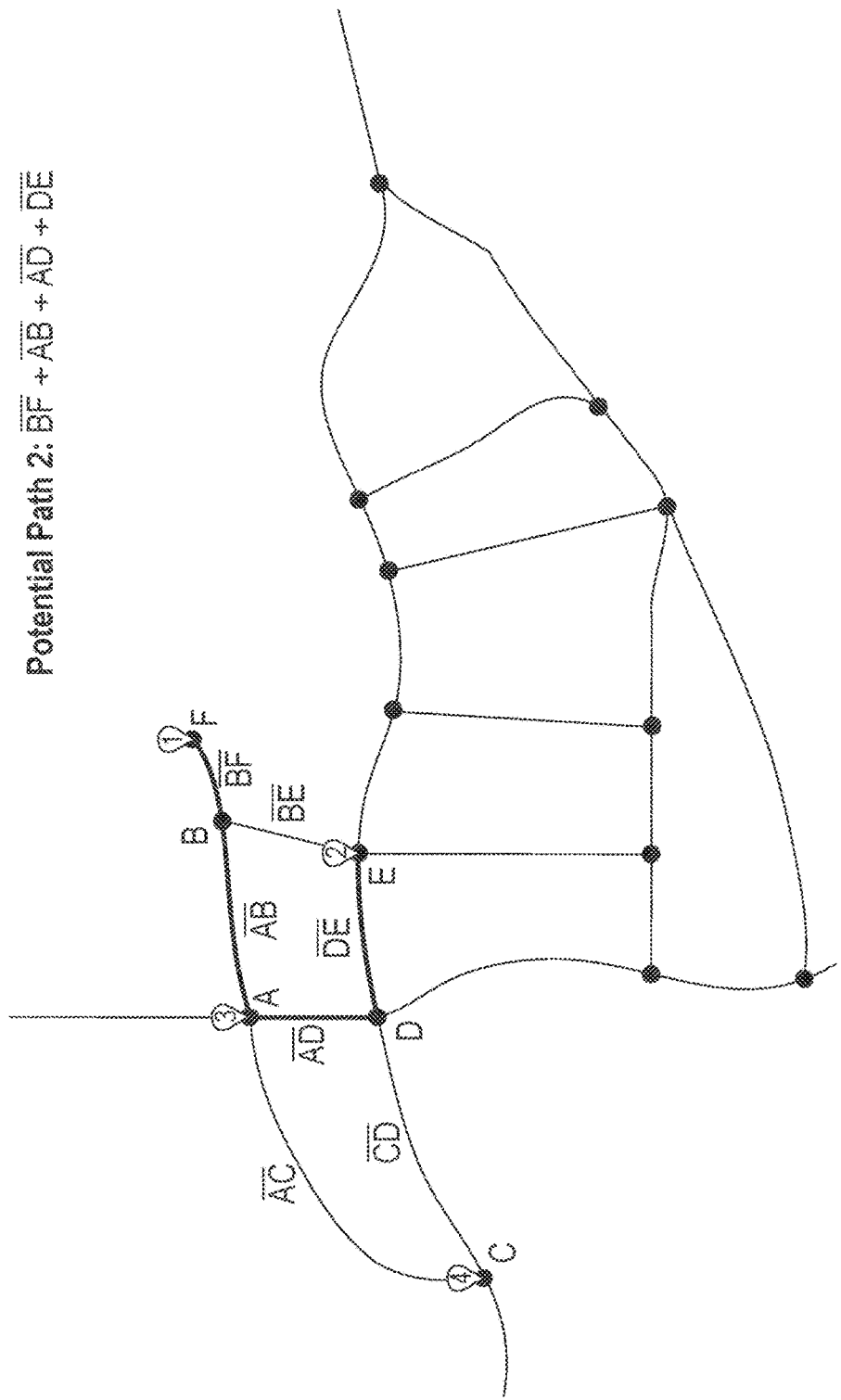
FIG. 54 illustrates a second potential path between the two points of FIG. 53.

As illustrated in FIG. 52, the distance between any location and itself (e.g. From "1" to "1") would be zero. In some implementations, other distance values for each square can be determined based on a determined shortest path, for example as described hereinabove. As an example, consider travel from location "1" to location "2". As illustrated in FIG. 53, a first potential path would involve traversing road segments BF and BE. Similarly, as illustrated in FIG. 54, a second potential path would involve traversing road segments BF, AB, AD, and DE. As noted above, other paths could be considered as well, or another methodology could be used to determine a shortest path (and corresponding distance).

FIG. 55 illustrates calculation of total distance values for each of these paths, and FIG. 56 illustrates identification of the value "429" as the calculated total distance value for the determined shortest path for traversal from location "1" to location "2". According to various embodiments, this calculated total distance value for the determined shortest path for traversal from location "1" to location "2" can be stored as a precalculated value in a travel distance matrix, as illustrated in FIG. 57. In this simplistic example, all of the road segments are characterized as bidirectional road segments having the same travel distance in both directions, so a distance value for the shortest path from location "1" to location "2" would be the same as a distance value for the shortest path from location "2" to location "1", as illustrated in FIG. 58.

Figure 60:
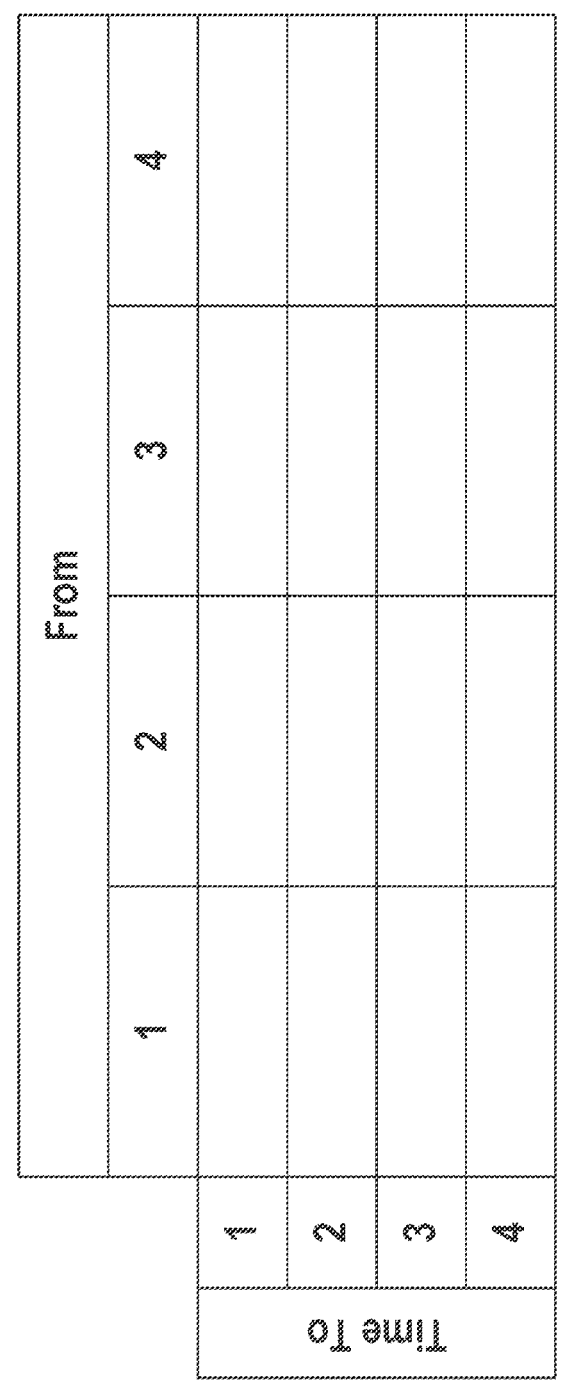

In some implementations, a shortest path, and distance value therefore, can similarly be determined for traveling from each location to each other location, as illustrated in FIG. 59. Further, an estimated time value can similarly be calculated for a shortest path between each location. For example, FIG. 60 illustrates a simple two-dimensional grid for estimated time values for shortest paths between each location.

In some embodiments, just like calculated total distance values, estimated time values for each square can be calculated based on a determined shortest path, e.g. as described hereinabove. As an example, again consider travel from location "1" to location "2", this time using directional road segments (e.g. where travel from A to B in a first direction along road segment AB might have a first estimated travel time and travel from B to A in a second, opposite direction along road segment BA might have a second estimated travel time which may be, but does not have to be, different from the first estimated travel time).

Figure 61:
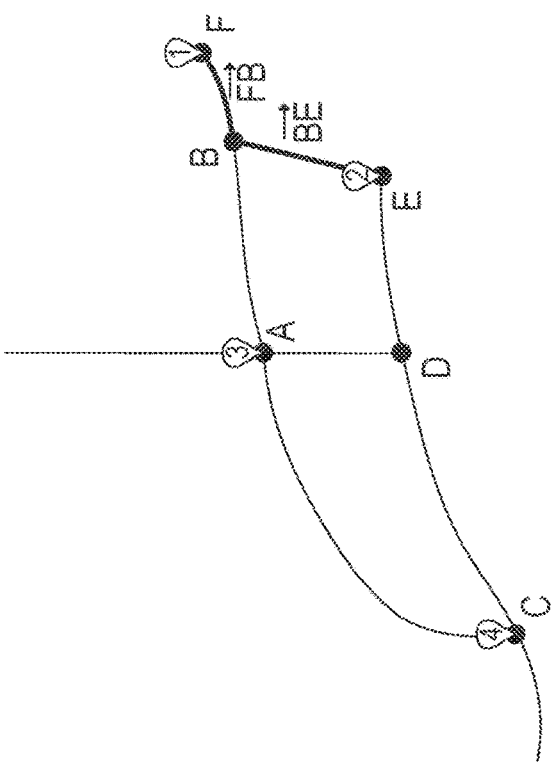
FIGS. 61-62 illustrate a first and second potential path between two locations and the estimated travel time.
Figure 62:
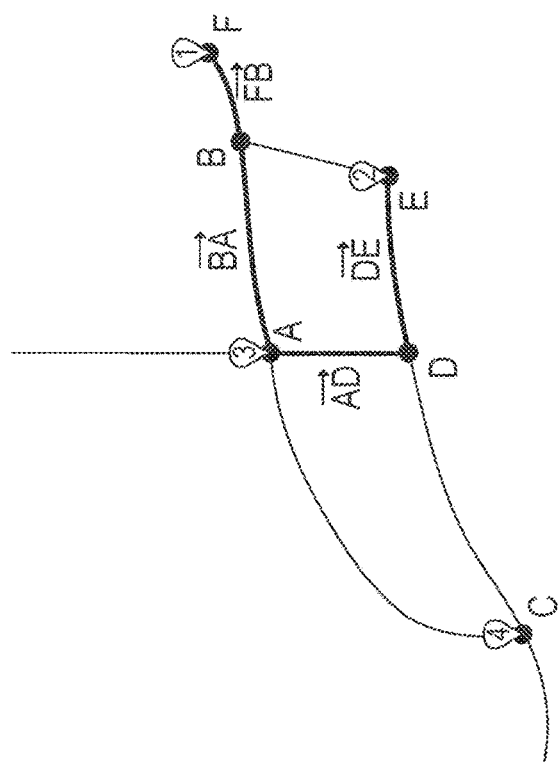

FIG. 61 illustrates a first potential path involving traversing road segments BF and BE, and calculation of an estimated travel time of 30 seconds. Similarly, FIG. 62 illustrates a second potential path involving traversing road segments FB, BA, AD, and DE, and calculation of an estimated travel time of 99 seconds. According to various embodiments, other paths could be considered as well. For instance, a shortest path could be determined to be the shortest based on having a lowest estimated travel time. Alternately, or additionally, another methodology could be used to determine a shortest path (and estimated travel time).

FIG. 63 illustrates identification of thirty seconds as the calculated total estimated travel time value for the determined shortest path for traversal from location "1" to location "2". According to various embodiments, this calculated total estimated travel time value for the determined shortest path for traversal from location "1" to location "2" can be stored as a precalculated value in a travel time matrix, as illustrated in FIG. 64. Unlike the previous example, it cannot necessarily be assumed that the same total estimated travel time for a shortest path will hold for traversal from location "2" to location "1". Thus, in this example, the system may also consider travel from location "2" to location "1".

Figure 65:
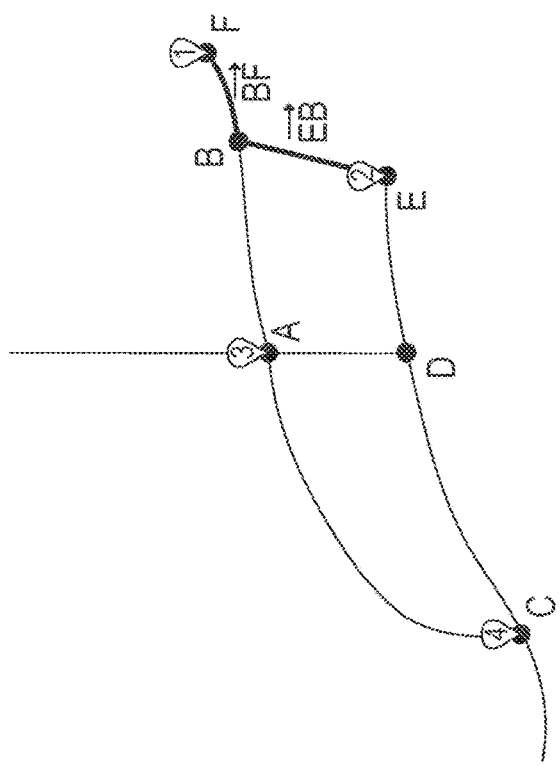
FIG. 65 illustrates a first potential path between the two locations of FIGS. 61-62 in the opposite direction and the estimated travel time.
Figure 66:
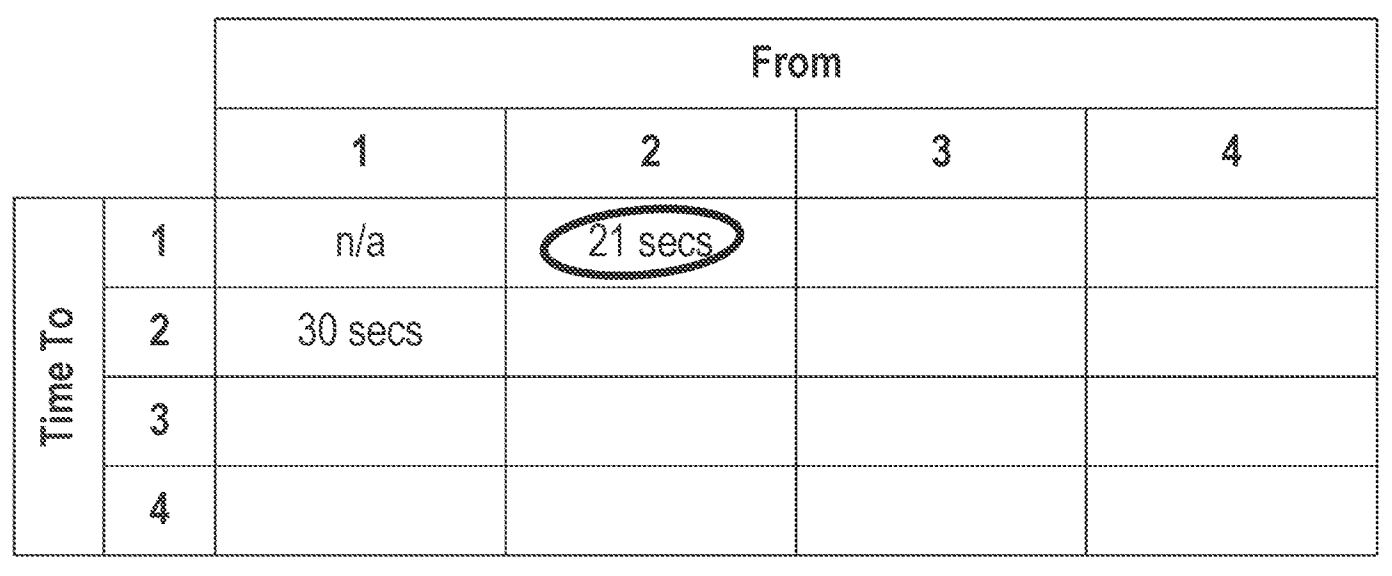

FIG. 65 illustrates a first potential path involving traversing road segments EB and BF, and calculation of an estimated travel time of 21 seconds. In some implementations, this estimated travel time of 21 seconds can be determined to be the estimated travel time for the shortest path from location "2" to location "1", and can be stored as a precalculated value in a travel time matrix, as illustrated in FIG. 66.

According to various embodiments, a shortest path, and estimated travel time value therefore, can similarly be determined for traveling from each location to each other location, as illustrated in FIG. 67. These calculated estimated travel time values can even be stored in a matrix together with calculated distance values, as illustrated in FIG. 68.

Figure 69:
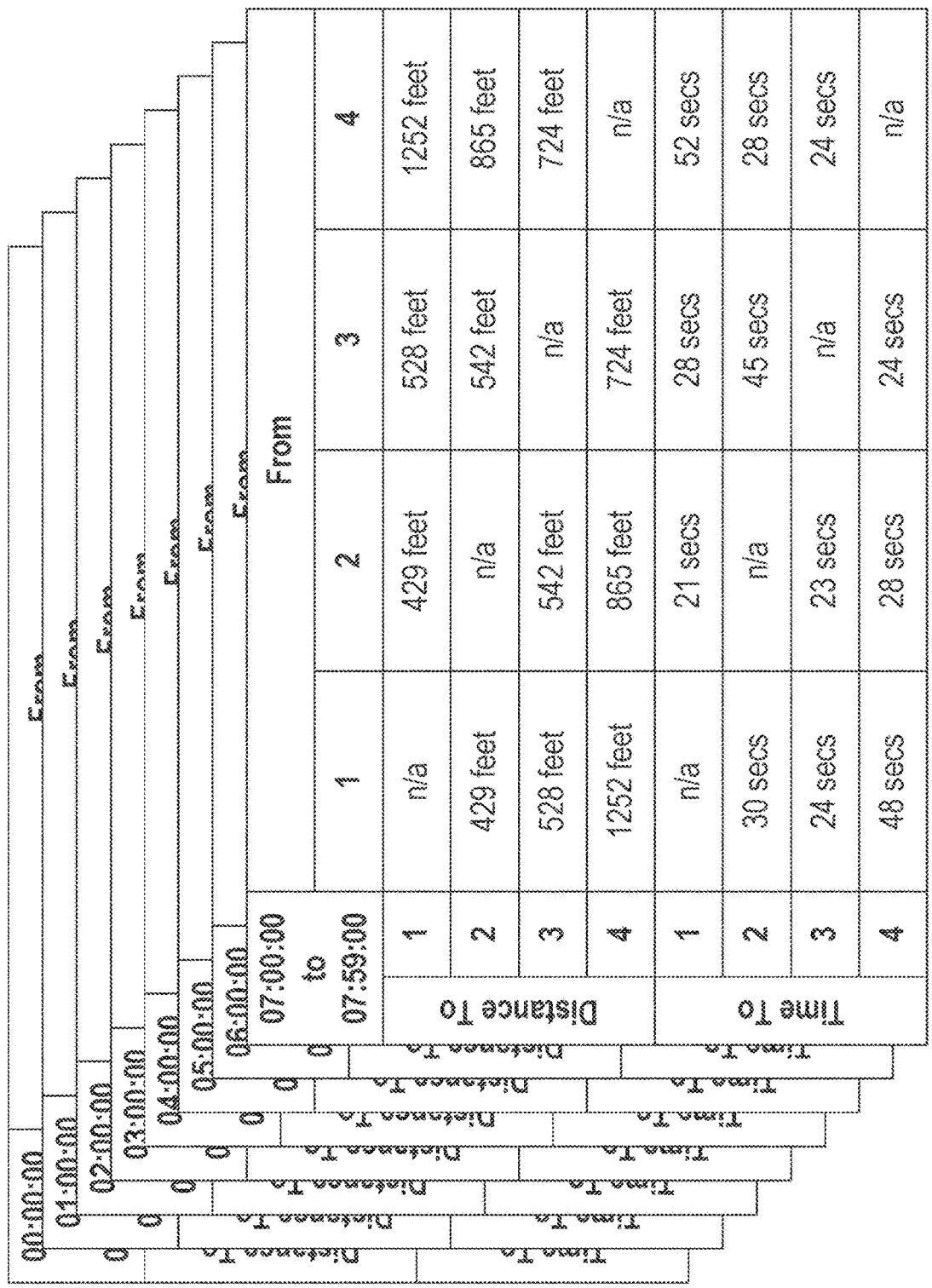
FIG. 69 illustrates a matrix with travel times and distances for multiple time windows each corresponding to an hour of a twenty four hour day.

Traffic patterns may frequently allow for quicker traversal of a road segment (or navigation from one road segment to another) at certain times of the day, and slower traversal at other times. According to various embodiments, to account for this, an example of average travel times may be determined for windows throughout the day, e.g. for 24 one-hour windows, as illustrated in FIGS. 33-34. Determination of a shortest path may then involve using the time estimates for a window within which a current time falls, or within which an estimated time of travel falls. Similarly, a matrix containing calculated values for determined shortest paths may be precomputed and stored for time windows throughout the day, e.g. for 24 one-hour windows, as illustrated in FIG. 69.

Determining High-Quality Routes Using Precomputed Shortest Path Matrices

According to various embodiments, not only the shortest path between two locations, but also a preferred or optimized route for visiting multiple locations may be determined. These can represent locations for use in a routing problem, in which one or more preferred or optimized routing solutions are to be determined which involve visiting of all of the specified locations. In some embodiments, one or more optimized routes may be determined which represent part of a high-quality routing solution. In some embodiments, one or more optimized routing solutions may be determined which represent high-quality routing solutions, even if they have not been determined or confirmed to be an optimal routing solution.

Figure 70:
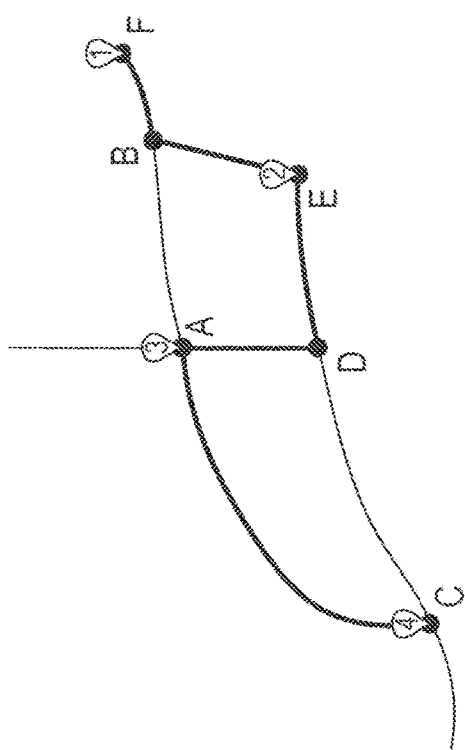
FIGS. 70-73 illustrate four potential routes visiting all four locations illustrated in FIG. 50.

Returning to the example of FIG. 50, an example of an approach to determining a high-quality routing solution for visiting all four locations will now be outlined using the calculated travel times in the precomputed shortest path matrix of FIG. 67. FIG. 70 illustrates a first potential route visiting all four locations which involves traversal from location "1" to location "2", traversal from location "2" to location "3", and traversal from location "3" to location "4". In some embodiments, a total estimated travel time for this route can be determined using the precalculated shortest estimated travel times for shortest paths between these locations in the precomputed shortest path matrix. Thus, the route portion representing traversal from location "1" to location "2" can be determined based on the precomputed shortest path matrix to have an estimated travel time of 30 seconds, the route portion representing traversal from location "2" to location "3" can be determined based on the precomputed shortest path matrix to have an estimated travel time of 23 seconds, and the route portion representing traversal from location "3" to location "4" can be determined based on the precomputed shortest path matrix to have an estimated travel time of 24 seconds. A total estimated travel time for the route can be calculated by summing together these estimated travel times for these route portions. This results in a total estimated travel time for the first potential route of 77 seconds, as illustrated in FIG. 70.

Figure 71:
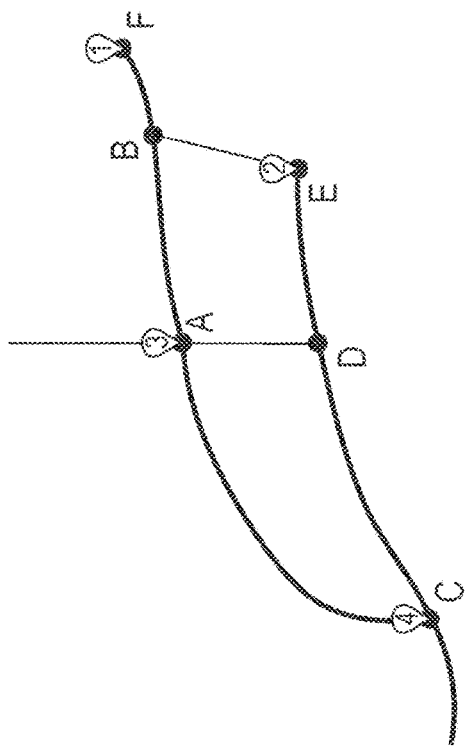

FIG. 71 illustrates a second potential route visiting all four locations which involves traversal from location "1" to location "3", traversal from location "3" to location "4", and traversal from location "4" to location "2". According to various embodiments, the route portion representing traversal from location "1" to location "3" can be determined based on the precomputed shortest path matrix to have an estimated travel time of 24 seconds, the route portion representing traversal from location "3" to location "4" can be determined based on the precomputed shortest path matrix to have an estimated travel time of 24 seconds, and the route portion representing traversal from location "4" to location "2" can be determined based on the precomputed shortest path matrix to have an estimated travel time of 28 seconds. These calculated estimated travel times for the route portions can be summed together to result in a total estimated travel time for the second potential route of 76 seconds, as illustrated in FIG. 71.

Figure 72:
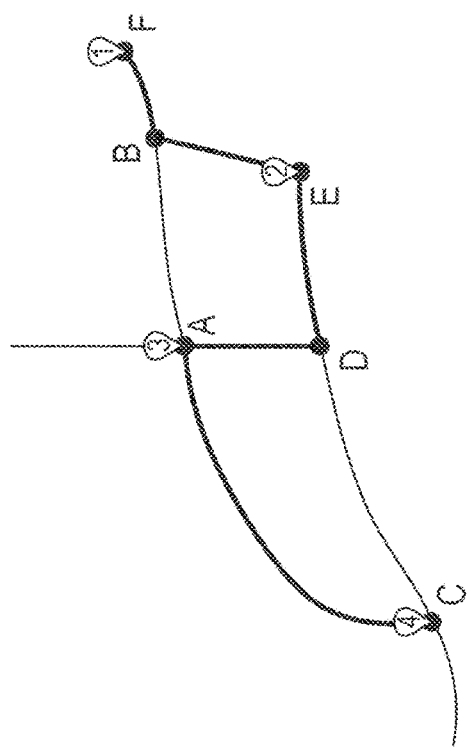

FIG. 72 illustrates a third potential route visiting all four locations which involves traversal from location "4" to location "3", traversal from location "3" to location "2", and traversal from location "2" to location "1". In some embodiments, the route portion representing traversal from location "4" to location "3" can be determined based on the precomputed shortest path matrix to have an estimated travel time of 24 seconds, the route portion representing traversal from location "3" to location "2" can be determined based on the precomputed shortest path matrix to have an estimated travel time of 45 seconds, and the route portion representing traversal from location "2" to location "1" can be determined based on the precomputed shortest path matrix to have an estimated travel time of 21 seconds. These calculated estimated travel times for the route portions can be summed together to result in a total estimated travel time for the third potential route of 90 seconds, as illustrated in FIG. 72.

Figure 73:
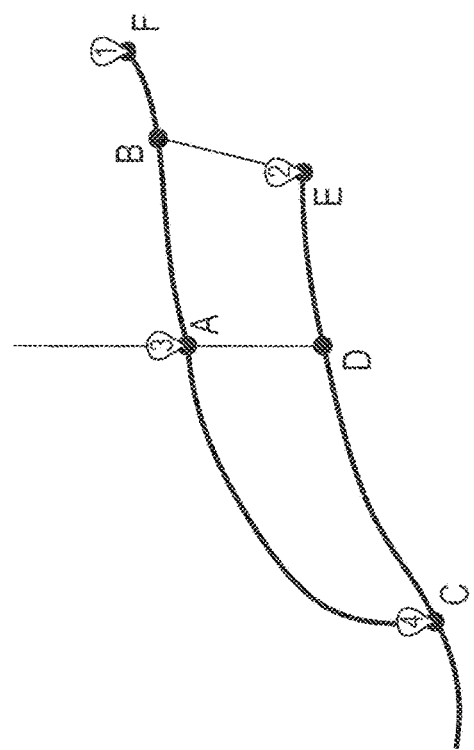

FIG. 73 illustrates a fourth potential route visiting all four locations which involves traversal from location "2" to location "4", traversal from location "4" to location "3", and traversal from location "3" to location "1". In some implementations, the route portion representing traversal from location "2" to location "4" can be determined based on the precomputed shortest path matrix to have an estimated travel time of 28 seconds, the route portion representing traversal from location "4" to location "3" can be determined based on the precomputed shortest path matrix to have an estimated travel time of 24 seconds, and the route portion representing traversal from location "3" to location "1" can be determined based on the precomputed shortest path matrix to have an estimated travel time of 28 seconds. These calculated estimated travel times for the route portions can be summed together to result in a total estimated travel time for the fourth potential route of 90 seconds, as illustrated in FIG. 73.

According to various embodiments, a preferred or optimized route can be identified based on the calculated total estimated travel times for each potential route, as illustrated in FIG. 74. More or less paths may be identified. For example, a search for routes may involve a breadth first or depth first traversal of paths in an attempt to determine one or more paths. Further, other methodologies and approaches may additionally or alternatively be used for determining a shortest, optimized, or preferred route. For example, a search for a shortest, optimized, or preferred route may involve one or more breadth first traversals of paths in an attempt to determine a shortest, optimized, or preferred route, e.g. a depth first traversal from each of one or more locations identified as being geographically exterior to other locations.

According to various embodiments, routing problems can take various forms. For example, a routing problem may involve determining an optimized route for not just one vehicle, but two or more vehicles, e.g. a fleet of vehicles. Returning again to the locations illustrated in FIG. 50, consider such a routing problem in which two trucks are to visit the four locations (assuming that each truck is to visit two of the locations). FIG. 75 illustrates potential assignments of the trucks for solution of the routing problem. An example of an approach to determining preferred or optimized assignments for a high-quality routing solution will now be outlined using the calculated travel times in the precomputed shortest path matrix of FIG. 67.

Figure 76:
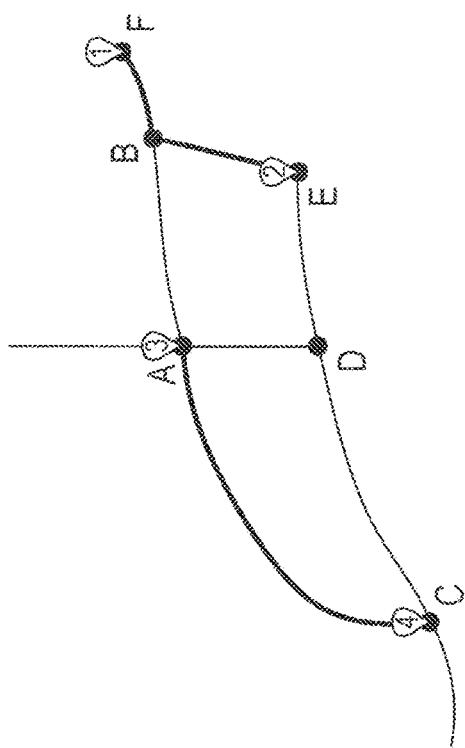
FIGS. 76-77 illustrate determination of an estimated travel time for a first potential assignment of two trucks.

FIG. 76 illustrates a first potential assignment for two trucks. In this example, this first potential assignment involves, for a first truck, use of either a first potential route involving traversal from location "1" to location "2", or a second potential route involving traversal from location "2" to location "1". In some implementations, a total estimated travel time for each potential route for the first truck can be determined using the precalculated shortest estimated travel times for shortest paths between these locations in the precomputed shortest path matrix. Thus, the route involving traversal from location "1" to location "2" can be determined based on the precomputed shortest path matrix to have a total estimated travel time of 30 seconds, and the route involving traversal from location "2" to location "1" can be determined based on the precomputed shortest path matrix to have a total estimated travel time of 21 seconds.

In this example, this first potential assignment further involves, for a second truck, use of either a first potential route involving traversal from location "3" to location "4", or a second potential route involving traversal from location "4" to location "3". In some embodiments, a total estimated travel time for each potential route for the second truck can be determined using the precalculated shortest estimated travel times for shortest paths between these locations in the precomputed shortest path matrix. Thus, the route involving traversal from location "3" to location "4" can be determined based on the precomputed shortest path matrix to have a total estimated travel time of 24 seconds, and the route involving traversal from location "4" to location "3" can be determined based on the precomputed shortest path matrix to have a total estimated travel time of 24 seconds.

Figure 77:
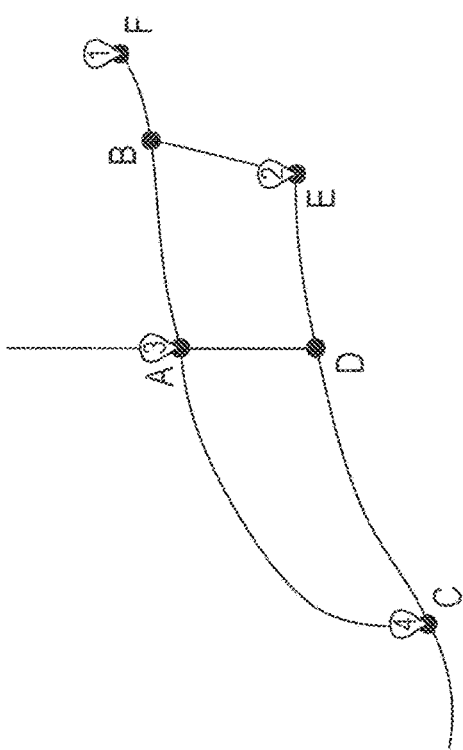

According to various embodiments, a total estimated travel time for this first potential assignment can be determined by summing together the lowest calculated estimated travel time for each truck, as illustrated in FIGS. 76-77.

Here, a total estimated travel time for this first potential assignment can be calculated to be 45 seconds, as illustrated in FIG. 77.

Figure 78:
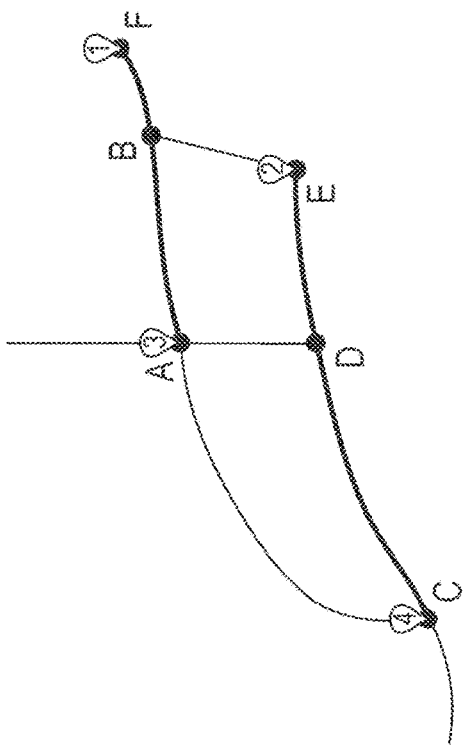
FIG. 78 illustrates determination of an estimated travel time for a second potential assignment of two trucks.

FIG. 78 illustrates a second potential assignment for two trucks, generated according to one or more implementations. This second potential assignment involves, for a first truck, use of either a first potential route involving traversal from location "1" to location "3", or a second potential route involving traversal from location "3" to location "1". A total estimated travel time for each potential route for the first truck can be determined using the precalculated shortest estimated travel times for shortest paths between these locations in the precomputed shortest path matrix. Thus, the route involving traversal from location "1" to location "3" can be determined based on the precomputed shortest path matrix to have a total estimated travel time of 24 seconds, and the route involving traversal from location "3" to location "1" can be determined based on the precomputed shortest path matrix to have a total estimated travel time of 28 seconds.

In the example shown, this second potential assignment further involves, for a second truck, use of either a first potential route involving traversal from location "2" to location "4", or a second potential route involving traversal from location "4" to location "2". A total estimated travel time for each potential route for the second truck can be determined using the precalculated shortest estimated travel times for shortest paths between these locations in the precomputed shortest path matrix. Thus, the route involving traversal from location "2" to location "4" can be determined based on the precomputed shortest path matrix to have a total estimated travel time of 28 seconds, and the route involving traversal from location "4" to location "2" can be determined based on the precomputed shortest path matrix to have a total estimated travel time of 28 seconds.

In some embodiments, a total estimated travel time for this second potential assignment can be determined by summing together the lowest calculated estimated travel time for each truck, as illustrated in FIG. 78. Here, a total estimated travel time for this first potential assignment can be calculated to be 52 seconds, as illustrated in FIG. 78.

Figure 79:
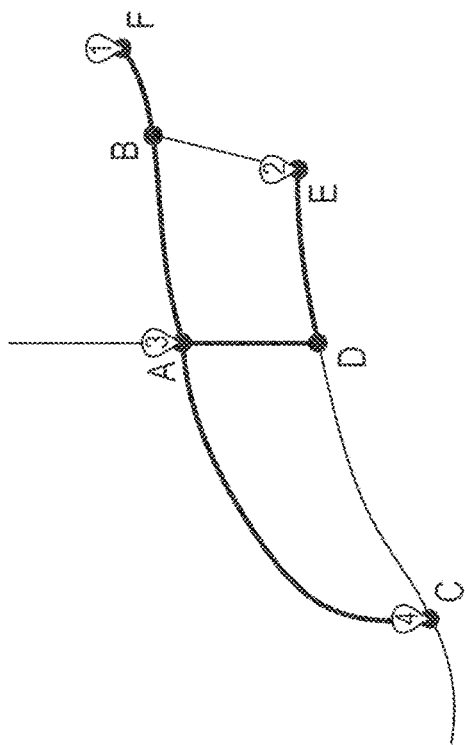
FIG. 79 illustrates determination of an estimated travel time for a third potential assignment of two trucks.

In the example shown, FIG. 79 illustrates a third potential assignment for two trucks. This third potential assignment involves, for a first truck, use of either a first potential route involving traversal from location "1" to location "4", or a second potential route involving traversal from location "4" to location "1". In some embodiments, a total estimated travel time for each potential route for the first truck can be determined using the precalculated shortest estimated travel times for shortest paths between these locations in the precomputed shortest path matrix. Thus, the route involving traversal from location "1" to location "4" can be determined based on the precomputed shortest path matrix to have a total estimated travel time of 48 seconds, and the route involving traversal from location "4" to location "1" can be determined based on the precomputed shortest path matrix to have a total estimated travel time of 52 seconds.

This third potential assignment further involves, for a second truck, use of either a first potential route involving traversal from location "2" to location "3", or a second potential route involving traversal from location "3" to location "2". According to various embodiments, a total estimated travel time for each potential route for the second truck can be determined using the precalculated shortest estimated travel times for shortest paths between these locations in the precomputed shortest path matrix. Thus, the route involving traversal from location "2" to location "3"

can be determined based on the precomputed shortest path matrix to have a total estimated travel time of 23 seconds, and the route involving traversal from location "3" to location "2" can be determined based on the precomputed shortest path matrix to have a total estimated travel time of 45 seconds.

In some implementations, a total estimated travel time for this third potential assignment can be determined by summing together the lowest calculated estimated travel time for each truck, as illustrated in FIG. 79. Here, a total estimated travel time for this first potential assignment can be calculated to be 71 seconds, as illustrated in FIG. 79.

In some embodiments, the calculated total estimated travel times for each potential assignment can be compared to determine an optimized or preferred assignment, as illustrated in FIG. 80. The optimized routes that were used to determine the calculated total estimated travel times for each potential assignment may be used as optimized routes for a routing solution, or additional determination of optimized routes may be performed. According to various embodiments, routing problems can take various forms. As another example, one or more vehicles may have a set starting location which is to be taken into account in determining a solution.

Figure 81:
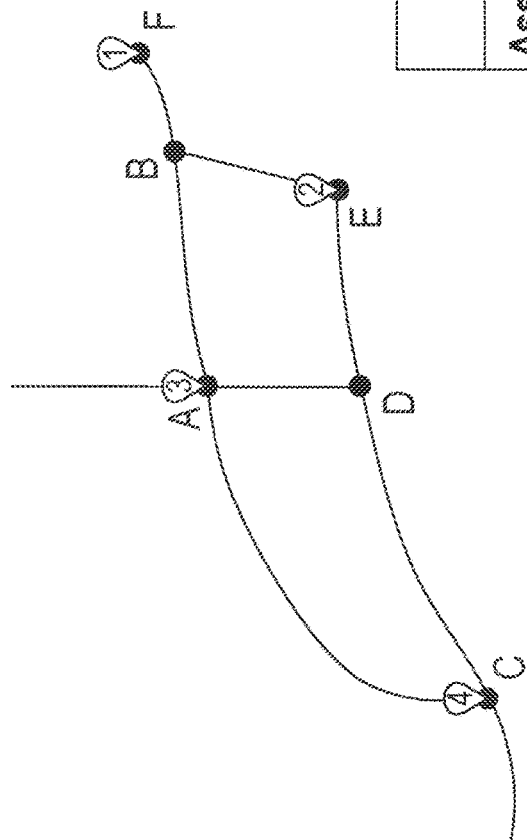
FIG. 81 illustrates three potential assignments of trucks for solution of another routing problem.

Returning again to the locations illustrated in FIG. 50, consider such a routing problem in which two trucks having a set starting location of location "1" are to visit location "2", location "3", and location "4" (assuming that each truck is to visit at least one location). FIG. 81 illustrates potential assignments of the trucks for solution of the routing problem. An example of an approach to determining preferred or optimized assignments for a high-quality routing solution will now be outlined using the calculated travel times in the precomputed shortest path matrix of FIG. 67.

Figure 82:
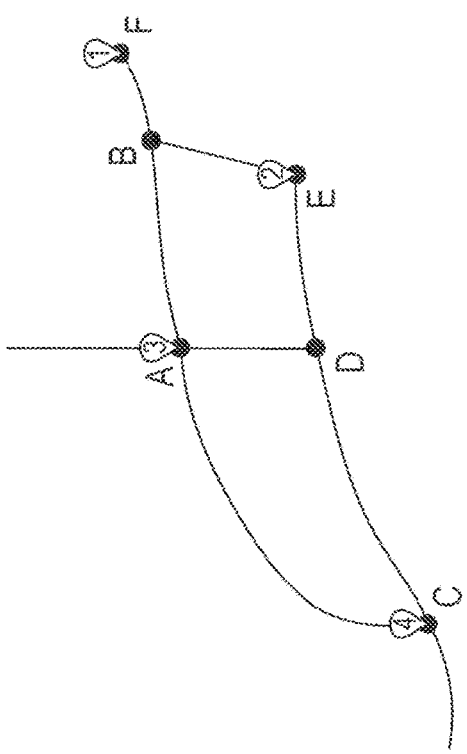
FIGS. 82-84 illustrate determination of an estimated travel time for first, second, and third potential assignments of two trucks.

FIG. 82 illustrates a first potential assignment for two trucks, generated in accordance with one or more implementations. This first potential assignment involves, for a first truck, use of either a first potential route involving traversal from location "1" to location "2" and traversal from location "2" to location "3", or a second potential route involving traversal from location "1" to location "3" and traversal from location "3" to location "2". A total estimated travel time for each potential route for the first truck can be determined using the precalculated shortest estimated travel times for shortest paths between these locations in the precomputed shortest path matrix. Thus, the route involving traversal from location "1" to location "2" and traversal from location "2" to location "3" can be determined based on the precomputed shortest path matrix to have a total estimated travel time of 53 seconds, and the route involving traversal from location "1" to location "3" and traversal from location "3" to location "2" can be determined based on the precomputed shortest path matrix to have a total estimated travel time of 69 seconds.

This first potential assignment further involves, for a second truck, use of a potential route involving traversal from location "1" to location "4". According to various embodiments, a total estimated travel time for this potential route for the second truck can be determined using the precalculated shortest estimated travel times for shortest paths between these locations in the precomputed shortest path matrix. Thus, the route involving traversal from location "1" to location "4" can be determined based on the precomputed shortest path matrix to have a total estimated travel time of 48 seconds.

In some implementations, a total estimated travel time for this first potential assignment can be determined by summing together the lowest calculated estimated travel time for each truck, as illustrated in FIG. 82. Here, a total estimated travel time for this first potential assignment can be calculated to be 101 seconds, as illustrated in FIG. 82.

FIG. 82 illustrates a second potential assignment for two trucks. According to various embodiments, this second potential assignment involves, for a first truck, use of either a first potential route involving traversal from location "1" to location "2" and traversal from location "2" to location "4", or a second potential route involving traversal from location "1" to location "4" and traversal from location "4" to location "2". A total estimated travel time for each potential route for the first truck can be determined using the precalculated shortest estimated travel times for shortest paths between these locations in the precomputed shortest path matrix. Thus, the route involving traversal from location "1" to location "2" and traversal from location "2" to location "4" can be determined based on the precomputed shortest path matrix to have a total estimated travel time of 58 seconds, and the route involving traversal from location "1" to location "4" and traversal from location "4" to location "2" can be determined based on the precomputed shortest path matrix to have a total estimated travel time of 76 seconds.

This second potential assignment further involves, for a second truck, use of a potential route involving traversal from location "1" to location "3". In some embodiments, a total estimated travel time for this potential route for the second truck can be determined using the precalculated shortest estimated travel times for shortest paths between these locations in the precomputed shortest path matrix. Thus, the route involving traversal from location "1" to location "3" can be determined based on the precomputed shortest path matrix to have a total estimated travel time of 24 seconds.

Figure 83:
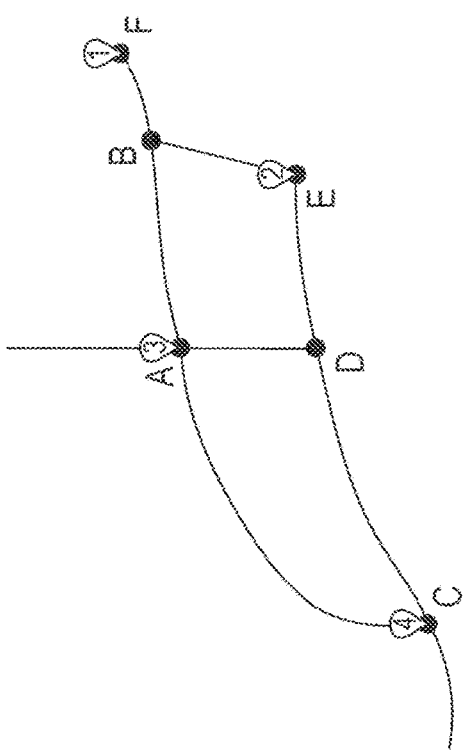

In some embodiments, a total estimated travel time for this second potential assignment can be determined by summing together the lowest calculated estimated travel time for each truck, as illustrated in FIG. 83. Here, a total estimated travel time for this first potential assignment can be calculated to be 82 seconds, as illustrated in FIG. 83.

FIG. 83 illustrates a third potential assignment for two trucks, generated in accordance with one or more embodiments. This third potential assignment involves, for a first truck, use of either a first potential route involving traversal from location "1" to location "3" and traversal from location "3" to location "4", or a second potential route involving traversal from location "1" to location "4" and traversal from location "4" to location "3". A total estimated travel time for each potential route for the first truck can be determined using the precalculated shortest estimated travel times for shortest paths between these locations in the precomputed shortest path matrix. Thus, the route involving traversal from location "1" to location "3" and traversal from location "3" to location "4" can be determined based on the precomputed shortest path matrix to have a total estimated travel time of 48 seconds, and the route involving traversal from location "1" to location "4" and traversal from location "4" to location "3" can be determined based on the precomputed shortest path matrix to have a total estimated travel time of 72 seconds.

This third potential assignment further involves, for a second truck, use of a potential route involving traversal from location "1" to location "2". In some implementations, a total estimated travel time for this potential route for the second truck can be determined using the precalculated shortest estimated travel times for shortest paths between these locations in the precomputed shortest path matrix. Thus, the route involving traversal from location "1" to location "2" can be determined based on the precomputed shortest path matrix to have a total estimated travel time of 30 seconds.

Figure 84:
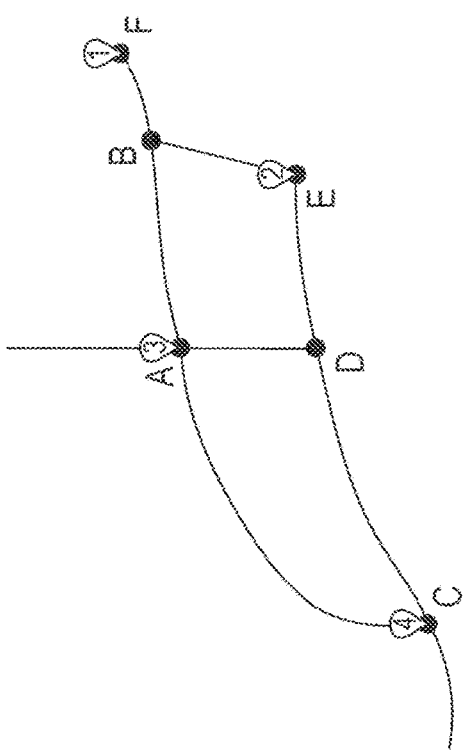

According to various embodiments, a total estimated travel time for this second potential assignment can be determined by summing together the lowest calculated estimated travel time for each truck, as illustrated in FIG. 84. Here, a total estimated travel time for this first potential assignment can be calculated to be 78 seconds, as illustrated in FIG. 84.

In some embodiments, the calculated total estimated travel times for each potential assignment can be compared to determine an optimized or preferred assignment, as illustrated in FIG. 85. The optimized routes that were used to determine the calculated total estimated travel times for each potential assignment may be used as optimized routes for a routing solution, or additional determination of optimized routes may be performed.

Figure 87:
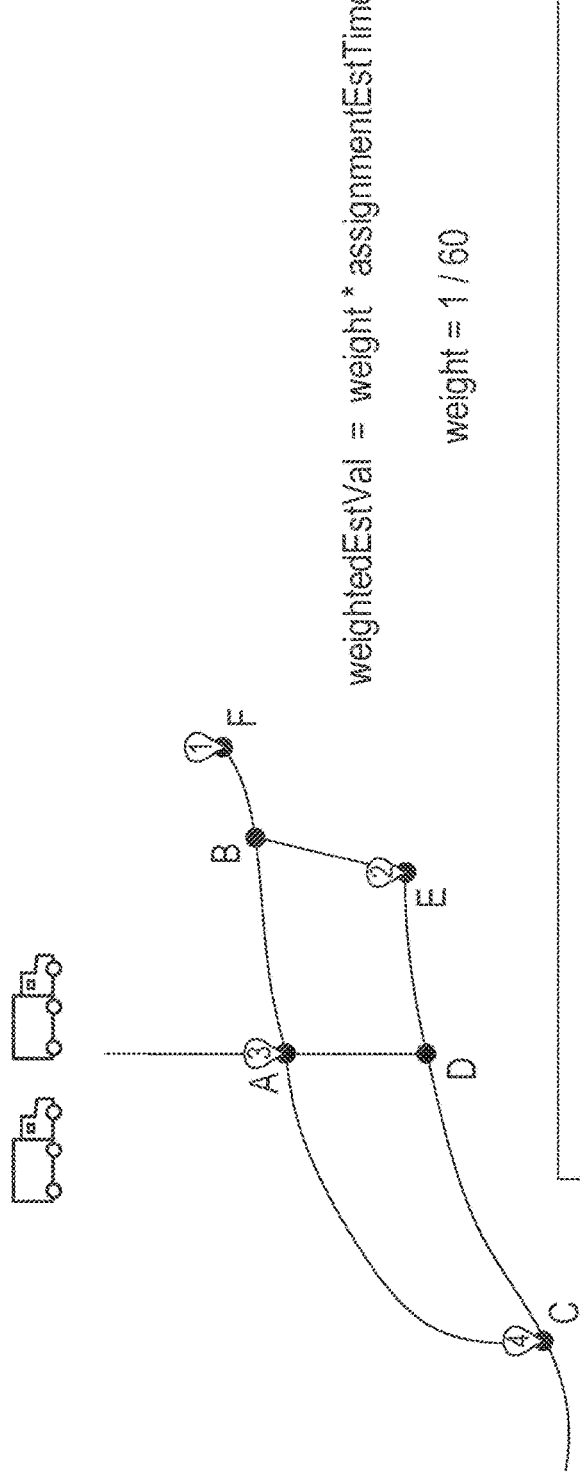
FIG. 87 illustrates calculation of weighted estimated time values for potential assignments.

In some implementations, calculated values, such as a calculated estimated time value, may be weighted, e.g. for calculations for determining a shortest, optimal, or preferred path, assignment, or route. For example, FIG. 86 illustrates weighting of an estimated time value for an assignment, and FIG. 87 illustrates calculation of such weighted estimated time values for potential assignments.

Figure 89:
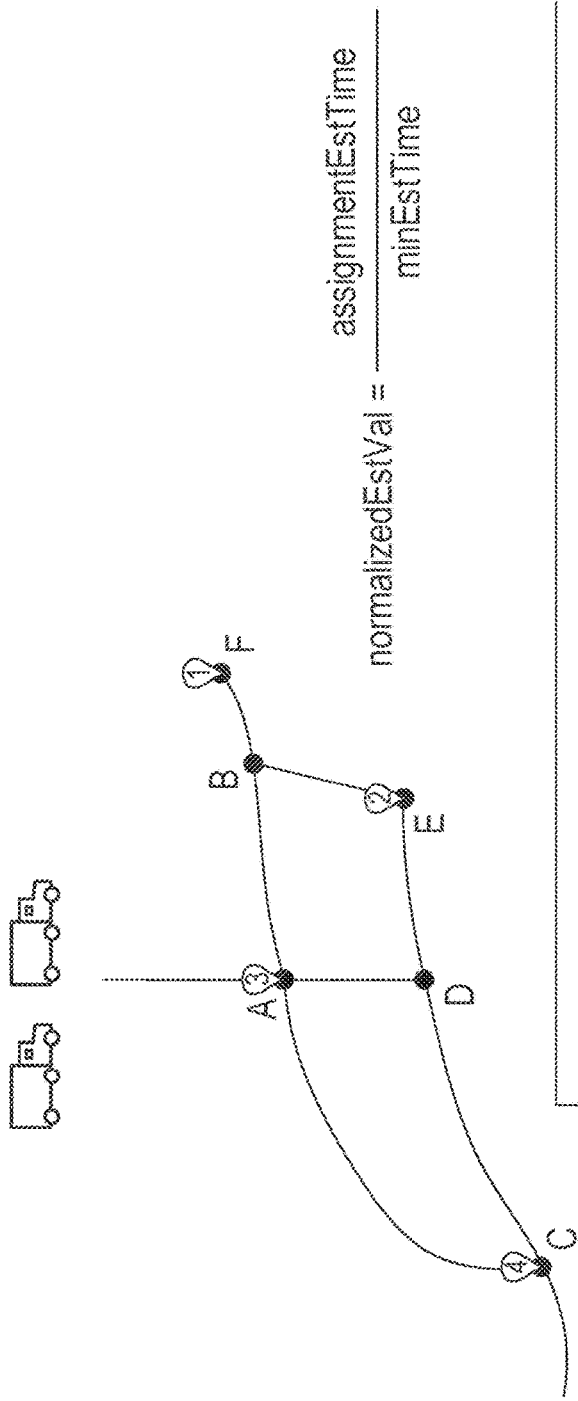
FIG. 89 illustrates calculation of normalized estimated time values for potential assignments.

According to various embodiments, calculated values, such as a calculated estimated time value, may be normalized, e.g. for calculations for determining a shortest, optimal, or preferred path, or preferred or optimized assignment or route. For example, FIG. 88 illustrates calculation of a normalized value for an estimated time value for an assignment, and FIG. 89 illustrates calculation of such normalized estimated time values for potential assignments.

Using Constraints and Penalties to Facilitate Determination of High-Quality Solutions to Multi-Objective Routing Problems A classic approach to generating a solution to a routing problem involves trying to minimize travel time while adhering to hard time window constraints. In reality, however, many problems are multi-objective, and it may be desirable to account for a variety of tradeoffs such as, for example, travel time, importance of assigning certain drivers or vehicles to individual customers, visiting as many customers as possible, avoiding certain roads at some times of day, etc. For example, objectives for a routing problem may include minimizing total travel time, minimizing fuel costs, minimizing a number of vehicles used, making sure the right vehicle or driver visits each customer, minimizing overtime costs, and visiting as many high priority customers as possible. According to various embodiments, multi-objective routing optimization problems where there are tradeoffs between possibly conflicting objectives may be solved.

In some embodiments, a methodology involves defining one or more constraints related to features of possible solutions to a routing problem. Each constraint is assigned a penalty value or weight based on how important it is. For example, a higher penalty can indicate increased importance of adhering to the constraint. Mathematical optimization may be applied to try and generate solutions that have as low a total score as possible where the score is generated using a sum of determined penalty values.

In some embodiments, a constraint is a rule that asks a yes or no question about the solution to a problem. An example of constraints might be, for example: "Is the driver working more than 8 hours?", "Is the vehicle traveling more than 200 miles in a day?", "Is customer x being serviced by driver y?", "Is customer x being serviced on Wednesday between 9 am and 11 am?", "Does the driver get a lunch break?", or "Are we visiting at least 5 high priority customers today?".

In some embodiments, a penalty is a numerical quantity assigned to each instance in a solution when a constraint is violated. A penalty might be, for example, that if a driver is driving more than eight hours on a day, that solution is penalized x points (for each violation instance within that solution). A penalty may also be configured to be applied based on the extent of violation of a constraint. For example, a solution may be penalized an additional y points for every ten minutes over the eight-hour limit.

In some embodiments, the overall quality of the solution can be characterized using a sum of all of these penalties which measures which rules are broken and how important each of those violations is to the user's overall preferences. In some embodiments, by viewing routing problems as multi-objective, a system is able to determine potential solutions that match what a user really wants. Additionally, a system can provide multiple solutions back to a user to allow the user to select which solution he or she feels best addresses his or her needs.

As a more specific example, consider a routing problem in which it is desired to avoid curvy roads. In particular, returning again to the locations illustrated in FIG. 50 and the routing problem illustrated in FIG. 81 in which two trucks having a set starting location of location "1" are to visit location "2", location "3", and location "4" (assuming that each truck is to visit at least one location), now consider the same routing problem where it is additionally desired to avoid curvy roads.

Figure 90:
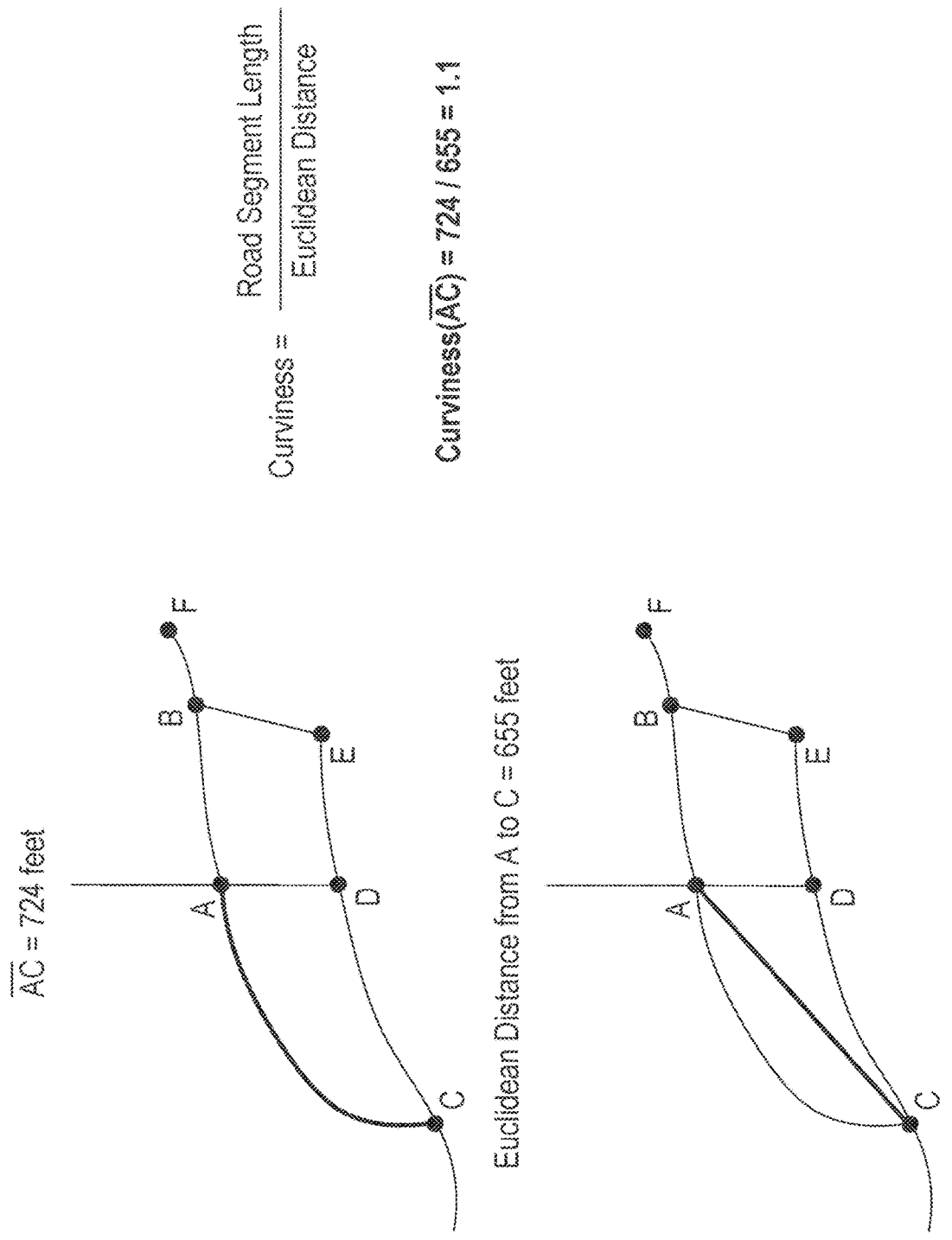
FIG. 90 illustrates calculation of a curviness value for a road segment.

In some embodiments, a curviness value for a road segment can be stored or determined based on data for that road segment. For example, a curviness value for a road segment could be determined by dividing a traversal length of a road segment by a Euclidean distance between two endpoints of that road segment, as illustrated in FIG. 90. In FIG. 90, a curviness value for the road segment AC is determined to be "1.1". In some embodiments, a curviness value may be determined based on a distance calculated using the Haversine formula.

Figure 91:
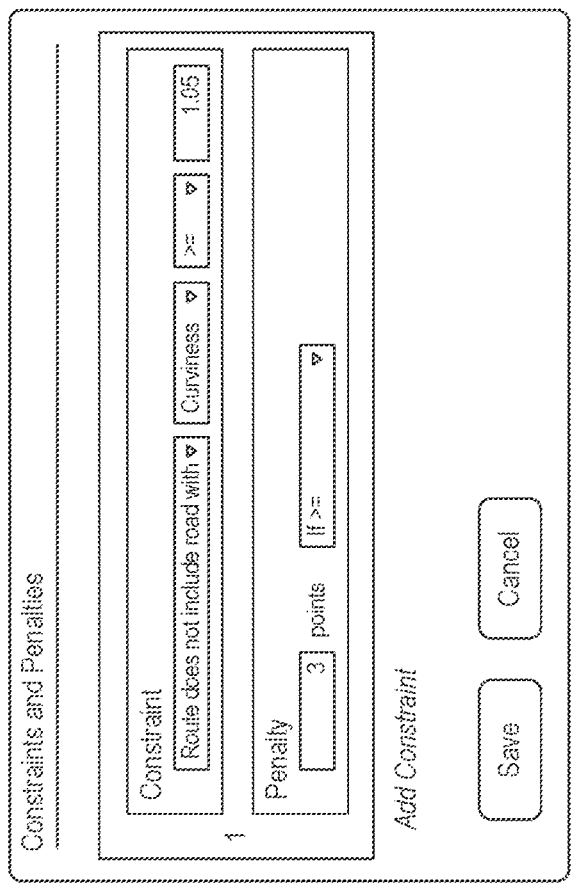

FIG. 91 illustrates an example of a user interface which allows a user to specify constraints and penalties for use in generating solutions to a routing problem. For example, the routing problem illustrated in FIG. 81 includes two trucks having a set starting location of location "1" are to visit location "2", location "3", and location "4" (assuming that each truck is to visit at least one location).

Figure 92:
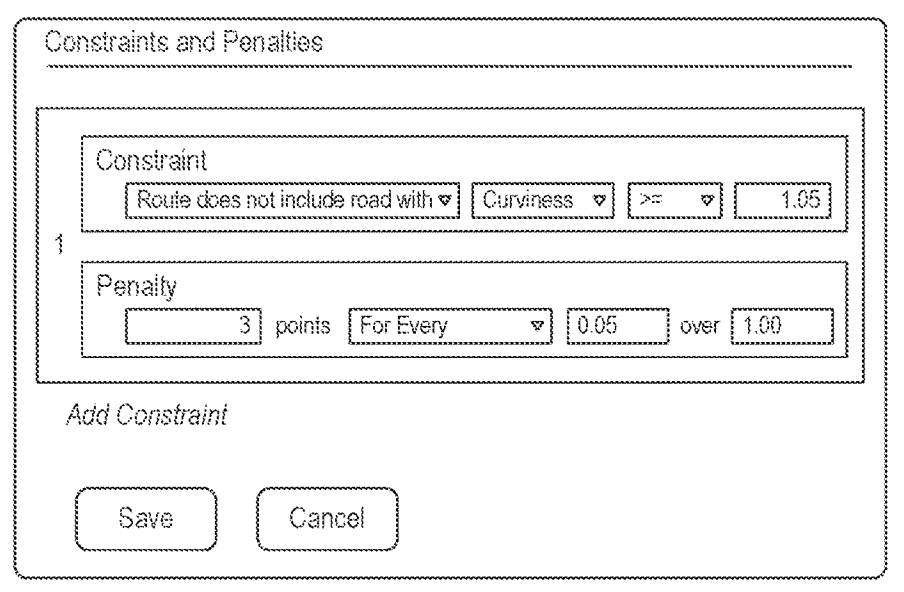

FIG. 92 illustrates the same example of a user interface where a user has indicated that with respect to violation of a constraint that a route does not include a road with a curviness value at or over "1.05", a penalty of "3" points is to be applied for every "0.05" over "1.00".

Figure 93A:
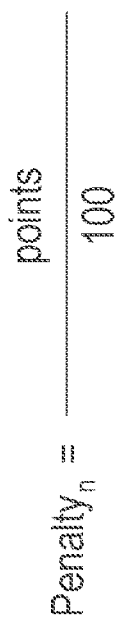

In some implementations, a penalty could be specified in various formats, and/or could be weighted in various ways. For example, a penalty could be specified as points (as illustrated), or as seconds which are to be applied to a total estimated time for a route or solution. In this example, points are weighted to generate a penalty value by dividing the total number of points by 100, as illustrated in FIG. 93A, although weighting may not always be used, or other various weights may be used.

According to various embodiments, a penalty value can be added to a value for a path, route, assignment, or solution to produce an adjusted value. A penalty value might be added to a weighted estimated value, as illustrated in FIG.

93B, or a normalized estimated value, as illustrated in FIG. 93C. In this example, a penalty is added to a route for each instance of traversal over a road segment which has a curviness value at or over 1.05. For each instance, the penalty is equal to three points for each "0.05" over "1.00".

Figure 94:
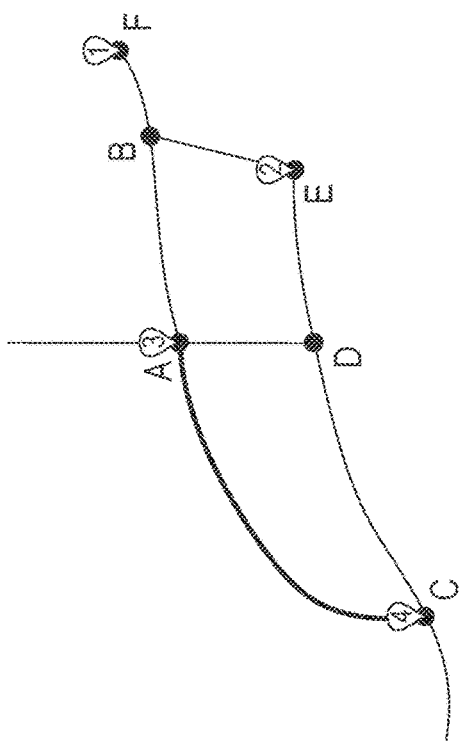
FIG. 94 illustrates penalty points for various routes.

FIG. 94 illustrates how, for the route including traversal from location "1" to location "3" and from location "3" to location "4", a penalty of six points is incurred owing to traversal of road segment AC during traversal from location "3" to location "4". This penalty is incurred because, as illustrated in FIG. 90, the road segment AC has a curviness value of "1.1". In some implementations, a penalty value for this route is calculated by dividing the total number of penalty points by "100", resulting in a penalty value for this route of "0.06", as illustrated in FIG. 94.

Similarly, FIG. 94 illustrates how, for the route including traversal from location "1" to location "4" and from location "4" to location "3", a penalty of six points is incurred owing to traversal of road segment CA during traversal from location "4" to location "3". This penalty is incurred because the road segment CA has a curviness value of "1.1". According to various embodiments, a penalty value for this route is calculated by dividing the total number of penalty points by "100", resulting in a penalty value for this route of "0.06", as illustrated in FIG. 94.

According to various embodiments, an adjusted value can be calculated for a potential solution by adding together penalty values calculated for the various routes forming part of that solution to a weighted or normalized value for that solution (e.g. the sum of weighted or normalized values for the routes forming part of that solution).

Figure 95:
FIG. 95 illustrates adjusted values calculated for potential solutions by adding calculated penalty values to normalized estimated values.

FIG. 95 illustrates adjusted values calculated for potential solutions by adding calculated penalty values for routes for the solutions to normalized estimated values for the solutions, generated according to one or more embodiments. As illustrated, although solution number five has the lowest total estimated travel time of seventy-eight seconds, once penalty values are applied based on specified constraints and penalties, solution number three has the lowest adjusted value taking into account these specified constraints and penalties, with an adjusted value of "1.051".

Figure 96A:
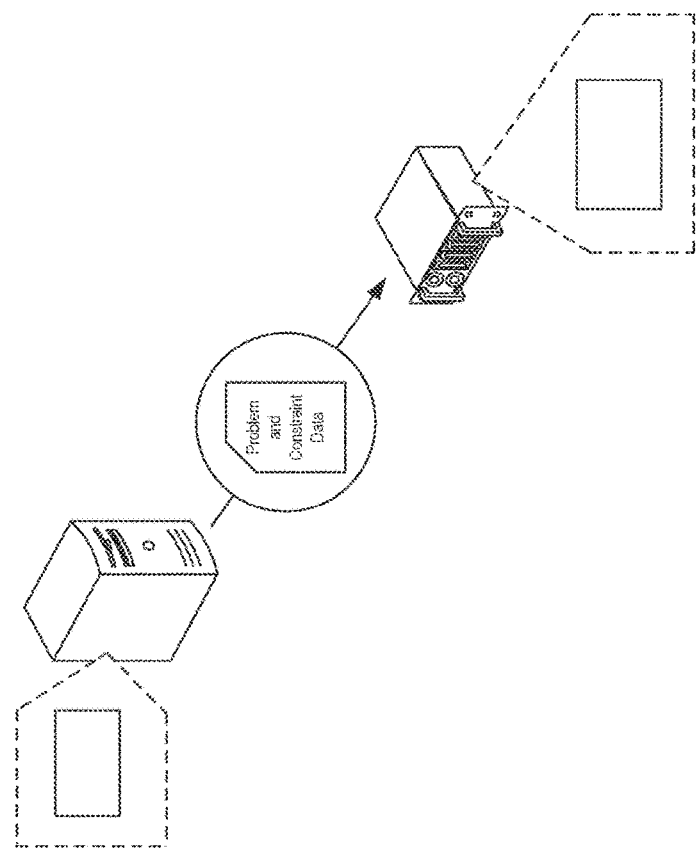
Figure 96B:
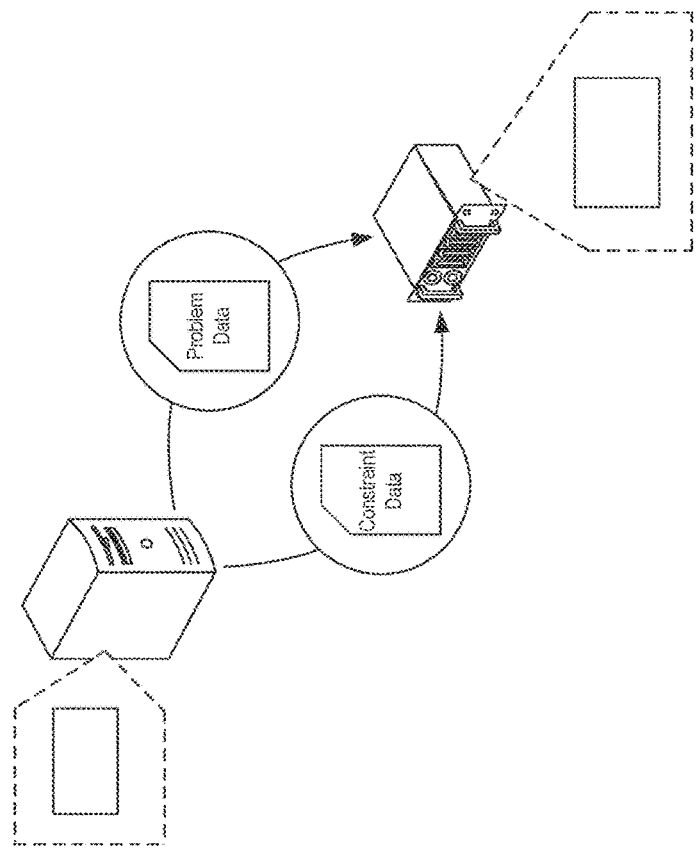

In some embodiments, an example of a methodology for generating high-quality solutions to a routing problem involves sending problem data and constraint (and penalty) data to a system (e.g. an optimization service running at one or more servers). This problem data can include, for example, latitude and longitude coordinates for locations for the routing problem, customer attributes, vehicle attributes, driver attributes, etc. This problem data and constraint data may be sent together, as illustrated in FIG. 96A, or separately as illustrated in FIG. 96B.

In some embodiments, following receipt of problem and constraint data, the system generates a large number of possible solutions (e.g. millions) and evaluates how well each solution meets the specified constraints, as illustrated in FIG. 96C. In some embodiments, a penalty value is calculated for all generated solutions, or for one or more of the more promising generated solutions. In some embodiments, estimated time values or other generated values are evaluated in combination with generated penalty values.

Figure 96D:
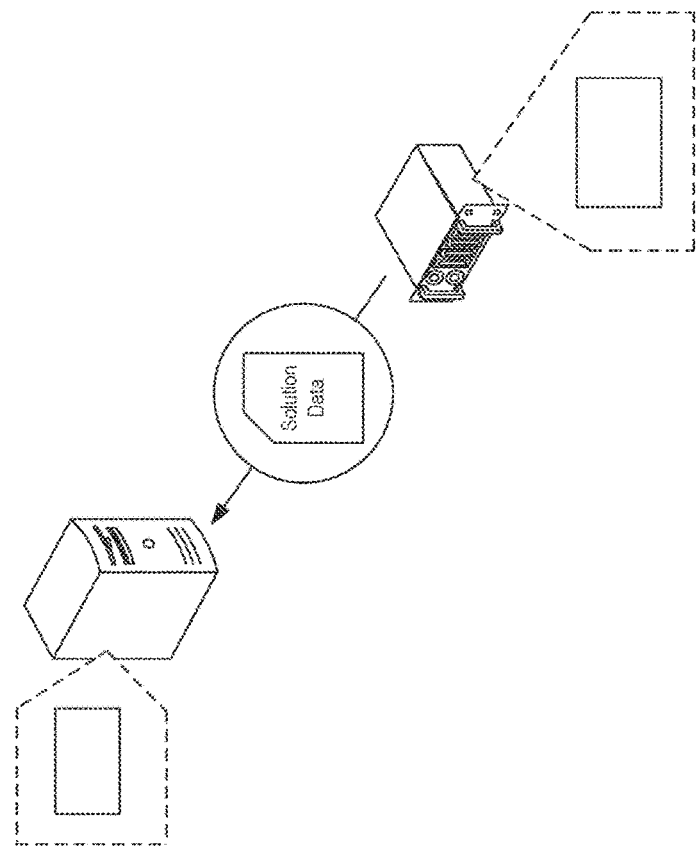

In some embodiments, the system thereafter returns one or more solutions based on calculated values, as illustrated in FIG. 96D. In some embodiments, a system returns multiple solutions with an indication of an overall score (e.g. an adjusted value) and information on violated constraints.

Figure 97:
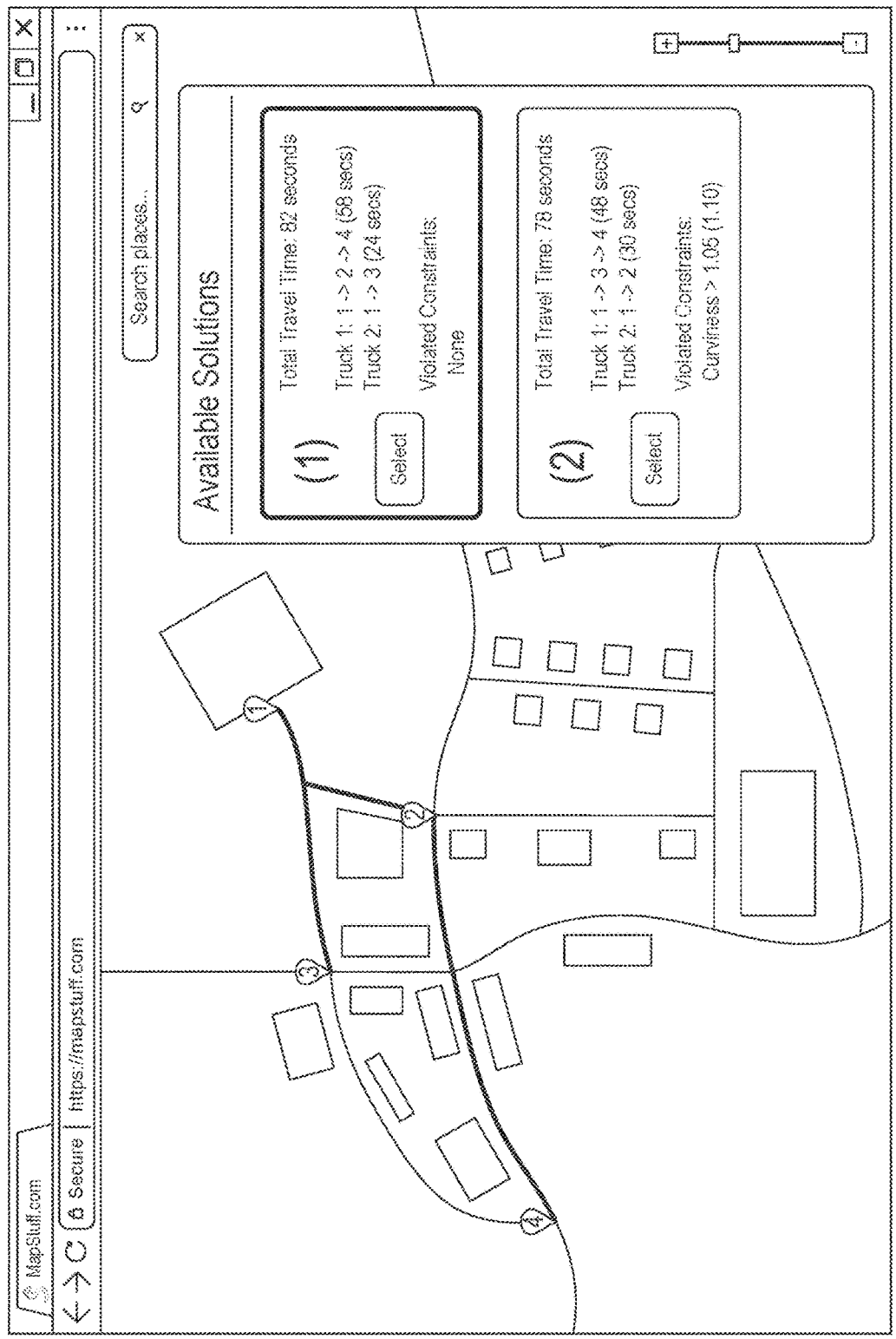
FIG. 97 illustrates an example of a user interface presenting multiple solutions to a routing problem where a user is allowed to select from the presented solutions.

In some embodiments, one or more determined available solutions (e.g. most preferred solutions) are presented to a user, as illustrated in FIG. 97, and the user is allowed to select from the presented available solutions.

In some embodiments, an indication of a total travel time, travel distance, or cost (e.g. fuel costs, labor costs, or both) is presented to a user for each presented available solution.

In some embodiments, one or more penalty values may be added to a value generated based on an estimated travel time, distance, or cost (such as a fuel cost or a labor cost or both) to facilitate identification or ranking of potential solutions, or may be solely used to facilitate identification or ranking of potential solutions.

Figure 98:
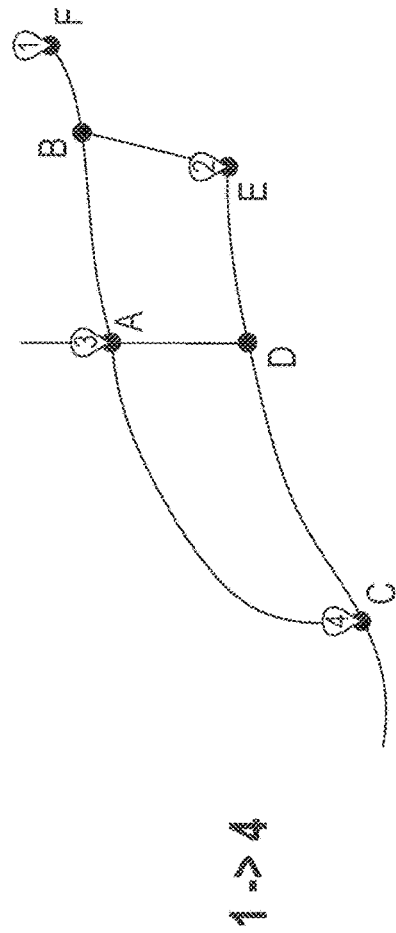
FIG. 98 illustrates calculation of an adjusted value for various potential paths during determination of a preferred or optimized route.

In accordance with various preferred implementations, various methodologies for applying a penalty value to road segments, paths, routes, assignments, or solutions may be used. For example, FIG. 98 illustrates calculation of an adjusted value for various potential paths during determination of an optimized route for travel from location "1" to location "4", where calculation of the adjusted value involves summing a weighted estimated value based on a total estimated travel time for a path with a penalty value. This allows for determination of an adjusted value for an optimal path between location "1" and location "4" given the specified constraints and penalties.

Figure 99:
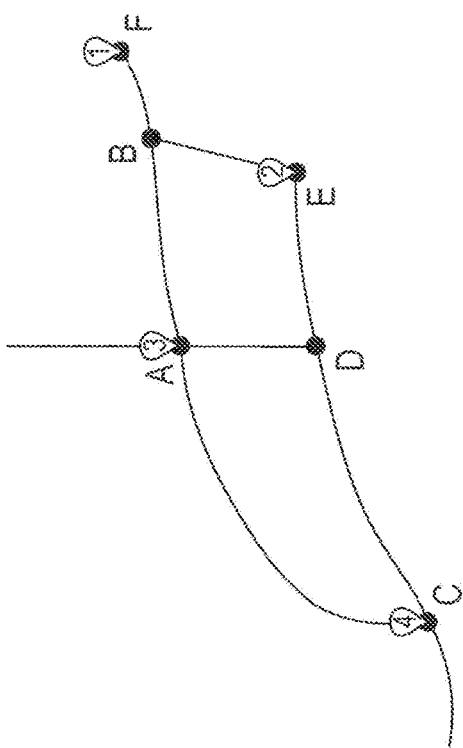
FIGS. 99-101 illustrate three potential assignments together with calculated total adjusted values for routes under each assignment.
Figure 100:
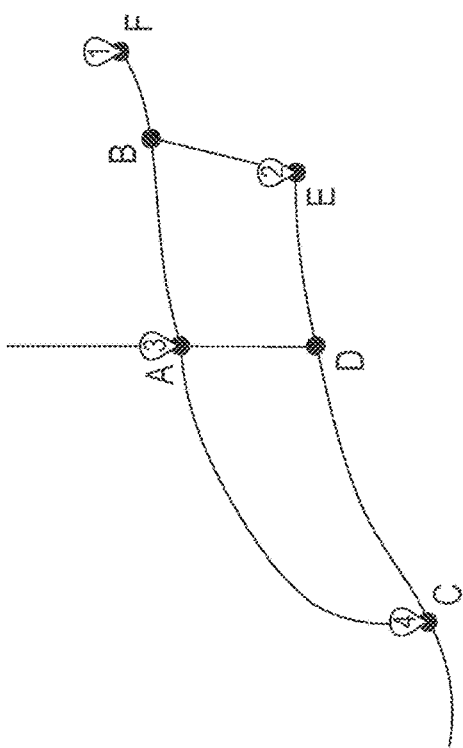
Figure 101:
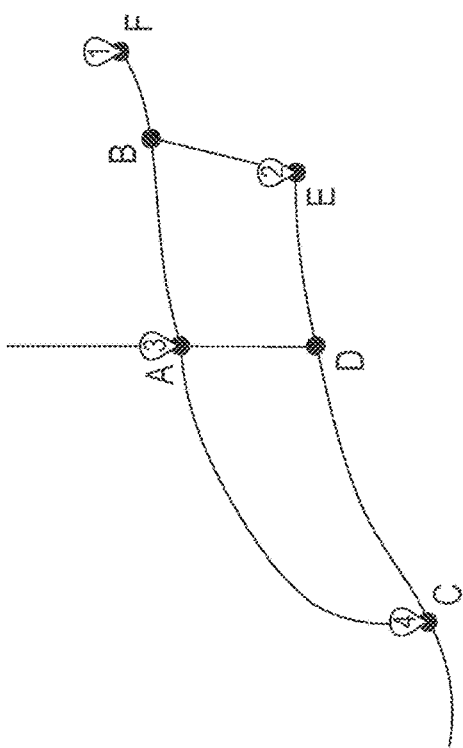
Figure 102A:
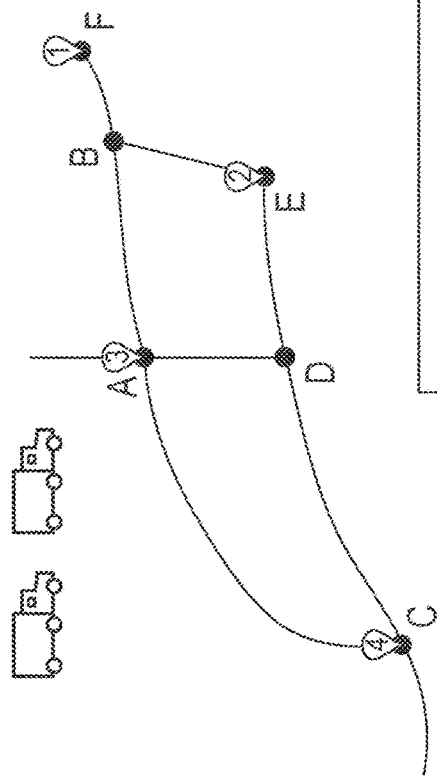
FIG. 102A illustrates the identification of a preferred or optimized assignment using calculated adjusted values.
Figure 102B:
FIG. 102B illustrates the identification of a preferred or optimized solution.

In some embodiments, an optimal path matrix is populated with calculated adjusted values for travel between locations under specified constraints and penalties, as illustrated in FIG. 99. Such an optimal path matrix can be used to determine optimized routes, and optimized or high-quality assignments and solutions. For example, FIG. 99 illustrates calculated adjusted values for routes for a first potential assignment together with a calculated total adjusted value for optimized routes under the first potential assignment, FIG. 100 illustrates calculated adjusted values for routes for a second potential assignment together with a calculated total adjusted value for optimized routes under the second potential assignment, and FIG. 101 illustrates calculated adjusted values for routes for a third potential assignment together with a calculated total adjusted value for optimized routes under the third potential assignment. These calculated adjusted values can be used to identify a preferred or optimized assignment, as illustrated in FIG. 102A, or preferred or optimized solution (representing a high-quality solution), as illustrated in FIG. 102B.

Figure 103:
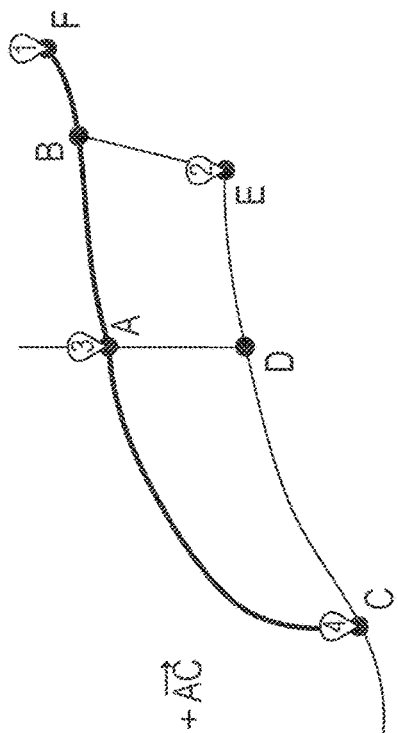
FIG. 103 illustrates penalty values being used to calculate adjusted values for road segments or path portions during path evaluation.

In some implementations, penalty values may be used to calculate adjusted values for road segments or path portions during evaluation of paths, e.g. during determination of a shortest or optimal path between two locations, as illustrated in FIG. 103 where adjusted values have been calculated for path portions to facilitate determination of a shortest path from location "1" to location "4".

Using Estimated Traversal Values to Accelerate the Determination of High-Quality Solutions to Routing Problems According to various embodiments, methodologies for determining high-quality solutions to routing problems may involve computing a shortest or optimal path matrix containing shortest or optimal path information for travel between locations involved in the routing problem. As the number of locations involved in a routing problem grows, this begins to greatly increase the number of computations that are required to compute such a shortest or optimal path matrix. In general, for a routing problem involving n locations, approximately n*n shortest or optimal paths must be determined. Thus, for example, for a routing problem involving one thousand locations, one million shortest or optimal paths would have to be determined to compute the shortest or optimal path matrix.

Computing such a matrix can be a cumbersome and time-consuming process and can delay the solution to a routing problem, e.g. a routing optimization problem that involves a road network. However, in some implementations a very fast approximation to road network travel time can be obtained by using estimated distances and travel times (e.g. "crow flies" approximations such as a Euclidean distance or a distance computed using the Haversine formula). In a simplified example, a distance is computed using the Haversine formula, and then a reasonable estimate of a speed of a vehicle is used to calculate a travel time estimate.

In some embodiments, a more complex estimate uses an estimate of the curvature (e.g. curviness value) of roads in an area in order to weight a distance approximation (or a speed or time estimate). For example, a highway or interstate would generally have very little curvature (e.g. a low curviness value) since it is generally straight allowing for a high rate of travel. Such an approach might, for example, involve taking into account a curvature (e.g. curviness value) of roads around a start location, taking into account a curvature (e.g. curviness value) of roads around a destination location, and taking into account a curvature (e.g. curviness value) of roads between such locations. A curvature (e.g. curviness value) for an area may be determined based on curvature (e.g. curviness values) for roads in the area (e.g. aggregating or averaging curviness values for roads in the area).

In some embodiments, a methodology involves accelerating the solution to an optimization problem that involves a road network. While accurate solutions to these problems generally require distances and travel times to be computed while accounting for streets, turns, and predicted traffic, in some embodiments a methodology involves first computing estimates or approximations of distances and travel times, and then beginning optimization for the problem using these approximations while simultaneously, in parallel, performing distance and travel time computations for the road network (e.g. computing a shortest or optimal path matrix), gaining an overall speedup in the solution of the optimization problem.

Figure 104:
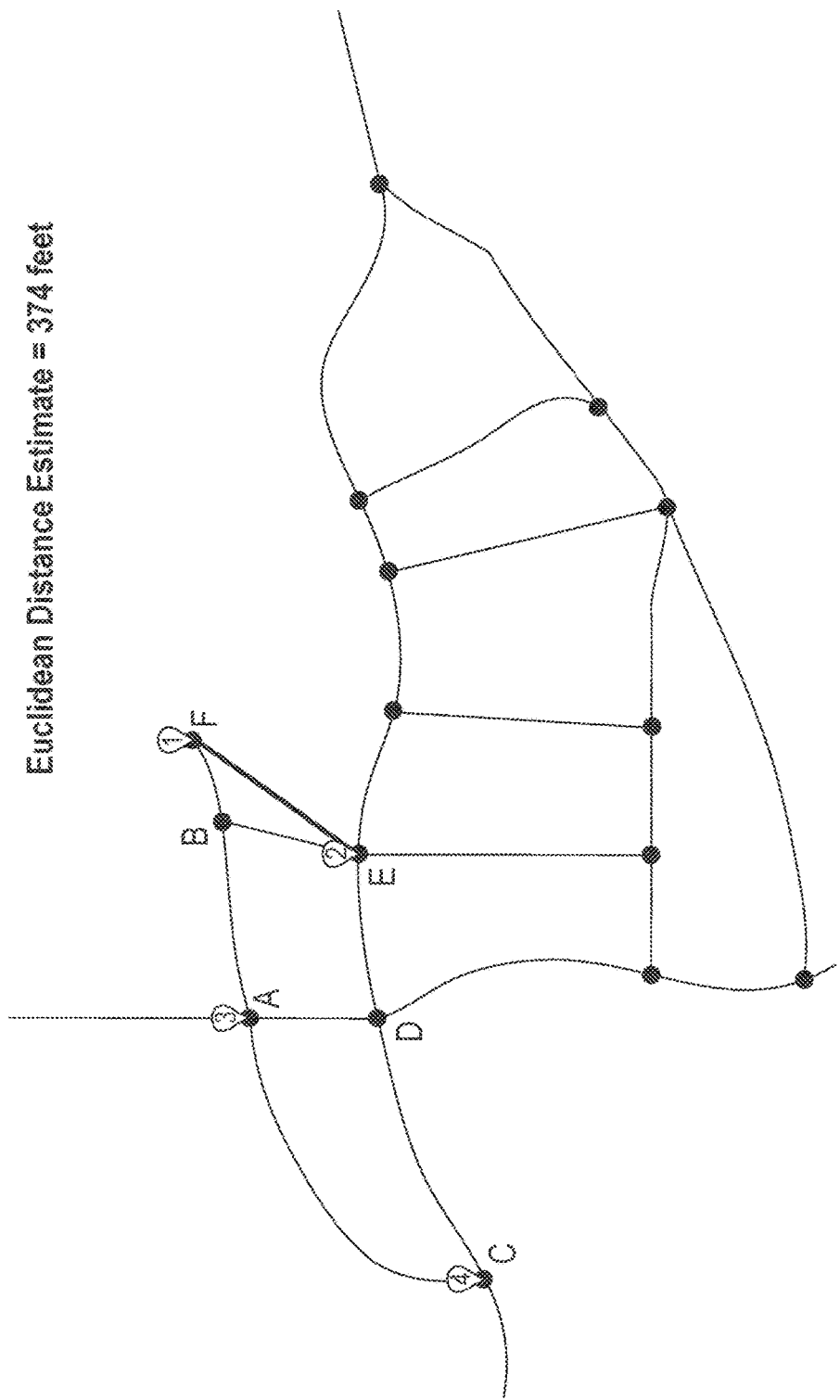
FIG. 104 illustrates a calculated Euclidean distance estimate for travel between two points.
Figure 106:
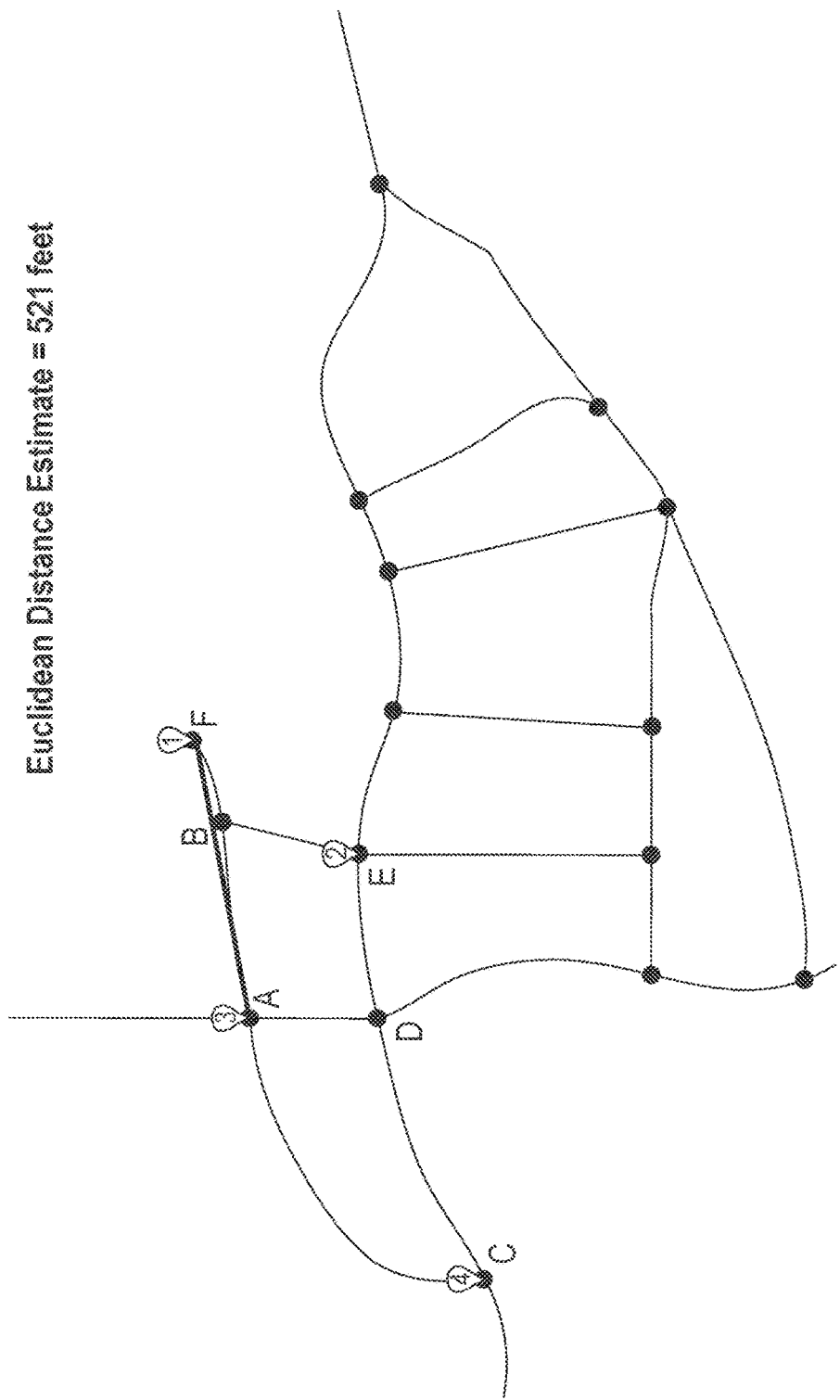
FIG. 106 illustrates a calculated Euclidean distance estimate for travel between two points.

Returning again to the locations illustrated in FIG. 50, FIG. 104 illustrates a calculated Euclidean distance estimate for travel from location "1" to location "2". According to various embodiments, this calculated Euclidean distance estimate value for travel from location "1" to location "2" can be stored in a shortest path or optimal path matrix, as illustrated in FIG. 105. This may be a shortest or optimal path matrix that is eventually updated with computed shortest path distance values, or may be a different matrix. FIG. 106 similarly illustrates a calculated Euclidean distance estimate value for travel from location "1" to location "3". This calculated Euclidean distance estimate value for travel from location "1" to location "3" can also be stored in the matrix, as illustrated in FIG. 107.

In some implementations, a calculated Euclidean distance estimate value can similarly be calculated and stored for traveling from each location to each other location, as illustrated in FIG. 108. Further, estimated time values can be calculated based on these calculated Euclidean distance estimate values, and stored in a shortest or optimal path matrix, as illustrated in FIG. 109. This may be a shortest or optimal path matrix that is eventually updated with computed shortest path distance values, or may be a different matrix.

Figure 110:
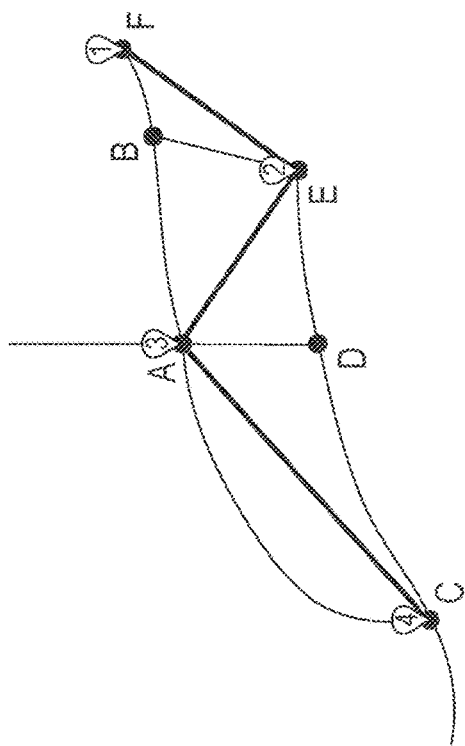
FIGS. 110-111 illustrate first and second potential routes and determined estimated travel times.

In some embodiments, such calculated estimated distance values and corresponding calculated estimated time values can be used to begin determination of one or more high-quality solutions to a routing problem. For example, FIG. 110 illustrates a first potential route visiting all four locations which involves traversal from location "1" to location "2", traversal from location "2" to location "3", and traversal from location "3" to location "4". A total estimated travel time for this route can be determined using the estimated travel times for shortest paths between these locations in the shortest path matrix which were generated based on the Euclidean distance estimate values. Thus, the route portion representing traversal from location "1" to location "2" can be determined based on the shortest path matrix to have an estimated travel time of 14 seconds, the route portion representing traversal from location "2" to location "3" can be determined based on the precomputed shortest path matrix to have an estimated travel time of 14 seconds, and the route portion representing traversal from location "3" to location "4" can be determined based on the precomputed shortest path matrix to have an estimated travel time of 26 seconds. A total estimated travel time for the route can be calculated by summing together these estimated travel times for these route portions. This results in a total estimated travel time for the first potential route of 54 seconds, as illustrated in FIG. 110.

Figure 111:
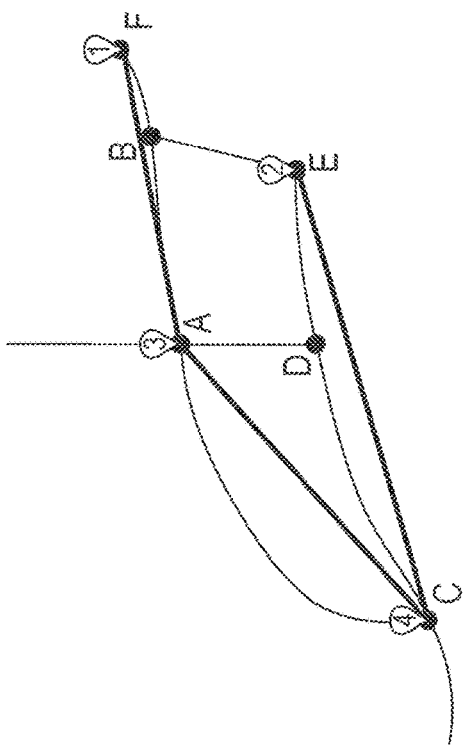

FIG. 111 illustrates a second potential route visiting all four locations which involves traversal from location "1" to location "3", traversal from location "3" to location "4", and traversal from location "4" to location "2". According to various embodiments, a total estimated travel time for this route can be determined using the estimated travel times for shortest paths between these locations in the shortest path matrix which were generated based on the Euclidean distance estimate values. The route portion representing traversal from location "1" to location "3" can be determined based on the shortest path matrix to have an estimated travel time of 20 seconds, the route portion representing traversal from location "3" to location "4" can be determined based on the shortest path matrix to have an estimated travel time of 26 seconds, and the route portion representing traversal from location "4" to location "2" can be determined based on the shortest path matrix to have an estimated travel time of 32 seconds. These calculated estimated travel times for the route portions can be summed together to result in a total estimated travel time for the second potential route of 78 seconds, as illustrated in FIG. 111.

According to various embodiments, a preferred or optimized route can be identified based on the calculated total estimated travel times for each potential route, as illustrated in FIG. 112.

In some embodiments, a methodology involves, while beginning optimization for the routing problem using these approximations, simultaneously, in parallel, performing distance and travel time computations for the road network (e.g. updating the shortest or optimal path matrix with computed values), gaining an overall speedup in the solution of the optimization problem. For example, FIG. 113 illustrates updating of the shortest path matrix of FIG. 109 with computed values for traversal from location "1" to location "2".

In some implementations, as determination of high-quality solutions to a routing problem proceeds, these updated values may be used as they are computed, resulting in increasingly accurate optimization results. In some embodiments, one or more determinations or calculations performed as part of a methodology for determining one or more high-quality solutions to a routing problem are performed using estimates or approximate values, while one or more subsequent determinations of calculations performed as part of the same methodology are performed using updated, more accurate computed values.

For example, returning again to the locations illustrated in FIG. 50 and the routing problem illustrated in FIG. 75 in which two trucks are to visit the four locations (assuming that each truck is to visit two of the locations), in some embodiments optimized assignments for the trucks might be determined using values based on Euclidean or Haversine estimates, while more accurate high-quality solutions may subsequently be determined using more accurate, computed values.

Figure 114:
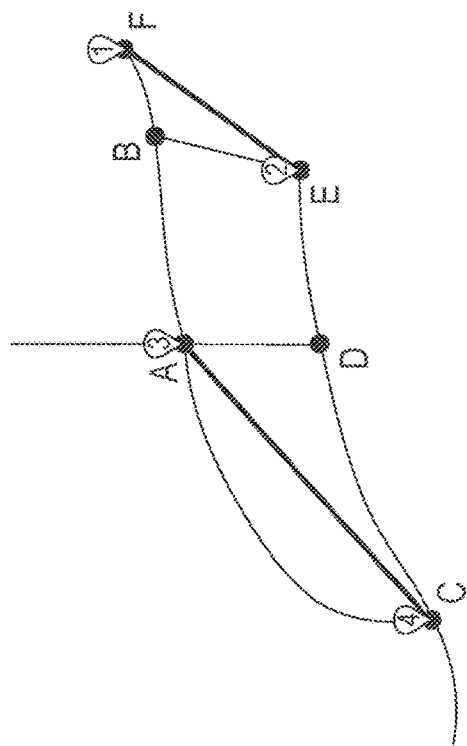
FIGS. 114-116 illustrate three potential assignments for two trucks.

FIG. 114 illustrates a first potential assignment for two trucks, generated in accordance with one or more embodiments. This first potential assignment involves, for a first truck, use of either a first potential route involving traversal from location "1" to location "2", or a second potential route involving traversal from location "2" to location "1". According to various embodiments, total estimated travel time for each potential route for the first truck can be determined using the estimated travel times for shortest paths between these locations in the shortest path matrix which were generated based on the Euclidean distance estimate values. It will be appreciated that, in this example, because the values are based on Euclidean distance estimates, the value for travel in a first direction is the same as a value for travel in a second, opposite direction. Here, the routes involving traversal between location "1" and location "2" can be determined based on the estimated travel times for shortest paths between these locations in the shortest path matrix to have a total estimated travel time of 14 seconds.

This first potential assignment further involves, for a second truck, use of either a first potential route involving traversal from location "3" to location "4", or a second potential route involving traversal from location "4" to location "3". In some implementations, total estimated travel time for each potential route for the second truck can be determined using the estimated travel times for shortest paths between these locations in the shortest path matrix which were generated based on the Euclidean distance estimate values. It will be appreciated that, in this example, because the values are based on Euclidean distance estimates, the value for travel in a first direction is the same as a value for travel in a second, opposite direction. Here, the routes involving traversal between location "3" and location "4" can be determined based on the estimated travel times for shortest paths between these locations in the shortest path matrix to have a total estimated travel time of 26 seconds.

According to various embodiments, a total estimated travel time for this first potential assignment can be determined by summing together the estimated travel times for each truck, as illustrated in FIG. 114. Here, a total estimated travel time for this first potential assignment can be calculated to be 40 seconds, as illustrated in FIG. 114.

Figure 115:
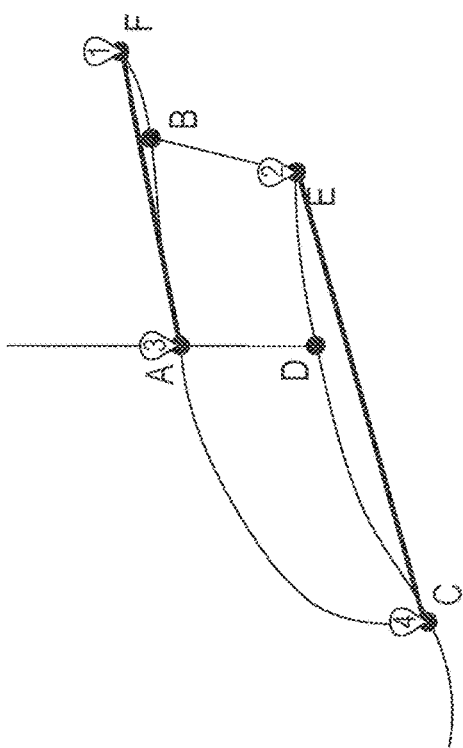

FIG. 115 illustrates a second potential assignment for two trucks, generated in accordance with one or more implementations. This second potential assignment involves, for a first truck, use of either a first potential route involving traversal from location "1" to location "3", or a second potential route involving traversal from location "2" to location "4". A total estimated travel time for each potential route for the first truck can be determined using the estimated travel times for shortest paths between these locations in the shortest path matrix which were generated based on the Euclidean distance estimate values. It will be appreciated that, in this example, because the values are based on Euclidean distance estimates, the value for travel in a first direction is the same as a value for travel in a second, opposite direction. Here, the routes involving traversal between location "1" and location "3" can be determined based on the estimated travel times for shortest paths between these locations in the shortest path matrix to have a total estimated travel time of 20 seconds.

This second potential assignment further involves, for a second truck, use of either a first potential route involving traversal from location "2" to location "4", or a second potential route involving traversal from location "4" to location "2", generated in accordance with one or more implementations. A total estimated travel time for each potential route for the second truck can be determined using the estimated travel times for shortest paths between these locations in the shortest path matrix which were generated based on the Euclidean distance estimate values. It will be appreciated that, in this example, because the values are based on Euclidean distance estimates, the value for travel in a first direction is the same as a value for travel in a second, opposite direction. Here, the routes involving traversal between location "2" and location "4" can be determined based on the estimated travel times for shortest paths between these locations in the shortest path matrix to have a total estimated travel time of 32 seconds.

According to various embodiments, a total estimated travel time for this second potential assignment can be determined by summing together the estimated travel times for each truck, as illustrated in FIG. 115. Here, a total estimated travel time for this first potential assignment can be calculated to be 52 seconds, as illustrated in FIG. 115.

Figure 116:
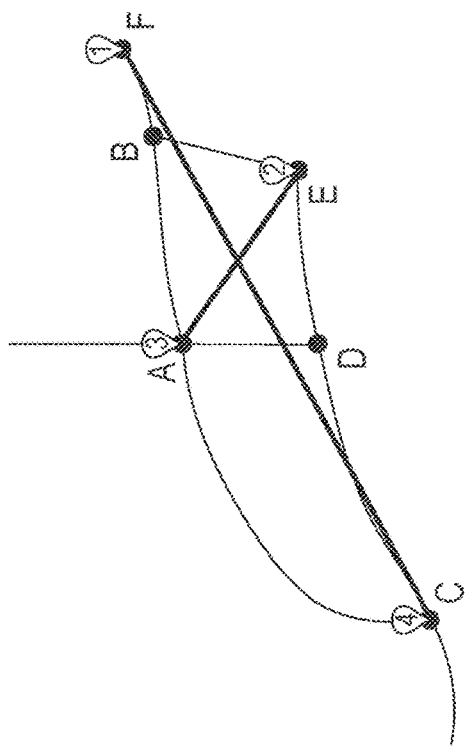

FIG. 116 illustrates a third potential assignment for two trucks, generated in accordance with one or more embodiments. This third potential assignment involves, for a first truck, use of either a first potential route involving traversal from location "1" to location "4", or a second potential route involving traversal from location "2" to location "3". A total estimated travel time for each potential route for the first truck can be determined using the estimated travel times for shortest paths between these locations in the shortest path matrix which were generated based on the Euclidean distance estimate values. It will be appreciated that, in this example, because the values are based on Euclidean distance estimates, the value for travel in a first direction is the same as a value for travel in a second, opposite direction. Here, the routes involving traversal between location "1" and location "4" can be determined based on the estimated travel times for shortest paths between these locations in the shortest path matrix to have a total estimated travel time of 44 seconds.

This third potential assignment further involves, for a second truck, use of either a first potential route involving traversal from location "2" to location "3", or a second potential route involving traversal from location "3" to location "2". In some embodiments, a total estimated travel time for each potential route for the second truck can be determined using the estimated travel times for shortest paths between these locations in the shortest path matrix which were generated based on the Euclidean distance estimate values. It will be appreciated that, in this example, because the values are based on Euclidean distance estimates, the value for travel in a first direction is the same as a value for travel in a second, opposite direction. Here, the routes involving traversal between location "2" and location "3" can be determined based on the estimated travel times for shortest paths between these locations in the shortest path matrix to have a total estimated travel time of 14 seconds.

According to various embodiments, a total estimated travel time for this third potential assignment can be determined by summing together the estimated travel times for each truck, as illustrated in FIG. 116. Here, a total estimated travel time for this first potential assignment can be calculated to be 58 seconds, as illustrated in FIG. 116.

According to various embodiments, the calculated total estimated travel times for each potential assignment can be compared to determine an optimized or preferred assignment, as illustrated in FIG. 117. The optimized routes that were used to determine the calculated total estimated travel times for each potential assignment may be used as optimized routes for a routing solution, or additional determination of optimized routes may be performed. For example, although these optimized assignments for the trucks were determined using values based on Euclidean distance estimates, a more accurate high-quality solution may subsequently be determined using more accurate, computed values.

Figure 118:
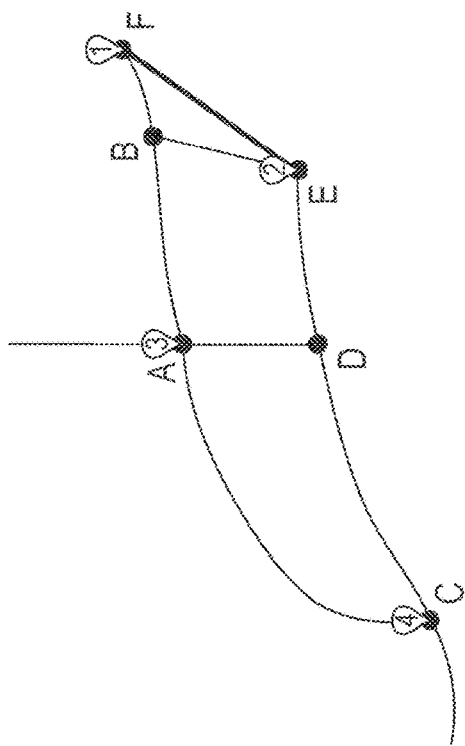
FIG. 118 illustrate use of updated computed values in a shortest path matrix.

In this example, FIG. 118 illustrates use of updated computed values in the shortest path matrix to determine an optimized order or route for traversal between location "1" and location "2". Here, it is determined that traversal from location "2" to location "1" has a shorter estimated travel time than traversal from location "1" to location "2", as illustrated in FIG. 118.

Figure 119:
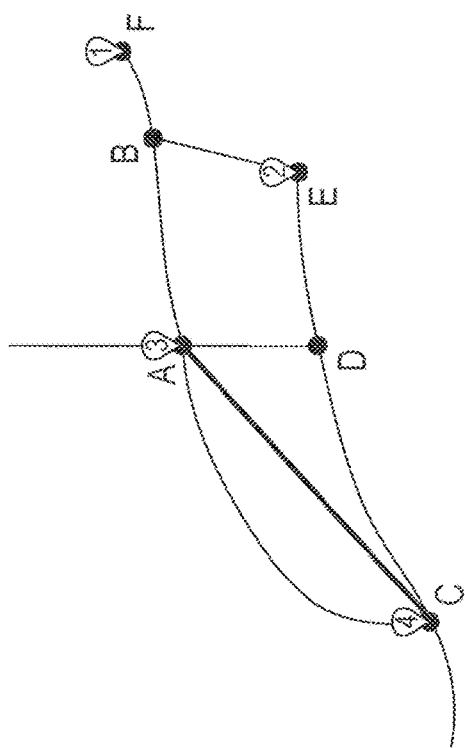
FIG. 119 further illustrates use of updated computed values in the shortest path matrix.

FIG. 119 further illustrates an example of use of updated computed values in the shortest path matrix to determine an optimized order or route for traversal between location "3" and location "4". Here, it is determined that traversal from location "3" to location "4" has the same estimated travel time as traversal from location "4" to location "3", as illustrated in FIG. 119.

Figure 120:
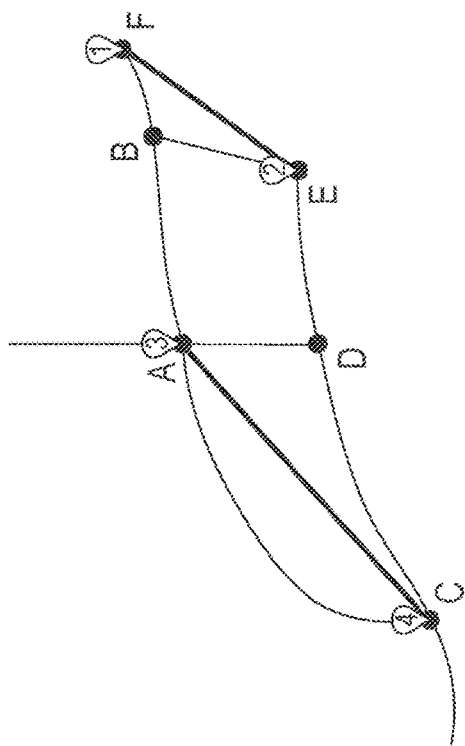
FIG. 120 illustrates calculation of an estimated travel time, based on computed values, for an assignment that was previously determined, based on estimated values, to be preferred or optimized.

In some implementations, such calculations based on updated computed values in the shortest path matrix can be used in determining one or more high-quality routing solutions. For example, FIG. 120 illustrates calculation of an estimated travel time, based on computed values, for the assignment that was previously determined, based on estimated values, to be preferred or optimized.

Figure 121:
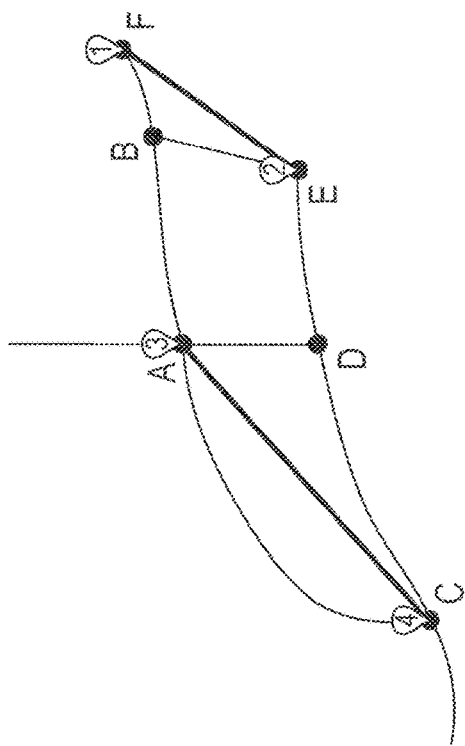
FIG. 121 illustrates computed accurate shortest path values for paths determined to be part of a preferred or optimized assignment.

In some embodiments, a methodology may involve selectively computing shortest path information based on determinations made using estimates or approximations. For example, with respect to the just outlined example, a methodology may only require computing accurate shortest path values for paths determined to be part of a preferred or optimized assignment, as illustrated in FIG. 121. More generally, a methodology may involve only computing accurate shortest path values for paths determined to be likely to be part of a high-quality routing solution (e.g. a preferred or optimized routing solution), or which cannot be ruled out as being part of a high-quality routing solution.

Figure 122:
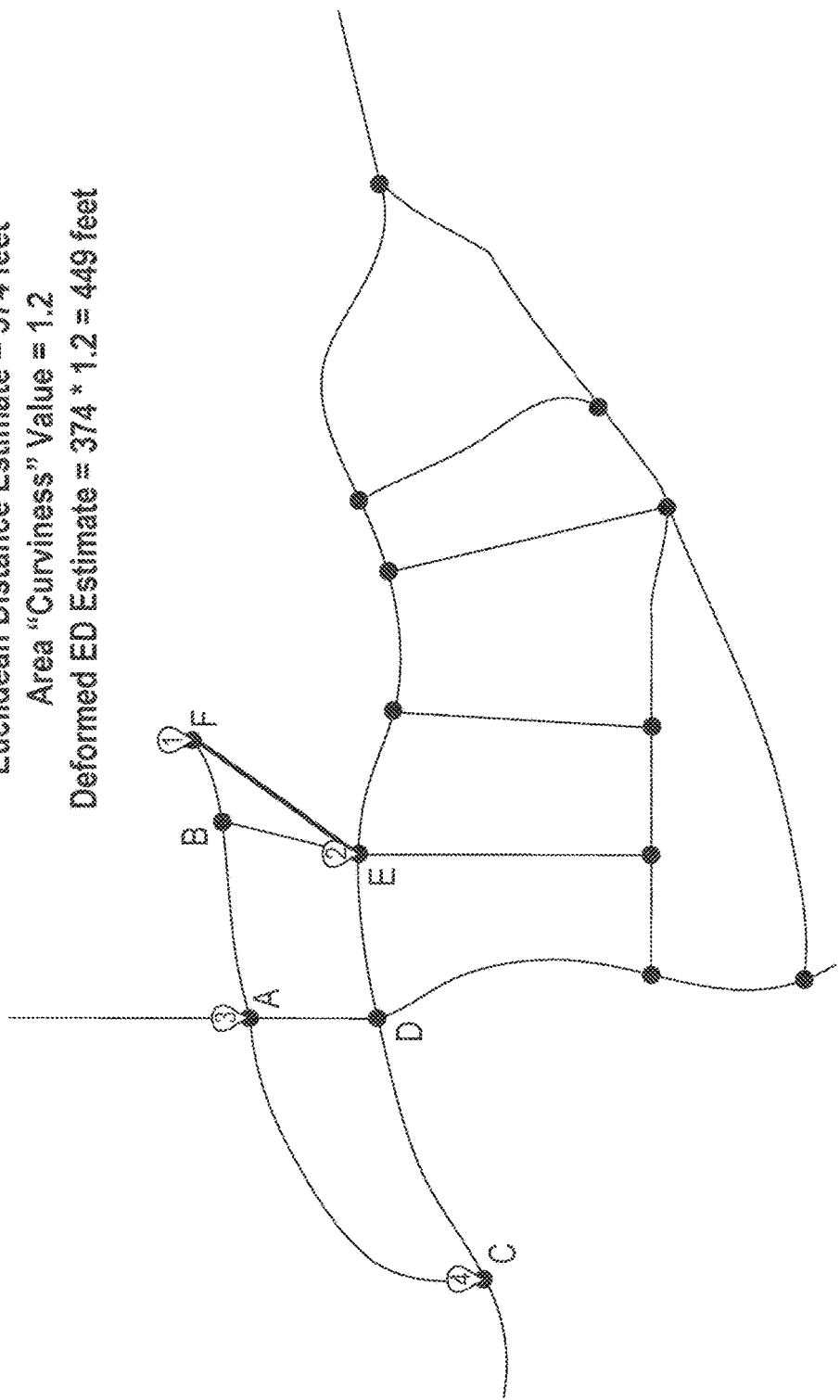
FIG. 122 illustrates an example of calculation of a deformed Euclidean distance estimate.

In some embodiments, a more complex estimate can use an estimate of the curvature (e.g. curviness value) of roads in an area in order to weight a distance approximation (or a speed or time estimate). For example, FIG. 122 illustrates an example of calculation of a deformed Euclidean distance estimate for travel from location "1" to location "2" using an area curviness value of "1.2".

Although some examples discussed herein employ Euclidean distance estimates, in one or more preferred implementations, estimates or approximations may use distance values calculated using the Haversine formula. For example, Haversine values may be calculated and then deformed based on one or more estimates of curvature of roads in one or more areas.

Using Determined Optimized Traffic Windows for Precomputing Optimal Path Matrices to Reduce Computer Resource Usage Traffic patterns may frequently allow for quicker traversal of a road segment (or navigation from one road segment to another) at certain times of the day, and slower traversal at other times. According to various embodiments, to account for this, an example of average travel times may be determined for windows throughout the day, e.g. for 24 one hour windows, as illustrated in FIGS. 33-34, and determination of a shortest path may involve using the time estimates for a window within which a current time falls, or within which an estimated time of travel falls. Similarly, as noted above, a matrix containing calculated values for determined shortest paths may be precomputed and stored for time windows throughout the day, e.g. for 24 one-hour windows, as illustrated in FIG. 69. Notably, although a rate of travel for a road segment generally changes throughout the day, in many contexts it changes slowly and somewhat continuously as long as there are no surprise disruptions such as a car accident.

In some embodiments, it is desirable to break up a day (or week, month, or year) into as few time intervals (or windows) as possible where the overall traffic during each window is similar and the speeds in different traffic windows is as different as possible. In some embodiments, a methodology involves assuming that the rate of travel on each road segment is constant during a window, or using a simple, defined formula to determine an estimated travel time or speed during a window.

In some implementations, the use of a reduced number of windows as compared to, for example, twenty-four one-hour windows or forty-eight thirty-minute windows allows for more rapid precomputation of one or more required shortest or optimal path matrices for a routing problem, and thus quicker determination of a solution with less resource usage (e.g. less processing time, less memory usage, and optionally less storage usage).

Figure 123:
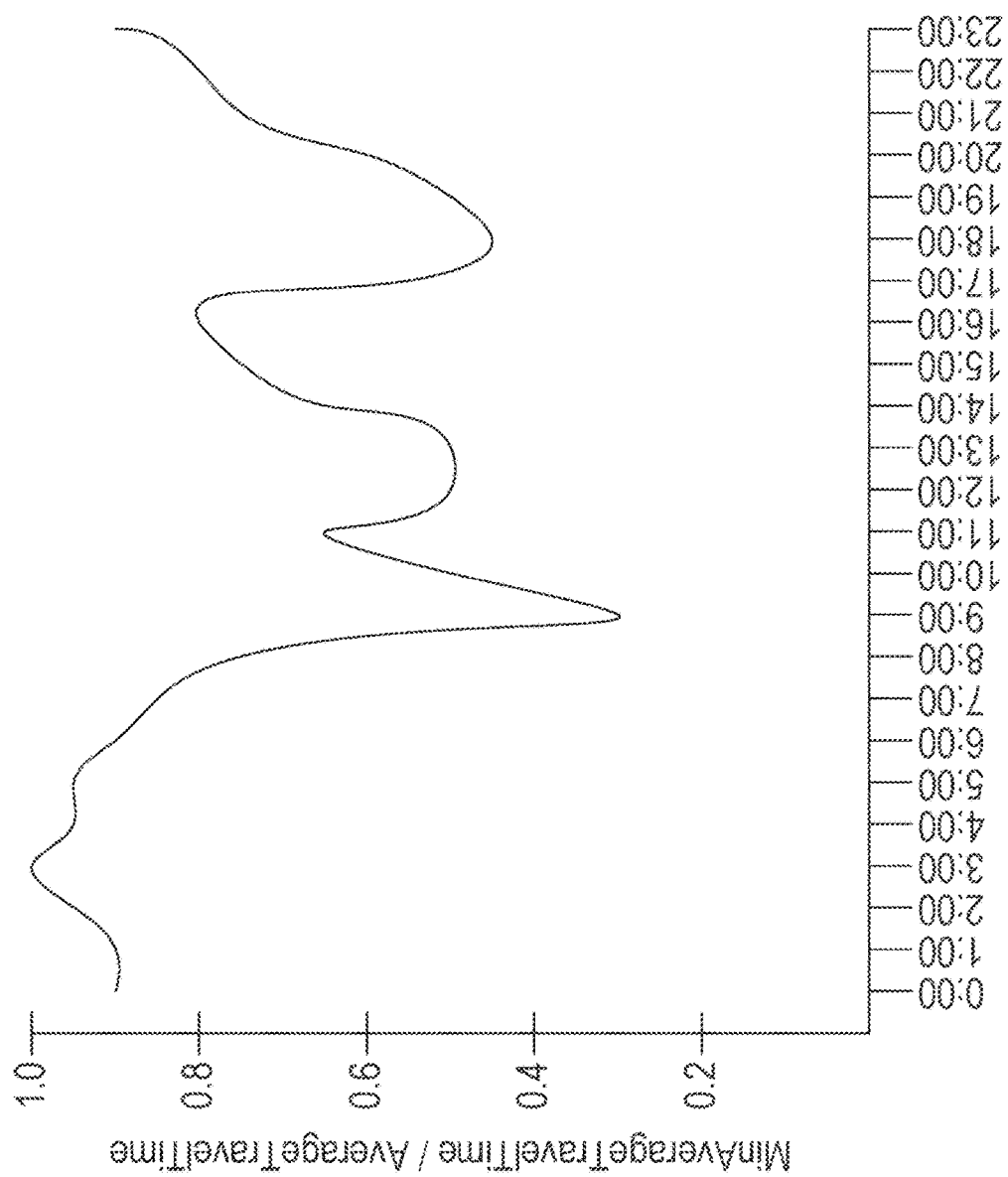
FIG. 123 illustrates plotting of a normalized average travel time to traverse a particular road segment throughout the day.

In some embodiments, one or more statistical methods may be applied to determine the points in time that best partition a twenty-four-hour day into traffic windows such that the rate of travel within each window is most constant. For example, FIG. 123 illustrates plotting of a normalized average travel time to traverse a particular road segment throughout the day. Each normalized average travel time value for a particular time is calculated by dividing a minimum average travel time value for the road segment (the lowest value at any time throughout the day) by an average travel time at that particular time.

Figure 124:
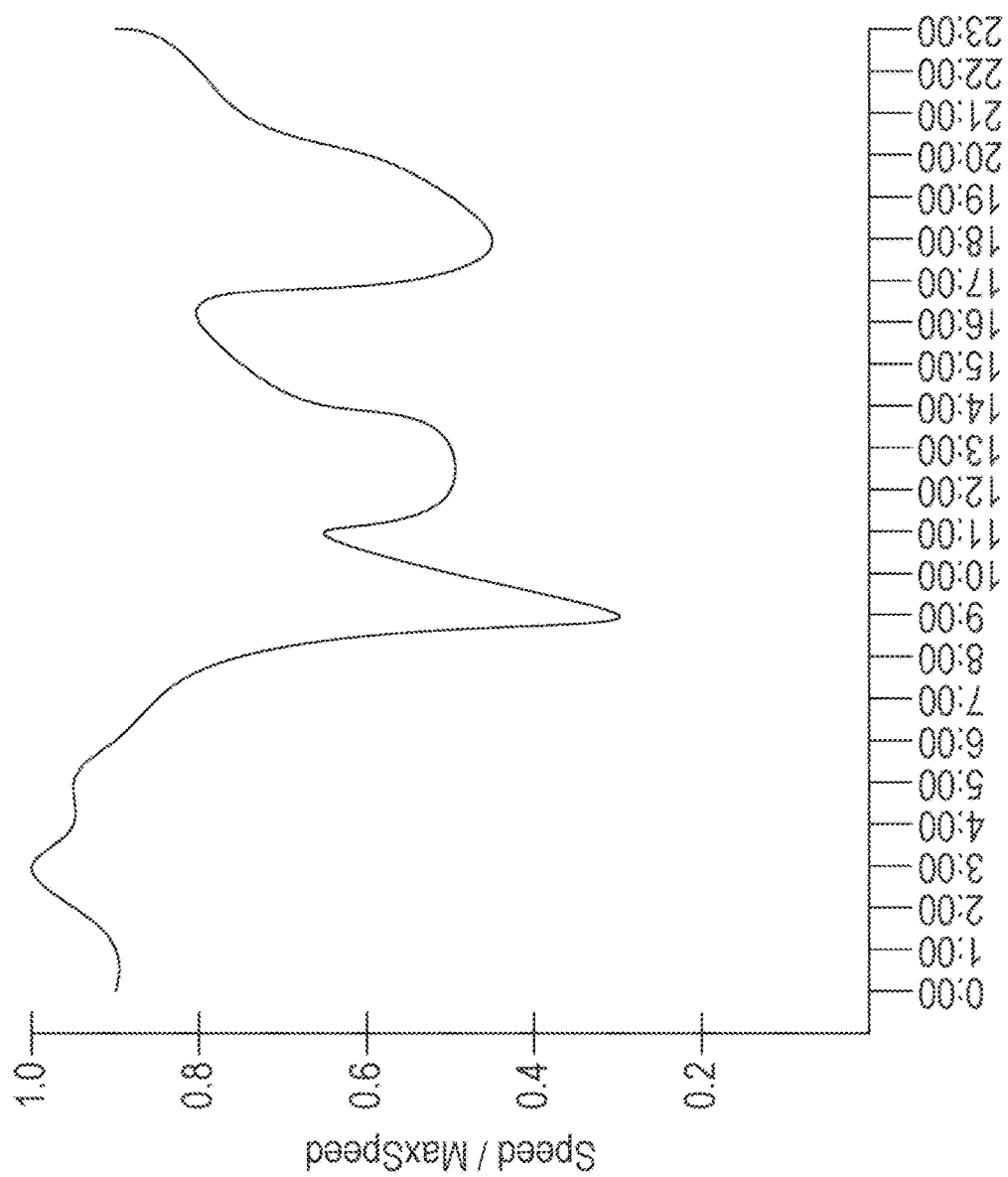
FIG. 124 illustrates plotting of a normalized average speed for a particular road segment throughout the day.
Figure 125:
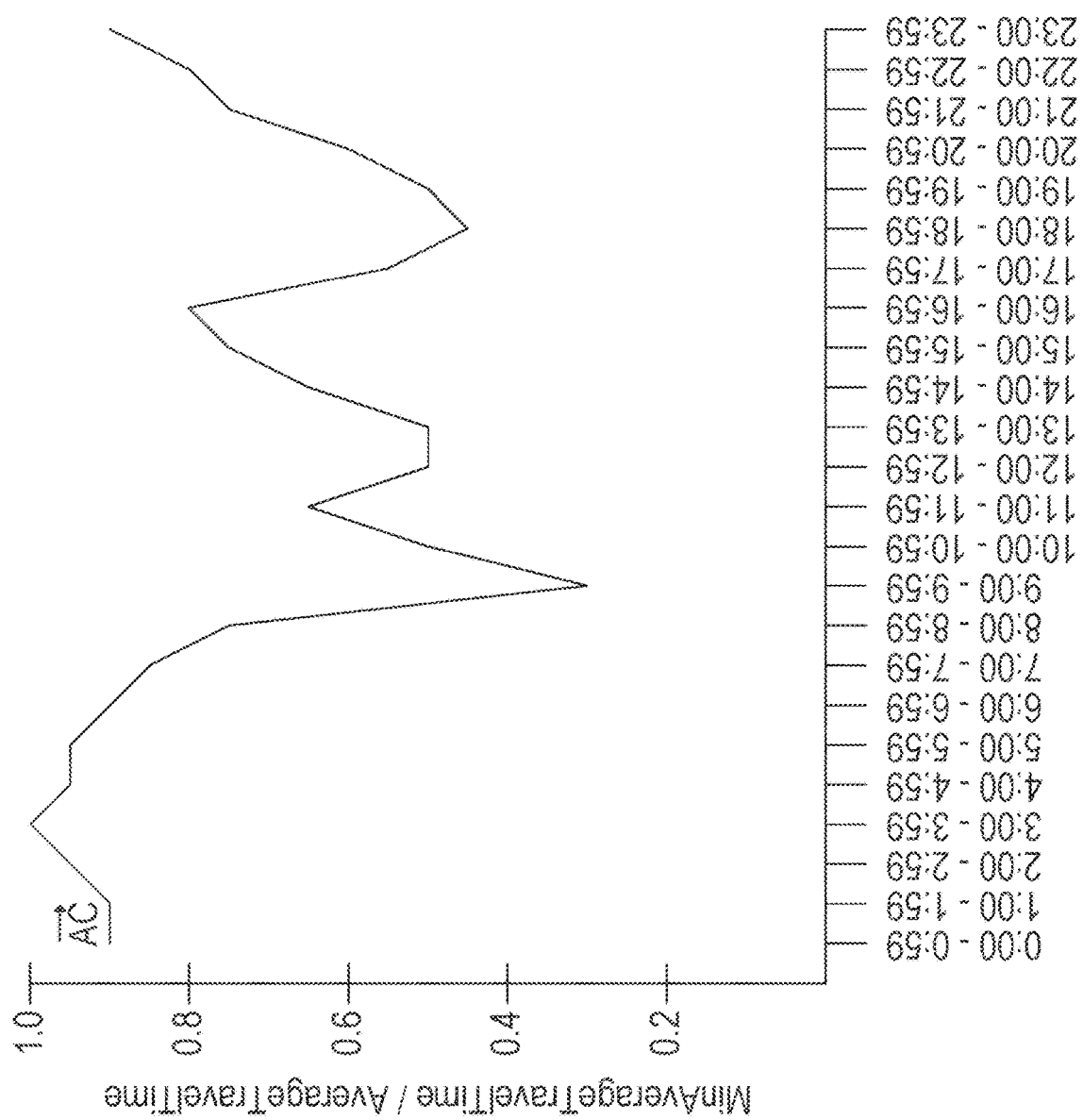
FIG. 125 illustrates plotting of a normalized average travel time to traverse a specific road segment during each of twenty four one hour windows throughout the day.
Figure 126:
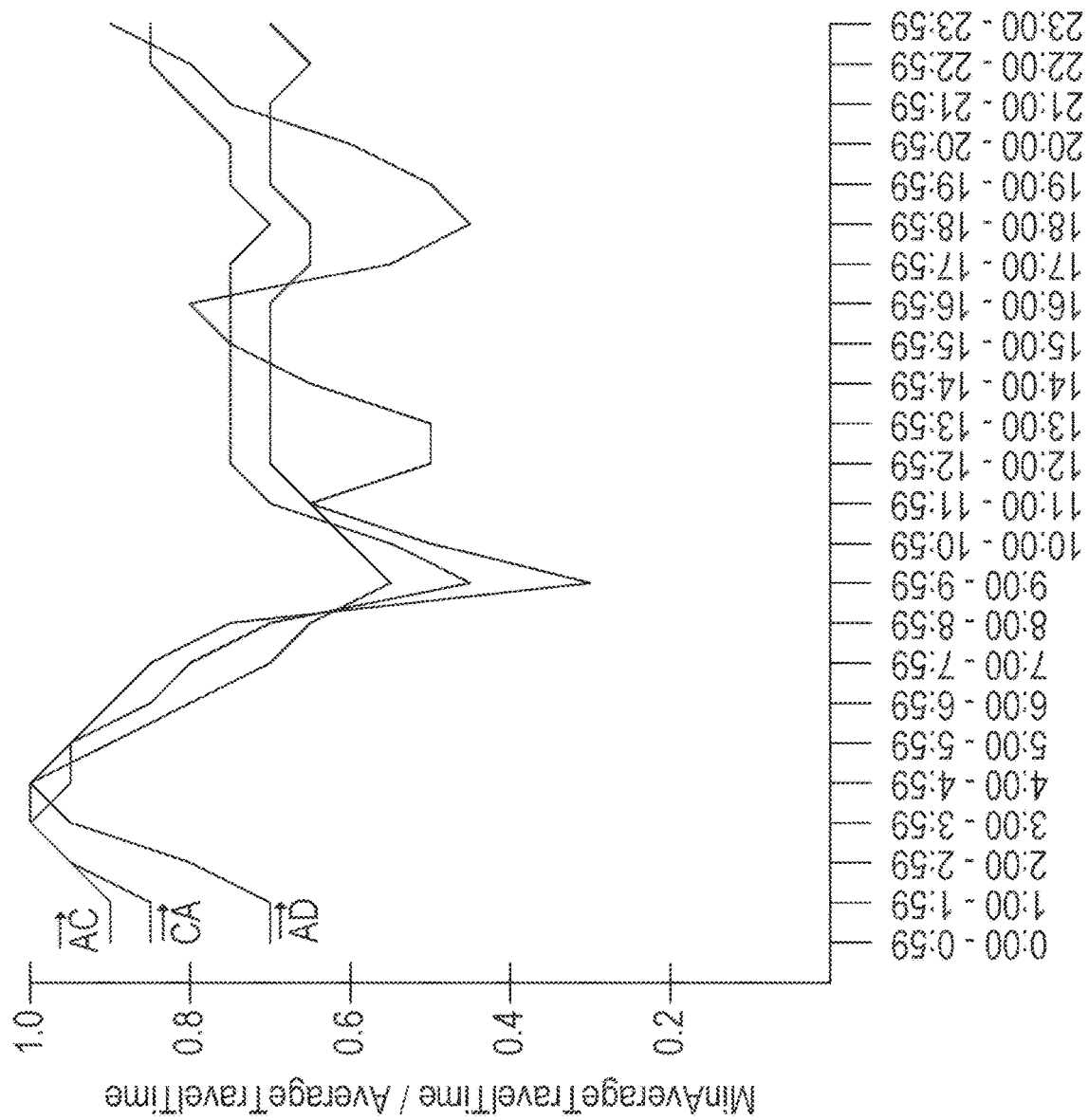
FIG. 126 illustrates plotting of normalized average travel times to traverse three specific road segments throughout the day.

According to various embodiments, a similar methodology can be performed with normalized speed values. For example, FIG. 124 illustrates plotting of a normalized average speed for a particular road segment throughout the day. Each normalized average speed value for a particular time is calculated by dividing an average speed at that particular time by a maximum average speed value for the road segment (the highest value at any time throughout the day). Under either approach, various methodologies including statistical methodologies can be applied to determine the points in time that best partition a day into traffic windows. For purposes of a simplified example, FIG. 125 illustrates plotting of a normalized average travel time to traverse road segment AC during each of twenty-four one-hour windows throughout the day. FIG. 126 further includes plotting of a normalized average travel time to traverse road segments CA and AD during each of the same twenty-four one-hour windows throughout the day.

Figure 129:
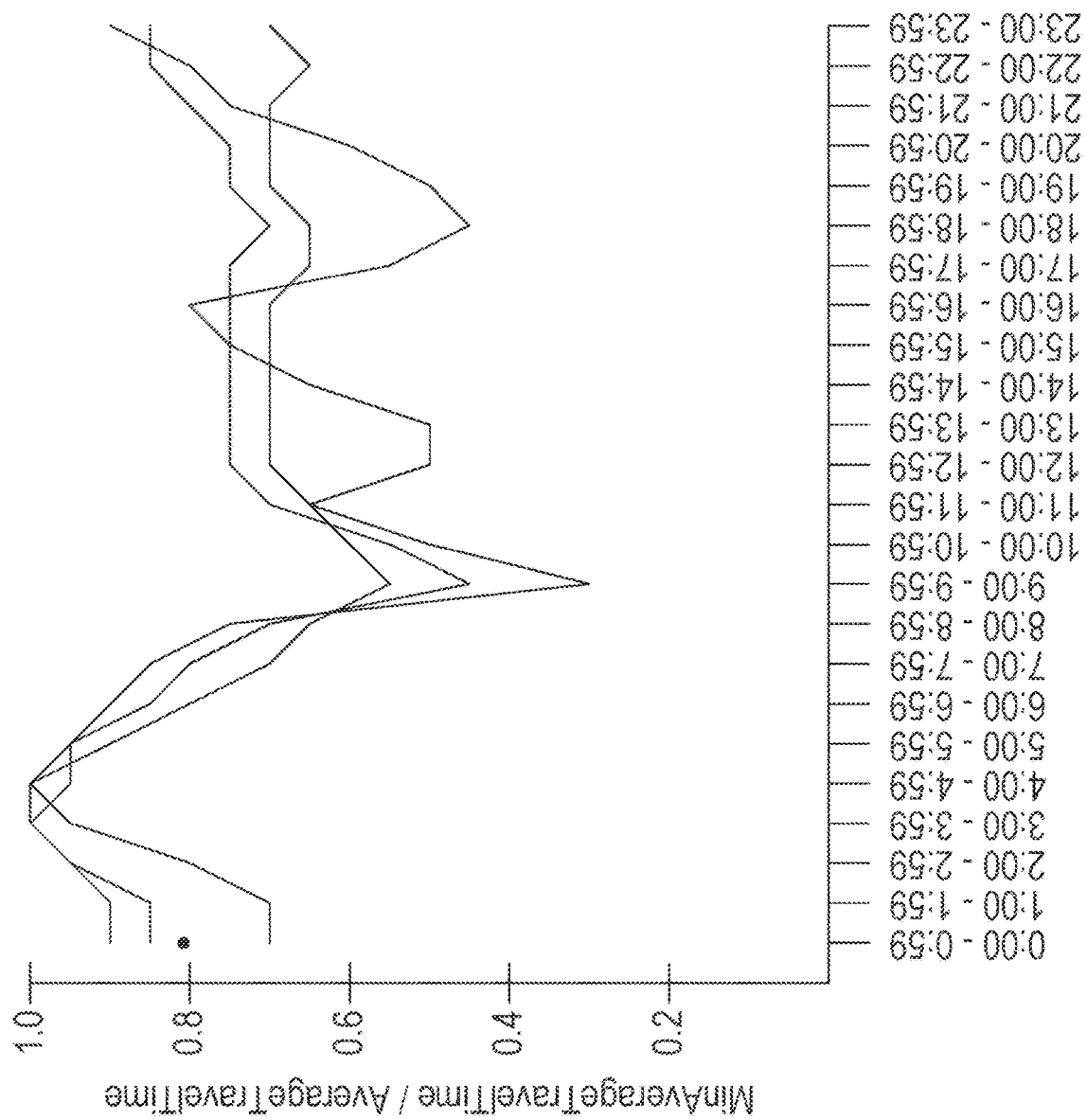
FIG. 129 illustrates the plotting of a best fit average travel time value for a simplified best fit line for a window of time.
Figure 130:
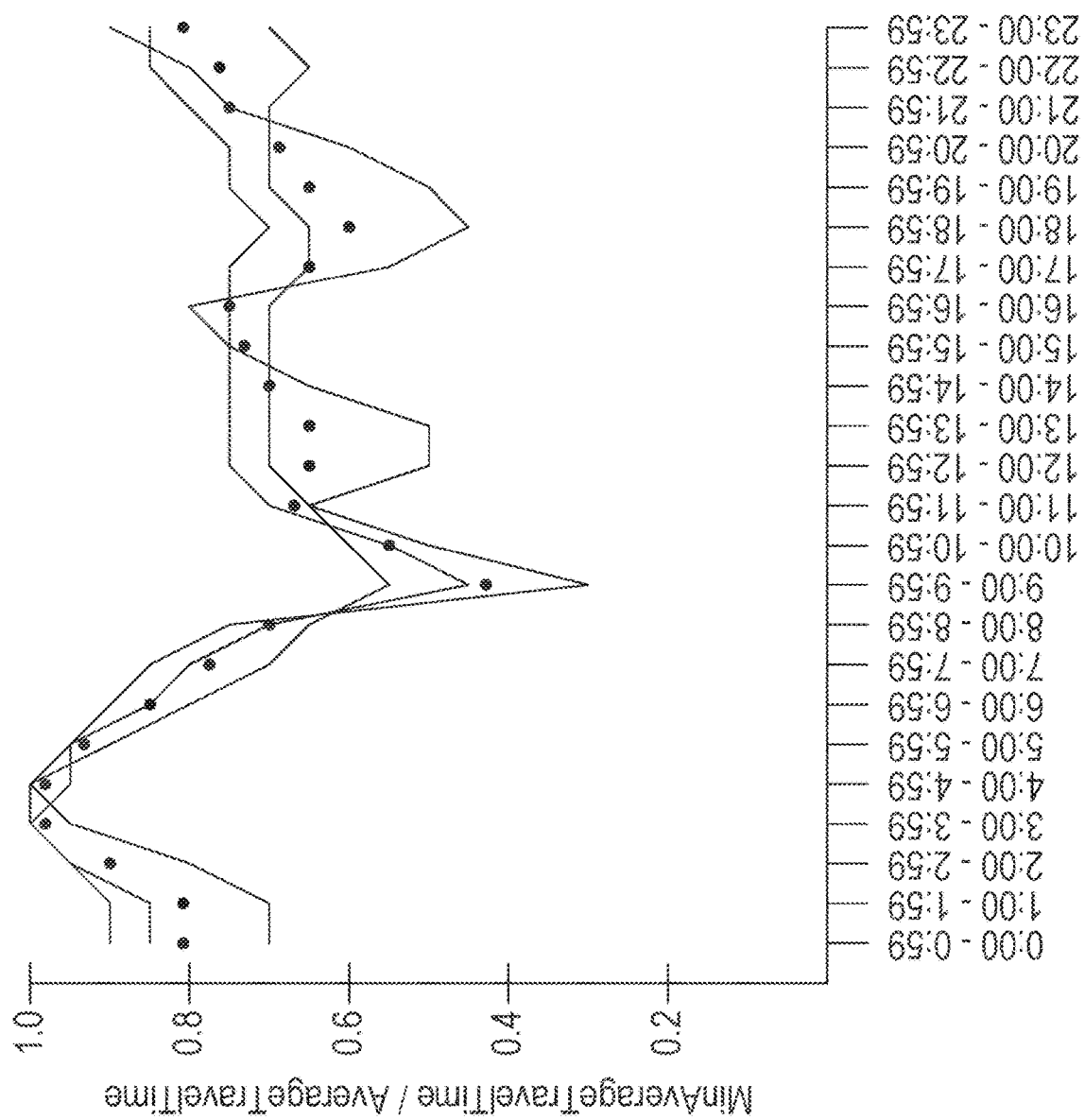
FIG. 130 illustrates plotting of similarly calculated best fit average travel time values for a simplified best fit line for other windows of time.
Figure 131:
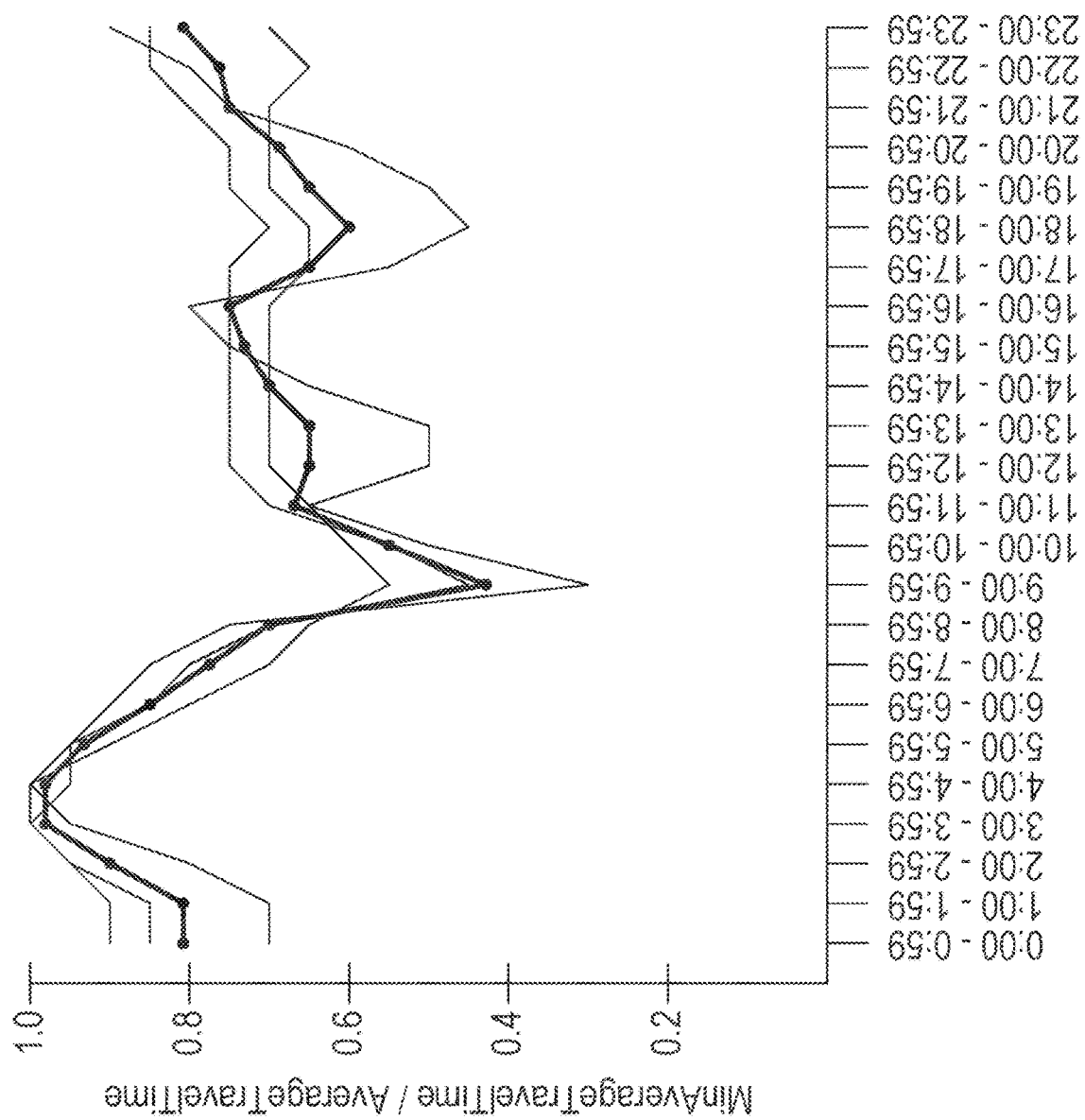
FIG. 131 illustrates how the values of FIG. 130 can be characterized as forming a best fit line.

In some embodiments, a best fit line can be calculated based on average travel time or speed values throughout a day, e.g. normalized average travel time or speed values. FIG. 127 illustrates an example of C Sharp style pseudocode for very simplified calculation of a best fit line based on normalized average travel time values throughout the day. For example, returning to the simplified example of FIG. 125, FIG. 128 illustrates calculation of a best fit average travel time value for a simplified best fit line for the window "0:00-0:59". FIG. 129 illustrates plotting of this best fit average travel time value for a simplified best fit line for the window "0:00-0:59". FIG. 130 illustrates similar plotting of similarly calculated best fit average travel time values for a simplified best fit line for other windows, and FIG. 131 illustrates how these values can be characterized as forming a best fit line.

In some embodiments, statistical methods are applied to best fit data or a best fit line or curve to find one or more inflection points in best fit data, a best fit line, or a best fit curve. These are points where a rate of change begins to change (e.g. a second derivative in calculus). In some embodiments, determined inflection points are used as cutoff points separating traffic windows. Returning to the simplified example of FIG. 125, FIG. 132 illustrates simplified calculation of a second order delta representing a change in the rate of change at the time interval "1:00-1:59". This involves first calculating a delta in the best fit line from time interval "0:00-0:59" to time interval "1:00-1:59", which is calculated to be "0.0". This further involves calculating a delta in the best fit line from time interval "1:00-1:59" to time interval "2:00-2:59", which is calculated to be "0.083". A second order delta for time interval "1:00-1:59" can then be calculated by determining a difference between the two calculated values, which is calculated to be "0.083".

The presented example illustrates a simple approach for calculating a second order delta. This example is based on the rate of change for the one-hour interval prior to the current interval, and the one-hour interval subsequent to the current interval. However, in some embodiments, other approaches could be used instead. For example, methodologies may be used which consider more than three hours of data in determining a second order delta, or which consider less than three hours of data in determining a second order delta.

Figure 134:
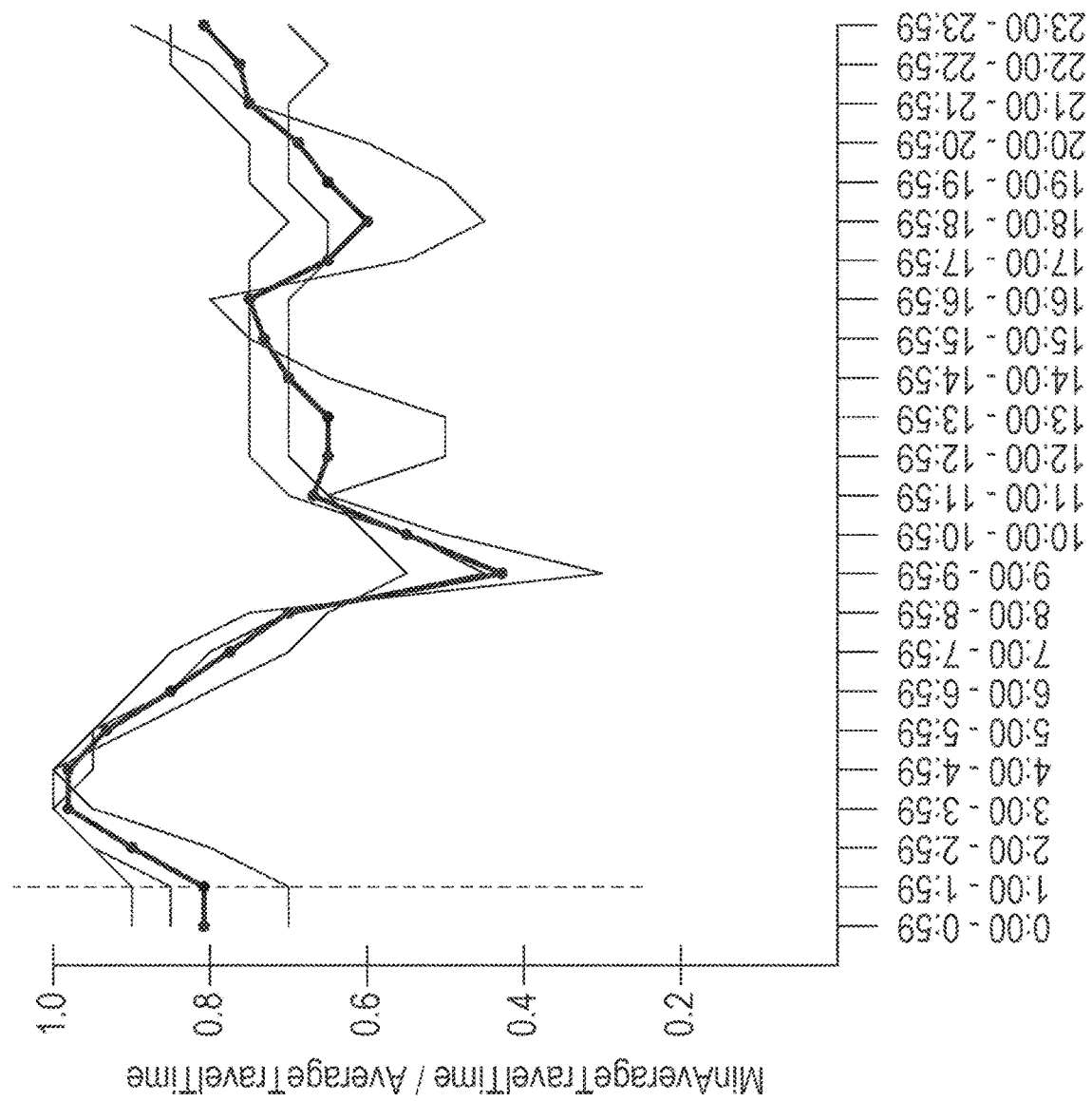
FIG. 134 illustrates that it has been determined that a corresponding time interval should be used as a cutoff to define a traffic window.

In some embodiments, a determined value for a second order delta or derivative may be compared to a minimum threshold to determine whether a particular time or time interval should be used as a cutoff to define a traffic window. Returning to the simplified example of FIG. 125, FIG. 133 illustrates comparison of the calculated second order delta of FIG. 132 to a threshold value, and determination that the calculated second order delta is greater than the threshold value, and thus that the corresponding time interval should be used as a cutoff to define a traffic window. FIG. 134 illustrates that it has been determined that the corresponding time interval "1:00-1:59" should be used as a cutoff to define a traffic window.

Figure 135:
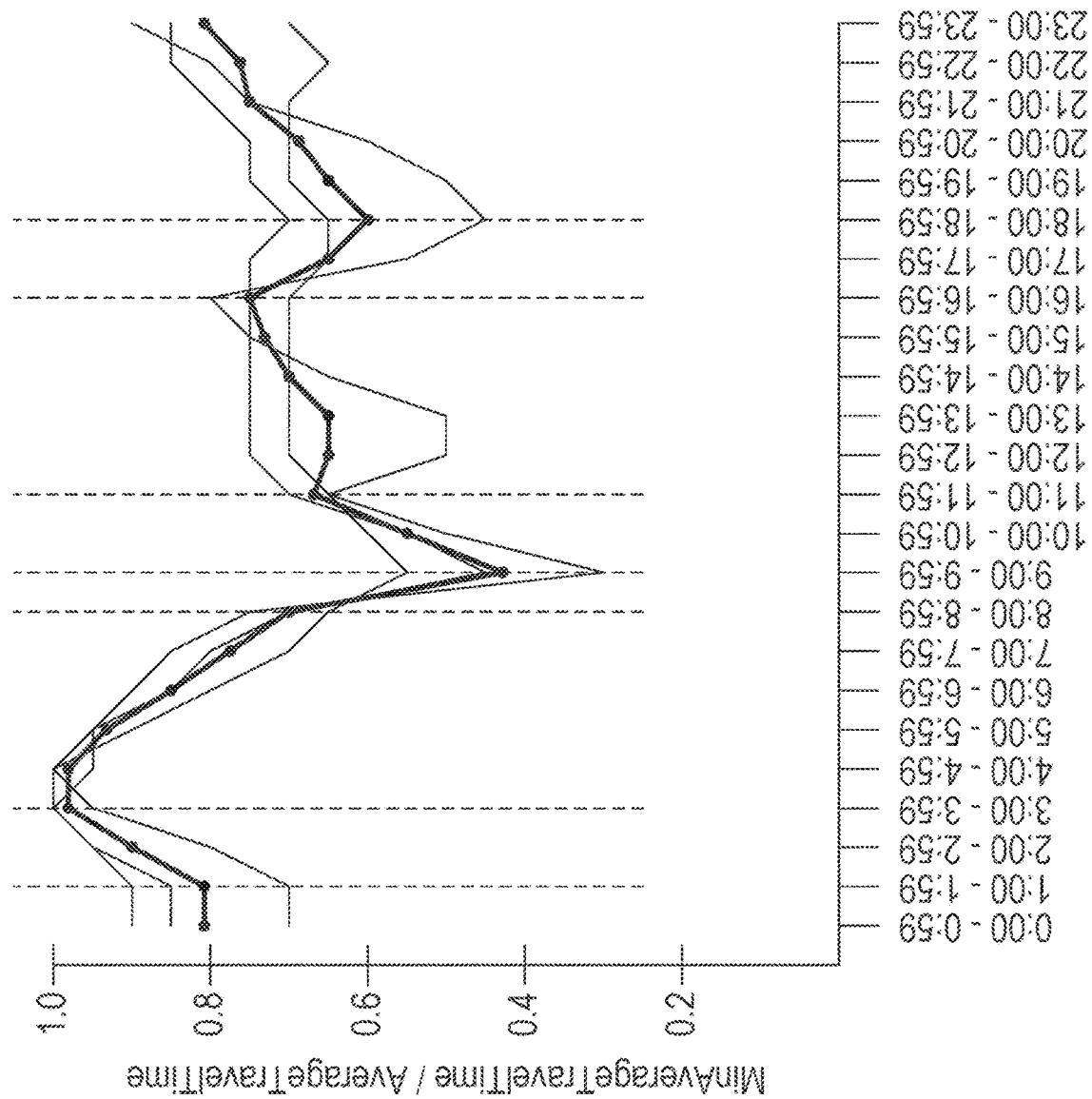
FIG. 135 illustrates additional time intervals used as cutoffs to define a traffic window.
Figure 136:
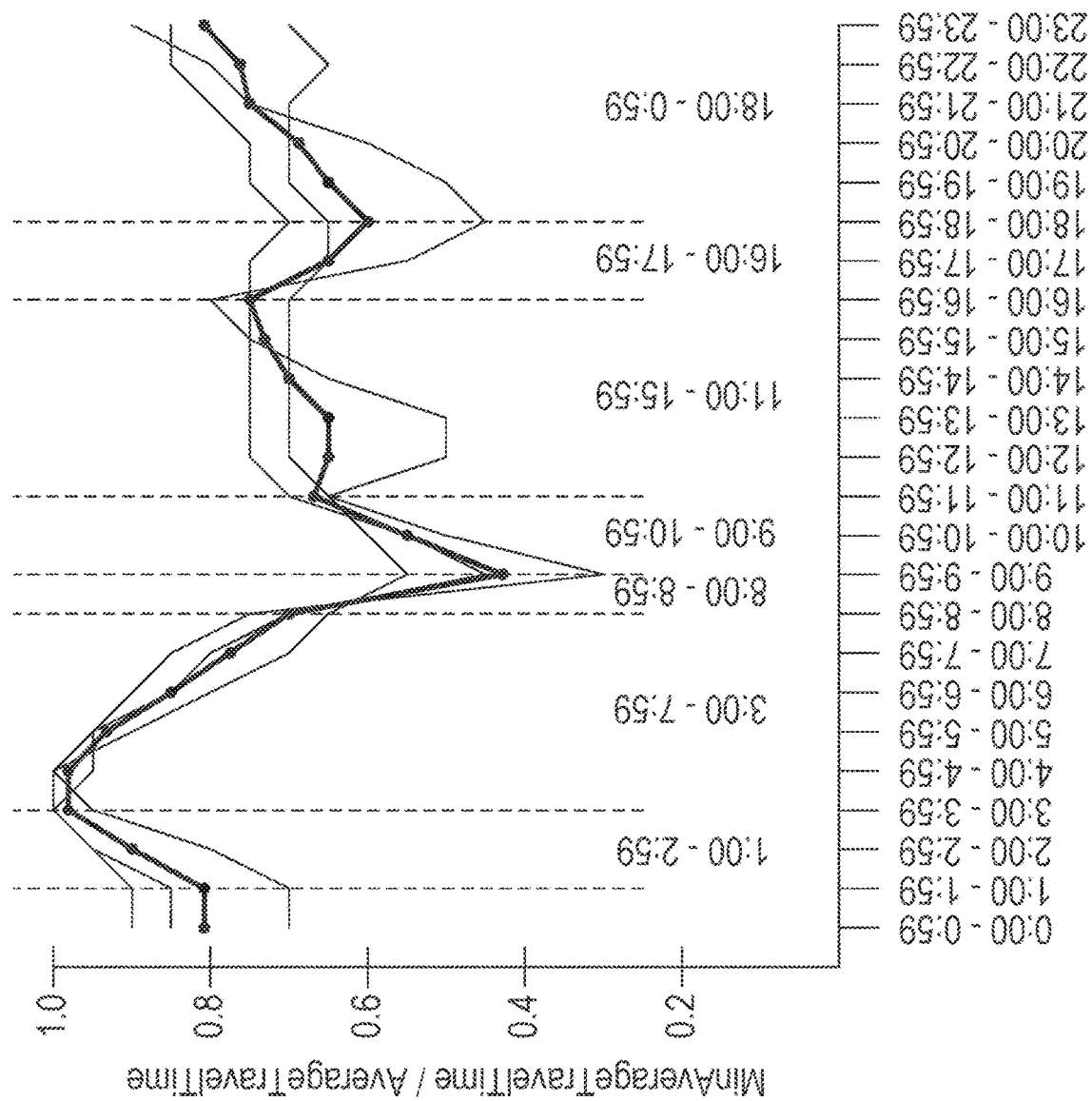
FIG. 136 illustrates the cutoffs in FIG. 135 used to define a plurality of traffic windows.

According to various embodiments, similar calculations can be carried to identify other time intervals which should be used as a cutoff to define a traffic window. FIG. 135 illustrates additional time intervals that it has been determined should be used as a cutoff to define a traffic window. Such determined time intervals may be used to define a plurality of traffic windows, as illustrated in FIG. 136.

Figure 138:
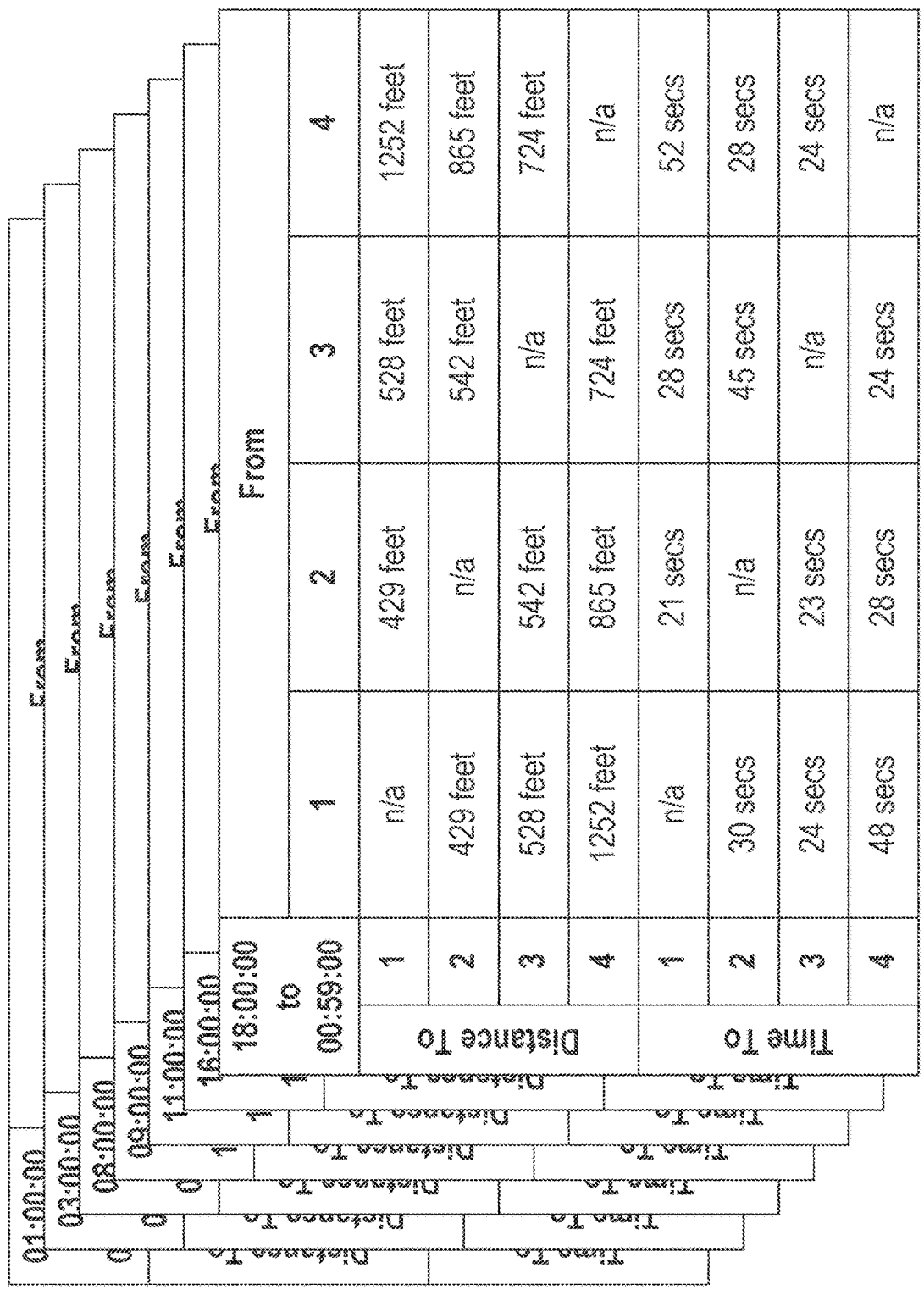
FIG. 138 illustrates a matrix containing calculated values for shortest or preferred paths for traffic windows of FIG. 136.

FIG. 137 illustrates an example of C Sharp style pseudocode for very simplified determination of times to be used for definition of traffic windows. According to various embodiments, average travel times for each road segment may be determined for each of a plurality of determined and defined windows, and determination of a shortest path may involve using the time estimates for a window within which a current time falls, or within which an estimated time of travel falls. Further, a matrix containing calculated values for determined shortest or preferred paths may be precomputed and stored for each of these time windows, as illustrated in FIG. 138.

In some embodiments, traffic windows may be determined using statistical or other methodologies, and for each road segment an average travel time or speed is computed during that window, and used to represent an estimated travel time or speed for that entire interval. In some embodiments, a shortest or optimal path matrix containing calculated values for determined shortest or optimal paths is precomputed and stored for each determined traffic window. In some embodiments, traffic window determinations may be made for a particular problem or area.

In some embodiments, determining a number of traffic windows for which shortest or optimal path information is precomputed allows for less computation as compared to requiring on-demand, in-process determination of a shortest or optimal path for a particular time during comparison of paths or routes performed as part of a process for determining a solution to a routing problem. In some embodiments, determining a number of traffic windows for which shortest or optimal path information is precomputed allows for quicker determination of a solution.

In some embodiments, reducing a number of traffic windows for which shortest or optimal path information is precomputed allows for less computation as compared to computation over an increased number of intervals (e.g. twenty-four one-hour intervals). In some embodiments, reducing a number of traffic windows for which shortest or optimal path information is precomputed allows for quicker determination of a solution with less resource usage (e.g. less processing time, less memory usage, and optionally less storage usage).

Using a Geo-Locator Service and Zone Servers to Reduce Computer Resource Requirements for Determining High-Quality Solutions to Routing Problems According to various embodiments, methodologies for determining high-quality solutions to routing problems may involve computing a shortest or optimal path for travel between locations involved in the routing problem. As noted above, as the number of locations involved in a routing problem grows, this begins to greatly increase the number of computations that are required to compute such a shortest or optimal path matrix. In some embodiments, for a routing problem involving n locations, approximately n*n shortest or optimal paths must be determined. Thus, in some implementations, for a routing problem involving one thousand locations, one million shortest or optimal paths would have to be determined to compute the shortest or optimal path matrix. Computing such a matrix can be a time-consuming process and can delay the solution to a routing problem, e.g. a routing optimization problem that involves a road network. Even more calculations and shortest path determinations may be required if data for various time intervals throughout a day is to be taken into consideration.

As more and more calculations and computations become required for more complex problems, it becomes increasingly important to be able to quickly compute information for shortest or optimal paths, e.g. a shortest or optimal path matrix. Rapid computation may involve storing the relevant data in memory, but storing data on a large road network in memory (e.g. the road network for an entire state or country) requires a large amount of memory. This can quickly escalate into requiring tens of gigabytes of memory (e.g. random-access memory, or "RAM"), or even more.

While some routing problems may require use of road network data for an entire state or country, many routing problems may only require use of road network data for a much smaller area, such as a town, city, county, or portion of a state or country. It is inefficient to tie up a high value server having a large amount of memory to compute shortest or optimal paths for a routing problem that is confined to a very small geographic area and only requires road network data for a very small road network.

Figure 139:
FIG. 139 illustrates an example of a geographic area comprising a road network.
Figure 140:
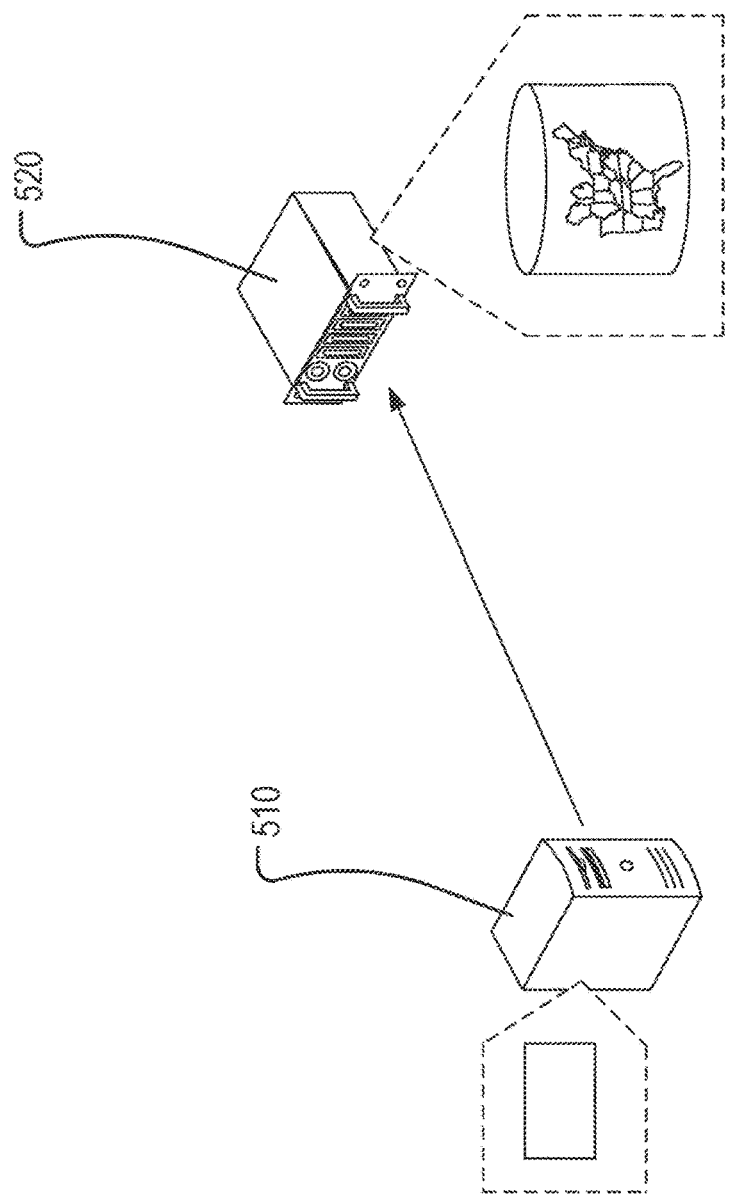
FIG. 140 illustrates a requestor communicating a request related to a routing problem involving specific locations.

For example, FIG. 139 illustrates an example of a geographic area comprising a road network. In a traditional implementation approach, a requester 510 would communicate a request related to a routing problem involving specified locations to a server 520, as illustrated in FIG. 140. This might, for example, be a request for one or more high-quality solutions to a routing problem involving specified locations, or might be a request for a shortest or optimal path matrix for specified locations. The server 520 (or a related server) would include a large amount of memory to allow for loading of road segment data for a large road network, e.g. the entire road network within the geographical area.

Figure 141:

In some embodiments, a geographic area comprising a road network is divided up into a plurality of zones, and one or more servers are used for each zone to provide routing solutions for that zone. For example, with respect to the example of geographic area illustrated in FIG. 139, each state could be characterized as its own zone, as illustrated in FIG. 141, where North Carolina is highlighted with an increased thickness line to illustrate its characterization as a zone. Notably, zones can overlap one another, and can even be located entirely within another zone. For example, the entire geographic area illustrated in FIG. 139 might be a first zone, and the state of North Carolina might be a second zone.

Figure 142:
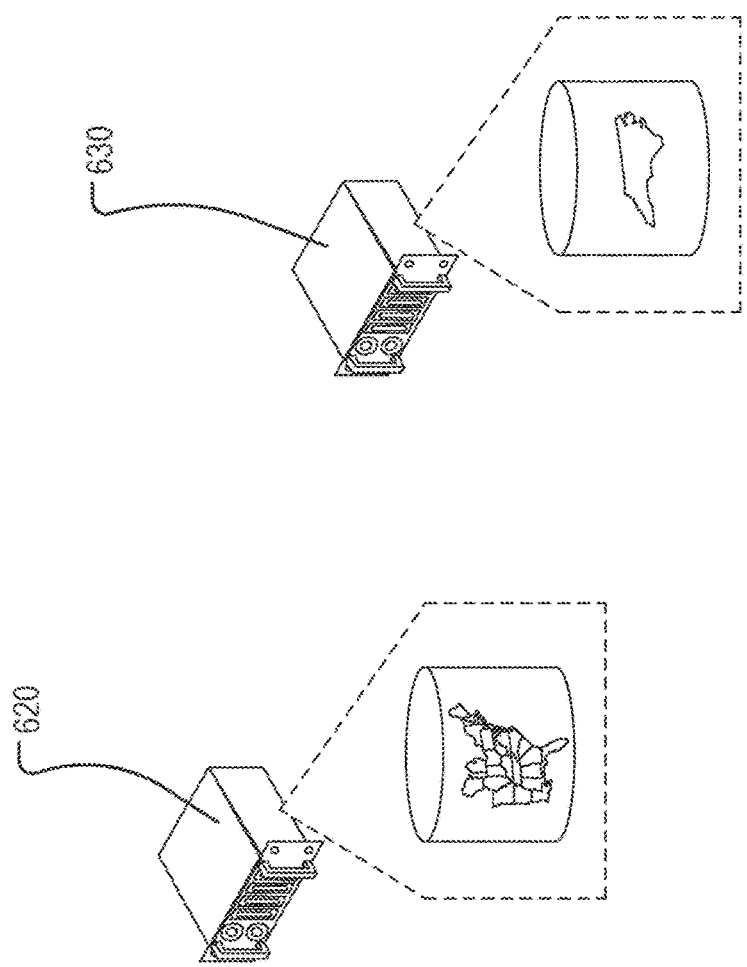
Figure 143:
Figure 144:
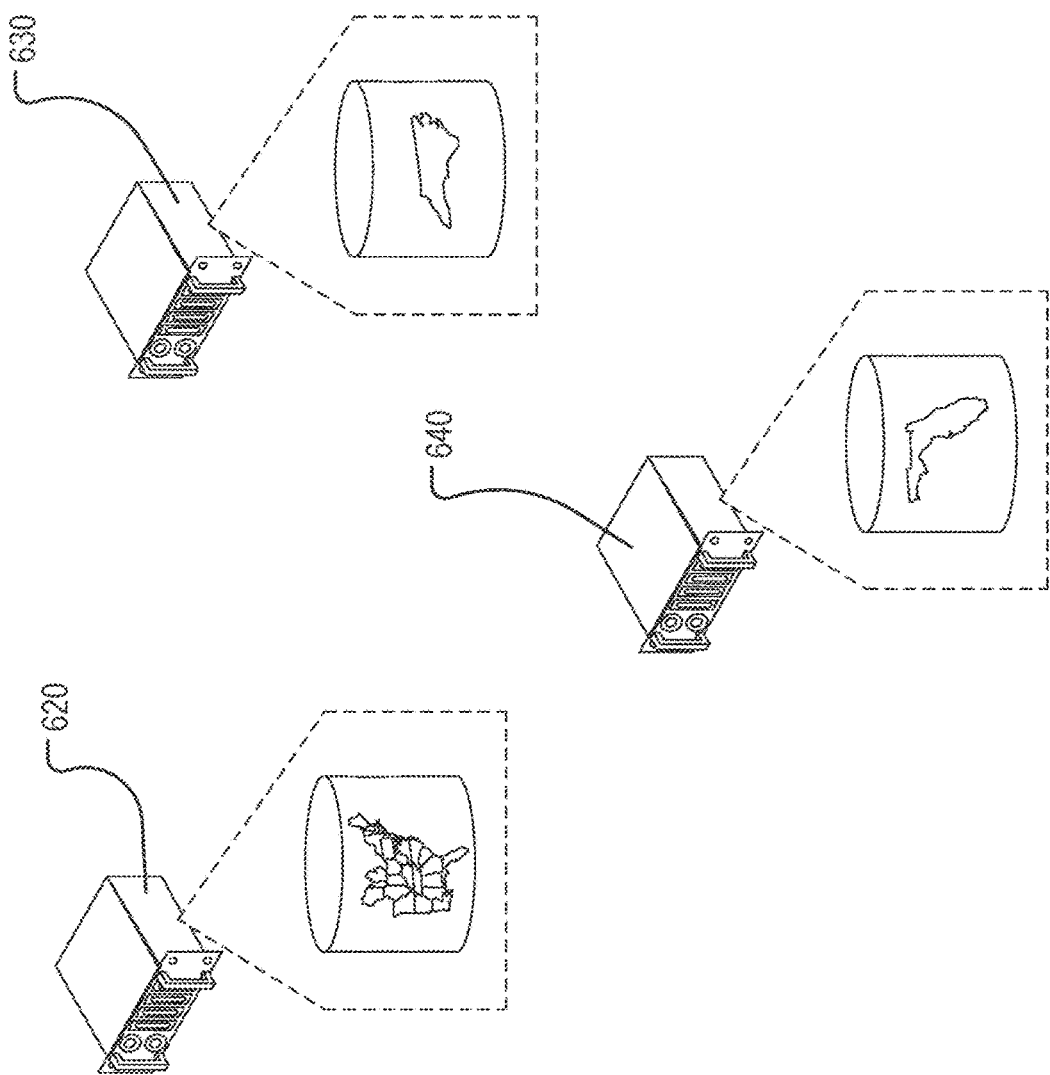

In some embodiments, a server is provided for each of these zones, as illustrated in FIG. 142, where a server 620 includes data for a zone corresponding to the geographic area illustrated in FIG. 139, and a server 630 includes data for a zone corresponding to the state of North Carolina. In this example, the state of Florida would itself be another zone, as illustrated in FIG. 143, where Florida is highlighted with an increased thickness line to illustrate its characterization as a zone. FIG. 144 illustrates additional provision of a server 640 including data for a zone corresponding to the state of Florida.

Figure 145:
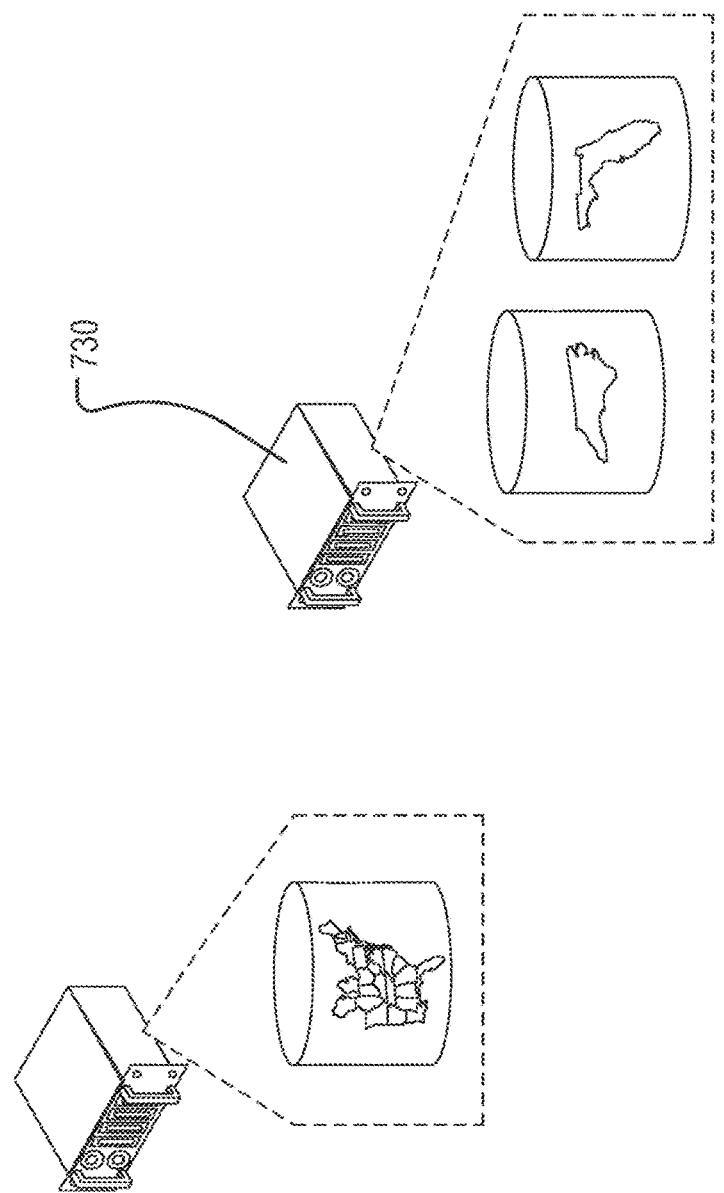

In some embodiments, a single server may include data for two or more zones, as illustrated in FIG. 145, where server 730 includes data for a first zone corresponding to the state of North Carolina and further includes data for a second zone corresponding to the state of Florida.

Figure 146:
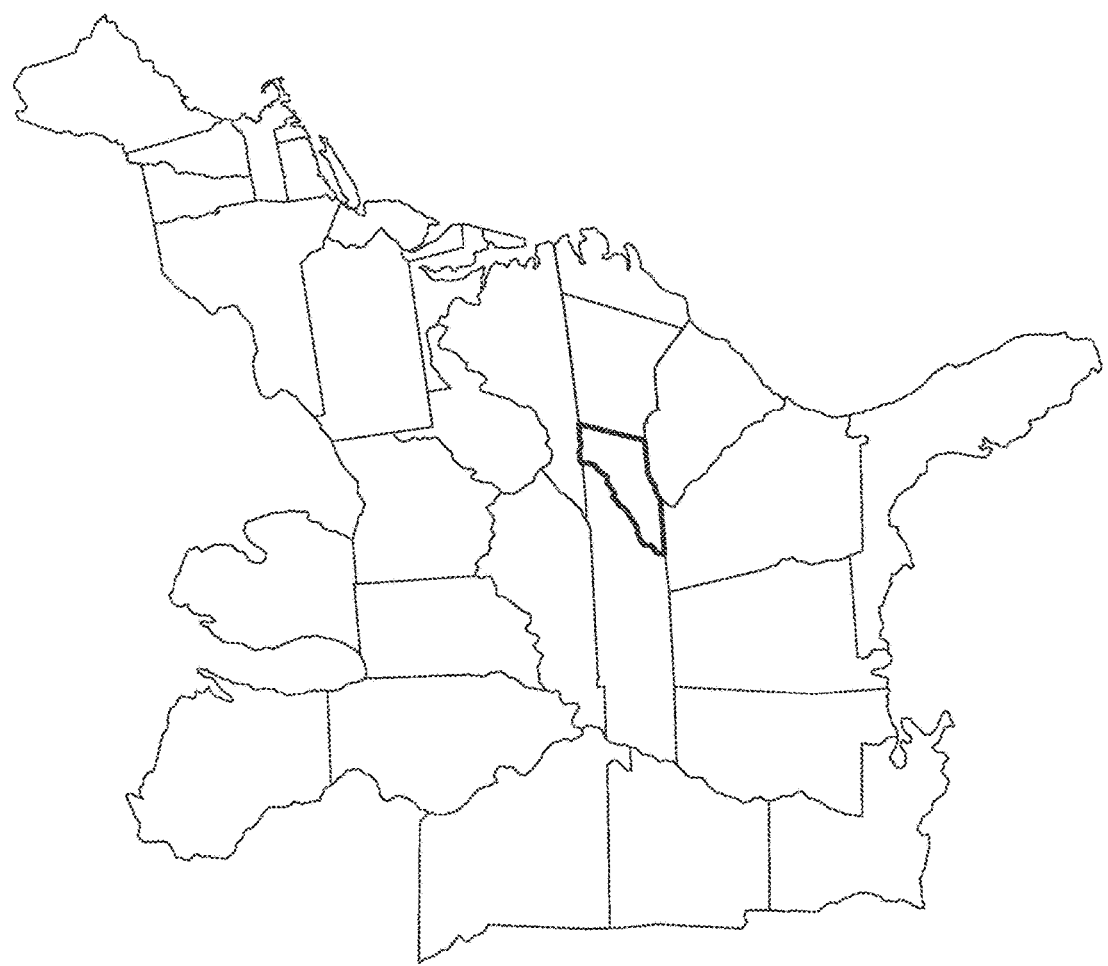
Figure 147:
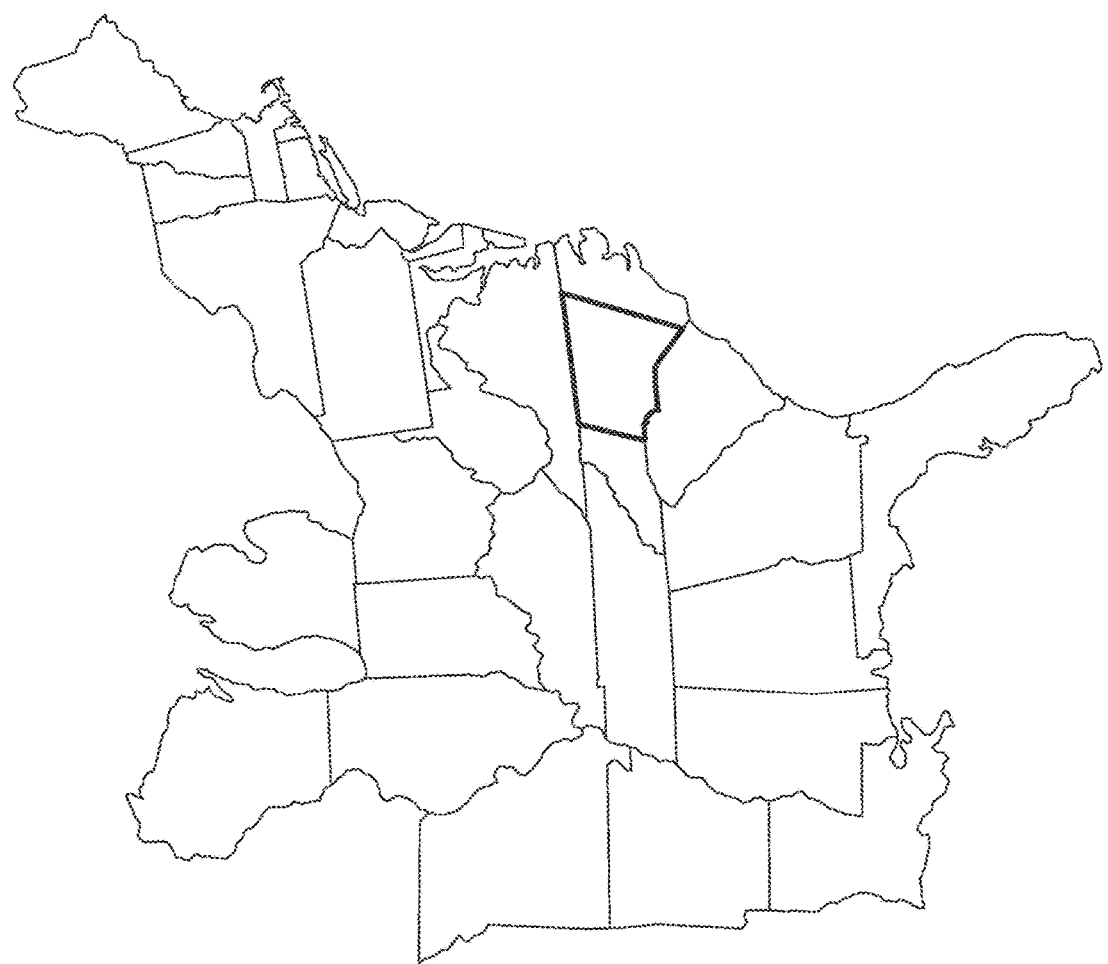
Figure 148:
Figure 149:
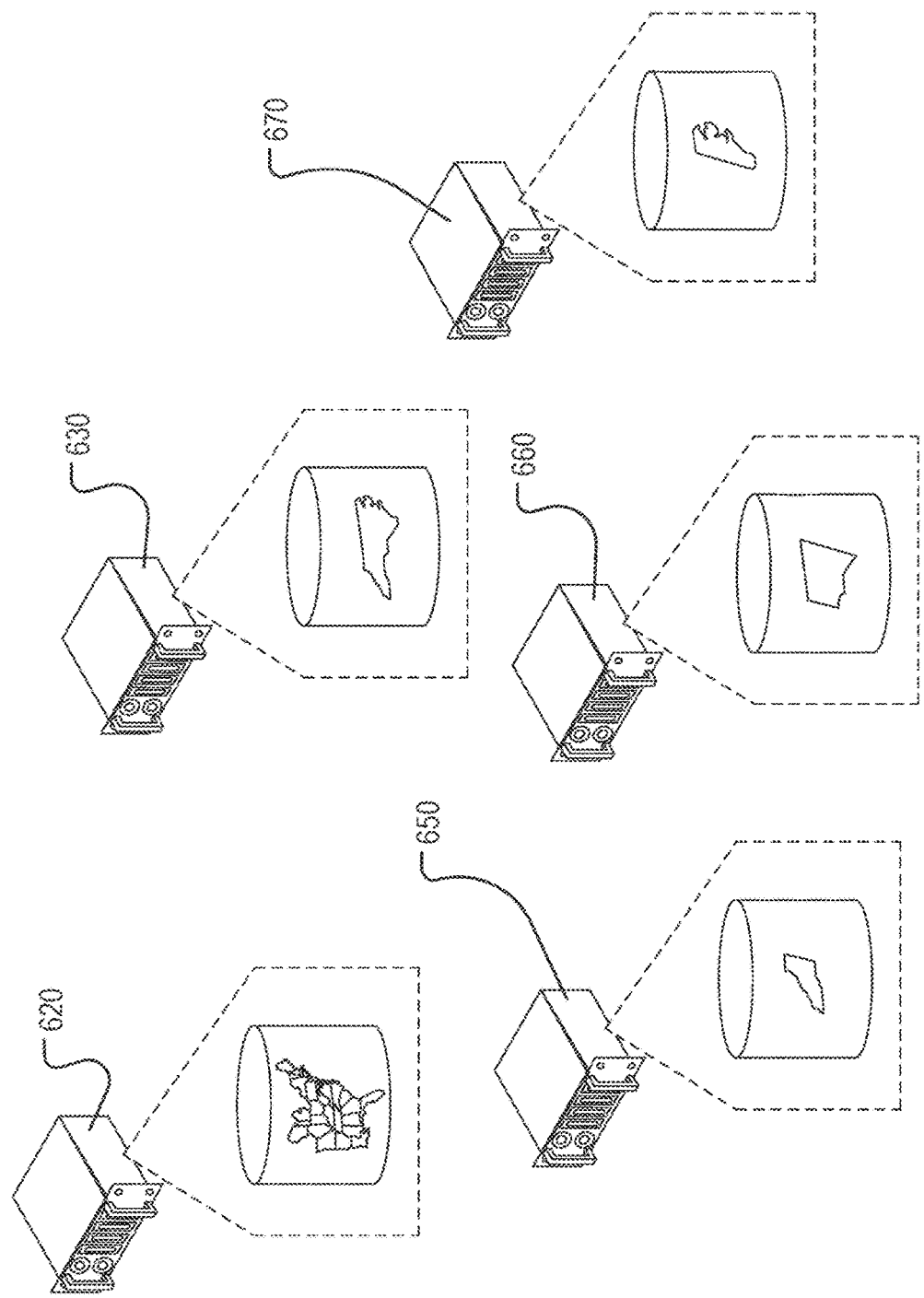
Figure 150:
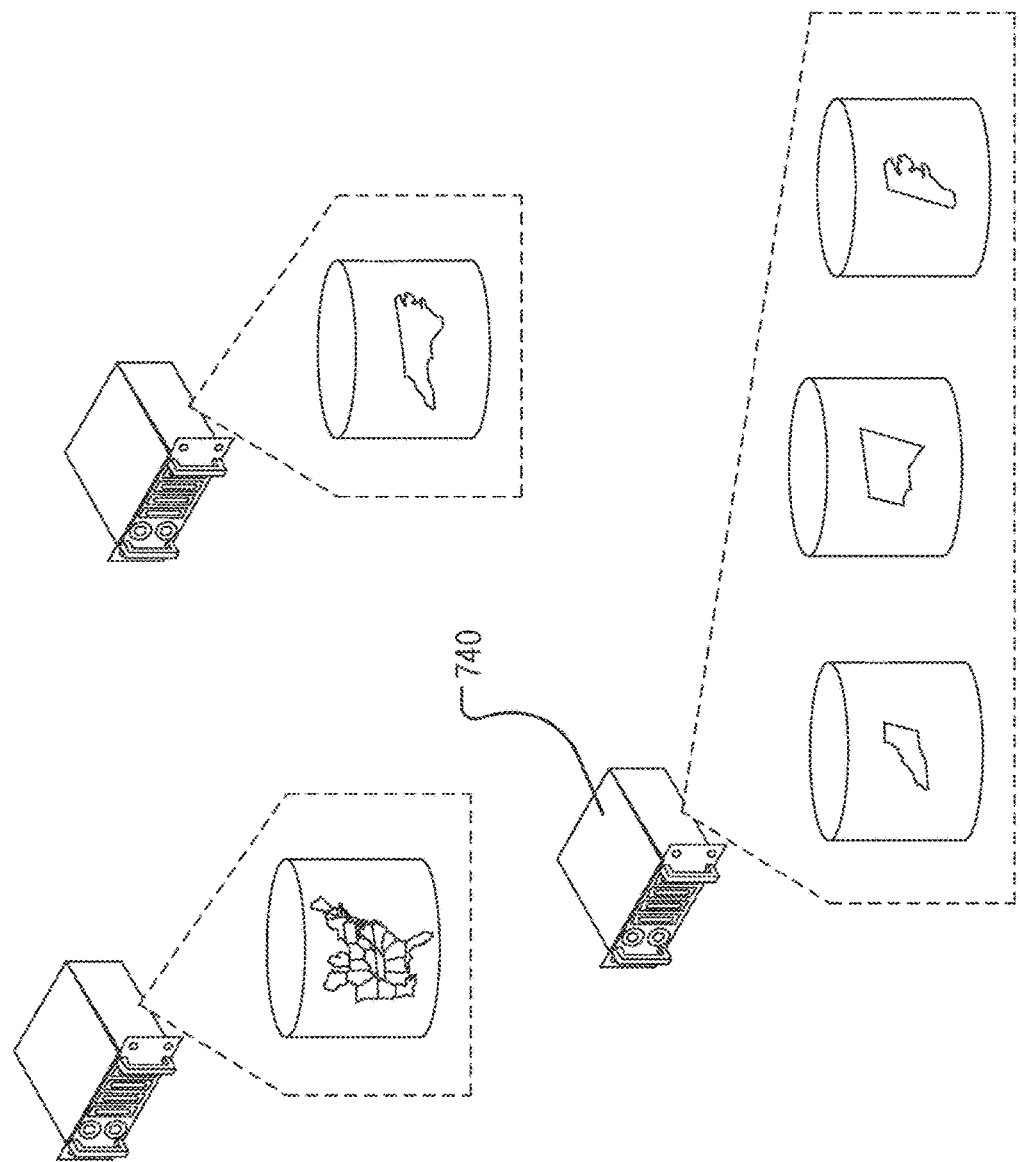

In some embodiments, multiple zones may overlap with, or be nested inside of, other overlapping or nesting zones. For example, FIG. 146 illustrates a western portion of North Carolina that is highlighted with an increased thickness line to illustrate its characterization as a zone, FIG. 147 illustrates a central portion of North Carolina that is highlighted with an increased thickness line to illustrate its characterization as a zone, and FIG. 148 illustrates an eastern portion of North Carolina that is highlighted with an increased thickness line to illustrate its characterization as a zone. FIG. 149 illustrates additional provision of servers 650, 660, 670 including data for these zones. As noted above, a single server may include data for two or more zones, and data for these zones could be found on a single server, as illustrated in FIG. 150, where a server 740 includes data for each of these zones.

Figure 151:
Figure 152:
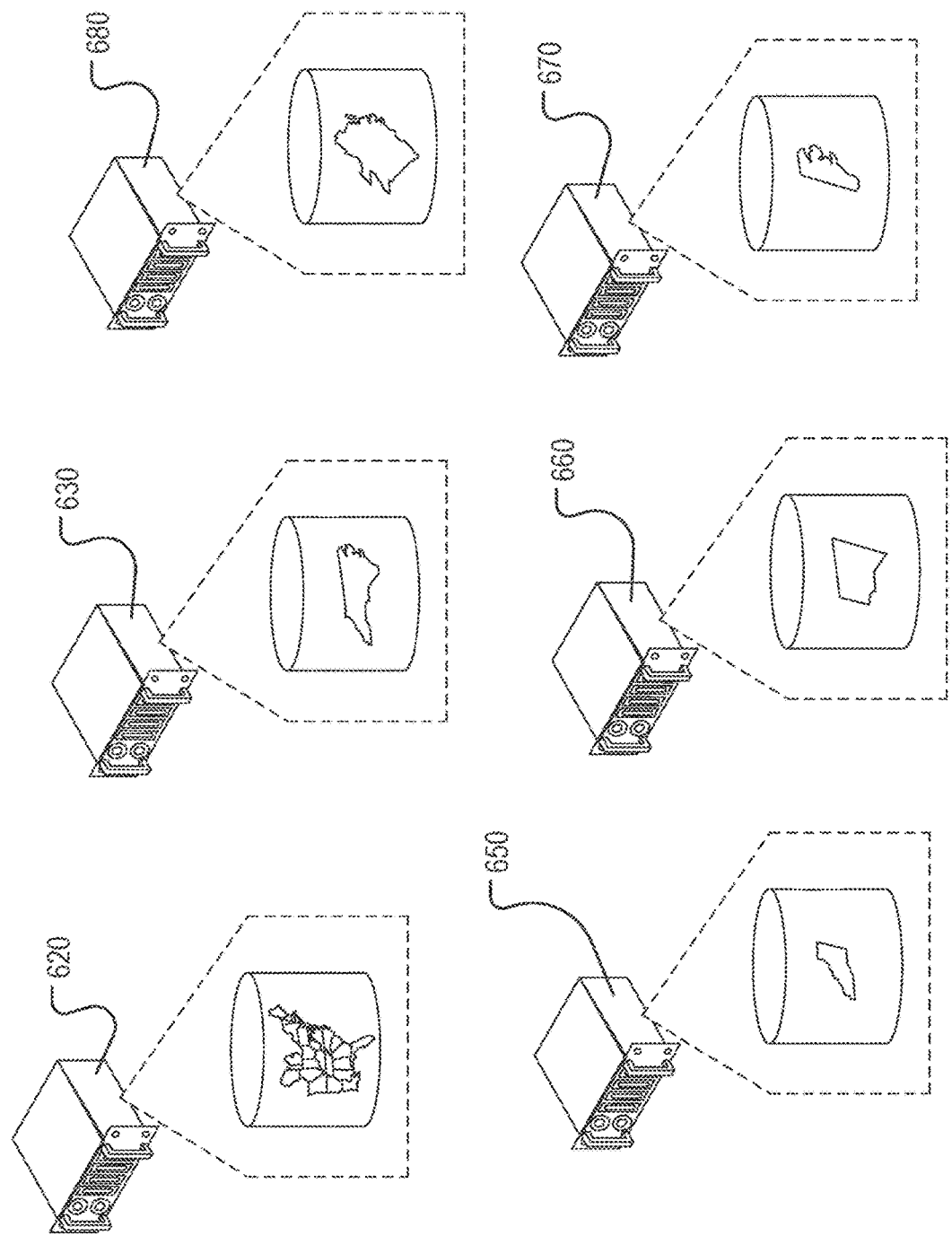

As another example, FIG. 151 illustrates a geographic area comprising the states of Virginia, North Carolina, and South Carolina that is highlighted with an increased thickness line to illustrate its characterization as a zone. FIG. 152 illustrates additional provision of a server 680 including data for this zone.

In some embodiments, a geo-locator service is used to allow a requestor to determine what server to contact to receive information for a routing problem. For example, FIG. 153 illustrates a server 690 comprising a geo-locator service 692 which contains information regarding the defined zones (e.g. sets of coordinates for defined boundaries of each of the zones). The geo-locator service 692 is configured to receive a list of sets of coordinates for locations involved in a routing problem, determine the smallest zone that contains all of the locations, and return an indication of the determined zone or corresponding server.

Figure 154:
Figure 155:
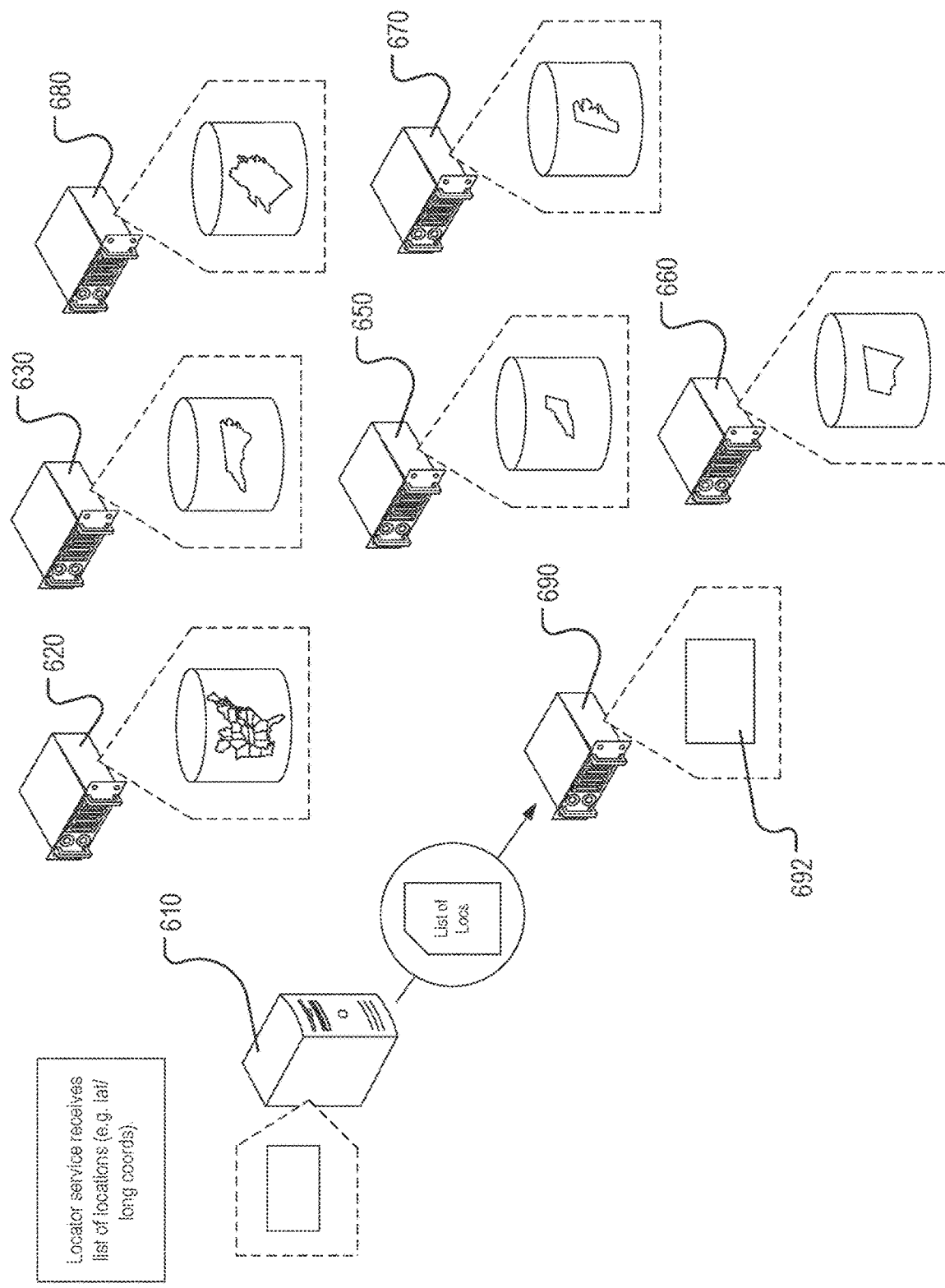

As an example, consider a routing problem involving the three locations illustrated in FIG. 154. In some embodiments, the server 690 hosting the locator service 692 receives, from a requestor 610, a list comprising information for these locations (e.g. in the form of latitude and longitude coordinates for these locations), as illustrated in FIG. 155.

Figure 156:
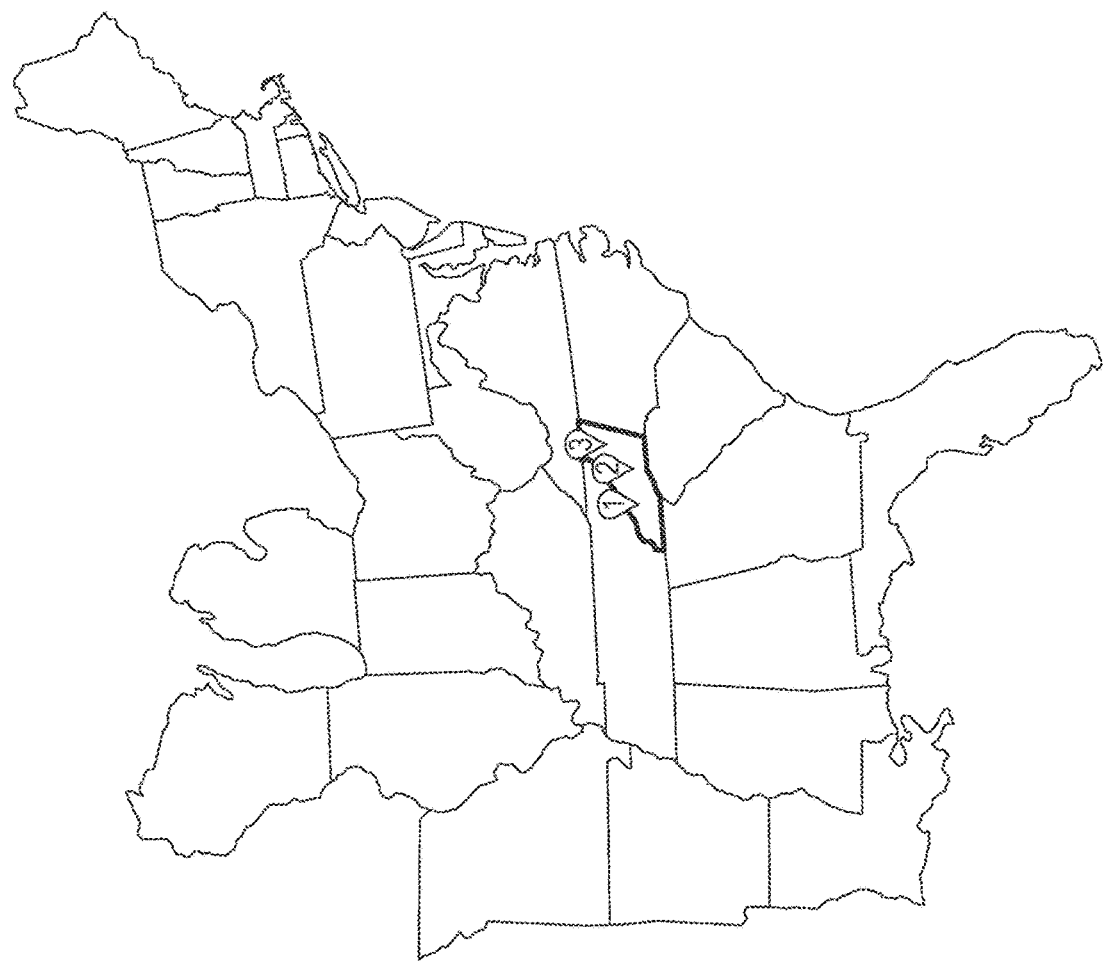

According to various embodiments, the locator service 692 accesses zone data for defined zones and determines a smallest defined zone containing all of these locations, as illustrated in FIG. 156. For example, In some embodiments, each zone is defined by a plurality of sets of latitude and longitude coordinates defining a boundary for that zone, and a locator service compares latitude and longitude coordinates for locations involved in a routing problem to defined boundaries of defined zones to identify a smallest defined zone containing all of the locations involved in the routing problem.

Figure 157:
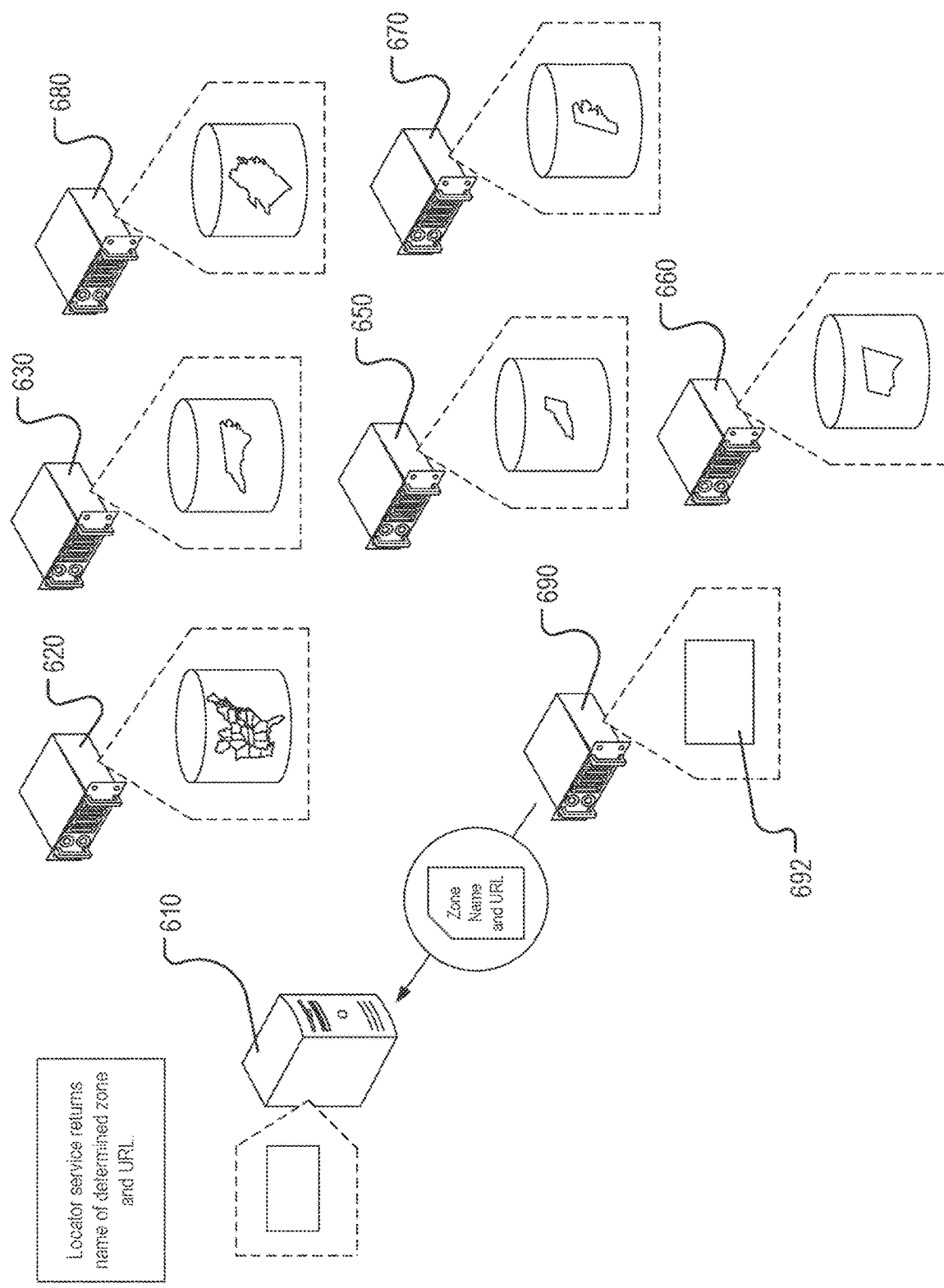

In some implementations, a locator service 692 returns an identifier for an identified or determined zone, or an identifier or address for a server corresponding to that identified or determined zone. In some embodiments, the locator service 692 returns a name of an identified or determined zone and a uniform resource locator corresponding to that identified or determined zone, as illustrated in FIG. 157.

Figure 158:
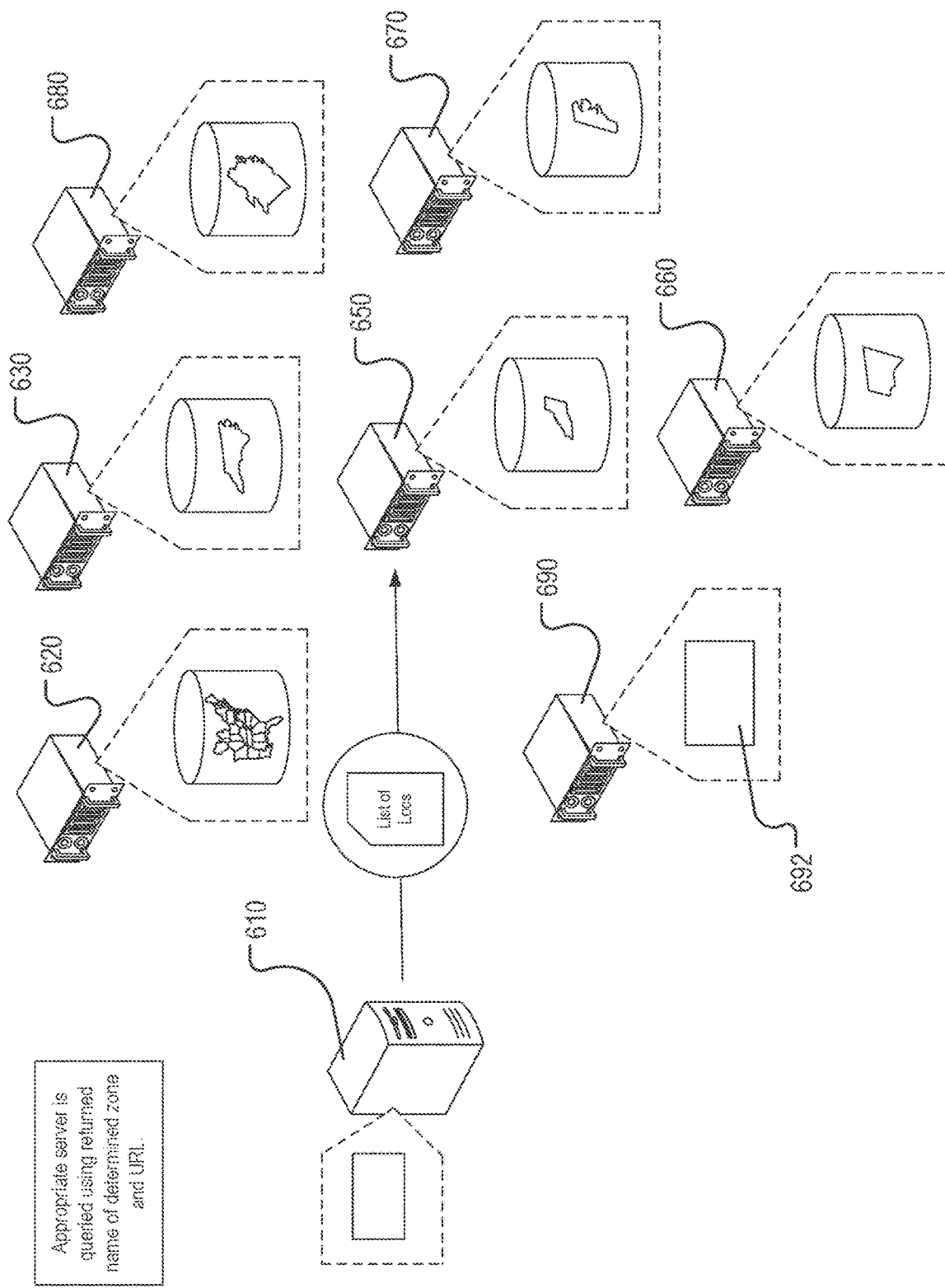

According to various embodiments, a returned uniform resource locator which corresponds to an identified or determined zone can be used to access one or more servers corresponding to that identified or determined zone, as illustrated in FIG. 158, where a list comprising information for locations (e.g. in the form of latitude and longitude coordinates for locations) is communicated from the requestor 610 to a server 650 corresponding to the zone previously determined by the requestor service 692 to be the smallest defined zone containing all of the locations involved in the routing problem. A computed shortest or optimal path matrix may be returned for the list of locations.

Figure 159:
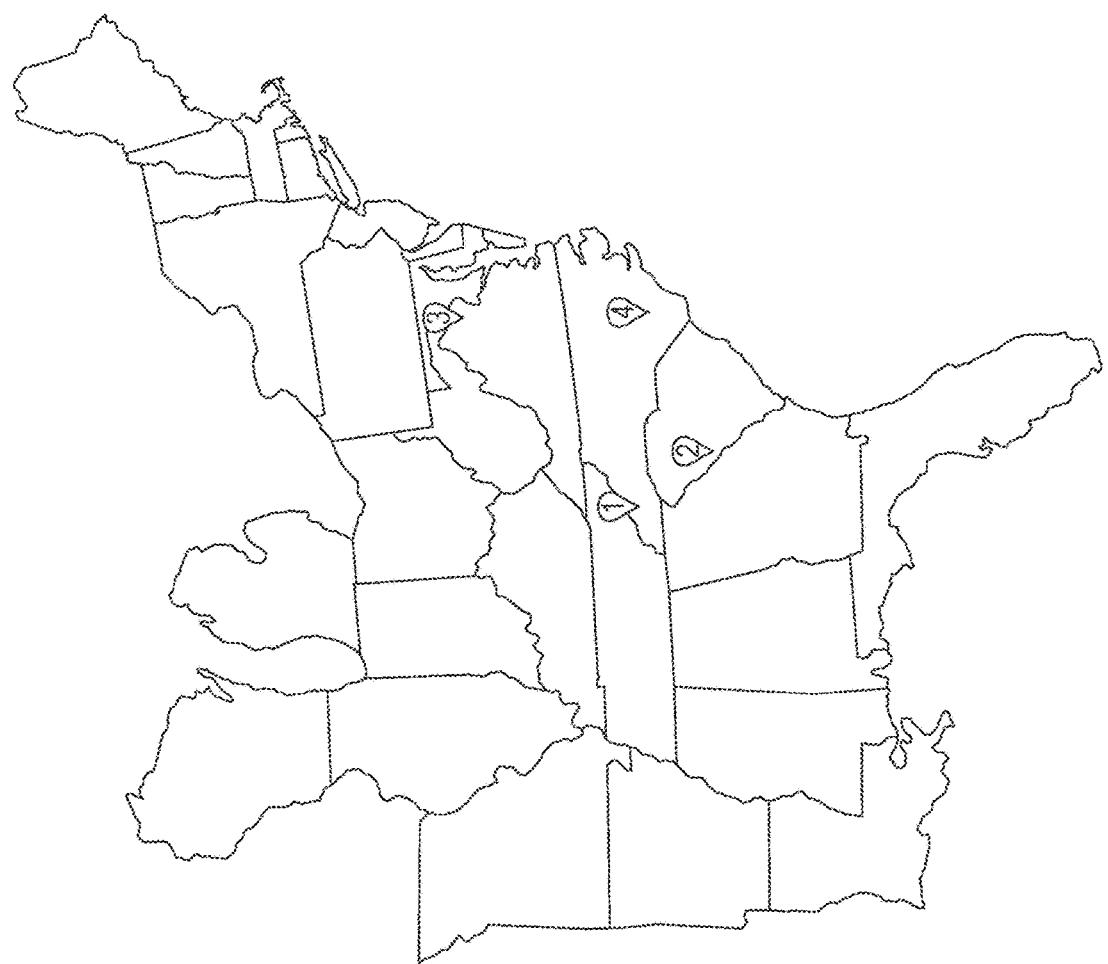
Figure 160:

FIGS. 159-160 illustrate another example of determination of a smallest defined zone containing all of the locations involved in a routing problem.

In some implementations, communication of a list comprising information for locations may be communicated as part of a request for a shortest or optimal path matrix, or as part of a request for one or more high-quality solutions to a routing problem. A response to such a request may include a shortest or optimal path matrix, or one or more high-quality solutions to a routing problem.

Figure 161:
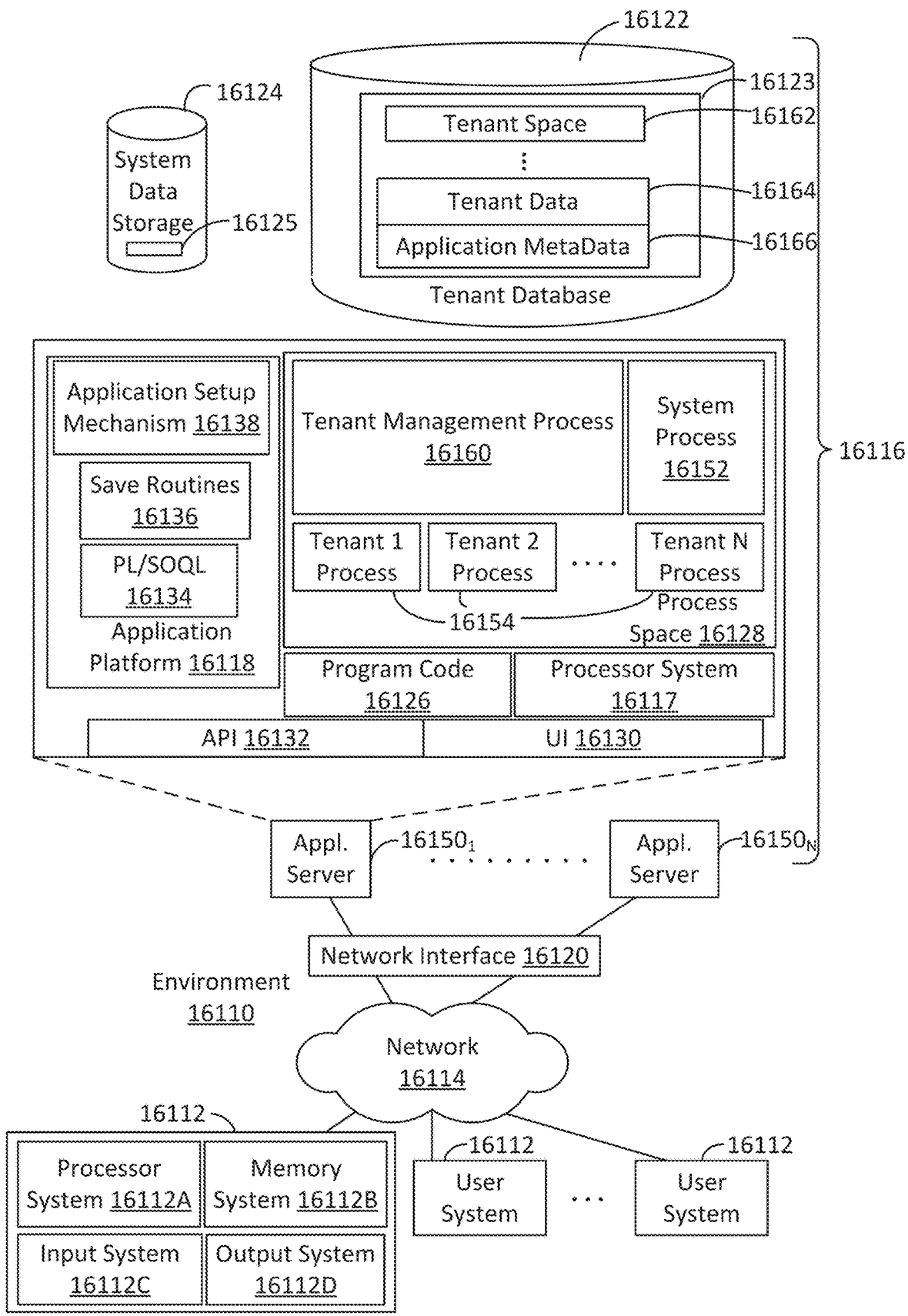

FIG. 161 shows a block diagram of an example of an environment 16110 that includes an on-demand database service configured in accordance with some implementations. Environment 16110 may include user systems 16112, network 16114, database system 16116, processor system 16117, application platform 16118, network interface 16120, tenant data storage 16122, tenant data 16123, system data storage 16124, system data 16125, program code 16126, process space 16128, User Interface (UI) 16130, Application Program Interface (API) 16132, PL/SOQL 16134, save routines 16136, application setup mechanism 16138, application servers 16150-1 through 16150-N, system process space 16152, tenant process spaces 16154, tenant management process space 16160, tenant storage space 16162, user storage 16164, and application metadata 16166. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 16116, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 18 may be a framework that allows the creation, management, and execution of applications in system 16116. Such applications may be developed by the database service provider or by users or third-party application developers accessing the service. Application platform 16118 includes an application setup mechanism 16138 that supports application developers' creation and management of applications, which may be saved as metadata into tenant data storage 16122 by save routines 16136 for execution by subscribers as one or more tenant process spaces 16154 managed by tenant management process 16160 for example. Invocations to such applications may be coded using PL/SOQL 16134 that provides a programming language style interface extension to API 16132. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 16166 for a subscriber making such an invocation. Such system processes may also manage execution of application metadata 16166 as an application in a virtual machine.

In some implementations, each application server 16150 may handle requests for any user associated with any organization. A load balancing function (e.g., an F5 Big-IP load balancer) may distribute requests to the application servers 16150 based on an algorithm such as least-connections, round robin, observed response time, etc. Each application server 16150 may be configured to communicate with tenant data storage 16122 and the tenant data 16123 therein, and system data storage 16124 and the system data 16125 therein to serve requests of user systems 16112. The tenant data 16123 may be divided into individual tenant storage spaces 16162, which can be either a physical arrangement and/or a logical arrangement of data. Within each tenant storage space 16162, user storage 16164 and application metadata 16166 may be similarly allocated for each user. For example, a copy of a user's most recently used (MRU) items might be stored to user storage 16164. Similarly, a copy of MRU items for an entire tenant organization may be stored to tenant storage space 16162. A UI 16130 provides a user interface and an API 16132 provides an application programming interface to system 16116 resident processes to users and/or developers at user systems 16112.

System 16116 may implement a web-based geographic routing service system. For example, in some implementations, system 16116 may include application servers configured to implement and execute geographic routing optimization software applications. The application servers may be configured to provide related data, code, forms, web pages and other information to and from user systems 16112. Additionally, the application servers may be configured to store information to, and retrieve information from a database system. Such information may include related data, objects, and/or Webpage content. With a multi-tenant system, data for multiple tenants may be stored in the same physical database object in tenant data storage 16122, however, tenant data may be arranged in the storage medium(s) of tenant data storage 16122 so that data of one tenant is kept logically separate from that of other tenants. In such a scheme, one tenant may not access another tenant's data, unless such data is expressly shared.

Several elements in the system shown in FIG. 161 include conventional, well-known elements that are explained only briefly here. For example, user system 16112 may include processor system 16112A, memory system 16112B, input system 16112C, and output system 161 12D. A user system 16112 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 16112 to access, process and view information, pages and applications available from system 16116 over network 16114. Network 16114 may be any network or combination of networks of devices that communicate with one another, such as any one or any combination of a LAN (local area network), WAN (wide area network), wireless network, or other appropriate configuration.

The users of user systems 16112 may differ in their respective capacities, and the capacity of a particular user system 16112 to access information may be determined at least in part by "permissions" of the particular user system 16112. As discussed herein, permissions generally govern access to computing resources such as data objects, components, and other entities of a computing system, such as a routing optimization, a social networking system, and/or a CRM database system. "Permission sets" generally refer to groups of permissions that may be assigned to users of such a computing environment. For instance, the assignments of users and permission sets may be stored in one or more databases of System 16116. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 16116 may provide on-demand database service to user systems 16112 using an MTS arrangement. By way of example, one tenant organization may be a company that employs a sales force where each salesperson uses system 16116 to manage their sales process. Thus, a user in such an organization may maintain contact data, leads data, customer follow-up data, performance data, goals and progress data, etc., all applicable to that user's personal sales process (e.g., in tenant data storage 16122). In this arrangement, a user may manage his or her sales efforts and cycles from a variety of devices, since relevant data and applications to interact with (e.g., access, view, modify, report, transmit, calculate, etc.) such data may be maintained and accessed by any user system 16112 having network access.

When implemented in an MTS arrangement, system 16116 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 16116 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 16116 may also maintain system-level data usable by multiple tenants or other data. Such system-level data may include industry reports, news, postings, and the like that are sharable between tenant organizations.

In some implementations, user systems 16112 may be client systems communicating with application servers 16150 to request and update system-level and tenant-level data from system 16116. By way of example, user systems 16112 may send one or more queries requesting data of a database maintained in tenant data storage 16122 and/or system data storage 16124. An application server 16150 of system 16116 may automatically generate one or more SQL statements (e.g., one or more SQL queries) that are designed to access the requested data. System data storage 16124 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For routing applications, a table may describe geographic locations and/or distance information. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

FIG. 162A shows a system diagram of an example of architectural components of an on-demand database service environment 16200, configured in accordance with some implementations. A client machine located in the cloud 16204 may communicate with the on-demand database service environment via one or more edge routers 16208 and 16212. A client machine may include any of the examples of user systems 712 described above. The edge routers 16208 and 16212 may communicate with one or more core switches 16220 and 16224 via firewall 16216. The core switches may communicate with a load balancer 16228, which may distribute server load over different pods, such as the pods 16240 and 16244 by communication via pod switches 16232 and 16236. The pods 16240 and 16244, which may each include one or more servers and/or other computing resources, may perform data processing and other operations used to provide on-demand services. Components of the environment may communicate with a database storage 16256 via a database firewall 16248 and a database switch 16252.

Accessing an on-demand database service environment may involve communications transmitted among a variety of different components. The environment 16200 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 162A and 162B.

The cloud 16204 refers to any suitable data network or combination of data networks, which may include the Internet. Client machines located in the cloud 16204 may communicate with the on-demand database service environment 16200 to access services provided by the on-demand database service environment 16200. By way of example, client machines may access the on-demand database service environment 16200 to retrieve, store, edit, and/or process geographic routing request information.

In some implementations, the edge routers 16208 and 16212 route packets between the cloud 16204 and other components of the on-demand database service environment 16200. The edge routers 16208 and 16212 may employ the Border Gateway Protocol (BGP). The edge routers 16208 and 16212 may maintain a table of IP networks or 'prefixes', which designate network reachability among autonomous systems on the internet.

In one or more implementations, the firewall 16216 may protect the inner components of the environment 16200 from internet traffic. The firewall 16216 may block, permit, or deny access to the inner components of the on-demand database service environment 16200 based upon a set of rules and/or other criteria. The firewall 16216 may act as one or more of a packet filter, an application gateway, a stateful filter, a proxy server, or any other type of firewall.

In some implementations, the core switches 16220 and 16224 may be high-capacity switches that transfer packets within the environment 16200. The core switches 16220 and 16224 may be configured as network bridges that quickly route data between different components within the on-demand database service environment. The use of two or more core switches 16220 and 16224 may provide redundancy and/or reduced latency.

In some implementations, communication between the pods 16240 and 16244 may be conducted via the pod switches 16232 and 16236. The pod switches 16232 and 16236 may facilitate communication between the pods 16240 and 16244 and client machines, for example via core switches 16220 and 16224. Also or alternatively, the pod switches 16232 and 16236 may facilitate communication between the pods 16240 and 16244 and the database storage 16256. The load balancer 16228 may distribute workload between the pods, which may assist in improving the use of resources, increasing throughput, reducing response times, and/or reducing overhead. The load balancer 16228 may include multilayer switches to analyze and forward traffic.

In some implementations, access to the database storage 16256 may be guarded by a database firewall 16248, which may act as a computer application firewall operating at the database application layer of a protocol stack. The database firewall 16248 may protect the database storage 16256 from application attacks such as structure query language (SQL) injection, database rootkits, and unauthorized information disclosure. The database firewall 16248 may include a host using one or more forms of reverse proxy services to proxy traffic before passing it to a gateway router and/or may inspect the contents of database traffic and block certain content or database requests. The database firewall 16248 may work on the SQL application level atop the TCP/IP stack, managing applications' connection to the database or SQL management interfaces as well as intercepting and enforcing packets traveling to or from a database network or application interface.

In some implementations, the database storage 16256 may be an on-demand database system shared by many different organizations. The on-demand database service may employ a single-tenant approach, a multi-tenant approach, a virtualized approach, or any other type of database approach. Communication with the database storage 16256 may be conducted via the database switch 16252. The database storage 16256 may include various software components for handling database queries. Accordingly, the database switch 16252 may direct database queries transmitted by other components of the environment (e.g., the pods 16240 and 16244) to the correct components within the database storage 16256.

FIG. 162B shows a system diagram further illustrating an example of architectural components of an on-demand database service environment, in accordance with some implementations. The pod 16244 may be used to render services to user(s) of the on-demand database service environment 16200. The pod 16244 may include one or more content batch servers 16264, content search servers 16268, query servers 16282, file servers 16286, access control system (ACS) servers 16280, batch servers 16284, and app servers 16288. Also, the pod 16244 may include database instances 16290, quick file systems (QFS) 16292, and indexers 16294. Some or all communication between the servers in the pod 16244 may be transmitted via the switch 16236.

In some implementations, the app servers 16288 may include a framework dedicated to the execution of procedures (e.g., programs, routines, scripts) for supporting the construction of applications provided by the on-demand database service environment 16200 via the pod 16244. One or more instances of the app server 16288 may be configured to execute all or a portion of the operations of the services described herein.

In some implementations, as discussed above, the pod 16244 may include one or more database instances 16290. A database instance 16290 may be configured as an MTS in which different organizations share access to the same database, using the techniques described above. Database information may be transmitted to the indexer 16294, which may provide an index of information available in the database 16290 to file servers 16286. The QFS 16292 or other suitable filesystem may serve as a rapid-access file system for storing and accessing information available within the pod 16244. The QFS 16292 may support volume management capabilities, allowing many disks to be grouped together into a file system. The QFS 16292 may communicate with the database instances 16290, content search servers 16268 and/or indexers 16294 to identify, retrieve, move, and/or update data stored in the network file systems (NFS) 16296 and/or other storage systems.

In some implementations, one or more query servers 16282 may communicate with the NFS 16296 to retrieve and/or update information stored outside of the pod 16244. The NFS 16296 may allow servers located in the pod 16244 to access information over a network in a manner similar to how local storage is accessed. Queries from the query servers 16222 may be transmitted to the NFS 16296 via the load balancer 16228, which may distribute resource requests over various resources available in the on-demand database service environment 16200. The NFS 16296 may also communicate with the QFS 16292 to update the information stored on the NFS 16296 and/or to provide information to the QFS 16292 for use by servers located within the pod 16244.

In some implementations, the content batch servers 16264 may handle requests internal to the pod 16244. These requests may be long-running and/or not tied to a particular customer, such as requests related to log mining, cleanup work, and maintenance tasks. The content search servers 16268 may provide query and indexer functions such as functions allowing users to search through content stored in the on-demand database service environment 16200. The file servers 16286 may manage requests for information stored in the file storage 16298, which may store information such as documents, images, basic large objects (BLOBs), etc. The query servers 16282 may be used to retrieve information from one or more file systems. For example, the query system 16282 may receive requests for information from the app servers 16288 and then transmit information queries to the NFS 16296 located outside the pod 16244. The ACS servers 16280 may control access to data, hardware resources, or software resources called upon to render services provided by the pod 16244. The batch servers 16284 may process batch jobs, which are used to run tasks at specified times. Thus, the batch servers 16284 may transmit instructions to other servers, such as the app servers 16288, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

FIG. 163 illustrates one example of a computing device. According to various embodiments, a system 16300 suitable for implementing embodiments described herein includes a processor 16301, a memory module 16303, a storage device 16305, an interface 16311, and a bus 16315 (e.g., a PCI bus or other interconnection fabric.) System 16300 may operate as variety of devices such as an application server, a database server, or any other device or service described herein. Although a particular configuration is described, a variety of alternative configurations are possible. The processor 16301 may perform operations such as those described herein. Instructions for performing such operations may be embodied in the memory 16303, on one or more non-transitory computer readable media, or on some other storage device. Various specially configured devices can also be used in place of or in addition to the processor 16301. The interface 16311 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

FIG. 164 illustrates a method 16400 for determining an optimized route, performed in accordance with one or more embodiments. According to various embodiments, the method 16400 may be performed by any suitable server in communication with a client machine.

A routing request message is received at 16402. In some implementations, the routing request message may be received from a client device associated with a client entity. The routing request message may identify a routing request. According to various embodiments, the routing request message may identify a set of geographic locations. Such locations may be identified by any suitable mechanism. For instance, a geographic location may be identified by street address, by GPS coordinates, or by some other means.

In some implementations, the routing request message may identify one or more weighting parameters. Such weighting parameters may include, but are not limited to: penalties for left-hand turns, one or more weights based on route length, one or more weights associated with pairs of drivers and customers, and weights based on road types.

A geographic zone based on the routing request message is identified at 16404. A zone server associated with the identified geographic zone is determined at 16406. According to various embodiments, a geographic area comprising a road network may be divided up into a plurality of zones, and one or more servers are used for each zone to provide routing solutions for that zone. For example, with respect to the example of geographic area illustrated in FIG. 139, each state could be characterized as its own zone, as illustrated in FIG. 141, where North Carolina is highlighted with an increased thickness line to illustrate its characterization as a zone. Notably, zones can overlap one another, and can even be located entirely within another zone. For example, the entire geographic area illustrated in FIG. 139 might be a first zone, and the state of North Carolina might be a second zone.

In some implementations, a geographic zone for the request may be identified by determining a zone that includes all or substantially all of the locations identified by the request received at 16402. For instance, the geographic zone that is selected may be the smallest zone that includes all of the identified locations.

Route optimization information is retrieved from the zone server at 16408. According to various embodiments, the route optimization information may include, but is not limited to, all or a portion of a shortest path matrix identifying a shortest path between pairs of geographic locations within the zone. The shortest path matrix may identify, for example, transit times between pairs of points.

A route based on the routing request message and the route optimization message is determined at 16410. In some implementations, the route may be determined based on the route optimization information retrieved from the zone server and the geographic locations identified at 16402. Determining the route may involve determining interpolated values between pairs of points represented in the shortest path matrix. For instance, the shortest path matrix may be computed using road intersections as vertices and roads as edges in a graph. However, one or more of the locations included in the routing request may be located at a position between two intersections along a road. In such a situation, the transit time from one or more of the intersections may be estimated by determining one or more interpolated values.

In some implementations, the route may be determined at least in part based on one or more weighting parameters identified as discussed with respect to the receipt of the routing request message at 16402. For instance, various preliminary routes may be computed, and then one of the computed routes may be selected based on the weighting parameters.

A response message identifying the route is transmitted at 16412. According to various embodiments, the route message may be provided in any suitable format for conveying the route determined at 16410. For example, the route message may include an ordered list of geographic locations. As another example, the route message may include a URI to a route on a map accessible via the internet.

FIG. 165 illustrates a method 16500 for determining an optimized route, performed in accordance with one or more embodiments. According to various embodiments, the method 16500 may be performed by any suitable server in communication with a client machine.

A routing request message is received at 16502. In some implementations, the routing request message may be received from a client device associated with a client entity. The routing request message may identify a routing request. According to various embodiments, the routing request message may identify a set of geographic locations. Such locations may be identified by any suitable mechanism. For instance, a geographic location may be identified by street address, by GPS coordinates, or by some other means.

In some implementations, the routing request message may identify a time period. The time period may indicate, for instance, a period during which the route is to be completed. The time period may indicate a generic period of time during a weekday (e.g., 9:00 AM to 5:00 PM) or may indicate a specific period of time that may span one or more specific days.

One or more time windows based on the routing request message are identified at 16504. According to various embodiments, each time window may correspond to a block of time, such as a two-hour block of time. Route optimization information such as shortest path information may be computed for each time window to reflect the fact that transit times tend to vary over the day. In some configurations, one or more time windows may be specific to a day of the week or some other unit of analysis. For instance, travel times may tend to be different on holidays and non-holidays, and on weekdays and weekends.

In some embodiments, the identified one or more time windows may be the smallest set of time windows that include the time period identified in the routing request. In some configurations, one or more of the identified time windows may overlap. For instance, one time window may span the period from 9:00 AM to 11:00 AM, while another time period may span the period from 10:00 AM to 12:00 PM.

A geographic zone based on the routing request message is identified at 16506. According to various embodiments, a geographic area comprising a road network may be divided up into a plurality of zones, and one or more servers may be used for each zone to provide routing solutions for that zone. In some implementations, a geographic zone for the request may be identified by determining a zone that includes all or substantially all of the locations identified by the request received at 16502. For instance, the geographic zone that is selected may be the smallest zone that includes all of the identified locations.

Route optimization information is retrieved for the identified time windows at 16508. According to various embodiments, the route optimization information may include, but is not limited to, all or a portion of a shortest path matrix identifying a shortest path between pairs of geographic locations within the zone. The shortest path matrix may identify, for example, transit times between pairs of points. Different time windows may be associated with different shortest path values.

A route based on the routing request message and the route optimization message is determined at 16510. In some implementations, the route may be determined based on the route optimization information retrieved at 16508 and the geographic locations identified at 16502. In some embodiments, determining the route may involve evaluating different transit values for the same road at different times during the time period identified at 16502.

In some embodiments, determining the route may involve determining interpolated values between pairs of points represented in the shortest path matrix. For instance, the shortest path matrix may be computed using road intersections as vertices and roads as edges in a graph. However, one or more of the locations included in the routing request may be located at a position between two intersections along a road. In such a situation, the transit time from one or more of the intersections may be estimated by determining one or more interpolated values.

A response message identifying the route is transmitted at 16512. According to various embodiments, the route message may be provided in any suitable format for conveying the route determined at 16510. For example, the route message may include an ordered list of geographic locations. As another example, the route message may include a URI to a route on a map accessible via the internet.

Various techniques and mechanisms described herein refer to optimization, shortest path matrices, and other such terms. However, an optimized solution is not necessarily the best possible solution across all dimensions. Similarly, a shortest path is not necessarily the shortest path either geographically or temporally. Instead, optimized solutions and shortest paths represent values produced by optimization procedures, which may be configured in various ways.

FIG. 166 illustrates a method 16600 for determining an optimized route, performed in accordance with one or more embodiments. According to various embodiments, the method 16600 may be performed at any suitable computing device, such as a server within an on-demand computing services environment.

At 16602, a request to determine a weighting configuration for a client is received. According to various embodiments, the request may be received as part of the execution of a method for determining a route in response to a routing request. For instance, the request may be generated as part of the methods 16400 and/or 16500.

At 16604, a default weighting configuration is retrieved. According to various embodiments, the system may iteratively develop a default weighting configuration based at least in part by adjusting the weights of any of a variety of route optimization weighting parameters based on client feedback. For example, the system may at times present a client with two or more routes generated with different route optimization parameter weighting schemes and ask that the client select one of the routes. Based on the client's feedback, the default scheme may be updated to strengthen the route optimization weighting parameters to more closely match the set of route optimization parameters used to generate the selected route.

In some implementations, a default weighting configuration may be developed based at least in part based on other types of data. Such data may include, but is not limited to: best practices, route optimization requests, typical time windows, observed appointments included in routing requests, and other such information.

In some embodiments, different default weighting configurations may be developed. For example, the system may develop different default weighting configurations based on location type (e.g., rural vs. urban), client type (e.g., small, medium, large), route type (e.g., service, delivery, etc.), or other such characteristics.

A client-specific weighting configuration may be retrieved at 16606. According to various embodiments, the system may iteratively develop a client-specific weighting configuration in a fashion similar to the default weighting configuration.

One or more routes are determined based on the weighting configurations at 16608. Then, at 16610, client feedback based on the one or more routes is received. In some embodiments, as discussed with respect to the operations 16604 and 16606, different routes may be determined in response to the same routing request. The client may then select a route to provide feedback as to which route best matches the client's preferences. Alternately, or additionally, feedback may be received in a different way. For example, a client may provide specific input, such as identifying a particular route as too long or deviated from preferences in some other way.

At 16612, the default and/or client-specific weighting configurations are updated. In some embodiments, the default and/or client-specific weighting configurations may be updated to reflect the feedback received at 16610. For example, the default and/or client-specific schemes may be updated to strengthen the weights to more closely match the set of optimization parameters used to generate a route indicated in the feedback as being selected. As another example, the default and/or client-specific schemes may be updated to more closely match a specific parameter identified by the client in the feedback.

According to various embodiments, any of a variety of machine learning methods may be used to update the default and/or client-specific weighting configuration. For example, an artificial neural network such as a deep learning network may be employed.

According to various embodiments, one or more of the operations shown in FIG. 166 may be omitted. For example, if the client is not yet associated with a client-specific weighting configuration, then such a configuration may not be retrieved at 16606. As another example, if the client is associated with a robustly client-specific trained weighting configuration, then a default weighting configuration need not be retrieved at 16404.

According to various embodiments, many vehicle routing and fleet management applications require a travel time matrix and a distance matrix. This can be thought of as a 2-dimensional grid where each entry is a measurement of the travel time, cost, or distance to get between two locations. However, each entry in this matrix may involve performing a shortest path computation over the street network. The data for the street may be stored in memory and continental size street network graphs can require tens of gigabytes of RAM.

According to various embodiments, a geo-locator service may contain the polygons representing the regions and may determine the smallest region containing all of the locations in a request. A server may host the map/street network data, for instance in memory, for one or more of the regions.

According to various embodiments, the computation of a travel time or distance matrix that accounts for the actual street network graph is a computationally intensive task. Further, since the number of entries in the matrix grows quadratically, these matrices can become quite large even for modest sized problems. Each entry in the matrix requires one to perform a shortest path computation on the underlying street network graph. For example, a 100-location problem may involve 100×100=10,000 computations while a 1000 location problem may involve 1 million shortest path computations. To do this quickly, the relevant data may be stored in memory, yet storing the entire street network graph for an entire country can require tens of gigabytes of RAM. Most routing problems and/or requests for a travel time matrix do not require access to a full national-level street network as all locations are often contained within a single city, state, or region.

In some embodiments, multiple matrices may be needed to solve a single optimization problem. If traffic is to be considered one may need a matrix representing the morning rush hour travel times, the afternoon rush hour travel times, and so on, requiring multiple matrices for each problem.

Since users expect near real time response for some applications, this matrix may need to be computed as quickly as possible.

According to various embodiments, techniques and mechanisms described herein may be used to accelerate the matrix computation, for instance by partitioning the street network into smaller pieces. For example, the US may be partitioned into 16 "zones" where historical data suggests that individual routing problems for a client are likely to be contained within a single zone (note that these zones may overlap). After partitioning the street network into these zones, the data for each zone may be hosted on a single server that is responsible for computing the travel time and distance matrices for that zone. This allows the computations to be done more quickly and by using less computer memory.

According to various embodiments, the geo-locator service includes a database containing the information about each zone. For each zone, the geo-locator service may store information such as zone name, latitude and longitude of the "corner points" of the zone (i.e., the zone boundary), and/or the name/URL of the computer/server hosting this data. Such information may be stored in a database. When the geo-locator service receives a request, it may check all of the zones to find a suitable zone, such as the smallest zone that contains all of the locations in the routing problem request. The name and URL of the zone may then be returned to the requestor who may then query the appropriate machine for the relevant matrices required. Since each server hosting the street network for a particular zone is hosting a much smaller amount of data than if a single server was hosting the entire continent, one can compute the matrices faster, use smaller machines with less RAM, and better balance the workload across a number of different servers.

According to various embodiments, typical solutions to routing problems try to minimize travel time while adhering to hard time window constraints. In reality, however, many problems are multi-objective and the user wishes to account for a variety of tradeoffs such as travel time, importance of assigning certain drivers/vehicles to individual customers, visiting as many customers as possible, avoiding certain roads at some times of day, and so on. One or more embodiments provide for arbitrary constraints that describe certain features of a solution to a problem. Each constraint may be assigned a penalty value or weight based on how important it is—the higher the penalty, the more important it is to adhere to this constraint. Mathematical optimization may be employed to identify solutions that have as low a total score as possible, where the score is the sum of the penalty violations.

According to various embodiments, different optimization problems may have different objects. These include, but are not limited to: minimizing travel time, minimizing the number of vehicles used, matching drivers to customers, minimizing overtime costs, maximizing the number of high priority customers visited. A constraint may identify a yes/no question about the solution to a problem, such as:

Is the driver working more than 8 hours?,
Is the vehicle traveling more than 200 miles in a day?
Is customer x being serviced by driver y?
Is customer x being serviced on Wednesday between 9 am and 11 am
Does the driver get a lunch break?
Are we visiting at least 5 high priority customers today?
Does the first leg of a route exceed m miles?
Do items carried on the vehicle exceed a journey time of s seconds?
Do items picked up and carried on the vehicle for delivery exceed the fastest point-to-point delivery from pick up by more than m minutes?
Are items scheduled for drop-off before an associated drop-off deadline?
Are orders assigned to vehicles with attributes that are undesirable for some orders (e.g., a refrigerated truck)?
Are locations in a first set visited before locations in a second set?
Is a location the first order visited on a route?
Are two locations visited by the same driver?

A penalty may identify a numerical quantity assigned to each instance in a solution when a constraint is violated. For example, if a driver is driving more than 8 hours on a day, the solution is penalized 5 points. Optionally, the solution is penalized an additional 1 point for every 10 minutes over the 8-hour limit.

According to various embodiments, a constraint may be specific to one or more characteristics, such as orders, shifts, vehicles, time intervals In some embodiments, the overall quality of the solution may then be computed as the sum of all of these penalties which measures which rules are broken and how important each of those violations is to the user's overall preferences. By viewing these problems as multi-objective, the system may tailor the solution to match what the user really wants. Additionally, the system can provide multiple solutions back to the user to allow them to pick which solution they feel best addresses their needs.

According to various embodiments, techniques and mechanisms described herein may accelerate the solution to an optimization problem that involves the street network. Accurate solutions to these problems may involve determining distances and travel times to be computed while accounting for streets, turns, and/or predicted traffic. Distances and travel times may first be computed with approximations based on "crow flies" and accounting for a general "windiness" of the road network. The system can then begin optimizing the problem using these approximations while simultaneously doing these distance and travel time computations over the street network, gaining an overall speedup in the solution of the optimization problem.

In some implementations, one inputs into a vehicle routing problem or fleet management problem over the road network is the travel time matrix. This can be thought of as a 2-dimensional grid showing the time or distance between any two pairs of locations. In reality these travel times on the road network are not symmetric—getting from A to B may require longer than getting from B to A due to one way streets, traffic lights, etc. However, one should note that for a routing problem involving n locations, there are approximately n*n paths that must be computed—so 1,000,000 paths if one has a routing problem involving 1000 locations.

In some implementations, a very fast approximation to the street network travel time can be obtained by using so-called "crow flies" distances and travel times. In some configurations, the system may compute the distance using the Haversine formula and then make a reasonable guess as to the speed of the car/truck/bike/pedestrian to get a travel time estimate. A more complex estimate may employ an estimate for the "curvature" of roads in the area in order to weight the "crow flies" distance appropriately depending on how "not straight" roads in the area are. For example, a highway/interstate would have very little "curvature" since it is generally straight allowing for a high rate of travel.

In some implementations, the "crow flies" distance can be computed very quickly using either a Pythagorean approximation using only the latitude and longitude of the points, or a slightly more complex computation using the Haversine formula. Either of these methods may be substantially faster than the shortest path computations that must be done to compute a path between two points over the street network, and the curvature of the roads in an area can also be precomputed. Thus, when a complex fleet management or vehicle routing problem must be solved, the system may first compute the approximate distances and travel times using this shortcut method and begin solving the problem, assigning stops to vehicles, determining which day to visit each stop, and so on. Then in parallel the system may compute the actual travel times and distances over the street network using shortest path graph algorithms. When this computation is complete the system may then replace the approximate travel times and distances with these actual values and then continue the optimization solution using this more precise data.

According to various embodiments, it is possible to predict traffic on some street segment by storing historical rates of travel gathered by monitoring vehicles equipped with GPS, mobile applications that report position, and so on. Commercial map data both store this information and expose it by assigning a "traffic pattern" to each street segment. This is an estimate of the speed at regularly spaced intervals. Intuitively, while the rate of travel changes throughout the day, it changes slowly and somewhat continuously as long as there are no surprise disruptions such as a car accident (which cannot be predicted). For our purposes, the day may ideally be broken up into as few time intervals (called traffic windows) as possible where the overall traffic during these intervals is similar and the speeds in different traffic windows is as different as possible. By having fewer traffic windows, the system can assume that the rate of travel on each segment is constant during this window, increasing the computation speed for the computation of shortest paths and travel time matrices.

Consider a plot of relative rate of travel on each street compared to maximum speed (represented by 1.0). Such a plot would exhibit near maximum speed until about 5am when things start to slow down due to more traffic. Morning rush hour often hits its peak between 8 AM and 9 AM, the slowest point of the day. Things speed up over mid-day until slowing down again for rush hour. The segments in such a plot may represent a road leading from the outside of a city to downtown and is thus typical of driving with the traffic in the morning but in the opposite direction of traffic in the evenings.

According to various embodiments, one or more statistical methods may be applied to this data to find the "inflection" points in these curves. These are points where the rate of change begins to change, similar to a second derivative in calculus. By finding the most important inflection points across these patterns the system may be are able to determine the most logical cutoff points separating each window. With these windows defined, for each road segment the system may compute the average travel speed on the road during the window and use that to represent the travel speeds per road for that entire interval. By reducing the number of traffic windows, the system can do less precomputation than if it used every interval (i.e. hourly) and it can customize them to what best fits a particular region.

It will be appreciated that stylized, simplified examples are described herein for purposes of clarity of description. Actual implementations may involve more complexity.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:
receiving a route optimization request message at a server within an on-demand computing services environment, the route optimization request message identifying a first plurality of geographic locations associated with a routing request from a client entity;
identifying via a processor one of a plurality of geographic zones based on the route optimization request message, the identified geographic zone including the first plurality of geographic locations and a second plurality of geographic locations;
retrieving route optimization information from a designated one of a plurality of zone servers, the designated zone server being associated with the identified geographic zone, the route optimization information identifying transit information between each of a plurality of pairs of the second plurality of geographic locations;
determining a route to traverse the first plurality of geographic locations based on the retrieved route optimization information; and
transmitting, via a communication interface, a response message identifying the route to a client machine associated with the client entity.

2. The method recited in claim 1, wherein a designated geographic area is included in two or more of the geographic zones.

3. The method recited in claim 1, wherein the identified geographic zone is the smallest of the plurality of zones that includes the first plurality of geographic locations.

4. The method recited in claim 1, wherein the transit information identifies a first plurality of transit time values, each transit time value identifying a respective transit time between two or more of the second plurality of geographic locations.

5. The method recited in claim 4, wherein determining the route to traverse the first plurality of geographic locations involves determining a second plurality of transit time values by interpolating from two or more of the first plurality of transit time values.

6. The method recited in claim 5, wherein one or more of the first plurality of transit time values are determined by the designated zone server based on one or more observed travel time values.

7. The method recited in claim 5, wherein each of the first plurality of transit time values is stored in a shortest path matrix computed by the designated zone server.

8. The method recited in claim 1, wherein the server is included within an on-demand computing services environment configured to provide computing services to a plurality of clients via a network, the plurality of clients including the client entity.

9. A computing device configured to perform a method, the method comprising:
- receiving a route optimization request message at a server within an on-demand computing services environment, the route optimization request message identifying a first plurality of geographic locations associated with a routing request from a client entity;
- identifying via a processor one of a plurality of geographic zones based on the route optimization request message, the identified geographic zone including the first plurality of geographic locations and a second plurality of geographic locations;
- retrieving route optimization information from a designated one of a plurality of zone servers, the designated zone server being associated with the identified geographic zone, the route optimization information identifying transit information between each of a plurality of pairs of the second plurality of geographic locations;
- determining a route to traverse the first plurality of geographic locations based on the retrieved route optimization information; and
- transmitting, via a communication interface, a response message identifying the route to a client machine associated with the client entity.

10. The computing device recited in claim 9, wherein a designated geographic area is included in two or more of the geographic zones.

11. The computing device recited in claim 9, wherein the identified geographic zone is the smallest of the plurality of zones that includes the first plurality of geographic locations.

12. The computing device recited in claim 9, wherein the transit information identifies a first plurality of transit time values, each transit time value identifying a respective transit time between two or more of the second plurality of geographic locations.

13. The computing device recited in claim 9, wherein determining the route to traverse the first plurality of geographic locations involves determining a second plurality of transit time values by interpolating from two or more of the first plurality of transit time values.

14. The computing device recited in claim 9, wherein one or more of the first plurality of transit time values are determined by the designated zone server based on one or more observed travel time values.

15. One or more non-transitory machine-readable media having instructions stored thereon for performing a method, the method comprising:
- receiving a route optimization request message at a server within an on-demand computing services environment, the route optimization request message identifying a first plurality of geographic locations associated with a routing request from a client entity;
- identifying via a processor one of a plurality of geographic zones based on the route optimization request message, the identified geographic zone including the first plurality of geographic locations and a second plurality of geographic locations;
- retrieving route optimization information from a designated one of a plurality of zone servers, the designated zone server being associated with the identified geographic zone, the route optimization information identifying transit information between each of a plurality of pairs of the second plurality of geographic locations;
- determining a route to traverse the first plurality of geographic locations based on the retrieved route optimization information; and
- transmitting, via a communication interface, a response message identifying the route to a client machine associated with the client entity.

16. The one or more non-transitory machine-readable media recited in claim 15, wherein a designated geographic area is included in two or more of the geographic zones.

17. The one or more non-transitory machine-readable media recited in claim 15, wherein the identified geographic zone is the smallest of the plurality of zones that includes the first plurality of geographic locations.

18. The one or more non-transitory machine-readable media recited in claim 15, wherein the transit information identifies a first plurality of transit time values, each transit time value identifying a respective transit time between two or more of the second plurality of geographic locations.

19. The one or more non-transitory machine-readable media recited in claim 15, wherein determining the route to traverse the first plurality of geographic locations involves determining a second plurality of transit time values by interpolating from two or more of the first plurality of transit time values.

20. The one or more non-transitory machine-readable media recited in claim 15, wherein one or more of the first plurality of transit time values are determined by the designated zone server based on one or more observed travel time values.

* * * * *